United States Patent
Baumheinrich et al.

(10) Patent No.: US 12,190,788 B2
(45) Date of Patent: Jan. 7, 2025

(54) μ-LED, μ-LED DEVICE, DISPLAY AND METHOD FOR THE SAME

(71) Applicant: OSRAM Opto Semiconductors GmbH, Regensburg (DE)

(72) Inventors: Thorsten Baumheinrich, Altdorf (DE); Peter Brick, Regensburg (DE); Jean-Jacques Drolet, Obertraubling (DE); Hubert Halbritter, Dietfurt-Toeging (DE); Laura Kreiner, Regensburg (DE); Jens Richter, Hemau (DE); Thomas Schwarz, Regensburg (DE); Paul Ta, Fremont, CA (US); Kilian Regau, Regensburg (DE); Christopher Soell, Veitsbronn (DE); Hoa Vu, Milpitas, CA (US); Christopher Wiesmann, Barbing (DE); Patrick Hoerner, Regensburg (DE); Jong Park, Sunnyvale, CA (US); Kanishk Chand, Santa Clara, CA (US)

(73) Assignee: OSRAM OPTO SEMICONDUCTORS GMBH, Regensburg (DE)

( * ) Notice: Subject to any disclaimer, the term of this patent is extended or adjusted under 35 U.S.C. 154(b) by 0 days.

(21) Appl. No.: 17/515,102

(22) Filed: Oct. 29, 2021

(65) Prior Publication Data
US 2022/0051615 A1    Feb. 17, 2022

Related U.S. Application Data

(63) Continuation of application No. 17/039,482, filed on Sep. 30, 2020, now Pat. No. 11,302,248, which is a (Continued)

(30) Foreign Application Priority Data

Jan. 29, 2019   (DK) .............................. PA201970059
Jan. 31, 2019   (DE) .................... 10 2019 102 509.5
(Continued)

(51) Int. Cl.
G09G 3/32      (2016.01)
B60K 35/00     (2024.01)
(Continued)

(52) U.S. Cl.
CPC ............... *G09G 3/32* (2013.01); *B60K 35/00* (2013.01); *G09G 5/10* (2013.01); *B60K 35/22* (2024.01);
(Continued)

(58) Field of Classification Search
None
See application file for complete search history.

(56) References Cited

U.S. PATENT DOCUMENTS 4,897,614 A   1/1990   Nishio
4,979,002 A   12/1990  Pankove
(Continued)

FOREIGN PATENT DOCUMENTS

DE   19744793 A1   4/1998
DE   19751649 A1   5/1999
(Continued)

OTHER PUBLICATIONS

Mingzeng Peng, Yan Zhang, Yudong Liu, Ming Song, Junyi Zhai, Zhong Lin Wang, "Magnetic-Mechanical-Electrical-Optical Coupling Effects in GaN-Based LED/Rare-Earth Terfenol-D Structures," vol. 26, Issue 39, Oct. 22, 2014, pp. 6767-6772.
(Continued)

*Primary Examiner* — Christopher R Lamb
(74) *Attorney, Agent, or Firm* — ArentFox Schiff LLP

(57) ABSTRACT

Disclosed are various aspects of a μ-LED or a μ-LED array for augmented reality or lighting applications, in particular in the automotive field. The μ-LED is characterized by particularly small dimensions in the range of a few μm.

9 Claims, 51 Drawing Sheets

Related U.S. Application Data continuation of application No. PCT/EP2020/052191, filed on Jan. 29, 2020.

(60) Provisional application No. 62/937,552, filed on Nov. 19, 2019.

(30) Foreign Application Priority Data

| Apr. 23, 2019 | (DE) | .................. 10 2019 110 497.1 |
| Apr. 23, 2019 | (DE) | .................. 10 2019 110 523.4 |
| May 9, 2019 | (DE) | .................. 10 2019 112 124.8 |
| May 23, 2019 | (DE) | .................. 10 2019 113 792.6 |
| Jun. 7, 2019 | (DE) | .................. 10 2019 115 479.0 |

(51) Int. Cl.
 *B60K 35/22* (2024.01)
 *G09G 5/10* (2006.01)

(52) U.S. Cl.
 CPC ............... *B60K 2360/1523* (2024.01); *B60K 2360/349* (2024.01); *G09G 2320/0633* (2013.01)

(56) References Cited

U.S. PATENT DOCUMENTS

| 5,103,271 | A | 4/1992 | Izumiya et al. |
| 5,537,171 | A | 7/1996 | Ogino et al. |
| 5,858,814 | A | 1/1999 | Goossen et al. |
| 6,048,751 | A | 4/2000 | D'Asaro et al. |
| 6,316,286 | B1 | 11/2001 | Trezza |
| 6,527,456 | B1 | 3/2003 | Trezza |
| 6,881,982 | B2 | 4/2005 | Okuyama et al. |
| 7,067,339 | B2 | 6/2006 | Biwa et al. |
| 7,808,005 | B1 | 10/2010 | Fattal et al. |
| 8,049,233 | B2 | 11/2011 | Fukshima et al. |
| 8,349,116 | B1 | 1/2013 | Bibl et al. |
| 8,536,026 | B2 | 9/2013 | Park et al. |
| 8,586,965 | B2 | 11/2013 | Toyoda et al. |
| 8,816,324 | B2 | 8/2014 | Fukui et al. |
| 9,202,988 | B2 | 12/2015 | Yoshida et al. |
| 9,318,645 | B2 | 4/2016 | Tani et al. |
| 9,368,683 | B1 | 6/2016 | Meitl et al. |
| 9,437,782 | B2 | 9/2016 | Bower et al. |
| 9,444,015 | B2 | 9/2016 | Bower et al. |
| 9,472,734 | B1 | 10/2016 | Chen et al. |
| 9,520,537 | B2 | 12/2016 | Bower et al. |
| 9,698,308 | B2 | 7/2017 | Bower et al. |
| 9,705,042 | B2 | 7/2017 | Bower et al. |
| 9,923,013 | B1* | 3/2018 | Yamashita ........ H01L 27/14643 |
| 9,991,423 | B2 | 6/2018 | Bower et al. |
| 9,997,102 | B2 | 6/2018 | Rotzoll et al. |
| 10,069,036 | B2 | 9/2018 | Atanackovic |
| 10,096,585 | B2 | 10/2018 | Tanaka et al. |
| 10,147,849 | B2 | 12/2018 | Xu et al. |
| 10,177,195 | B2 | 1/2019 | Ahmed et al. |
| 10,224,460 | B2 | 3/2019 | Bower et al. |
| 10,395,589 | B1 | 8/2019 | Vahid Far et al. |
| 10,396,241 | B1 | 8/2019 | Perkins |
| 10,405,406 | B2 | 9/2019 | Liszt |
| 10,418,517 | B2 | 9/2019 | Atanackovic |
| 10,446,719 | B2 | 10/2019 | Bower et al. |
| 10,490,695 | B2 | 11/2019 | Gomez-Iglesias et al. |
| 10,522,787 | B1 | 12/2019 | Montgomery et al. |
| 10,622,514 | B1 | 4/2020 | Atanackovic |
| 10,802,334 | B2 | 10/2020 | Kim et al. |
| 10,833,225 | B2 | 11/2020 | Bower et al. |
| 10,963,103 | B1 | 3/2021 | Shahmohammadi |
| 10,985,143 | B2 | 4/2021 | Bower et al. |
| 10,903,193 | B2 | 5/2021 | Yamada |
| 11,156,759 | B2 | 10/2021 | Brick et al. |
| 11,367,807 | B2 | 6/2022 | Wada et al. |
| 11,513,275 | B2 | 11/2022 | Brick et al. |
| 11,538,852 | B2 | 12/2022 | Varghese et al. |
| 11,552,057 | B2 | 1/2023 | Chae et al. |
| 2002/0072138 | A1 | 6/2002 | Trezza et al. |
| 2002/0074553 | A1 | 6/2002 | Starikov et al. |
| 2003/0013230 | A1 | 1/2003 | Dudoff et al. |
| 2003/0141507 | A1 | 7/2003 | Krames et al. |
| 2003/0168666 | A1 | 9/2003 | Okuyama et al. |
| 2003/0189125 | A1 | 10/2003 | Trierenberg |
| 2005/0194598 | A1 | 9/2005 | Kim et al. |
| 2005/0237488 | A1 | 10/2005 | Yamasaki et al. |
| 2005/0264472 | A1 | 12/2005 | Rast |
| 2006/0164345 | A1 | 7/2006 | Sarma et al. |
| 2006/0192225 | A1 | 8/2006 | Chua et al. |
| 2007/0057249 | A1 | 3/2007 | Kim et al. |
| 2007/0096127 | A1 | 5/2007 | Pattison et al. |
| 2008/0061304 | A1 | 3/2008 | Huang et al. |
| 2008/0160725 | A1 | 7/2008 | Byun et al. |
| 2009/0045416 | A1 | 2/2009 | Bierhuizen et al. |
| 2009/0291237 | A1 | 11/2009 | Park et al. |
| 2009/0315054 | A1 | 12/2009 | Kim et al. |
| 2010/0019693 | A1 | 1/2010 | Hoogzaad et al. |
| 2010/0019697 | A1 | 1/2010 | Korsunsky et al. |
| 2010/0163894 | A1 | 7/2010 | Uemura et al. |
| 2010/0252103 | A1 | 10/2010 | Yao et al. |
| 2010/0317132 | A1 | 12/2010 | Rogers et al. |
| 2011/0151602 | A1 | 6/2011 | Speier |
| 2011/0156070 | A1 | 6/2011 | Yoon et al. |
| 2011/0156616 | A1 | 6/2011 | Anderson et al. |
| 2011/0204327 | A1 | 8/2011 | Hiruma et al. |
| 2011/0254043 | A1 | 10/2011 | Negishi et al. |
| 2011/0263054 | A1 | 10/2011 | Yu et al. |
| 2012/0126229 | A1 | 5/2012 | Bower |
| 2012/0223289 | A1 | 9/2012 | Gwo et al. |
| 2012/0223873 | A1 | 9/2012 | Ohta |
| 2013/0063815 | A1 | 3/2013 | Kubota |
| 2013/0082624 | A1 | 4/2013 | Brassfield et al. |
| 2013/0119424 | A1 | 5/2013 | Kang et al. |
| 2013/0154498 | A1 | 6/2013 | Missbach |
| 2013/0249972 | A1 | 9/2013 | Nishino et al. |
| 2013/0328066 | A1 | 12/2013 | Sabathil et al. |
| 2014/0008677 | A1 | 1/2014 | Zhu et al. |
| 2014/0054619 | A1 | 2/2014 | Tseng et al. |
| 2014/0131753 | A1 | 5/2014 | Ishida et al. |
| 2014/0159064 | A1 | 6/2014 | Sakariya et al. |
| 2014/0319560 | A1 | 10/2014 | Tischler |
| 2014/0340900 | A1 | 11/2014 | Bathurst et al. |
| 2015/0103070 | A1 | 4/2015 | In et al. |
| 2015/0103404 | A1 | 4/2015 | Rudy et al. |
| 2015/0162560 | A1 | 6/2015 | Chen et al. |
| 2015/0186099 | A1 | 7/2015 | Hall |
| 2015/0187991 | A1 | 7/2015 | McGroddy et al. |
| 2015/0207399 | A1 | 7/2015 | Li et al. |
| 2015/0280086 | A1 | 10/2015 | Jang et al. |
| 2015/0293302 | A1 | 10/2015 | Czornomaz et al. |
| 2016/0013167 | A1* | 1/2016 | Sakariya ................ H01L 33/36 257/88 |
| 2016/0155892 | A1 | 6/2016 | Li et al. |
| 2016/0172253 | A1 | 6/2016 | Wu et al. |
| 2016/0240159 | A1 | 8/2016 | Ohkawa et al. |
| 2016/0315218 | A1 | 10/2016 | Bour et al. |
| 2016/0341942 | A1 | 11/2016 | Cheon et al. |
| 2016/0351539 | A1 | 12/2016 | Bower et al. |
| 2017/0005151 | A1 | 1/2017 | Kim et al. |
| 2017/0061878 | A1 | 3/2017 | Park et al. |
| 2017/0082263 | A1 | 3/2017 | Byrnes et al. |
| 2017/0084775 | A1 | 3/2017 | Li et al. |
| 2017/0133357 | A1 | 5/2017 | Kuo et al. |
| 2017/0170360 | A1 | 6/2017 | Bour et al. |
| 2017/0179097 | A1 | 6/2017 | Zhang et al. |
| 2017/0179192 | A1 | 6/2017 | Zhang et al. |
| 2017/0186740 | A1 | 6/2017 | Cok et al. |
| 2017/0186908 | A1 | 6/2017 | Robin et al. |
| 2017/0236885 | A1 | 8/2017 | Koshihara et al. |
| 2017/0254518 | A1 | 9/2017 | Vasylyev |
| 2017/0270852 | A1* | 9/2017 | Meitl ....................... G09G 3/32 |
| 2017/0278733 | A1 | 9/2017 | Chang et al. |
| 2017/0287402 | A1 | 10/2017 | Toyomura et al. |
| 2017/0352313 | A1 | 12/2017 | Miyake |
| 2017/0371087 | A1 | 12/2017 | You et al. |
| 2018/0005562 | A1 | 1/2018 | Lin et al. |
| 2018/0024412 | A1 | 1/2018 | Kim et al. |

(56) References Cited

U.S. PATENT DOCUMENTS

| | | |
|---|---|---|
| 2018/0033768 A1 | 2/2018 | Kumar et al. |
| 2018/0084614 A1 | 3/2018 | Bower et al. |
| 2018/0097033 A1 | 4/2018 | Ahmed et al. |
| 2018/0114878 A1 | 4/2018 | Danesh et al. |
| 2018/0180249 A1 | 6/2018 | Yamada et al. |
| 2018/0182298 A1 | 6/2018 | Jang et al. |
| 2018/0190712 A1 | 7/2018 | Xu et al. |
| 2018/0211595 A1 | 7/2018 | Takahashi et al. |
| 2018/0211945 A1 | 7/2018 | Cok et al. |
| 2018/0219144 A1 | 8/2018 | Perkins et al. |
| 2018/0226386 A1 | 8/2018 | Cok |
| 2018/0247586 A1 | 8/2018 | Vahid Far et al. |
| 2018/0269234 A1 | 9/2018 | Hughes et al. |
| 2018/0301433 A1 | 10/2018 | Robin et al. |
| 2018/0308832 A1 | 10/2018 | Shin et al. |
| 2018/0323116 A1 | 11/2018 | Wu et al. |
| 2018/0331258 A1 | 11/2018 | Halbritter et al. |
| 2018/0342492 A1 | 11/2018 | Lu |
| 2018/0358339 A1 | 12/2018 | Iguchi |
| 2018/0358340 A1* | 12/2018 | Wong .................... H01L 25/167 |
| 2019/0012957 A1 | 1/2019 | Liu et al. |
| 2019/0012965 A1 | 1/2019 | Fu et al. |
| 2019/0044023 A1 | 2/2019 | Cheng et al. |
| 2019/0058081 A1 | 2/2019 | Ahmed et al. |
| 2019/0066571 A1 | 2/2019 | Goward |
| 2019/0066587 A1 | 2/2019 | Han |
| 2019/0113199 A1 | 4/2019 | Pellarin et al. |
| 2019/0113727 A1 | 4/2019 | Tamma |
| 2019/0115508 A1 | 4/2019 | Lin et al. |
| 2019/0137757 A1 | 5/2019 | Rousseau |
| 2019/0148606 A1 | 5/2019 | Racz et al. |
| 2019/0165209 A1 | 5/2019 | Bonar et al. |
| 2019/0195466 A1 | 6/2019 | Shimizu |
| 2019/0198716 A1 | 6/2019 | Gordon et al. |
| 2019/0229097 A1 | 7/2019 | Takeya et al. |
| 2019/0235234 A1 | 8/2019 | Hu et al. |
| 2019/0235677 A1 | 8/2019 | Liu et al. |
| 2019/0258346 A1 | 8/2019 | Cheng et al. |
| 2019/0273471 A1 | 9/2019 | Ahmed et al. |
| 2019/0293939 A1 | 9/2019 | Sluka |
| 2019/0302917 A1 | 10/2019 | Pan |
| 2019/0305035 A1 | 10/2019 | Cho et al. |
| 2019/0305036 A1 | 10/2019 | Ahn et al. |
| 2019/0305185 A1 | 10/2019 | Lauermann et al. |
| 2019/0335553 A1 | 10/2019 | Ahmed et al. |
| 2019/0347979 A1 | 11/2019 | Ahmed |
| 2019/0378674 A1 | 12/2019 | Chou et al. |
| 2019/0383474 A1 | 12/2019 | Vasylyev |
| 2019/0386173 A1 | 12/2019 | Chen et al. |
| 2019/0393198 A1 | 12/2019 | Takeya |
| 2020/0052033 A1 | 2/2020 | Iguchi |
| 2020/0105184 A1* | 4/2020 | Shao .................... H01L 33/486 |
| 2020/0119233 A1 | 4/2020 | Dupont |
| 2020/0134624 A1 | 4/2020 | Zhang et al. |
| 2020/0203580 A1 | 6/2020 | Marutani |
| 2020/0227594 A1 | 7/2020 | Kuo |
| 2020/0251638 A1 | 8/2020 | Morris et al. |
| 2020/0342194 A1 | 10/2020 | Bhat et al. |
| 2020/0343230 A1* | 10/2020 | Sizov .................... H01L 25/0753 |
| 2020/0356016 A1 | 11/2020 | Sampayan et al. |
| 2020/0366067 A1 | 11/2020 | David et al. |
| 2021/0005775 A1 | 1/2021 | Chen et al. |
| 2021/0043617 A1 | 2/2021 | Onuma et al. |
| 2021/0124247 A1 | 4/2021 | Mezouari et al. |
| 2021/0134624 A1 | 5/2021 | Zhang |
| 2021/0136966 A1 | 5/2021 | Jang et al. |
| 2021/0242370 A1 | 8/2021 | Lee et al. |
| 2021/0272938 A1 | 9/2021 | Chang et al. |
| 2021/0313497 A1 | 10/2021 | Pourquier |
| 2021/0325594 A1 | 10/2021 | Meng et al. |
| 2021/0375833 A1 | 12/2021 | Lee et al. |
| 2021/0391514 A1 | 12/2021 | Koyama et al. |
| 2021/0405276 A1 | 12/2021 | Brick et al. |
| 2022/0051614 A1 | 2/2022 | Baumheinrich et al. |
| 2022/0093833 A1 | 3/2022 | Takiguchi et al. |
| 2022/0101781 A1 | 3/2022 | Baumheinrich et al. |
| 2022/0102583 A1 | 3/2022 | Baumheinrich et al. |
| 2022/0123046 A1 | 4/2022 | Behringer et al. |
| 2022/0231193 A1 | 7/2022 | Boss et al. |
| 2022/0262850 A1 | 8/2022 | Behringer et al. |
| 2022/0262851 A1 | 8/2022 | Behringer et al. |
| 2022/0262852 A1 | 8/2022 | Behringer et al. |
| 2022/0271084 A1 | 8/2022 | Behringer et al. |
| 2022/0271085 A1 | 8/2022 | Behringer et al. |
| 2022/0285430 A1 | 9/2022 | Behringer et al. |
| 2022/0285591 A1 | 9/2022 | Biebersdorf et al. |
| 2022/0285592 A1 | 9/2022 | Biebersdorf et al. |
| 2022/0293829 A1 | 9/2022 | Biebersdorf et al. |
| 2022/0293830 A1 | 9/2022 | Biebersdorf et al. |
| 2022/0310888 A1 | 9/2022 | Biebersdorf et al. |
| 2022/0352436 A1 | 11/2022 | Biebersdorf et al. |
| 2022/0375991 A1 | 11/2022 | Behringer et al. |

FOREIGN PATENT DOCUMENTS

| | | |
|---|---|---|
| DE | 19911717 A1 | 9/2000 |
| DE | 10009782 A1 | 9/2001 |
| DE | 102006045702 A1 | 4/2008 |
| DE | 102007043877 A1 | 1/2009 |
| DE | 102007046339 A1 | 4/2009 |
| DE | 102005063159 B4 | 5/2009 |
| DE | 102012008833 A1 | 11/2012 |
| DE | 102013104273 A1 | 10/2014 |
| DE | 102017106755 A1 | 10/2018 |
| DE | 102017109083 A1 | 10/2018 |
| DE | 102018108022 A1 | 10/2018 |
| DE | 102017114369 A1 | 1/2019 |
| DE | 102018113363 A1 | 12/2019 |
| DE | 102018119312 A1 | 2/2020 |
| DE | 102018119376 A1 | 2/2020 |
| EP | 0488772 A1 | 6/1992 |
| EP | 1544660 A1 | 6/2005 |
| EP | 1553640 A1 | 7/2005 |
| EP | 1887634 A2 | 2/2008 |
| EP | 2323185 A2 | 5/2011 |
| EP | 2396818 A2 | 12/2011 |
| EP | 2430652 A | 3/2012 |
| EP | 2609624 | 3/2012 |
| EP | 2477240 A1 | 7/2012 |
| EP | 2506321 A1 | 10/2012 |
| EP | 2642537 A2 | 9/2013 |
| EP | 2685155 A2 | 1/2014 |
| EP | 2750208 A2 | 7/2014 |
| EP | 2838130 A1 | 2/2015 |
| EP | 2924490 A2 | 9/2015 |
| EP | 2980866 A1 | 2/2016 |
| EP | 2986082 A1 | 2/2016 |
| EP | 3010048 A1 | 4/2016 |
| EP | 3031086 A1 | 6/2016 |
| EP | 2676528 B1 | 8/2017 |
| EP | 3226042 A1 | 10/2017 |
| EP | 2704215 B1 | 4/2018 |
| EP | 3367374 A1 | 8/2018 |
| EP | 33673774 A1 | 8/2018 |
| JP | S62269385 A | 11/1987 |
| JP | H06244457 A | 9/1994 |
| JP | 2004-228297 A | 8/2004 |
| JP | 2005244220 A | 9/2005 |
| JP | 2005346066 A | 12/2005 |
| JP | 2007264610 A | 10/2007 |
| JP | 2007324416 A | 12/2007 |
| JP | 2009141254 A | 6/2009 |
| JP | 2009186794 A | 8/2009 |
| JP | 2009260357 A | 11/2009 |
| JP | 2010272245 A | 12/2010 |
| JP | 2013048282 A | 3/2013 |
| JP | 2013110154 A | 6/2013 |
| JP | 2014019436 A | 2/2014 |
| JP | 2015099238 A | 5/2015 |
| JP | 2016208012 A | 12/2016 |
| JP | 2019009438 A | 1/2017 |
| JP | 2017152655 A | 8/2017 |
| JP | 2017-533453 A | 11/2017 |
| JP | 2017535966 A | 11/2017 |

(56) References Cited

FOREIGN PATENT DOCUMENTS

| | | |
|---|---|---|
| JP | 2018063975 A | 4/2018 |
| JP | 2018-191006 A | 11/2018 |
| JP | 2019029473 A | 2/2019 |
| KR | 20130052944 A1 | 5/2013 |
| WO | 2004084318 A1 | 9/2004 |
| WO | 2006035212 A1 | 4/2006 |
| WO | 2007001099 A1 | 1/2007 |
| WO | 2009082121 A2 | 7/2009 |
| WO | 2010019594 A2 | 2/2010 |
| WO | 2010132552 A1 | 11/2010 |
| WO | 2010149027 A1 | 12/2010 |
| WO | 2011069747 A1 | 6/2011 |
| WO | 2011117056 A1 | 9/2011 |
| WO | 2011160051 A2 | 12/2011 |
| WO | 2012014857 A1 | 2/2012 |
| WO | 2013026440 A2 | 2/2013 |
| WO | 2014047113 A1 | 3/2014 |
| WO | 2014093063 A1 | 6/2014 |
| WO | 2015138102 A1 | 9/2015 |
| WO | 2016025325 A1 | 2/2016 |
| WO | 2016054092 A1 | 4/2016 |
| WO | 2016060677 A1 | 4/2016 |
| WO | 2017087312 A1 | 5/2017 |
| WO | 2017111827 A1 | 6/2017 |
| WO | 2017120320 A1 | 7/2017 |
| WO | 2017120341 A1 | 7/2017 |
| WO | 2017197576 A1 | 11/2017 |
| WO | 2018117382 A1 | 6/2018 |
| WO | 2018123280 A1 | 7/2018 |
| WO | 2018179540 A1 | 10/2018 |

OTHER PUBLICATIONS

Buljan et al., "Ultra-Compact Multichannel Freeform Optics for 4xWUXGA OLED Microdisplays," Proc. SPIE 10676, Digital Optics for Immersive Displays, 9 pages (2018).

Fortuna, "Integrated Nanoscale Antenna-LED for On-Chip Optical Communication," UC Berkeley, 146 pages (2017).

Li et al., "Waveguiding in Vertical Cavity Quantum-Well Structure Defined by Ion Implantation," J. Lightwave Technol. 16, pp. 1498-1508 (1998).

Ogihara et al., "1200 Dots-Per-Inch Light Emitting Diode Array Fabricated by Solid-Phase Zinc Diffusion," IEICE Transactions on Electronics, 80;3, pp. 489-497 (1997).

Stevens et al., "Varifocal Technologies Providing Prescription and VAC Mitigation in HMDs Using Alvarez Lenses," Proc. SPIE 10676, Digital Optics for Immersive Displays, 18 pages (2018).

Tomioka et al., "Selective-Area Growth of III-V Nanowires and Their Applications," Journal of Materials Research, 26(17), pp. 2127-2141 (2011).

Waldern et al., "DigiLens Switchable Bragg Grating Waveguide Optics for Augmented Reality Applications," Proc. SPIE 10676, Digital Optics for Immersive Displays, 17 pages (2018).

Wheelwright et al., "Field of View: Not Just a Number," Proc. SPIE 10676, Digital Optics for Immersive Displays, 8 pages (2018).

Yu et al., "Hybrid LED Driver for Multi-Channel Output with High Consistency," 2015 IEEE 11th International Conference on ASIC (ASICON), Chengdu, 4 pages (2015).

Huang et al., "Metasurface holography: from fundamentals to applications," Nanophotonics. 7(6), pp. 1169-1190 (2018).

International Search Report for International Patent Application No. PCT/EP2020/058997, mailed Mar. 5, 2021 (10 pages).

International Search Report for International Patent Application No. PCT/EP2020/058547, mailed Mar. 26, 2021 (9 pages).

Volz et al., "Influence of annealing on the optical and structural properties of dilute N-containing III/V semiconductor heterostructures," Journal of Crystal Growth, Jan. 2007, vol. 298, pp. 126-130.

\* cited by examiner

| | App. Field | Usecase | Viewing Distance [cm] | Min. Size X*Y [cm] | Max. Size X*Y [cm] | PPI | PP [μm] | Res. Type |
|---|---|---|---|---|---|---|---|---|
| Direct Emitter Display | Auto | Low res HuD | tbd | tbd | tbd | tbd | tbd | tbd |
| | Auto | Multi Media Display Rear | 30 - 40 | 15*10 | 25*15 | ≥ 250 | ≤ 102 | mid res |
| | Auto | Rear View Mirror / Replacement | 25 - 70 | 16*6 | 30*15 | ≥ 250 | ≤ 102 | |
| | Auto | Display in the Window Pillars | 25 - 150 | 20*5 | 100*30 | ≥ 250 | ≤ 102 | |
| | Auto | Cluster | 40 - 70 | 20*10 | 90*30 | ≥ 200 | ≤ 127 | |
| | Auto | Center Stack | 40 - 70 | 12*9 | 40*25 | ≥ 200 | ≤ 127 | |
| | Auto | Small Distributed info Displays (e.g. AC Control) | 40 - 70 | 1*0,5 | 6*6 | ≥ 200 | ≤ 127 | |
| | Auto | Extended Cluster Across Dash Board | 40 - 70 | 150*10 | 180*30 | ≥ 200 | ≤ 127 | |
| | Auto | Exterior Advertisement good resolution | 50 - 150 | 30*30 | 50*150 | ≥ 100 | ≤ 254 | |
| | Auto | Roof / Sky | 20 - 40 | 70*40 | 200*180 | ≥ 50 | ≤ 508 | low res |
| | Auto | RCL | 200 - …. | 20*10 | 50*30 | ≥ 50 | ≤ 508 | |
| | Auto | Decoration Style Displays | 20 - 200 | 20*10 | 180*30 | ≥ 50 | ≤ 508 | |
| | MM | Command & Control | 300-1500 | 200*200 | 5000*300 | ≤ 30 | ≥ 847 | very low res |
| | MM | Conference/Board Rooms | 1000-10000 | 70*180 | 300*600 | ≤ 30 | ≥ 847 | |
| | Auto | Pedestrian Communication | 200-…… | tbd | tbd | ≥ 25 | ≤ 1016 | |
| | Auto | Exterior Advertisement | 50-2000 | 30*30 | 50*150 | ≥ 25 | ≤ 1016 | |
| | MM | Electronic Posters | 50-2000 | 100*200 | 200*400 | ≥ 25 | ≤ 1016 | |
| | MM | Cinema | 3000-50000 | 500*300 | 800*2000 | ≤ 10 | ≥ 2540 | |

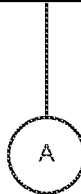

FIG. 3B-1

| | Auto | Rear View Mirror | 25 - 70 | 15*10 | 30*15 | ≥ 250 | ≤ 102 | mid res |
|---|---|---|---|---|---|---|---|---|
| Transparent Direct Emitter Display | Auto | Vanity Mirror | 25 - 70 | 7*4 | 90*90 | ≥ 250 | ≤ 102 | |
| | Auto | Side View Mirror | 40 – 70 | 12*8 | 20*15 | ≥ 200 | ≤ 127 | |
| | Auto | Side Window status indicators | 40 – 70 | 2*2 | 15*3 | ≥ 200 | ≤ 127 | |
| | Auto | Stacked Display (3D Cluster) | 40 – 70 | 20*10 | 180*30 | ≥ 200 | ≤ 127 | |
| | Auto | Panorama Roof Display | 20 - 40 | 70*40 | 200*180 | ≥ 50 | ≤ 508 | low res |
| | MM | Advertisement | 50-2000 | 100*200 | 200*400 | ≥ 25 | ≤ 1016 | very low res |
| | Auto | Rear/Side Window Display (Outside Communication, Rear Light, Turn Indicator) | 200 - 1000 | 20*20 | 180*150 | ≥ 10 | ≤ 2540 | |
| | Auto | CHMSL (Center High Mounted Stop Light) | 200 - ...... | 20*10 | 180*15 | ≥ 10 | ≤ 2540 | |
| | Auto | Peripheral Display (e.g. Wind Shield, Side Windows, etc…) | 40 – 70 | 5*5 | 180*15 | ≥ 10 | ≤ 2540 | |
| | Auto | Wind Shield Display for Autonomous Communication (Full Size) | 200 - 1000 | 3*50 | 180*150 | ≥ 10 | ≤ 2540 | |

FIG. 3B-2

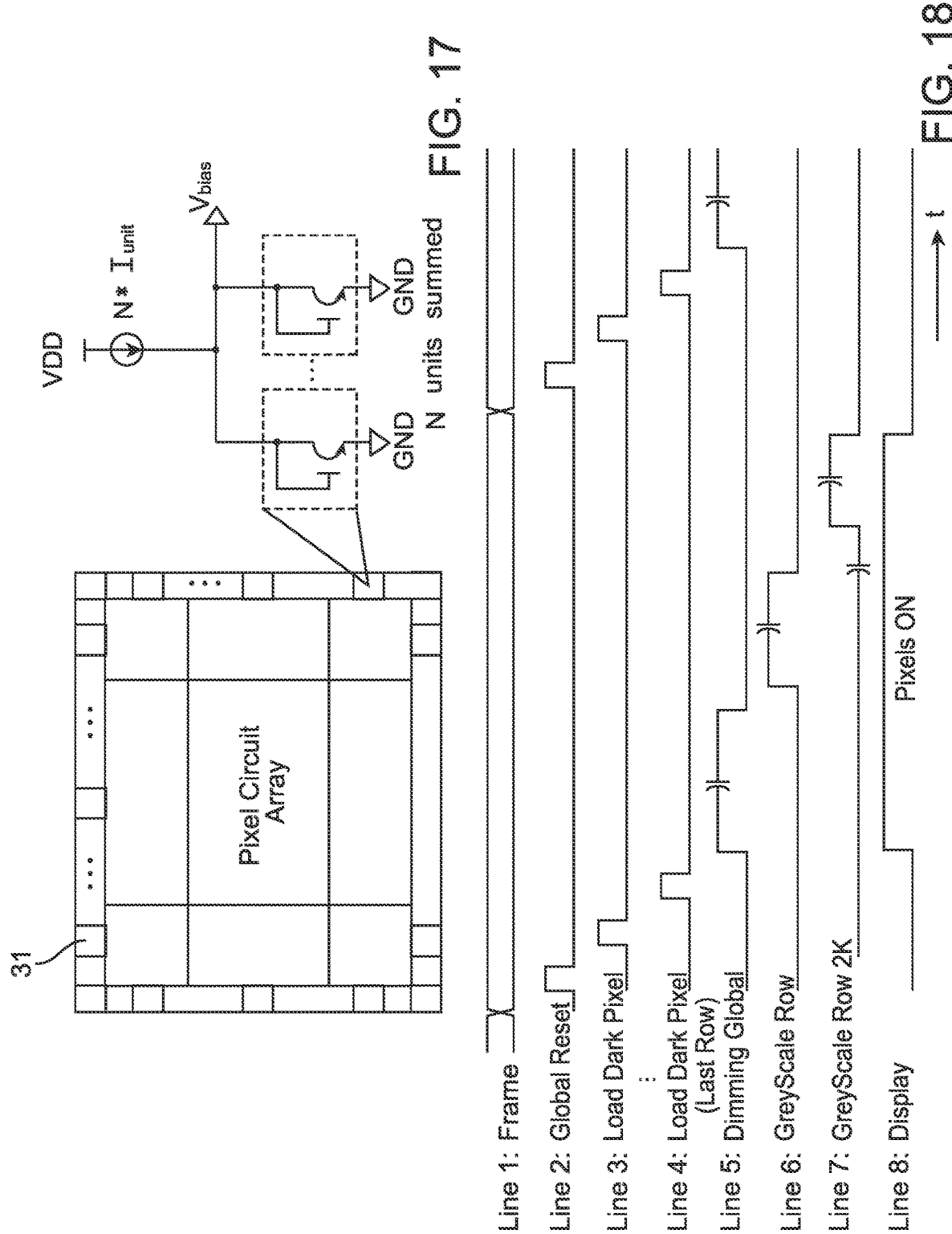

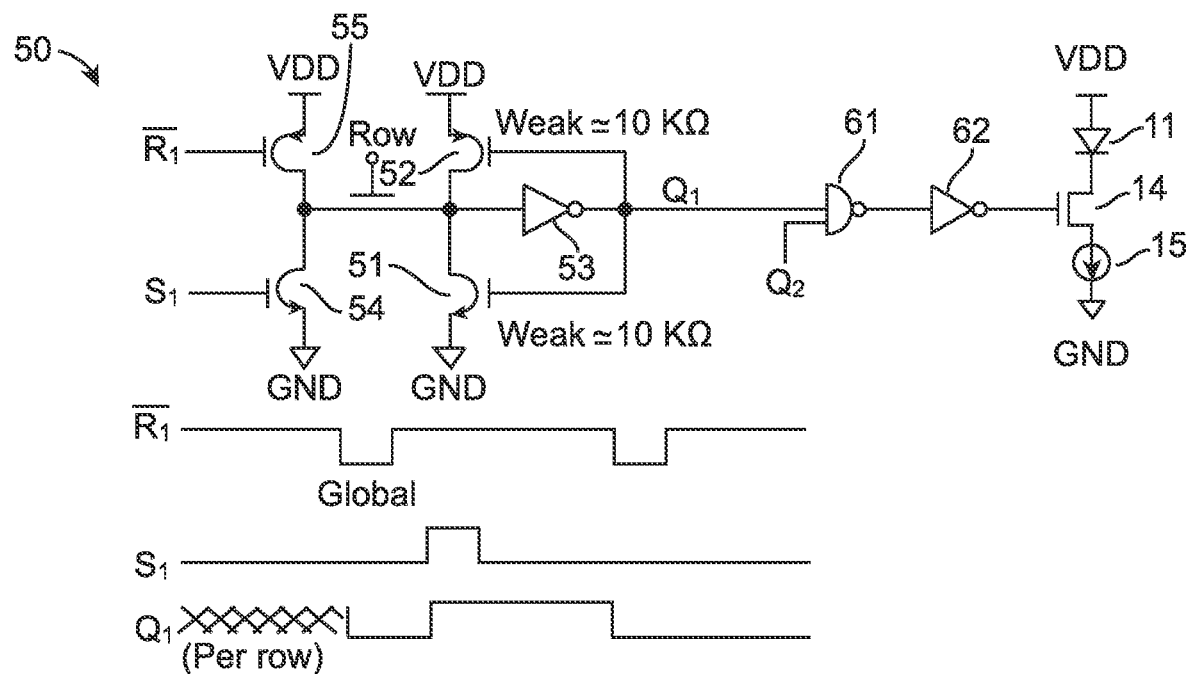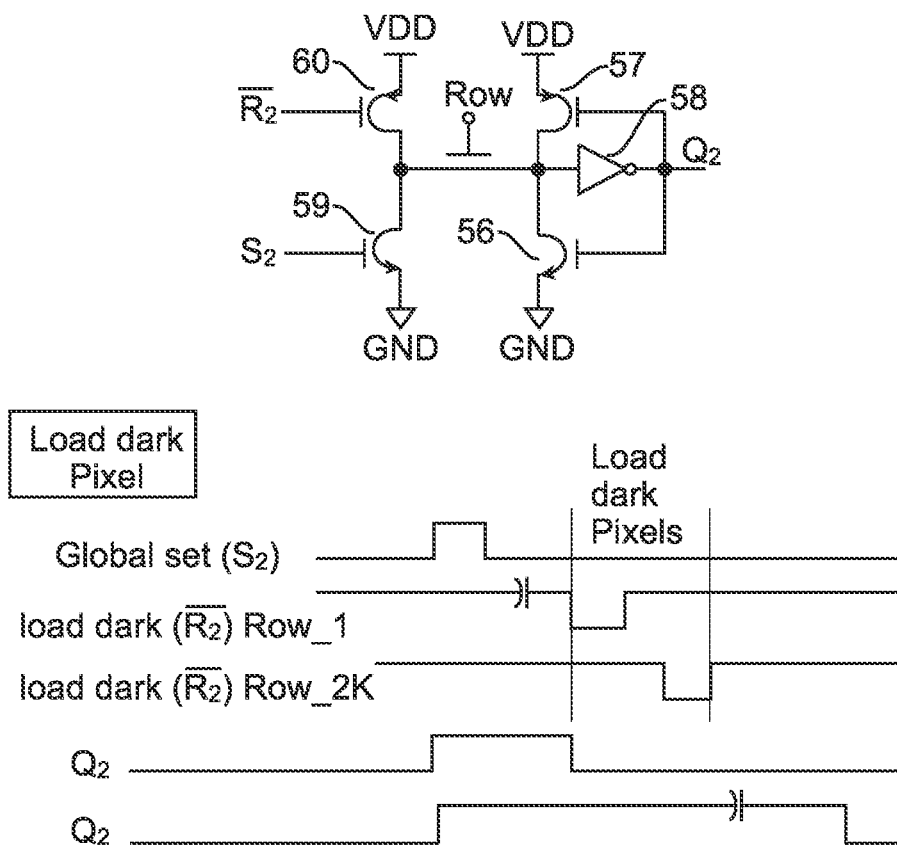
FIG. 19

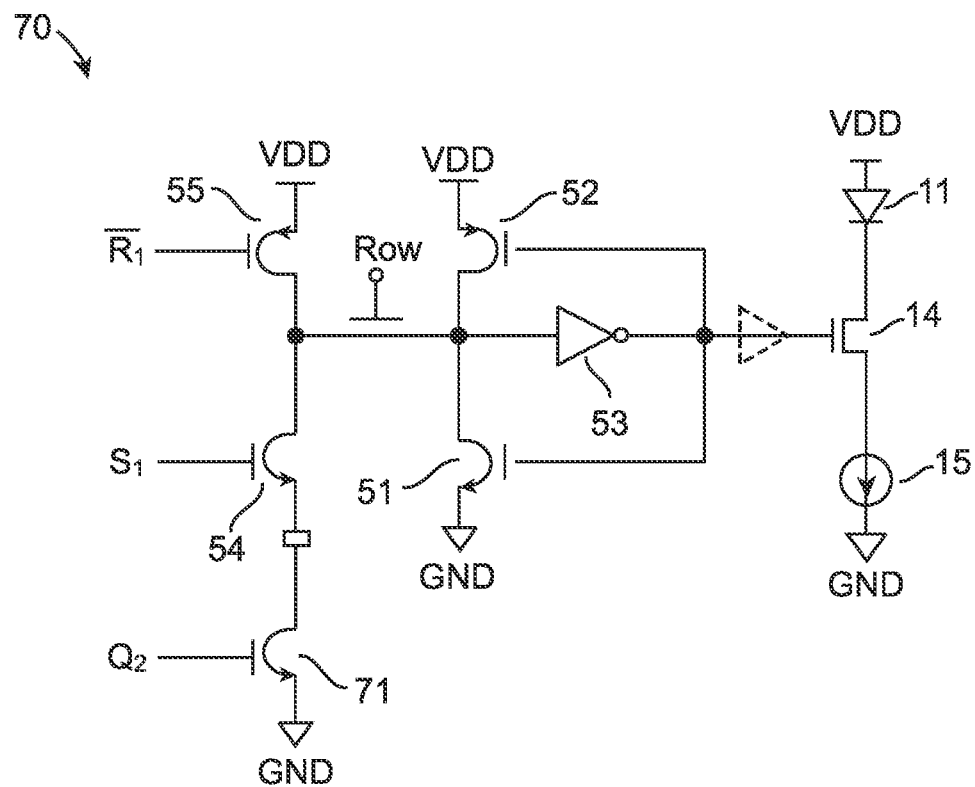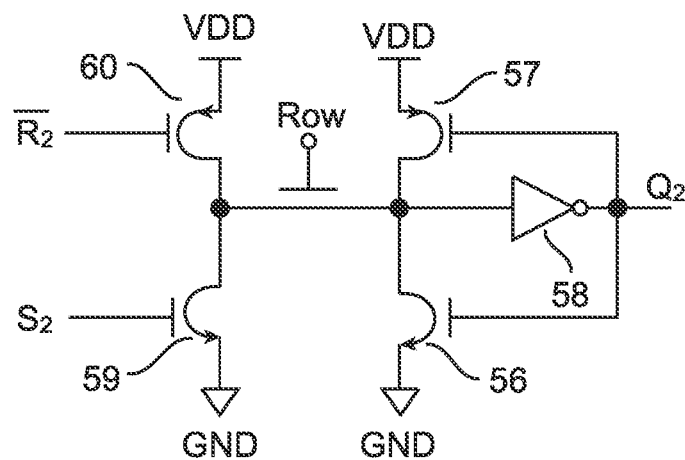
FIG. 20

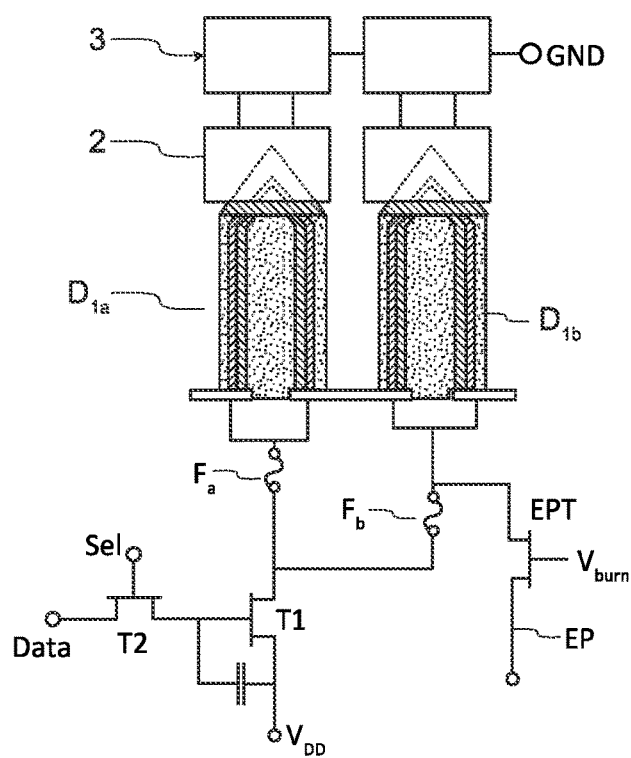
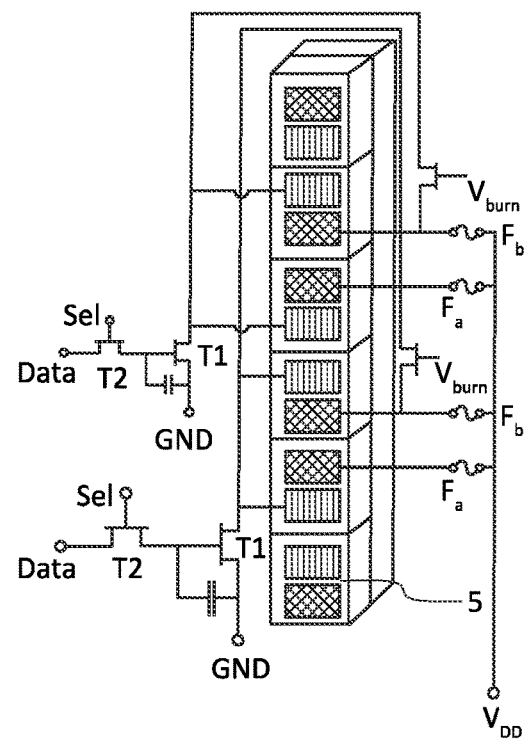
FIG. 41
FIG. 42

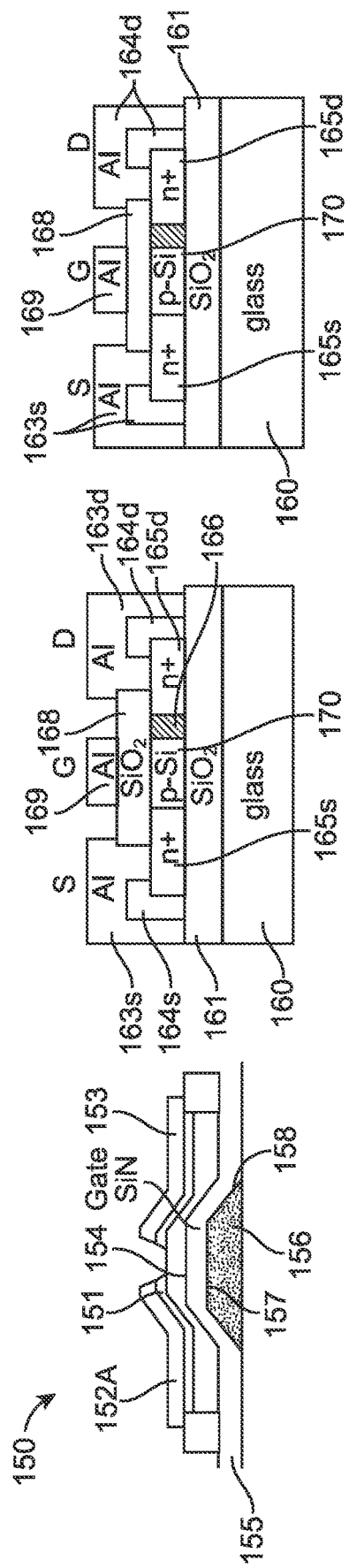

µ-LED, µ-LED DEVICE, DISPLAY AND METHOD FOR THE SAME

This patent application is a continuation of U.S. application Ser. No. 17/039,482, which claims the priorities of the German applications DE 102019112124.8 of 9 May 2019, DE 102019102509.5 of 31 Jan. 2019, DE 102019115479.0 of 7 Jun. 2019, DE 10 2019110523.4 of 23 Apr. 2019, DE 102019113792.6 of 23 May 2019, DE 102019110497.1 of 23 Apr. 2019, as well as the priority of the Danish application DK PA201970059 of 29 Jan. 2019, as well as the priority of U.S. application No. 62/937,552 of 19 Nov. 2019, as well as the priority of PCT application PCT/EP2020/052191 of 29 Jan. 2020. The disclosure of each of the above applications is incorporated herein by reference in its entirety. Additionally, this patent application is related to the following patent applications: U.S. application Ser. No. 17/038,283, filed Sep. 30, 2020; U.S. application Ser. No. 17/039,283, filed Sep. 30, 2020; U.S. application Ser. No. 17/039,097, filed Sep. 30, 2020; U.S. application Ser. No. 17/426,456, filed Jul. 28, 2021; U.S. application Ser. No. 17/426,520, filed Jul. 28, 2021; U.S. application Ser. No. 17/475,030, filed Sep. 14, 2021; U.S. application Ser. No. 17/475,975, filed Sep. 14, 2021; U.S. application Ser. No. 17/510,907, filed Oct. 26, 2021; U.S. application Ser. No. 17/513,398, filed Oct. 28, 2021; U.S. application Ser. No. 17/513,587, filed Oct. 28, 2021; U.S. application Ser. No. 17/513,475, filed Oct. 28, 2021; U.S. application Ser. No. 17/515,057, filed Oct. 29, 2021; U.S. application Ser. No. 17/515,131, filed Oct. 29, 2021; U.S. application Ser. No. 17/515,138, filed Oct. 29, 2021; U.S. application Ser. No. 17/515,142, filed Oct. 29, 2021; U.S. application Ser. No. 17/515,326, filed Oct. 29, 2021; U.S. application Ser. No. 17/515,337, filed Oct. 29, 2021; and U.S. application Ser. No. 17/515,338, filed Oct. 29, 2021.

BACKGROUND

The ongoing current developments within the Internet of Things and the field of communication have opened the door for various new applications and concepts. For development, service and manufacturing purposes, these concepts and applications offer increased effectiveness and efficiency.

One aspect of new concepts is based on augmented or virtual reality. A general definition of "augmented reality" is given by an "interactive experience of the real environment, whereby the objects from it, which are in the real world, are augmented by computer generated perceptible information".

The information is mostly transported by visualization, but is not limited to visual perception. Sometimes haptic or other sensory perceptions can be used to expand reality. In the case of visualization, the superimposed sensory-visual information can be constructive, i.e. additional to the natural environment, or it can be destructive, for example by obscuring parts of the natural environment. In some applications, it is also possible to interact with the superimposed sensory information in one way or another. In this way, augmented reality reinforces the ongoing perception of the user of the real environment.

In contrast, "virtual reality" completely replaces the real environment of the user with an environment that is completely simulated. In other words, while in an augmented reality environment the user is able to perceive the real world at least partially, in a virtual reality the environment is completely simulated and may differ significantly from reality. Augmented Reality can be used to improve natural environmental situations, enriching the user's experience or supporting the user in performing certain tasks. For example, a user may use a display with augmented reality features to assist him in performing certain tasks. Because information about a real object is superimposed to provide clues to the user, the user is supported with additional information, allowing the user to act more quickly, safely and effectively during manufacturing, repair or other services. In the medical field, augmented reality can be used to guide and support the doctor in diagnosing and treating the patient. In development, an engineer may experience the results of his experiments directly and can therefore evaluate the results more easily. In the tourism or event industry, augmented reality can provide a user with additional information about sights, history, and the like. Augmented Reality can support the learning of activities or tasks.

SUMMARY

In the following summary different aspects for µ-displays in the automotive and augmented reality applications are explained. This includes devices, displays, controls, process engineering methods and other aspects suitable for augmented reality and automotive applications. This includes aspects which are directed to light generation by means of displays, indicators or similar. In addition, control circuits, power supplies and aspects of light extraction, light guidance and focusing as well as applications of such devices are listed and explained by means of various examples.

Because of the various limitations and challenges posed by the small size of the light-generating components, a combination of the various aspects is not only advantageous, but often necessary. For ease of reference, this disclosure is divided into several sections with similar topics. However, this should explicitly not be understood to mean that features from one topic cannot be combined with others. Rather, aspects from different topics should be combined to create a display for augmented reality or other applications or even in the automotive sector.

For considerations of the following solutions, some terms and expressions should be explained in order to define a common and equal understanding. The terms listed are generally used with this understanding in this document. In individual cases, however, there may be deviations from the interpretation, whereby such deviation will be specifically referred to.

"Active Matrix Display"

The term "active matrix display" was originally used for liquid crystal displays containing a matrix of thin film transistors that drive LCD pixels. Each individual pixel has a circuit with active components (usually transistors) and power supply connections. At present, however, this technology should not be limited to liquid crystals, but should also be used in particular for driving µ-LEDs or µ-displays.

"Active Matrix Carrier Substrate"

"Active matrix carrier substrate" or "active matrix backplane" means a drive for light emitting diodes of a display with thin-film transistor circuits. The circuits may be integrated into the backplane or mounted on it. The "active matrix carrier substrate" has one or more interface contacts, which form an electrical connection to a µ-LED display structure. An "active-matrix carrier substrate" can thus be part of an active-matrix display or support it.

"Active layer"

The active layer is referred to as the layer in an optoelectronic component or light emitting diode in which charge carriers recombine. In its simplest form, the active layer can be characterized by a region of two adjacent semiconductor layers of different conductivity type. More complex active layers comprise quantum wells (see there), multi-quantum wells or other structures that have additional properties. Similarly, the structure and material systems can be used to adjust the band gap (see there) in the active layer, which determines the wavelength and thus the color of the light.

"Alvarez Lens Array"

With the use of Alvarez lens pairs, a beam path can be adapted to video eyewear. An adjustment optic comprises an Alvarez lens arrangement, in particular a rotatable version with a Moire lens arrangement. Here, the beam deflection is determined by the first derivative of the respective phase plate relief, which is approximated, for example, by $z=ax2+by2+cx+dy+e$ for the transmission direction z and the transverse directions x and y, and by the offset of the two phase plates arranged in pairs in the transverse directions x and y. For further design alternatives, swivelling prisms are provided in the adjustment optics.

"Augmented Reality (AR)"

This is an interactive experience of the real environment, where the subject of the picking up is located in the real world and is enhanced by computer-generated perceptible information. Extended reality is the computer-aided extension of the perception of reality by means of this computer-generated perceptible information. The information can address all human sensory modalities. Often, however, augmented reality is only understood to be the visual representation of information, i.e. the supplementation of images or videos with computer-generated additional information or virtual objects by means of fade-in/overlay. Applications and explanations of the mode of operation of Augmented Reality can be found in the introduction and in the following in execution examples.

"Automotive."

Automotive generally refers to the motor vehicle or automobile industry. This term should therefore cover this branch, but also all other branches of industry which include μ-displays or generally light displays—with very high resolution and μ-LEDs.

"Bandgap"

Bandgap, also known as band gap or forbidden zone, is the energetic distance between the valence band and conduction band of a solid-state body. Its electrical and optical properties are largely determined by the size of the band gap. The size of the band gap is usually specified in electron volts (eV). The band gap is thus also used to differentiate between metals, semiconductors and insulators. The band gap can be adapted, i.e. changed, by various measures such as spatial doping, deforming of the crystal lattice structure or by changing the material systems. Material systems with so-called direct band gap, i.e. where the maximum of the valence band and a minimum of the conduction band in the pulse space are superimposed, allow a recombination of electron-hole pairs under emission of light.

"Bragg Grid"

Fibre Bragg gratings are special optical interference filters inscribed in optical fibres. Wavelengths that lie within the filter bandwidth around λB are reflected. In the fiber core of an optical waveguide, a periodic modulation of the refractive index is generated by means of various methods. This creates areas with high and low refractive indexes that reflect light of a certain wavelength (bandstop). The center wavelength of the filter bandwidth in single-mode fibers results from the Bragg condition.

"Directionality"

Directionality is the term used to describe the radiation pattern of a μ-LED or other light-emitting device. A high directionality corresponds to a high directional radiation, or a small radiation cone. In general, the aim should be to obtain a high directional radiation so that crosstalk of light into adjacent pixels is avoided as far as possible. Accordingly, the light-emitting component has a different brightness depending on the viewing angle and thus differs from a Lambert emitter.

The directionality can be changed by mechanical measures or other measures, for example on the side intended for the emission. In addition to lenses and the like, this includes photonic crystals or pillar structures (columnar structures) arranged on the emitting surface of a pixelated array or on an arrangement of, in particular, μ-LEDs. These generate a virtual band gap that reduces or prevents the propagation of a light vector along the emitting surface.

"Far Field"

The terms near field and far field describe spatial areas around a component emitting an electromagnetic wave, which differ in their characterization. Usually the space regions are divided into three areas: reactive near field, transition field and far field. In the far field, the electromagnetic wave propagates as a plane wave independent of the radiating element.

"Fly Screen Effect"

The Screen Door Effect (SDE) is a permanently visible image artefact in digital video projectors. The term fly screen effect describes the unwanted black space between the individual pixels or their projected information, which is caused by technical reasons, and takes the form of a fly screen. This distance is due to the construction, because between the individual LCD segments run the conductor paths for control, where light is swallowed and therefore cannot hit the screen. If small optoelectronic lighting devices and especially μ-LEDs are used or if the distance between individual light emitting diodes is too great, the resulting low packing density leads to possibly visible differences between pointy illuminated and dark areas when viewing a single pixel area. This so-called fly screen effect (screen door effect) is particularly noticeable at a short viewing distance and thus especially in applications such as VR glasses. Sub-pixel structures are usually perceived and perceived as disturbing when the illumination difference within a pixel continues periodically across the matrix arrangement. Accordingly, the fly screen effect in automotive and augmented reality applications should be avoided as far as possible.

"Flip Chip"

Flip-chip assembly is a process of assembly and connection technology for contacting unpackaged semiconductor chips by means of contact bumps, or short "bumps". In flip-chip mounting, the chip is mounted directly, without any further connecting wires, with the active contacting side down—towards the substrate/circuit carrier—via the bumps. This results in particularly small package dimensions and short conductor lengths. A flip-chip is thus in particular an electronic semiconductor component contacted on its rear side. The mounting may also require special transfer techniques, for example using an auxiliary carrier. The radiation direction of a flip chip is then usually the side opposite the contact surfaces.

"Flip-Flop"

A flip-flop, often called a bi-stable flip-flop or bi-stable flip-flop element, is an electronic circuit that has two stable states of the output signal. The current state depends not only on the input signals present at the moment, but also on the state that existed prior to the time under consideration. A dependence on time does not exist, but only on events. Due to the bi-stability, the flip-flop can store a data quantity of a single bit for an unlimited time. In contrast to other types of storage, however, power supply must be permanently guaranteed. The flip-flop, as the basic component of sequential circuits, is an indispensable component of digital technology and thus a fundamental component of many electronic circuits, from quartz watches to microprocessors. In particular, as an elementary one-bit memory, it is the basic element of static memory components for computers. Some designs can use different types of flip-flops or other buffer circuits to store state information. Their respective input and output signals are digital, i.e. they alternate between logical "false" and logical "true". These values are also known as "low" 0 and "high" 1.

"Head-Up Display"

The head-up display is a display system or projection device that allows users to maintain their head position or viewing direction by projecting information into their field of vision. The Head-up Display is an augmented reality system. In some cases, a Head-Up Display has a sensor to determine the direction of vision or orientation in space.

"Horizontal Light Emitting Diode"

With horizontal LEDs, the electrical connections are on a common side of the LED. This is often the back of the LED facing away from the light emission surface. Horizontal LEDs therefore have contacts that are only formed on one surface side.

"Interference Filter"

Interference filters are optical components that use the effect of interference to filter light according to frequency, i.e. color for visible light.

"Collimation"

In optics, collimation refers to the parallel direction of divergent light beams. The corresponding lens is called collimator or convergent lens. A collimated light beam contains a large proportion of parallel rays and is therefore minimally spread when it spreads. A use in this sense refers to the spreading of light emitted by a source. A collimated beam emitted from a surface has a strong dependence on the angle of radiation. In other words, the radiance (power per unit of a fixed angle per unit of projected source area) of a collimated light source changes with increasing angle. Light can be collimated by a number of methods, for example by using a special lens placed in front of the light source. Consequently, collimated light can also be considered as light with a very high directional dependence.

"Converter Material"

Converter material is a material, which is suitable for converting light of a first wavelength into a second wavelength. The first wavelength is shorter than the second wavelength. This includes various stable inorganic as well as organic dyes and quantum dots. The converter material can be applied and structured in various processes.

"Lambert Lamps"

For many applications, a so-called Lambertian radiation pattern is required. This means that a light-emitting surface ideally has a uniform radiation density over its area, resulting in a vertically circular distribution of radiant intensity. Since the human eye only evaluates the luminance (luminance is the photometric equivalent of radiance), such a Lambertian material appears to be equally bright regardless of the direction of observation. Especially for curved and flexible display surfaces, this uniform, angle-independent brightness can be an important quality factor that is sometimes difficult to achieve with currently available displays due to their design and LED technology.

LEDs and µ-LEDs resemble a Lambert spotlight and emit light in a large spatial angle. Depending on the application, further measures are taken to improve the radiation characteristics or to achieve greater directionality (see there).

"Conductivity Type"

The term "conductivity type" refers to the majority of (n- or p-) charge carriers in a given semiconductor material. In other words, a semiconductor material that is n-doped is considered to be of n-type conductivity. Accordingly, if a semiconductor material is n-type, then it is n-doped. The term "active" region in a semiconductor refers to a border region in a semiconductor between an n-doped layer and a p-doped layer. In this region, a radiative recombination of p- and n-type charge carriers takes place. In some designs, the active region is still structured and includes, for example, quantum well or quantum dot structures.

"Light Field Display"

Virtual retinal display (VNA) or light field display is referred to a display technology that draws a raster image directly onto the retina of the eye. The user gets the impression of a screen floating in front of him. A light field display can be provided in the form of glasses, whereby a raster image is projected directly onto the retina of a user's eye. In the virtual retina display, a direct retinal projection creates an image within the user's eye. The light field display is an augmented reality system.

"Lithography" or "Photolithography"

Photolithography is one of the central methods of semiconductor and microsystem technology for the production of integrated circuits and other products. The image of a photomask is transferred onto a photosensitive photoresist by means of exposure. Afterwards, the exposed areas of the photoresist are dissolved (alternatively, the unexposed areas can be dissolved if the photoresist is cured under light). This creates a lithographic mask that allows further processing by chemical and physical processes, such as applying material to the open areas or etching depressions in the open areas. Later, the remaining photoresist can also be removed.

"µ-LED"

A µ-LED is an optoelectronic component whose edge lengths are less than 70 µm, especially down to less than 20 µm, especially in the range of 1 µm to 10 µm. Another range is between 10 to 30 µm. This results in an area of a few hundred µm$^2$ down to several tens of µm$^2$. For example, a µ-LED can comprise an area of about 60 µm$^2$ with an edge length of about 8 µm. In some cases, a µ-LED has an edge length of 5 µm or less, resulting in a size of less than 30 µm$^2$. Typical heights of such µ-LEDs are, for example, in the range of 1.5 µm to 10 µm.

In addition to classic lighting applications, displays are the main applications for µ-LEDs. The µ-LEDs form pixels or subpixels and emit light of a defined color. Due to their small pixel size and high density with a small pitch, µ-LEDs are suitable for small monolithic displays for AR applications, among other things.

Due to the above-mentioned very small size of a µ-LED, the production and processing is significantly more difficult compared to previous larger LEDs. The same applies to additional elements such as contacts, package, lenses etc. Some aspects that can be realized with larger optoelectronic components cannot be produced with µ-LEDs or only in a different way. In this respect, a µ-LED is therefore significantly different from a conventional LED, i.e. a light emitting device with an edge length of 200 µm or more.

"µ-LED Array"

See at µ-Display

"µ-Display"

A µ-display or µ-LED array is a matrix with a plurality of pixels arranged in defined rows and columns. With regard to its functionality, a µ-LED array often forms a matrix of µ-LEDs of the same type and color. Therefore, it rather provides a lighting surface. The purpose of a µ-display, on the other hand, is to transmit information, which often results in the demand for different colors or an addressable control for each individual pixel or subpixel. A µ-display can be made up of several µ-LED arrays, which are arranged together on a backplane or other carrier. Likewise, a µ-LED array can also form a µ-Display.

The size of each pixel is in the order of a few µm, similar to µ-LEDs. Consequently, the overall dimension of a p display with 1920*1080 pixels with a µ-LED size of 5 µm per pixel and directly adjacent pixels is in the order of a few 10 $mm^2$. In other words, a µ-display or µ-LED array is a small-sized arrangement, which is realized by means of µ-LEDs.

µ-displays or µ-LED arrays can be formed from the same, i.e. from one work piece. The µ-LEDs of the µ-LED array can be monolithic. Such µ-displays or µ-LED arrays are called monolithic µ-LED arrays or µ-displays.

Alternatively, both assemblies can be formed by growing µ-LEDs individually on a substrate and then arranging them individually or in groups on a carrier at a desired distance from each other using a so-called Pick & Place process. Such µ-displays or µ-LED arrays are called non-monolithic. For non-monolithic µ-displays or µ-LED arrays, other distances between individual µ-LEDs are also possible. These distances can be chosen flexibly depending on the application and design. Thus, such µ-displays or µ-LED arrays can also be called pitch-expanded. In the case of pitch-expanded µ-displays or µ-LED arrays, this means that the µ-LEDs are arranged at a greater distance than on the growth substrate when transferred to a carrier. In a non-monolithic µ-display or µ-LED array, each individual pixel can comprise a blue light-emitting µ-LED and a green light-emitting µ-LED as well as a red light-emitting µ-LED.

To take advantage of different advantages of monolithic µ-LED arrays and non-monolithic µ-LED arrays in a single module, monolithic µ-LED arrays can be combined with non-monolithic µ-LED arrays in a µ-display. Thus, µ-displays can be used to realize different functions or applications. Such a display is called a hybrid display.

"µ-LED Nano Column"

A µ-LED nano column is generally a stack of semiconductor layers with an active layer, thus forming a µ-LED. The µ-LED nano column has an edge length smaller than the height of the column. For example, the edge length of a µ-LED nanopillar is approximately 10 nm to 300 nm, while the height of the device can be in the range of 200 nm to 1 µm or more.

"µ-Rod"

µ-rod or Rod designates in particular a geometric structure, in particular a rod or bar or generally a longitudinally extending, for example cylindrical, structure. µ-rods are produced with spatial dimensions in the µm to nanometer range. Thus, nanorods are also included here.

"Nanorods"

In nanotechnology, nanorods are a design of nanoscale objects. Each of their dimensions is in the range of about 10 nm to 500 nm. They may be synthesized from metal or semiconducting materials. Aspect ratios (length divided by width) are 3 to 5. Nanorods are produced by direct chemical synthesis. A combination of ligands acts as a shape control agent and attaches to different facets of the nanorod with different strengths. This allows different shapes of the nanorod with different growth rates to produce an elongated object. µLED nanopillars are such nano rods.

"Miniature LED"

Their dimensions range from 100 µm to 750 µm, especially in the range larger than 150 µm.

"Moiré Effect" and "Moiré Lens Arrangement"

The moiré effect refers to an apparent coarse raster that is created by overlaying regular, finer rasters. The resulting pattern, whose appearance is similar to patterns resulting from interference, is a special case of the aliasing effect by subsampling. In the field of signal analysis, aliasing effects are errors that occur when the signal to be sampled contains frequency components that are higher than half the sampling frequency. In image processing and computer graphics, aliasing effects occur when images are scanned and result in patterns that are not included in the original image. A moire lens array is a special case of an Alvarez lens array.

"Monolithic Construction Element"

A monolithic construction element is a construction element made of one piece. A typical such device is for example a monolithic pixel array, where the array is made of one piece and the µ-LEDs of the array are manufactured together on one carrier.

"Optical Mode"

A mode is the description of certain temporally stationary properties of a wave. The wave is described as the sum of different modes. The modes differ in the spatial distribution of the intensity. The shape of the modes is determined by the boundary conditions under which the wave propagates. The analysis according to vibration modes can be applied to both standing and continuous waves. For electromagnetic waves, such as light, laser and radio waves, the following types of modes are distinguished: TEM or transverse electromagnetic mode, TE or H modes, TM or E modes. TEM or transverse electromagnetic mode: Both the electric and the magnetic field components are always perpendicular to the direction of propagation. This mode is only propagation-capable if either two conductors (equipotential surfaces) insulated from each other are available, for example in a coaxial cable, or no electrical conductor is available, for example in gas lasers or optical fibers. TE or H modes: Only the electric field component is perpendicular to the direction of propagation, while the magnetic field component is in the direction of propagation. TM or E modes: Only the magnetic field component is perpendicular to the propagation direction, while the electric field component points in the propagation direction.

"Optoelectronic Device"

An optoelectronic component is a semiconductor body that generates light by recombination of charge carriers during operation and emits it. The light generated can range from the infrared to the ultraviolet range, with the wavelength depending on various parameters, including the material system used and doping. An optoelectronic component is also called a light emitting diode.

For the purpose of this disclosure, the term optoelectronic device or also light-emitting device is used synonymously. A µ-LED (see there) is thus a special optoelectronic device with regard to its geometry. In displays, optoelectronic components are usually monolithic or as individual components placed on a matrix.

"Passive Matrix Backplane" or "Passive Matrix Carrier Substrate"

A passive matrix display is a matrix display, in which the individual pixels are driven passively (without additional electronic components in the individual pixels). A light emitting diode of a display can be controlled by means of IC circuits. In contrast, displays with active pixels driven by transistors are referred to as active matrix displays. A passive matrix carrier substrate is part of a passive matrix display and carries it.

"Photonic Crystal" or "Photonic Structure"

A photonic structure can be a photonic crystal, a quasi-periodic or deterministically aperiodic photonic structure. The photonic structure generates a band structure for photons by a periodic variation of the optical refractive index. This band structure can comprise a band gap in a certain frequency range. As a result, photons cannot propagate through the photonic structure in all spatial directions. In particular, propagation parallel to a surface is often blocked, but perpendicular to it is possible. In this way, the photonic structure or the photonic crystal determines a propagation in a certain direction. It blocks or reduces this in one direction and thus generates a beam or a bundle of rays of radiation directed as required into the room or radiation area provided for this purpose.

Photonic crystals are photonic structures occurring or created in transparent solids. Photonic crystals are not necessarily crystalline—their name derives from analogous diffraction and reflection effects of X-rays in crystals due to their lattice constants. The structure dimensions are equal to or greater than a quarter of the corresponding wavelength of the photons, i.e. they are in the range of fractions of a µm to several µm. They are produced by classical lithography or also by self-organizing processes.

Similar or the same property of a photonic crystal can alternatively be produced with non-periodic but nevertheless ordered structures. Such structures are especially quasiperiodic structures or deterministically aperiodic structures. These can be for example spiral photonic arrangements.

In particular, so-called two-dimensional photonic crystals are mentioned here as examples, which exhibit a periodic variation of the optical refractive index in two mutually perpendicular spatial directions, especially in two spatial directions parallel to the light-emitting surface and perpendicular to each other.

However, there are also one-dimensional photonic structures, especially one-dimensional photonic crystals. A one-dimensional photonic crystal exhibits a periodic variation of the refractive index along one direction. This direction can be parallel to the light exit plane. Due to the one-dimensional structure, a beam can be formed in a first spatial direction. Thereby a photonic effect can be achieved already with a few periods in the photonic structure. For example, the photonic structure can be designed in such a way that the electromagnetic radiation is at least approximately collimated with respect to the first spatial direction. Thus, a collimated beam can be generated at least with respect to the first direction in space.

"Pixel"

Pixel, pixel, image cell or picture element refers to the individual color values of a digital raster graphic as well as the area elements required to capture or display a color value in an image sensor or screen with raster control. A pixel is thus an addressable element in a display device and comprises at least one light-emitting device. A pixel has a certain size and adjacent pixels are separated by a defined distance or pixel space. In displays, especially µ-displays, often three (or in case of additional redundancy several) subpixels of different color are combined to one pixel.

"Planar Array"

A planar array is an essentially flat surface. It is often smooth and without protruding structures. Roughness of the surface is usually not desired and does not have the desired functionality. A planar array is for example a monolithic, planar array with several optoelectronic components.

"Pulse Width Modulation"

Pulse width modulation or PWM is a type of modulation for driving a component, in particular a µ-LED. Here the PWM signal controls a switch that is configured to switch a current through the respective µ-LED on and off so that the µ-LED either emits light or does not emit light. With the PWM, the output provides a square wave signal with a fixed frequency f. The relative quantity of the switch-on time compared to the switch-off time during each period T (=1/f) determines the brightness of the light emitted by the µ-LED. The longer the switch-on time, the brighter the light.

"Quantum Well"

A quantum well or quantum well refers to a potential in a band structure in one or more semiconductor materials that restricts the freedom of movement of a particle in a spatial dimension (usually in the z-direction). As a result, only one planar region (x, y plane) can be occupied by charge carriers. The width of the quantum well significantly determines the quantum mechanical states that the particles can assume and leads to the formation of energy levels (sub-bands), i.e. the particle can only assume discrete (potential) energy values.

"Recombination"

In general, a distinction is made between radiative and non-radiative recombination. In the latter case, a photon is generated which can leave a component. A non-radiative recombination leads to the generation of phonons, which heat a component. The ratio of radiative to non-radiative recombination is a relevant parameter and depends, among other things, on the size of the component. In general, the smaller the component, the smaller the ratio and non-radiative recombination increases in relation to radiative recombination.

"Refresh Time"

Refresh time is the time after which a cell of a display or similar must be rewritten so that it either does not lose the information or the refresh is predetermined by external circumstances.

"Die" or "Light-Emitting Body"

A light-emitting body or also a die is a semiconductor structure which is separated from a wafer after production on a wafer and which is suitable for generating light after an electrical contact during operation. In this context, a die is a semiconductor structure, which contains an active layer for light generation. The die is usually separated after contacting, but can also be processed further in the form of arrays.

"Slot Antenna"

A slot antenna is a special type of antenna in which instead of surrounding a metallic structure in space with air (as a nonconductor), an interruption of a metallic structure (e.g. a metal plate, a waveguide, etc.) is provided. This interruption causes an emission of an electromagnetic wave whose wavelength depends on the geometry of the interruption. The interruption often follows the principle of the dipole, but can theoretically have any other geometry. A slot antenna thus comprises a metallic structure with a cavity resonator having a length of the order of magnitude of wavelengths of visible light. The metallic structure can be located in or surrounded by an insulating material. Usually, the metallic structure is earthed to set a certain potential.

"Field of Vision"

Field of view (FOV) refers to the area in the field of view of an optical device, a sun sensor, the image area of a camera (film or picking up sensor) or a transparent display within which events or changes can be perceived and recorded. In particular, a field of view is an area that can be seen by a human being without movement of the eyes. With reference to augmented reality and an apparent object placed in front of the eye, the field of view comprises the area indicated as a number of degrees of the angle of vision during stable fixation of the eye.

"Subpixels"

A subpixel (approximately "subpixel") describes the inner structure of a pixel. In general, the term subpixel is associated with a higher resolution than can be expected from a single pixel. A pixel can also consist of several smaller subpixels, each of which radiates a single color. The overall color impression of a pixel is created by mixing the individual subpixels. A subpixel is thus the smallest addressable unit in a display device. A subpixel also comprises a certain size that is smaller than the size of the pixel to which the subpixel is assigned.

"Vertical Light Emitting Diode"

In contrast to the horizontal LED, a vertical LED comprises one electrical connection on the front and one on the back of the LED. One of the two sides also forms the light emission surface. Vertical LEDs thus comprise contacts that are formed towards two opposite main surface sides. Accordingly, it is necessary to deposit an electrically conductive but transparent material so that on the one hand, electrical contact is ensured and on the other hand, light can pass through.

"Virtual Reality"

Virtual reality, or VR for short, is the representation and simultaneous perception of reality and its physical properties in a real-time computer-generated, interactive virtual environment. A virtual reality can completely replace the real environment of an operator with a fully simulated environment.

Several aspects disclosed herein relate to the Control of light emitting elements in a µ-LED display. The limited space available among the current matrix element pixels requires further consideration of how to address and control the individual pixels. Conventional approaches and techniques may not be usable due to the limited space.

This may also apply to concepts where the current is controlled by each pixel. Since the required space for a µ-LED as subpixel is much smaller than for normal pixels, newer concepts are necessary.

In addition, driver circuits should be capable of providing the current frame rates of 60 Hz to 240 Hz. In this context it is also necessary or at least expedient to achieve a wide dynamic brightness range (1:100,000) or 100 dB per individual pixel. This range is necessary to achieve sufficient contrast and brightness of the image even under different external light influences in automotive or augmented reality applications.

Due to the already mentioned size of the individual µ-LEDs in both pixelated displays and monolithic arrays, a digitally generated pulse width modulation, PWM, seems to be appropriate. Accordingly, the technology should be scalable in terms of both pixel array size and CMOS technology process nodes. A digitally generated PWM also allows calibration for non-uniformity of both pixel array and pixel current.

A digital nonlinear PWM can process digital codes so that the pulse width can be generated by a nonlinear transfer function of the codes to pulse width. In the following different concepts are presented, which are suitable for implementation in monolithic displays or pixelated arrays with µ-LEDs due to their special size or scalability.

Typically, in a pulse width modulation (PWM) implementation, a standard pixel cell circuit is very quickly switched alternately to "off" and "rated current". For this purpose, a so-called 2T1C circuit is used in conventional circuits. However, especially in displays with a high number of lines and columns, the programming frequency is very high in order to achieve a sufficient "refresh rate" of the display. In the past, this problem was solved by a second transistor, which, however, consumes additional space. Especially with the µ-displays shown here, or even the space "under" the µ-LEDs, the space may no longer be sufficient. In addition, depending on the wiring (i.e. position of the µ-LED within the current path), a higher inaccuracy and thus intensity fluctuations can occur. Accordingly, a current driver for µ-LEDs with backgate, which reduces these problems.

According to an aspect described here, a device for electronic control and power supply of a µ-LED is proposed, which has a data signal line, a threshold line and a selection signal line. Furthermore, a µ-LED is proposed, which is electrically connected in series to a dual-gate transistor and together with it between a first and second potential connection. A first control gate of the dual-gate transistor is connected to the threshold line. The device also comprises a select-hold circuit with a charge accumulator connected to a second control gate of the dual-gate transistor and to a current conduction contact of the dual-gate transistor, and with a control transistor whose control terminal is connected to the selection signal line.

Instead of an additional transistor for pulse width modulation (PWM), the additional control gate of a dual-gate transistor can now be modulated with a PWM signal as an existing driver transistor. In some aspects, the dual-gate transistor also acts as a current driver transistor.

According to a second aspect, a device is also proposed, where a µ-LED and a dual-gate transistor are arranged in series in a current path. An analogue data drive signal is applied to one side of the dual-gate transistor via a selection hold circuit to control the color of the µ-LED by means of the selection signal. A pulse width modulation signal coupled to the other side of the dual-gate transistor controls the brightness of the µ-LED.

Advantageously, a backgate transistor is used as a dual-gate transistor.

The modulation of the backgate of the driver transistor can also be used as an actuator for the current control loop in order to feed back a feedback signal, for example the forward voltage of the LED, thus achieving a current feedback to a LED temperature drift. By modulating the voltage at the backgate of the driver transistor, a light emitting diode current can be easily and, above all, space-savingly pulse-width modulated, especially in the TFT (Thin Film Transistor) pixel cell. With RGB cells, this results in a saving of three power transistors.

A weak modulation of the voltage at the backgate can be used to make the current in the µ-LED substantially independent of the µ-LED temperature. This is especially useful when using an NMOS cell with the µ-LED on the low side of the driver transistor, because of the common cathode. Such cells have intrinsically poor current accuracy, so that the idea of the present invention can be used to improve such cells significantly.

On the one hand, this allows pulse width modulation via the backgate of the main transistor instead of via an additional transistor, in addition to the main transistor. On the other hand, the use of a backgate transistor in displays allows temperature stabilization by "not digitally" operating the backgate with pulse width modulation, but with an analogue voltage. This is derived from the forward voltage Vf of the LED, which is used as a feedback loop of a control system. Such temperature stabilization improves the color accuracy and stability of the µ-LED.

In some aspects, the dual-gate transistor may include a backgate transistor where the backgate is the first control gate. This is a compact design. The dual-gate transistor can be designed as a thin-film transistor with two opposite control gates. This allows a reliable and compact manufacturing. The first control gate of the dual-gate transistor can be configured to set a threshold voltage. In this way, a modulation can be carried out. Alternatively, a switching signal (PWM signal) can be applied to the first control gate during operation. This allows a simple brightness control to be carried out.

In further aspects, the µ-LED can be connected with its first terminal to the first potential connection, the dual-gate transistor can be arranged with its current line contacts between a second terminal of the µ-LED and the second potential connection. The selector hold circuit may have the charge storage connected to the second control gate of the dual-gate transistor and to the second terminal of the µ-LED. This version can be easily manufactured in NMOS technology.

In further aspects, the µ-LED can be connected with its first connection to a second current line contact of the dual-gate transistor and with its second connection to the second potential connection. The Dual-Gate Transistor is connected with its current conducting contacts between a first terminal of the µ-LED and the first potential connection. The charge memory of the selector holding circuit is connected to the second control gate of the dual-gate transistor and to the first potential connection. Thus, the forward voltage of the LED does not affect a gate-source voltage of the dual-gate transistor.

Another aspect deals with the realization in p-MOS technology. There the µ-LED is connected with its first terminal to the first potential terminal and the dual-gate transistor with its current line contacts is connected between a second terminal of the µ-LED and the second potential terminal. The selector hold circuit can be connected with the charge storage to the second control gate of the dual-gate transistor as well as to the second potential connection.

In a further aspect, the selection hold circuit comprises a further control transistor, which is connected in parallel to the µ-LED and whose control terminal can be connected to the selection signal line.

According to a further configuration, the charge accumulator can be connected to the second control gate of the dual-gate transistor as well as to the first potential terminal, and further comprises a temperature compensation circuit with a negative feedback based on the detection of a forward voltage by the µ-LED, whereby the temperature compensation circuit can form the threshold line on the output side. This allows additional weak modulation to be impressed on the backgate transistor.

In some aspects, the temperature compensation circuit may include a control path, which may be in parallel with the dual-gate transistor, and may have two paths connected in series. This is a simple design. In another embodiment, from a node between the two controlled paths provided by a third control transistor and a fourth control transistor, the threshold line may be connected to the first control gate of the dual-gate transistor. By means of the node the back gate can be effectively controlled. According to a further embodiment, the control terminal of the fourth control transistor can be connected to the second potential terminal. In this way, the gate of the transistor is set stable to the high potential of the second potential connection.

Another aspect is that the temperature compensation circuit may include a second charge storage device, which may be connected to a control terminal of a control transistor providing one of the two paths and to the first potential terminal. This allows the gate voltage of the third transistor to be buffered.

A second data signal line is coupled to the second charge storage and the third control transistor. A signal on this line is used to program a negative feedback factor. The second data signal line can also be used for fine adjustment of the temperature compensation. Depending on the application, this fine adjustment can be switched on or off by means of a further control transistor According to another advantageous embodiment, in the temperature compensation circuit the control terminal of the third control transistor can be connected to the second potential terminal. In this way, the gate voltage of the third control transistor is advantageously fixed in a clear and stable manner.

In accordance with another advantageous embodiment, a fifth control transistor can be connected in parallel to the µ-LED. A switching signal (PWM signal) is applied to its control terminal during operation. In this way, the LED can be switched on and off directly and without charge storage, in particular by means of pulse width modulation. The dual-gate transistor can then operate as a temperature-stabilized current source.

Also a control for a brightness adjustment or a dimming of pixels of importance. Such dimming is not only required in the automotive sector, for example to switch between day and night vision, but also in AR applications. Basically, such dimming can be useful and advantageous when contrasts have to be adjusted or when external light makes it necessary to control the brightness of a display in order to avoid dazzling a user or to show information reliably.

For the reasons mentioned above, different technical solutions are known for the control of lighting units with LEDs, in particular to operate displays at different brightness levels. For example, control circuits for controlling matrix displays are known, with which the individual pixels of the rows formed by several rows and columns are specifically controlled. Likewise, control circuits are known with which the LED current can be reduced or dimmed. This so-called current dimming is used, for example, in displays with liquid crystal displays or OLEDs.

Due to the limited space available, solutions with a large number of components are difficult to implement. This can sometimes make the circuits very complex. Based on this, the following aspects should further develop the control of a lighting unit with LEDs to vary the brightness in such a way that a comparatively simple, accurate and reliable variation of the brightness of the light emitted by the LEDs is achieved. In particular, the above-mentioned dimming and operation in different brightness and contrast levels should be made possible.

Thus, a control circuit for changing the brightness of a lighting unit is proposed, which has a voltage source for supplying the lighting unit with electrical energy and at least one energy storage device. The latter sets a current for the illuminants of the lighting unit. Furthermore, a control element is provided which temporarily changes a voltage of a voltage signal generated by the voltage source, on the basis of which a LED current flowing through the at least one LED can be adjusted. According to the proposed principle, the control circuit has been developed further in such a way that the control element is set up to operate the lighting unit at at least two different brightness levels by transmitting a first and a second voltage signal having different voltages to the lighting unit during a period, i.e. in a repeating time period, and the brightness level can be adjusted as a function of the voltage of the first voltage signal.

Essential for this concept is therefore that a pulsed voltage signal is applied to the lighting unit, whereby a current flows through the at least one µ-LED of the lighting unit as a function of the voltage signal, which causes the LED to light up. During a period, a first voltage signal, in particular a switch-on voltage signal, and a second voltage signal, in particular a switch-off voltage signal, are advantageously provided, wherein the at least one LED provided in the lighting unit is supplied with a current proportional to the voltage during the application of the first voltage signal or a current proportional to the voltage flows through it. It is basically irrelevant here whether the lighting unit has one or a plurality of LEDs. One aspect of the switching element has a transistor, via which the at least one LED of the lighting unit is supplied with electrical energy depending on the respective voltage signal and an LED current flows through it so that it preferably emits visible light.

According to the proposed concept, the lighting unit is controlled in such a way that within a period, firstly a first voltage signal is transmitted to the lighting unit in a first phase of the period and subsequently a second voltage signal is transmitted to the lighting unit in a second phase of the period, whereby a current flow through the at least one LED of the lighting unit is effected depending on the voltage of the respective voltage signal. It is important here that the voltage or the voltage value of the second voltage signal is significantly lower than the voltage of the first voltage signal. Preferably, the voltage of the second voltage signal is at least nearly zero.

In the first phase of the period, in which the first voltage signal is transmitted to the lighting unit, the energy storage of the lighting unit is charged. At the same time, a current proportional to the voltage of the voltage signal flows through the LED, which emits visible light. While in the second phase of the period the second voltage signal is transmitted to the lighting unit, the potential in the energy storage, preferably a capacitor, is maintained so that until the beginning of the following period a current caused by this flows through the LED, which thus continues to emit light. Although the intensity of the current flowing through the LED during the first phase of the period should theoretically be equal to the intensity of the current flowing through the LED during the second phase of the period, this is not the case in practice. This is due to the fact that the control circuit usually has a second capacitance in addition to the capacitance of the energy storage device, in particular a capacitor, thus creating a capacitive voltage divider so that the voltage at the energy storage device is lower during the second phase of the period compared to the voltage during the first phase of the period. Such a second capacitance is provided, for example, by the capacitance of the transistor, in particular the so-called gate-source capacitance.

In this context, it is significant that the intensity of the current flowing through the LED during the first phase of the period in which the first voltage signal is transmitted to the lighting unit is different from the intensity of the current flowing through the LED during the second phase of the period in which the second voltage signal is transmitted to the lighting unit, namely smaller. However, an observer will not recognize this difference, which leads to a difference in the maximum brightness of the LED during a period, but will only perceive the light output averaged over the period.

In order to use this effect in a suitable way for the control of lighting units used in displays, for example, it is advantageous if the first and second voltage signals are repeated at a frequency of 60 Hz, which corresponds to the usual refresh rate of displays. This means that within one second, a first and a second voltage signal are transmitted to the lighting unit sixty times each, whereby a LED current flows through at least one LED of the lighting unit depending on the voltage of the respective voltage signal.

In further aspects, it is planned that the µ-LED, while the second voltage signal is transmitted to the lighting unit, is supplied with the electrical energy required to excite light emission from an energy storage device designed as a capacitor. Since the voltage of the capacitor is lower than that of the first phase of the period, the LED is passed through by a current of lower intensity in this operating state compared to the first phase of the period, so that the µ-LED shines less brightly.

Furthermore, it is conceivable in this way that the control element is set up to generate the first voltage signal with a duty cycle of 0.0025 to 0.003, the duty cycle corresponding to the ratio of the duration of the first voltage signal to the duration of the period. The duty cycle thus indicates the ratio of the duration of the first voltage signal to the duration of the period. At a repetition frequency for the first and second voltage signals of 60 Hz, this means that the control element is arranged according to this embodiment of the invention such that a period within which the first and second voltage signals are transmitted to the lighting unit is 0.0166 s or 16.6 ms long. In a preferred embodiment, the first voltage signal is transmitted to the lighting unit for a period not exceeding 0.050 ms, which corresponds to a duty cycle of about 0.003 or 1:333. In this case, the second voltage signal is transmitted to the lighting unit for a period of 16.6 ms. The duty cycle in relation to this signal is therefore approximately 1.

Since the brightness of an LED perceived by an observer depends on the average brightness or light output emitted during a period, a current flow in the LED during the second phase of a period and thus the proportion of light emitted by the at least one LED in the second, comparatively long phase of the period has a considerable, disproportionately strong influence on the average light output of an LED of the lighting unit.

In some aspects it is conceivable that the control circuit is arranged to operate the lighting unit at a first, darker brightness level by setting the voltage of the first voltage signal to a voltage value within a first voltage interval and to operate the lighting unit at at least a second, brighter brightness level by setting the voltage of the first voltage signal to a voltage value within at least a second voltage interval whose voltages are higher than those of the first voltage interval. In accordance with this embodiment, two voltage intervals or voltage ranges are thus provided for the control of a lighting unit, which each have different voltages with which the first voltage signal is generated and which are at different voltage levels. Depending on the voltage level of the first voltage signal, the lighting unit is thus operated either at a first, darker brightness level or at a second, brighter brightness level. If the lighting unit is to be operated at the brighter brightness level, the lighting unit is controlled on the basis of a first voltage signal whose voltage lies in the second voltage interval and thus in the voltage interval which has the higher value.

In another aspect, the control element is set up to operate the lighting unit at the same brightness level by selectively varying the voltage of the first voltage signal within one of at least two defined voltage intervals. This means that in a beneficial manner the first voltage signal, in particular its voltage, is only varied between two successive periods to such an extent that the corresponding voltage is still within the same voltage interval and it is ensured that the lighting unit is still operated at the same brightness level despite a slight change in brightness. It is thus possible to dim the lighting unit, in particular the at least one LED provided within the lighting unit, to at least two different brightness levels, i.e. to provide an at least largely stepless range at least at two different brightness levels in each case, in which the brightness of the at least one LED of a lighting unit is deliberately changed.

According to a further embodiment, it is intended that the first voltage interval or the first voltage range should have voltage values at least in the range of 1.3 V to 3.0 V. Furthermore, it is preferably provided that the second voltage interval or the second voltage range has voltage values at least in the range from 4.0 V to 10.0 V. In this way, two ranges are realized at different brightness levels, within which the brightness of the lighting unit can again be specifically and continuously changed or dimmed.

With regard to the embodiment described above, the idea can again be considered that—as soon as a comparatively small first voltage signal is applied to the lighting unit—the total current flowing through the LED during a period is significantly determined by the current flowing through the LED during the first phase of the period in which the first voltage signal is applied to the lighting unit. In this case, the lighting unit is operated at a comparatively low brightness and the emission of light due to a current flow through the LED caused by the second voltage signal applied to the lighting unit during the second phase of the period can be neglected in this operating state.

If, on the other hand, a first voltage signal with a comparatively high voltage is transmitted to the lighting unit, the total current flowing through the LED during a period is determined to a large extent by the current flowing through the LED during the second phase, i.e. while the second voltage signal is applied to the lighting unit. In this case, the lighting unit is operated at a high brightness level and can be dimmed in this range by selective variation of the first voltage signal.

The presented control circuit can be used in a display or monitor for image generation. These can be part of a larger screen or display device, for example in a motor vehicle. Also a realization in AR or VR glasses or any other device is conceivable. Again, it is essential that a control circuit is used which allows a display or monitor to be operated at at least two different brightness levels.

In addition to a specially designed control circuit, some aspects also relate to a method for selectively changing the brightness of a lighting unit, in which a voltage source supplies the lighting unit with electrical energy and at least one LED as the illuminant of the lighting unit is supplied with electrical energy at least temporarily from an energy storage device of the lighting unit. Furthermore, in this method a voltage signal is transmitted to the lighting unit at least intermittently and the current flowing through the at least one LED is adjusted on the basis of the voltage signal.

The method is characterized in that the lighting unit is operated at at least two different brightness levels by transmitting a first and a second voltage signal having different voltages to the lighting unit during one period and adjusting the brightness level depending on the voltage of the first voltage signal. It is again substantial to the invention that the brightness of an LED, which is decisively determined by the total current flowing through at least one LED during a period, can be selectively changed by transmitting a first voltage signal which is transmitted to the lighting unit in a first phase of the period. To drive the lighting unit, a first voltage signal is applied to the lighting unit in a first phase of the period, so that initially, while the first voltage signal is applied to the lighting unit, the energy storage device of the lighting unit is charged and a current proportional to the voltage of the voltage signal flows through the at least one LED of the lighting unit. In a second phase of the period, a second voltage signal is transmitted to the lighting unit with a voltage, which is significantly lower than the voltage of the first voltage signal, preferably close to zero. This initially lowers the potential of the energy storage device, in particular a capacitor, which also reduces the strength of the current flowing through the LED accordingly.

Compared to the first phase of the period, the LED therefore shines less brightly in the second phase, but this over a comparatively long period. Depending on the level of the voltage value of the first voltage signal, the lighting unit can be operated at a high brightness level with comparatively high average light output or at a low brightness level with comparatively low average light output. In this context, it should be noted that for a first voltage signal with a comparatively low voltage, the influence of the first phase of the period on the average light output of the LED is comparatively high, whereas for a first voltage signal with a high voltage value, the second phase of the period in which the second voltage signal is applied to the lighting unit is of decisive importance for the average light output of the LED.

In this way, it is intended that the LED of the lighting unit, while the second voltage signal is applied to the lighting unit, is supplied with electrical energy from an energy storage device designed as a capacitor. Furthermore, it is advantageous if the lighting unit is at least temporarily operated at a first, darker brightness level by setting the voltage of the first voltage signal to a voltage value lying within a first voltage interval and the lighting unit is at least temporarily operated at at least a second, brighter brightness level by setting the voltage of the first voltage signal to a voltage value lying within at least a second voltage interval, the voltages of which are higher than those of the first voltage interval.

In one embodiment it is provided that between two consecutive periods the voltage of the first voltage signal is varied without changing the brightness level at which the lighting unit is operated. This means that the average light output of an LED is varied while it is operated at a constant brightness level. The voltage of the first voltage signal is thus varied between two successive periods within the voltage interval or voltage range provided for the corresponding brightness level.

In addition to the question of temperature stability and drift of an input voltage or current through the diode due to process fluctuations, the pulse modulation used is also an aspect to be considered. In current displays, light emitting diodes are usually operated in pulse width modulation, i.e. they are switched on and off in rapid succession for contrast and brightness adjustment. The frequency is several 100 kHz up to the MHz range. The switching operations act back on the current source. This can affect the precision and stability of the power source. In the case of control loops within the power source, the switching processes lead to spikes or other behaviour, which can bring the control loop out of its control range.

Following these considerations, a regulated current source for µ-LEDs which controls a current source in such a way that its output current remains in its control state and follows a setpoint value even during PWM modulation and in particular during switching operations. The current source and in particular the feedback loop is suitable For this purpose the output current or a signal derived from it is fed to the control loop, which compares it with the setpoint. If the current source is now switched off or operated in an on/off mode (intermittent operation), a substitute signal is fed to the control loop while the output current is switched off. The substitute signal keeps the control loop in its control range. The substitute signal corresponds or is similar to an expected output current or the signal derived from it. All in all, continuous control in the output range is achieved in this way, independent of the switching state of a current source. The precision and stability of the supply circuit is maintained.

In an embodiment, a supply circuit is proposed which comprises an error correction detector with a reference signal input, an error signal input and a correction signal output. Furthermore, a controllable current source with current output and a control signal connection is provided. The control signal terminal is connected to the correction signal output to form a control loop for the controllable current source. In other words, the error correction detector controls the output current of the current source within certain limits. The current source is thus configured to provide a current at the current output depending on a signal at the control signal terminal.

According to the proposed principle, the supply circuit comprises a substitute source with one output, which is configured to provide a substitute signal. Finally, a switching device is arranged in operative connection with the controllable current source and the error correction detector, so that the switching device, depending on a switching signal, supplies the error signal input with either a signal derived from the current at the current output or the substitute signal with additional separation of the current output of the current source. In other words, the switching device is coupled to the controllable current source and the error correction detector and is configured to supply either a signal derived from the current at the current output or the substitute signal to the error signal input. In addition, the switching device is configured to disconnect the current output in the latter case.

This creates an arrangement that keeps the control loop in a control range independent of the operating state of the power source. The current source can thus be operated in a PWM or other intermittent mode in addition to being controlled by the control loop and the error correction detector.

It is useful if the substitute signal correspond substantially to the signal derived from the current signal. In this way, the control loop, and especially the error correction detector, will provide a signal that is hardly different from that of the current source, so that the control and the modulation remain intact.

In one aspect, the adjustable current source has a current mirror with a switchable output branch. This is connected to the current output or forms it. The output branch may comprise one or more output transistors whose control terminals or gates are connected to a control terminal of a current mirror transistor arranged on the input side.

In another aspect, the output transistor of the output branch is connected with its control terminal to the switching device. The switching device is configured, depending on the switching signal of the output transistor, to connect to a fixed potential for opening the output transistor or to connect the control terminal to the control terminal of the current mirror transistor arranged on the input side. When the control terminal is at the fixed potential, the output transistor opens or closes, i.e. it no longer conducts current and the load and the output of the supply circuit are disconnected.

In another aspect, the switching device is located in the output branch and is configured to disconnect the current output or output transistors from the load. The tap for the error signal input of the error correction detector is located between the switching device and the load.

In another aspect, the adjustable current source has an input branch. A reference current signal can be fed to the input branch so that the current source supplies an output current dependent on it. The input branch of the adjustable current source also includes a node, which is connected to the reference signal input of the error correction detector. Thus, for example, the reference current, which is fed to the current source to derive the output current, can also serve as a reference signal for the error correction detector.

The adjustable current source may also include a current mirror, with the control signal terminal connected to the control terminal of an output transistor of the current mirror. This allows a current through the output transistor to be changed with a control signal, thus providing regulation. The control terminal of the output transistor of the current mirror is coupled to the current mirror transistor of the current mirror via a capacitor in positive feedback. The capacitor is used for frequency compensation and thus improves the stability of the control.

Another aspect concerns the differential amplifier. This can include a differential amplifier whose two branches are connected to a supply potential via a current mirror. Optionally, the two branches of the differential amplifier can each include an input transistor, which have different geometrical parameters. Together with the current mirror, different fixed factors between reference and error signal can be taken into account.

In a further aspect, the substitute source comprises an element coupled to the output for voltage generation, so that the substitute signal essentially corresponds to the signal derived from the current signal. This allows the substitute signal to simulate the current flowing through the load during regular operation, thus keeping the control loop in the control range.

The replacement source may comprise a series connection of a current-generating element and a voltage-generating element, with the output located between the two elements. Similarly, in a further aspect, the replacement source may comprise a transistor whose control terminal is connected to the control terminal of the current mirror transistor of the current source.

Another aspect concerns the switching device, which comprises one or more transmission gates. The supply circuit may comprise a reference current mirror configured to supply a current defined on the input side to the error correction detector and to the current source on the output side.

Another aspect concerns the use of a supply circuit for a power supply of a µ-LED. This is powered by the power supply circuit, which is an on/off operation. This means that the μ-LED is driven by a pulse-width modulating signal from the power supply. This operation is not unusual for optoelectronic devices, but the supply circuit generates a stable and precise output current during this pulse-width modulated operation.

Another aspect relates to a method for supplying a μ-LED. Here, a supply current through the load is detected. This can be done by detecting the current through the μ-LED. Alternatively, a signal can be derived from the current, which has a known relationship to the current through the load. The supply current or the signal derived from it is compared with a reference signal and a correction signal is generated from this comparison. With the help of the correction signal, the supply current through the consumer is controlled to a reference value, if necessary.

It is now intended that the consumer is switched off at certain intervals, i.e. disconnected from the supply current. In such a case, a substitute signal is generated instead of the signal derived from the supply current and used for the comparison step. In other words, instead of the supply current or a signal derived from it, the substitute signal is compared with the reference signal and a correction signal is generated from this comparison. This makes the control independent of whether the load is supplied with power or not. The substitute signal can substantially correspond to a supply current through the consumer or a signal derived from it.

Another aspect lies in the realisation of a driver circuit with low own power consumption, which can nevertheless drive a large number of optoelectronic elements and especially μ-LEDs.

In a first aspect of the present application, a driver circuit is intended to drive or control a large number of optoelectronic elements. The optoelectronic elements are configured as μ-LEDs and are arranged in an array of rows and columns. Each μ-LED can represent one pixel. Alternatively, if each pixel includes several, for example three, sub-pixels, each μ-LED can form one of the sub-pixels.

The driver circuit comprises a plurality of first memory cells, each of the first memory cells being associated with a respective one of the μ-LEDs. In addition, each memory cell includes two inputs, referred to as a set input and reset input, and an output. The first memory cells may be latches and may be configured as 1-bit memories. Each first memory cell can have two different states at the output, a first state and a second state, where the first state can be a high state and the second state can be a low state.

A set signal received from one of the first memory cells at the set input triggers the first memory cell at the output to the first state. The first memory cell holds the first state until it is reset to the second state by a reset signal received at the reset input. The output, especially the output signal provided at the output, of each first memory cell is configured to control or drive a respective one of the μ-LEDs. In particular, the output signal determines whether the μ-LED is switched on and emits light or is switched off and does not emit light.

CMOS technology would be particularly suitable for the production of the driver circuit and also the first memory cells and their associated circuits. The driver circuit according to the first aspect is a digital driver circuit and requires less power and space compared to conventional driver circuits. Furthermore, the driver circuit according to the first aspect provides better linearity. Each first memory cell can provide a pulse width modulation signal, PWM signal, at its output.

In an embodiment, each first memory cell comprises two cross-coupled NOR gates or two cross-coupled NAND gates. Each of the NOR or NAND gates has two inputs and one output. The output of each of the NOR or NAND gates is coupled to one of the inputs of the other NOR or NAND gate. The other input of one of the NOR or NAND gates receives the set signal, and the other input of the other of the NOR or NAND gates receives the reset signal.

In an alternative embodiment, each first memory cell comprises an N-type metal oxide semiconductor transistor, NMOS transistor, and a P-type metal oxide semiconductor transistor, PMOS transistor, which are connected in series, meaning that the channels of the two transistors are connected in series. Furthermore, an input of an inverter is connected between the NMOS transistor and the PMOS transistor, and an output of the inverter is connected to the gates of the NMOS and PMOS transistors. The driver circuit may include a plurality of loadable counters, each configured to activate a set signal to turn on a current through the respective μ-LED when data, such as a pulse width value, is loaded into the respective counter. The counter counts until the current value reaches the loaded data value. Then the counter activates a reset signal to turn off the current through the respective μ-LED.

When an array of μ-LEDs arranges them in N columns of pixels, the driver circuit can include N counters that generate PWM signals for N columns of pixels simultaneously per selected row. The driver circuit may also include a single common counter configured to generate a common or global dimming signal for the plurality of μ-LEDs.

To disconnect dark pixels, the driver circuit can include a large number of second memory cells. Each second memory cell may be coupled to a respective one of the first memory cells and may be configured to override an output signal of the respective first memory cell when required so that the respective μ-LED remains off. In other words, the second memory cells prevent the respective first memory cells from turning on the respective μ-LED when these optoelectronic elements represent dark pixels during a frame.

An optoelectronic device or μ-display according to a second aspect of the present application comprises a plurality of μ-LEDs and a driver circuit for driving the plurality of μ-LEDs according to the first aspect as described above. The μ-LEDs may be arranged in an array and may form a display or a portion of a display. Each of the μ-LEDs can form one pixel of the array. Alternatively, each μ-LED can also form a sub-pixel. For example, in an RGB pixel array, a pixel can contain three optoelectronic elements or μ-LEDs that emit red, green and blue light respectively. Alternatively, converter materials may be provided so that at least two of the three μ-LEDs emit light of the same color, which is converted by the converter material.

The μ-LED can be arranged above an integrated circuit, IC, which is located below the μ-LED. The circuit can be formed in a different material system.

In a third aspect, a method for operating an optoelectronic device or μ-display according to the second aspect is provided. At the beginning of a frame, a global reset is performed and the pixel current is switched off so that all optoelectronic elements are switched off. Next, dark pixels are loaded line by line. Thus, the optoelectronic elements that are dark during the frame are controlled by the second memory cells. Afterwards, a line by line content-dependent PWM, for example grayscale PWM, is performed. Thus, the current through the optoelectronic elements is controlled by means of the first memory cells.

In addition, after a global reset at the beginning of a frame, the pixel stream can remain switched off until a common or global dimming starts. The common dimming of the optoelectronic elements can be performed before the current through the optoelectronic elements is controlled by the first memory cells. The global dimming data can be combined with the grayscale data in the video/image signal processor IC or by the µ-LED driver IC so that no separate global dimming pulse is required and then only the grayscale data is updated line by line. The optoelectronic device according to the second aspect and the method according to the third aspect may include the embodiments disclosed above in connection with the driver circuit according to the first aspect.

A novel concept for the control of µ-LEDs, which are intended as pixels, is based on a analogue ramp for lighting control. For a control circuit for a display matrix comprising a plurality of optoelectronic devices arranged in rows and columns, pulse width modulation can be used to adjust the on/off behavior of each pixel. Although the principle seems to be similar to conventional pulse width modulation schemes, the implementation is different and takes into account the small space available.

A control circuit for a matrix display, in particular a µ-LED matrix display comprises a row selection input for a row selection signal, a column data input for a data signal, a ramp signal input for a ramp signal and a trigger input for a trigger signal. For the purpose of explanation, a ramp signal is a signal that varies over time from a first value to a second value. Usually, a ramp signal is periodic. The circuit includes a column data buffer configured to buffer the data signal in response to the row select signal. In some variants, the level of the column data signal may correspond to the brightness of the light-emitting device. A pulse generator is coupled to the column data buffer and the ramp signal input and configured to provide a buffered output signal to control the on/off ratio of at least one of the plurality of light emitting devices in response to the trigger signal, the data signal and the ramp signal.

The proposed principle implements an analogue pulse generator that requires only a small space. Since the ramp signal can be multiplexed in space and time, artefacts caused by activation of different pixels can be suppressed. Furthermore, time multiplexing when using the ramp signal leads to different switching behavior of the pixels. This means that the µ-LED associated with the pixels is switched at different times, which causes a more even power distribution and prevents current peaks.

In some variants, the pulse generator has a comparator device to compare the buffered data signal with the ramp signal. The result is delivered to an output buffer, which is coupled to an output of the comparator and the trigger input, the column data buffer can act as an input buffer in such embodiment. Together with the output buffer of the pulse generator a double buffering is realized, which allows to implement the circuit in displays using a longer duty cycle, thus reducing update rates and the like. In general, this concept will further reduce power consumption, which is preferred in advanced reality applications.

The output buffer can have a single memory stage, such as a flip-flop. In some variants, the buffer may contain an RS flip-flop, whose inputs are coupled to the output of the comparator device and, accordingly, to the trigger input. In this respect it should be noted that depending on the current implementation and the sign of the corresponding data and trigger signals (positive or negative), inverted inputs of corresponding flip-flops can also be used. The column data buffer in some variants includes a capacitor to store the data signal and a switch located between the capacitor and the column data input. The capacitor may comprise a small capacitance, just as the input buffer can only apply a voltage signal of the order of a few volts and the comparator device has a very high input impedance. The comparator can be implemented using a differential amplifier. For example, an inverting input of the comparator can be coupled to the data column buffer and its non-inverting input can be coupled to the ramp signal input.

Depending on the implementation, the µ-LED coupled to the control circuit can only be active for a short period of time. In some variants, the µ-LED can only be active for about 50% of a normal cycle. In such cases, it is useful to be able to disable unneeded parts of the control circuit. For this purpose, the comparator device may have a power control input coupled to the trigger input for adjusting its power consumption based on the trigger signal. Alternatively, the comparator device may be coupled to the output buffer to control its power consumption based on an output state of the output buffer. In this respect, the output buffer may be configured to maintain its output state independently of its input coupled to the comparator device until it is reset or triggered by the trigger signal.

Another aspect concerns the generation of the ramp signal. In some variations, the control circuitry includes a ramp generator to provide the ramp signal to the ramp signal input, the ramp generator being configured to generate a varying signal between a start value and an end value in response to a trigger signal. The ramp generator can be implemented as a global ramp generator that sends a common ramp signal to various other control circuits. Alternatively, some ramp generators can be provided, where each individual ramp generator drives a number of lines and their respective pixels. Such an implementation allows to multiplex the ramp signals temporarily and thus reduce the artefact. Furthermore, a ramp signal supplied by a ramp generator can also be multiplexed before being applied to the ramp signal input.

Another aspect relates to a method of controlling the illumination of a light emitting device in a matrix display having a plurality of light emitting devices arranged in addressable rows and columns. In accordance with the proposed principle, the method comprises providing a trigger signal and a data signal for a selected row and at least one light emitting device. A level of the data signal is then converted to a pulse with respect to the trigger signal. More precisely, in some variants the level of the data signal is converted to a pulse width with respect to a trigger signal. The pulse is used to control the on/off ratio of the light emitting device with a pulse.

In some aspects, converting a level of the data signal involves generating a ramp signal between a first value and a second value. The data signal is compared with the ramp signal to generate a state signal. The state signal can be a digital signal. The pulse signal is then based on the trigger signal and a change in the state signal. Essentially, the pulse signal is set from LOW to HIGH or reset from HIGH to LOW in response to the change in the state signal. Of course, this principle of setting the value and resetting the value can be changed.

The ramp signal can be generated or initiated in response to the trigger signal. In some variants, both signals can be derived from a common signal. Delivering a data signal can also include pre-buffering of the data signal in some variants. For example, the data signal could be pre-buffered in a storage device such as a capacitor or the like.

Another aspect deals with the correction of errors in µ-LEDs of a µ-Display or µ-Display module that occur during their production by means of redundant µ-LED branches with selection fuse. Several concepts are presented in this application to create redundant µ-LEDs in production.

With µ-displays a µ-LED can fail during production. This can be caused, for example, by faulty assembly or, in the case of monolithic display modules, by a fault in one of the layers. There are two main variants of such an error. One is an open contact, known as "Open", or a short circuit between the anode and cathode, known as "Short". Both lead to the failure of the cell's LED.

Redundant µ-LEDs are provided for each subpixel to reduce the failure probability of a subpixel or a pixel. In the event of a defect, appropriate circuitry measures are taken to ensure that the cell does not fail, i.e. the defective LED can be decoupled from the current source. In some variants, however, this means that in a fault-free case both µ-LEDs are supplied by the same current source, namely the typical and the redundant one. This in turn leads to a color shift resulting from a dependency between cross current and dominant wavelength. In addition, due to the process technology of µ-displays or modules, often only one common cathode can be used for all LEDs. Depending on the further construction of the backplane (e.g. TFT backplanes), this can lead to the fact that only NMOS transistors (N-type metal oxide semiconductor transistors) can be used to construct the pixel cell. In a conventional 2T1C (2 transistors, 1 capacitor) cell, this leads to a clear dependence between the cross-current of the LED and its forward voltage.

There are various approaches to solving these difficulties, most of which, however, require additional work or space. According to the principle proposed here, a solution is given in which, on the one hand, redundancy is provided, but halving an electric current flowing through a light emitting diode is avoided. In addition, PMOS transistors can be used, which increases flexibility. The space consumption does not increase significantly, so that the solutions are just suitable for µ-displays with low space per pixel or subpixel.

This involves the creation of a device for electronically driving a plurality of µ-LEDs of a pixel cell or sub-pixel, in particular as a 2T1C cell. By means of a first transistor and an electronic imprinting component associated with the µ-LED, a current flow is generated which triggers the fuse connected in series to this µ-LED.

A device for electronically driving a plurality of µ-LEDs of a pixel cell or subpixel thus comprises a first and at least one second path each having a µ-LED connected therein and an electronic fuse arranged in series with the µ-LED. The first and the at least one second path are connected to one side with a potential terminal. Furthermore, a driver circuit with a data signal input, a selection signal input and a driver output is provided. The driver output is connected to the other side of the first and the at least one second path. Finally, the device comprises an imprinting component associated with the at least one second path, which is configured to generate a current flow triggering the electronic fuse arranged in series.

A characterising feature thus consists in the introduction of an additional imprint signal line in combination with an additional electronic imprint component, which can be adapted in particular as a transistor or as a diode. This ensures that after an end-of-line (EOL) test, only one LED per color and pixel is active, even in the case of an error-free pixel. In other words, in the event of an error, the µ-LED that is still functioning is selected. If, on the other hand, there is no error, i.e. both µ-LEDs of a path are working, one of the two will still be switched off permanently.

In a method for the electronic configuration of a plurality of µ-LEDs, a test of a function of the µ-LED of the first path and the second path is thus carried out first. If both µ-LEDs of the first and second path are functioning, an imprinting signal is applied to the electronic imprinting component. A current flow is then impressed into the second path of a fuse, which triggers the fuse connected in series with the µ-LED of the second path. For this purpose, the fuse is usually configured as a fuse link.

Depending on its embodiment, the imprinting component may comprise an imprinting transistor whose current line contacts are electrically parallel to the µ-LED to which the imprinting component is assigned and whose control contact is connected to an imprinting signal line. Alternatively, the imprinting component can also comprise an imprinting diode, which is connected with one terminal to the second terminal of the µ-LED to which the imprinting component is assigned. The other terminal of the impress-in diode is connected to the impress-in signal line.

The proposed arrangement makes it possible to design the µ-LED as a so-called common anode or common cathode. This means that, depending on the embodiment, the µ-LED of each path is either switched between supply potential and current source or between current source and reference potential connection. Thus, in one case the µ-LED is connected to the supply potential connection and the electronic fuse. In the other case, the µ-LED is connected between the fuse and the reference potential connection. The current source is always connected to the electronic fuse of the respective path. The charge storage of the 2T1C cell is connected to the gate of the current source transistor and the fixed potential, i.e. to the potential terminal to which the current source transistor is also connected.

In a further aspect, a µ-display or µ-display module with a variety of the devices described above is presented, in which pixel cells of the µ-display are electrically connected along a line and/or along a column to a common imprint signal line. Each pixel cell of a column is electrically connected to the supply potential terminal by means of a common supply line to a switching transistor arranged on a common carrier outside the µ-display.

Small-scale display arrangements with a high resolution are particularly desirable for AR systems, such as head-up displays or glasses with a light field display that projects a raster image directly onto the retina.

Micro OLEDs have been proposed for µ-displays with active pixel-sized light sources. Their disadvantage is their insufficient luminance and limited lifetime. An alternative for self-luminous light sources, which promises a long lifetime and a high efficiency as well as additionally a fast reaction time, is the use of µ-LEDs arranged in matrix form, for example based on GaN or InGaN. These are particularly suitable for display arrangements with a high packing density to form a high-resolution µ-display.

The starting point for the consideration is a display device comprising an IC substrate component and a monolithic pixelated optochip mounted thereon. In the present case, a monolithic pixelated optochip is understood to be a matrix-shaped arrangement of light-emitting optoelectronic light sources, which are created on a continuous chip substrate by a common manufacturing process. Some of the structures presented here can be produced in a matrix. These include, for example, the antenna structure, vertical or horizontal µ-rods, the paired bar-shaped configuration with converter material between the µ-LEDs or the µ-LEDs along special crystal directions, to name a few non-limiting examples. These light sources are adapted as μ-LEDs.

The IC substrate component features monolithic integrated circuits, which in turn result from a common manufacturing process. In addition, IC substrate contacts are arranged as a matrix on a top side of the IC substrate component facing the monolithic pixelated optochip.

The monolithic pixelated optochip comprises a semiconductor layer sequence with a first semiconductor layer having a first doping and a second semiconductor layer having a second doping, wherein the polarity of the charge carriers in the first semiconductor layer differs from that of the second semiconductor layer. Preferably, the first semiconductor layer and the second semiconductor layer extend laterally over the entire monolithic pixelated optochip. For an embodiment, the first semiconductor layer may have a p-type doping and the second semiconductor layer may have an n-type doping. A reverse doping is possible as well as the use of several sublayers of the same doping for at least one of the semiconductor layers, which differ in the doping strength and/or with respect to the semiconductor material. In particular, the semiconductor layer sequence can form a double heterostructure. Between the first semiconductor layer and the second semiconductor layer there is a region with a transition in which light-emitting active zones are formed during operation of the display. For a possible embodiment, the active zone is located in a doped or undoped active layer, which is placed between the first and the second semiconductor layer and has, for example, one or more quantum well structures.

The individual light-emitting, optoelectronic light sources of the pixelated optochip each represent μ-LEDs arranged as a matrix, each μ-LED having a μ-LED rear side facing the IC substrate component and a first light source contact which adjoins the first semiconductor layer in a contacting manner and is electrically conductively connected to one of the IC substrate contacts in each case. In other words, each μ-LED in the pixelated optochip is formed so as to include a region of one of the above-mentioned active layers. Between adjacent μ-LEDs, the active layer or another of the above-mentioned layers may be interrupted, so that crosstalk is avoided.

The inventors recognized that a display arrangement with high packing density, which is simplified in terms of production technology, can be realized if the projection area of the first light source contact on the μ-LED rear side corresponds to at most half the area of the μ-LED rear side and the first light source contact is surrounded in lateral direction by an absorber on the rear side. In the present case, the lateral direction is understood to be a direction perpendicular to a stacking direction determined by averaging the surface normals of the semiconductor layer sequence.

Due to a small area first light source contact, which is significantly smaller than the pixel area of the assigned μ-LED, a lateral narrowing of the current path in the semiconductor layer stack results. Consequently, the lateral extension of an active zone is limited to [μm] dimensions, so that individually controllable μ-LEDs are separated from each other due to the localized recombination zone within the semiconductor layer stack. The pixel size of each μ-LED, which is defined as the maximum diagonal of the μ-LED backside, is <70 μm and preferably <20 μm and especially preferred <7 μm. Again, the preferred first light source contact is significantly smaller, whereby for advantageous embodiments the projection area of the first light source contact on the μ-LED backside occupies at most 25% and preferably at most 10% of the area of the μ-LED backside.

To limit the lateral expansion of the active zone, the first semiconductor layer and the second semiconductor layer are preferably configured with a p or n conductivity of less than $10^4$ Sm-1, preferably less than $3*10^3$ Sm-1, more preferably less than 103 Sm-1, so that the lateral expansion of the current path is limited. In addition, it is advantageous if the layer thickness of the first semiconductor layer in the stacking direction is at most ten times and preferably at most five times the maximum diagonal of the first light source contact in the lateral direction.

For further embodiment, a first light source contact on the monolithic pixelated optochip does not directly abut the associated IC substrate contact. Instead, the actual optochip contact element, whose cross-sectional area is larger than that of the first light source contact, lies below the first light source contact in relation to the stacking direction. This measure simplifies the positioning of the monolithic pixelated optochip on the IC substrate component and the mutual contacting without worsening the lateral limitation of the current path.

According to the invention, the area around the small first light source contact is used for the arrangement of a rear absorber, which reduces the optical crosstalk between adjacent μ-LEDs. In particular, the downwardly directed electromagnetic radiation emanating from the active zone at an angle is absorbed as long as a limit angle to the stacking direction is exceeded. Preferred materials for the rear absorber are structured layers with silicon, germanium and gallium arsenide. It is also possible to incorporate graphene or soot particles into the rear absorber.

The rear absorber laterally surrounds the first light source contact and extends laterally from it. Rear absorbers of adjacent μ-LEDs are adjacent to each other and are preferably made in one piece. For an embodiment, the rear absorber extends in stacking direction at least up to the first semiconductor layer. For a further embodiment, a partial section of the rear absorber runs within the correspondingly structured first semiconductor layer and shields the border region between adjacent μ-LEDs.

For this purpose, additionally or alternatively reflective radiation blockers can be used, such as structured elements made of reflector materials, such as aluminum, gold or silver, or of dielectric materials whose refractive index is lower than that of the first semiconductor layer. For further embodiment, the rear absorber not only fulfils an optical function, but also serves as an electrical insulator to limit the current path laterally.

The display arrangement has a second light source contact for each μ-LED in the stacking direction above the second semiconductor layer. This contact is made of a transparent material such as indium tin oxide (ITO) and is electrically connected to a transparent, flat contact layer on the front side of the pixelated optochip. For an advantageous embodiment, the second light source contact is formed by the large-area contact layer itself, so that the entirety of the second light source contacts of the μ-LEDs arranged in matrix form can be applied as one common area contact. For an alternative embodiment which further reduces optical crosstalk, the second light source contact adjoins the contact layer in each case in a contacting manner, second light source contacts of adjacent μ-LEDs being separated from one another by an absorber on the front side in a lateral direction perpendicular to the stacking direction. The front absorber may consist of a material absorbing the electromagnetic radiation emitted by the active zone or of a material reflecting this radiation. In addition or alternatively, the front absorber can act as an electrical insulator and contribute to the lateral restriction of the current path for the localization of the recombination zone to an area with [µm] dimensions.

For a possible further embodiment, the front absorber extends against the stacking direction at least in a part of the second semiconductor layer. Furthermore, the lower and/or the upper sides of the second light source contact and/or the contact layer and/or the upper side of the second semiconductor layer may have an optically effective structuring to improve light extraction.

For a proposed method of manufacturing a display arrangement, an IC substrate component with monolithic integrated circuits and with IC substrate contacts arranged as a matrix is electrically conductively connected to a monolithic pixelated optochip. For the preceding manufacturing of the monolithic pixelated optochip, a semiconductor layer sequence with a first semiconductor layer having a first doping and a second semiconductor layer having a second doping is grown preferably epitaxially, the polarity of the charge carriers in the first semiconductor layer differing from that of the second semiconductor layer and the semiconductor layer sequence defining a stacking direction. Furthermore, µ-LEDs arranged in the pixelated optochip as a matrix are applied, each µ-LED having a rear side facing the IC substrate component and a first light source contact which adjoins the first semiconductor layer in a contacting manner and is electrically conductively connected to a respective one of the IC substrate contacts. In accordance with the invention, the first light source contact is formed with such a size that its projection surface with a surface normal perpendicular to the stacking direction occupies at most half the surface of the rear side of the µ-LED. In addition, the first light source contact is surrounded by an absorber on the rear side in a lateral direction perpendicular to the stacking direction.

Besides the different concepts for driving and providing a redundancy circuit, another aspect is to connect the carrier with the µ-LEDs or the monolithic array with a carrier that contains the driving. There are concepts that try to realize both µ-LEDs and the IC circuits in the same material system. This is to be advocated per se and can be realized at least in parts. However, the material systems for µ-LEDs have disadvantages, so that they are only partially suitable for IC circuits.

Another aspect is to create different material systems for the generation of the driving circuits on one side and the µ-LEDs in a matrix arrangement on the other side. There are substantially two possibilities for this. Firstly, one material system can be started with and the components can be manufactured, then a transition to the other material system is created and in this the further components are provided. Supply lines through the material systems and connect the components. One difficulty with this approach is to select and set the different process parameters in such a way that it is possible to manufacture one "side" without damaging the other "side". For example, the process temperature (e.g. for diffusion or implantation processes) is very different, so that depending on the temperature, no or undesired diffusion occurs. In this way, components can be damaged. In some aspects it is proposed to manufacture the control in one technology, for example on silicon basis, and then to grow different material systems as µ-rods or similar.

Another approach proposes to manufacture the control and pixel array separately and then connect them electrically and mechanically. In this way, the needs and requirements of the respective situation can be adapted and production can be optimized. Due to the small size of µ-LEDs, precise orientation for contacting is essential. The above example already illustrates this problem and suggests a solution. On the other hand, the use of digital control techniques allows reducing the number of necessary contact pads between the carriers without limiting the functionality. For the production of µ-displays or even display devices and matrices, novel digital and analogue concepts developed and jointly implemented.

One aspect of the design of a µ-LED display concerns the control of the light emission elements or µ-LEDs in a µ-display. The µ-Display thus has a plurality of µ-LEDs arranged in rows and columns. In some aspects, the µ-LEDs can be combined into subunits. This makes them easier to manufacture, test and process.

The limited space available under the actual matrix elements and pixels requires further considerations regarding addressing and control of the individual pixels. Conventional approaches and techniques may not be applicable due to the limited space. This may also apply to concepts where the current is controlled by each pixel.

In one embodiment a µ-display is provided, which has a plurality of pixel structure arranged in rows and columns. A first substrate structure is manufactured in a first material system and has a plurality of µ-LEDs whose edge length is 70 µm or less, in particular less than 20 µm. The µ-LEDs are individually addressable by lines in and/or on the first substrate structure. A large number of contacts are arranged on a surface of the first substrate structure facing away from the main radiation direction.

Furthermore, the µ-display has a second substrate structure, which comprises a plurality of digital circuits for addressing the µ-LEDs. The second substrate structure is manufactured in a different material system than the first substrate structure. The second substrate structure comprises on one surface a plurality of contacts corresponding to the contacts of the first substrate structure. According to the proposed principle, the first and second substrate structures are now mechanically and electrically connected to each other so that the contact areas correspond to each other. In accordance with this concept, it is proposed to manufacture digital and analogue elements of a display separately in different material systems and then to connect them with each other. This allows the optimal technology to be used in each case.

In this context, the first substrate structure with µ-LEDs can be configured as a monolithic module. In addition, the modular design revealed here can be used. Thus, the first substrate structure itself would be a carrier for the modules comprising the different µ-LEDs. The first substrate structure includes in some aspects the analogue circuits, for example a current source for each pixel. The redundancy circuits and driver circuits provided here are also conceivable. A design of these circuits in thin-film technology is possible, as long as the requirements for a current carrying capacity are not too high. If possible, it may be appropriate in some aspects to provide multiplexers or other circuits in the first substrate structure. This can reduce the number of contact areas between the first and second substrate structure. Simple switches, each selecting one of two µ-LEDs, reduce the number of necessary contact areas by about half. In other aspects, contacts may be grouped together, for example when using a common cathode layer for the µ-LEDs.

The µ-LEDs have an edge length of 20 µm or less. For particularly small µ-displays the edge length can be 2 µm to 5 µm. Depending on the embodiment, the contacts can be the same size as the µ-LEDs, but also smaller.

As far as material systems are concerned, the choice is flexible, with each technology and material system bringing its own advantages and challenges. The second substrate structure is based, among others, on monocrystalline, polycrystalline or amorphous silicon. To realize digital circuits in these material systems is well understood and can be scaled to small sizes.

Likewise, indium-gallium-zinc-oxide, GaN or GaAs are suitable as material systems for the second substrate structure. As material system for the first substrate structure, at least one of the following compounds can be used: GaN, GaP, GaInP, InAlP, GaAlP, GaAlInP, GaAs or AlGaAs. One aspect can be the different thermal expansions and crystallographic parameters depending on the material systems used. Therefore, both substrate structures are often not bonded together directly, but via several intermediate layers.

The second substrate structure with the digital circuits, in addition to the supply lines, can also contain a variety of digital circuits to generate a PWM-like signal from a clock signal and a data word for each pixel. Furthermore, it is possible to implement series-connected shift registers whose respective length corresponds to the data word for one pixel, each shift register being connected to a buffer for intermediate storage.

For the already mentioned reduction of contact areas, the second substrate structure can comprise one or more multiplexers, which are electrically coupled to a demultiplexer in the first substrate structure for driving several μ-LEDs.

BRIEF DESCRIPTION OF THE DRAWINGS

In the following section, some of the above-mentioned and summarized aspects are explained in more detail using various explanations and examples.

FIGS. 3B-1 and 3B2 show a table of preferred applications for μ-LED arrays;

FIG. 17 is a representation of a global bias for the pixel stream according to some aspects;

FIG. 18 shows a signal-time diagram with some signals according to the embodiment of FIG. 15;

FIG. 19 shows another embodiment of a driver circuit with reduced space consumption;

FIG. 20 shows embodiments of another driver circuit that also has a reduced space consumption;

FIG. 41 is an embodiment of a controller with a different µ-LED concept according to some aspects;

FIG. 42 shows a further embodiment of a control with a µ-LED concept presented here;

FIG. 51 shows an example of an inverted transistor of offset type using amorphous silicon for use in the analogue part of a µ-LED driver;

FIG. 52 illustrates some examples of polysilicon transistors suitable for a µ-LED driver circuit;

DETAILED DESCRIPTION

Figure 1A:
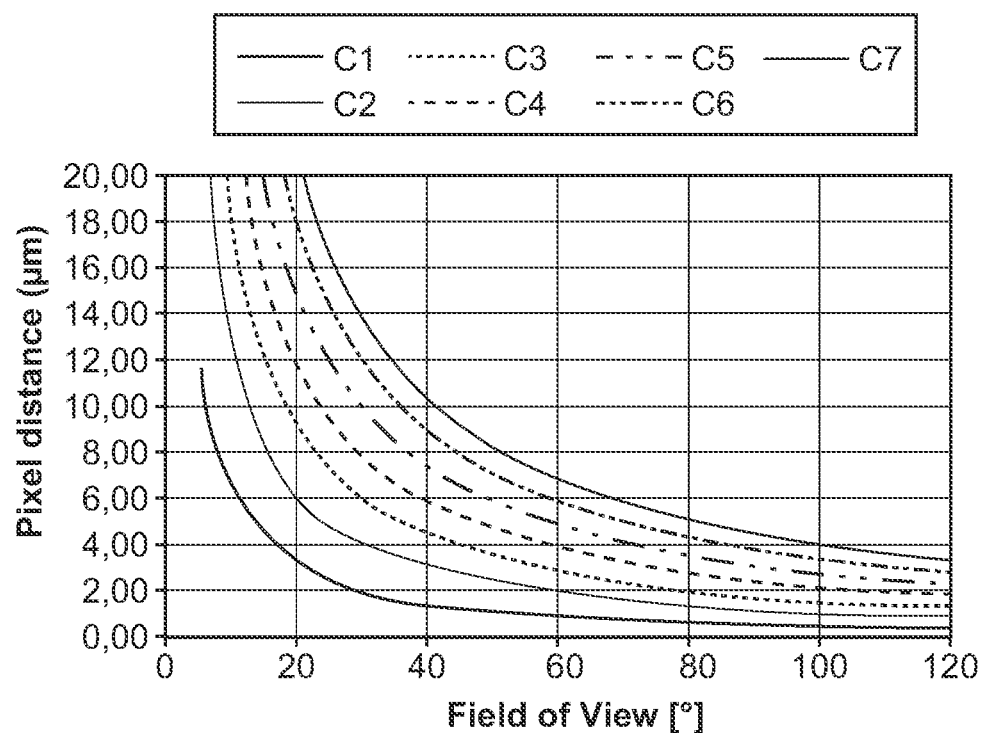
FIG. 1A shows a diagram illustrating some requirements for so-called μ-displays or micro-displays of different sizes with respect to the field of view and pixel pitch of the μ-display.

Augmented Reality is usually generated by a dedicated display whose image is superimposed on reality. Such device can be positioned directly in the user's line of sight, i.e. directly in front of it. Alternatively, optical beam guidance elements can be used to guide the light from a display to the user's eye.

In both cases, the display may be implemented and be part of the glasses or other visually enhancing devices worn by the user. Google's™ Glasses is an example of such a visually augmenting device that allows the user to overlay certain information about real world objects. For the Google™ glasses, the information was displayed on a small screen placed in front of one of the lenses. In this respect, the appearance of such an additional device is a key characteristic of eyeglasses, combining technical functionality with a design aspect when wearing glasses. In the meantime, users require glasses without such bulky or easily damaged devices to provide advanced reality functionality. One idea, therefore, is that the glasses themselves become a display or at least a screen on or into which the information is projected.

In such cases, the field of vision for the user is limited to the dimension of the glasses. Accordingly, the area onto which extended reality functionality can be projected is approximately the size of a pair of spectacles. Here, the same, but also different information can be projected on, into or onto the two lenses of a pair of spectacles.

In addition, the image that the user experiences when wearing glasses with augmented reality functionality should have a resolution that creates a seamless impression to the user, so that the user does not perceive the augmented reality as a pixelated object or as a low-resolution element. Straight bevelled edges, arrows or similar elements show a staircase shape that is disturbing for the user at low resolutions.

In order to achieve the desired impression, two display parameters are considered important, which have an influence on the visual impression for a given or known human sight. One is the pixel size itself, i.e. the geometric shape and dimension of a single pixel or the area of 3 subpixels representing the pixel. The second parameter is the pixel pitch, i.e. the distance between two adjacent pixels or, if necessary, subpixels. Sometimes the pixel pitch is also called pixel gap. A larger pixel pitch can be detected by a user and is perceived as a gap between the pixels and in some cases causes the so-called fly screen effect. The gap should therefore not exceed a certain limit.

The maximum angular resolution of the human eye is typically between 0.02 and 0.03 angular degrees, which roughly corresponds to 1.2 to 1.8 arc minutes per line pair. This results in a pixel gap of 0.6-0.9 arc minutes. Some current mobile phone displays have about 400 pixels/inch, resulting in a viewing angle of approximately 2.9° at a distance of 25 cm from a user's eye or approximately 70 pixels/° viewing angle and cm. The distance between two pixels in such displays is therefore in the range of the maximum angular resolution. Furthermore, the pixel size itself is about 56 µm.

FIG. 1A illustrates the pixel pitch, i.e. the distance between two adjacent pixels as a function of the field of view in angular degrees. In this respect, the field of view is the extension of the observable world seen at a given moment. This is because human vision is defined as the number of degrees of the angle of view during stable fixation of the eye.

In particular, humans have a forward horizontal arc of their field of vision for both eyes of slightly more than 210°, while the vertical arc of their field of vision for humans is around 135°. However, the range of visual abilities is not uniform across the field of vision and can vary from person to person.

The binocular vision of humans covers approximately 114° horizontally (peripheral vision), and about 90° vertically. The remaining degrees on both sides have no binocular area but can be considered part of the field of vision.

Furthermore, color vision and the ability to perceive shapes and movement can further limit the horizontal and vertical field of vision. The rods and cones responsible for color vision are not evenly distributed.

Figure 1B:
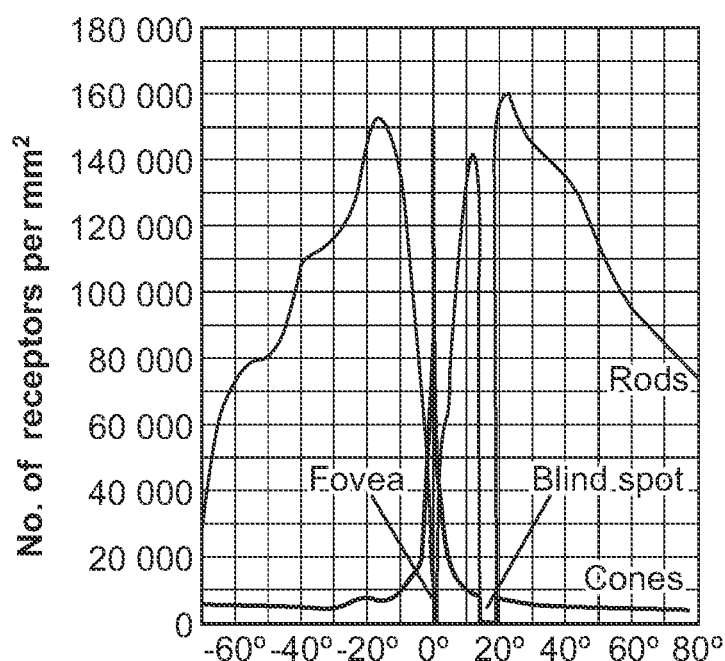
FIG. 1B shows a diagram of the spatial distribution of rods and cones in the human eye.
Figure 1C:
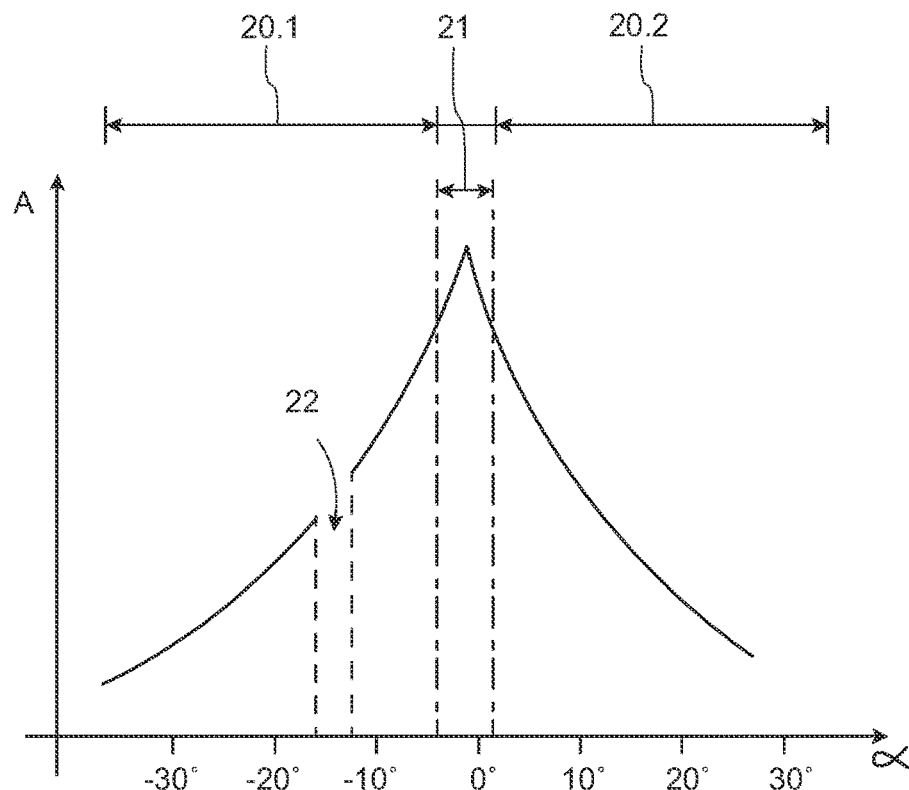
FIG. 1C shows a diagram of the perceptual capacity of the human eye with assigned projection areas.
Figure 1D:
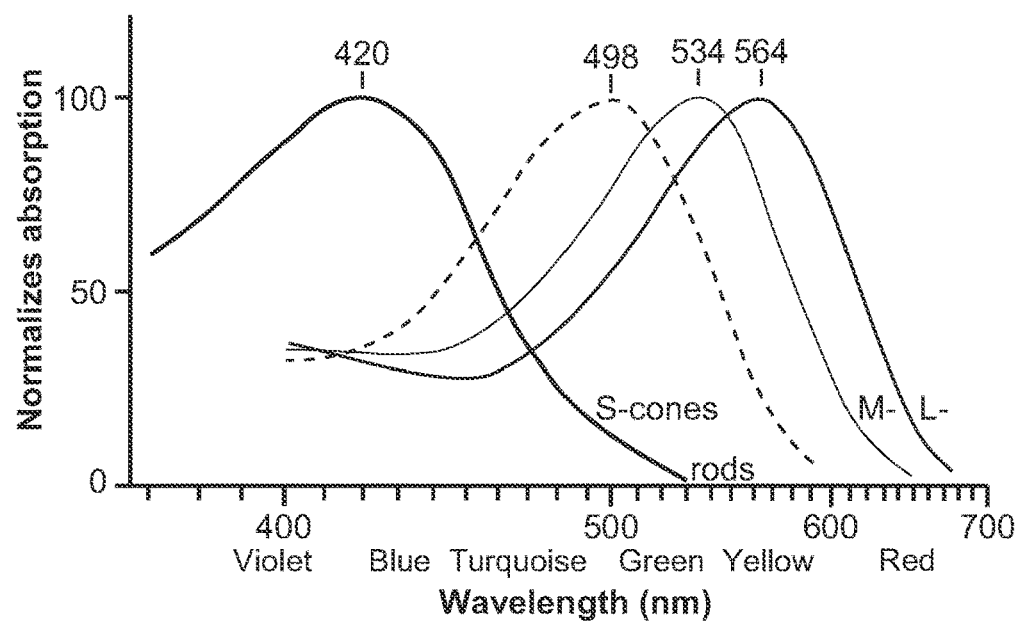
FIG. 1D is a figure showing the sensitivity of the rods and cones over the wavelength.

This point of view is shown in more detail in FIGS. 1B to 1D. In the area of central vision, i.e. directly in front of the eye, as required for Augmented Reality applications and partly also in the automotive sector, the sensitivity of the eye is very high both in terms of spatial resolution and in terms of color perception.

FIG. 1B shows the spatial density of rods and cones per $mm^2$ as a function of the fovea angle. FIG. 1C describes the color sensitivity of cones and rods as a function of wavelength. In the central area of the fovea, the increased density of cones (L, S and M) means that better color vision predominates. At a distance of about 25° around the fovea, the sensitivity begins to decrease and the density of the visual cells decreases.

Towards the edge, the sensitivity of color vision decreases, but at the same time contrast vision by means of the rods remains over a larger angular range. Overall, the eye develops a radially symmetrical visual pattern rather than a Cartesian visual pattern. A high resolution for all primary colors is therefore required, especially in the center. At the edge it may be sufficient to work with an emitter adapted to the spectral sensitivity of the rods (max. sensitivity at 498 nm, see FIG. 1D and the sensitivity of the eye).

FIG. 1C shows the different perceptual capacity of the human eye by means of a graph of the angular resolution A relative to the angular deviation α from the optical axis of the eye. It can be seen that the highest angular resolution A is in an interval of the angular deviation α of +/−2.5°, in which the fovea centralis 7 with a diameter of 1.5 mm is located on the retina 19. In addition, the position of the blind spot 22 on the retina 19 is sketched, which is located in the area of the optic nerve papilla 23, which has a position with an angular deviation α of about 15°.

The eye compensates this non-constant density and also the so-called blind spot by small movements of the eye. Such changes in the direction of vision or focus can be counteracted by suitable optics and tracking of the eye.

Furthermore, even with glasses, the field of vision is further restricted and, for example, can be approximately in the range of 80° for each lens.

The pixel pitch in FIG. 1A on the Y-axis is given in µm and defines the distance between two adjacent pixels. The various curves C1 to C7 define the diagonal dimension of a corresponding display from 5 mm to approximately 35 mm.

For example, curve C1 corresponds to a display with the diagonal size of 5 mm, i.e. a side length of approximately 2.25 mm. For a field of view of approximately 80°, the pixel pitch of a display with a diagonal size of 5 mm is in the range of 1 µm. For larger displays like curve C7 and 35 mm diagonal size, the same field of view can be implemented with a pixel pitch of approximately 5 µm.

Nevertheless, the curves in FIG. 1A illustrate that for larger fields of view, which are preferred for extended reality applications, very high pixel densities with small pixel pitch are required if the well-known fly screen effect is to be avoided. One can now calculate the size of the pixel for a given number of pixels, a given field of view and a given diagonal size of a µ-display.

Equation 1 shows the relationship between dimension D of a pixel, pixel pitch pp, number N of pixels and the edge length d of the display. The distance r between two adjacent pixels calculated from their respective centers is given by $r=d/2+pp+d/2.$ $D=d/N-pp$ $N=d/(D+pp)$ (1)

Assuming that the display (e.g. glasses) is at a distance of 2.54 cm (1 inch) from the eye, the distance r between two adjacent pixels for an angular resolution of 1 arcminute as roughly estimated above is given by $r=\tan(1/60°)*30$ mm $r=8.7$ µm The size of a pixel is therefore smaller than 10 µm, especially if some space is required between two different pixels. With a distance, r between two pixels and a display with the size of 15 mm×10 mm, 1720×1150 pixels can be arranged on the surface.

Figure 2A:
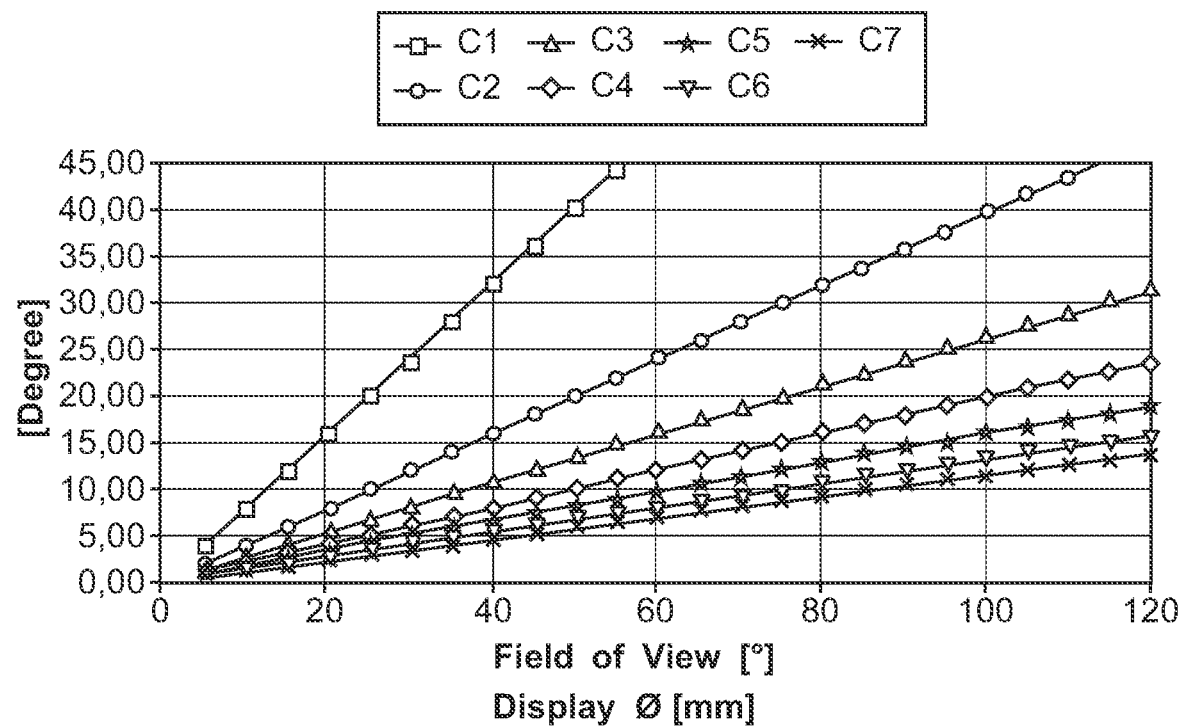
FIG. 2A is a diagram illustrating some requirements for micro-displays of different sizes in terms of the field of view and the angle of collimation of a pixel of the μ-display.
Figure 2B:
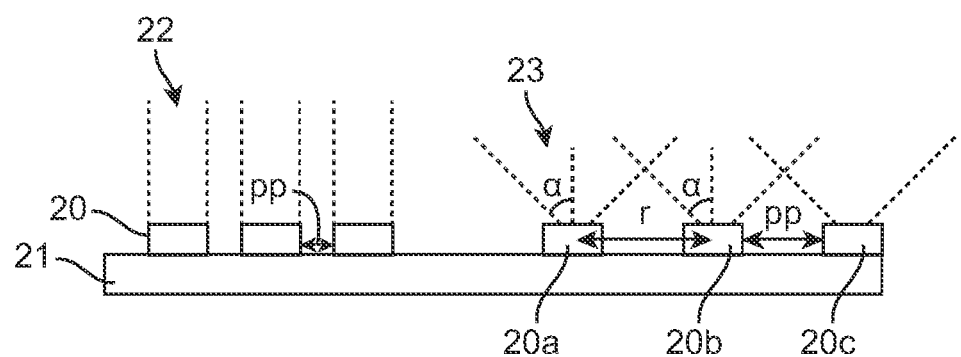
FIG. 2B illustrates an exemplary execution of a pixel arrangement to illustrate the parameters used in FIGS. 1A and 2A.

FIG. 2B shows an arrangement, which has a carrier 21 on which a large number of pixels, 20 and 20a to 20c are arranged. Pixels 20 arranged side by side have the pixel pitch pp, while pixels 20a to 20c are placed on carrier 21 with a larger pixel pitch pp. The distance between two pixels is given by the sum of the pixel pitch and half the size for each adjacent pixel. Each of the pixels 20 is configured so that its illumination characteristic or its emission vector 22 is substantially perpendicular to the emission surface of the corresponding LED.

The angle between the perpendicular axes to the emission surface of the LED and the beam vector is defined as the collimation angle. In the example of emission vector 22, the collimation angle of LEDs 20 is approximately zero. LED 20 emits light that is collinear and does not widen significantly.

In contrast, the collimation angle of the emission vector 23 of the LED pixels 20a to 20c is quite large and in the range of approximately 45°. As a result, part of the light emitted by LED 20a overlaps with the emission of an adjacent LED 20b.

The emission of the LEDs 20a to 20c is partially overlapping, so that its superposition of the corresponding light emission occurs. In case the LEDs emit light of different colors, the result will be a color mixture or a combined color. A similar effect occurs between areas of high contrast, i.e. when LED 20a is dark while LED 20b emits a certain light. Because of the overlap, the contrast is reduced and information about each individual position corresponding to a pixel position is reduced.

In displays where the distance to the user's eye is only small, as in the applications mentioned above, a larger collimation angle is rather annoying due to the effects mentioned above and other disadvantages. A user is able to see a wide collimation angle and may perceive displayed objects in slightly different colors blurred or with reduced contrast.

FIG. 2A illustrates in this respect the requirement for the collimation angle in degrees against the field of view in degrees, independent of specific display sizes. For smaller display sizes such as the one in curve C1 (approx. 5 mm diagonal), the collimation angle increases significantly depending on the field of view.

As the size of the display increases, the collimation angle requirements change drastically, so that even for large display geometries such as those illustrated in curve C7, the collimation angle reaches about 10° for a field of view of 100°. In other words, the collimation angle requirements for larger displays and larger fields of view are increasing. In such displays, light emitted by a pixel must be highly collimated to avoid or reduce the effects mentioned above. Consequently, strong collimation is required when displays with a large field of view are to be made available to a user, even if the display geometry is relatively large.

As a result of the above diagrams and equations, one can deduce that the requirements regarding pixel pitch and collimation angle become increasingly challenging as the display geometry and field of view grow. As already indicated by equation 1, the dimension of the display increases strongly with a larger number of pixels. Conversely, a large number of pixels is required for large fields of view if sufficient resolution is to be achieved and fly screens or other disturbing effects are to be avoided.

Figure 3A:
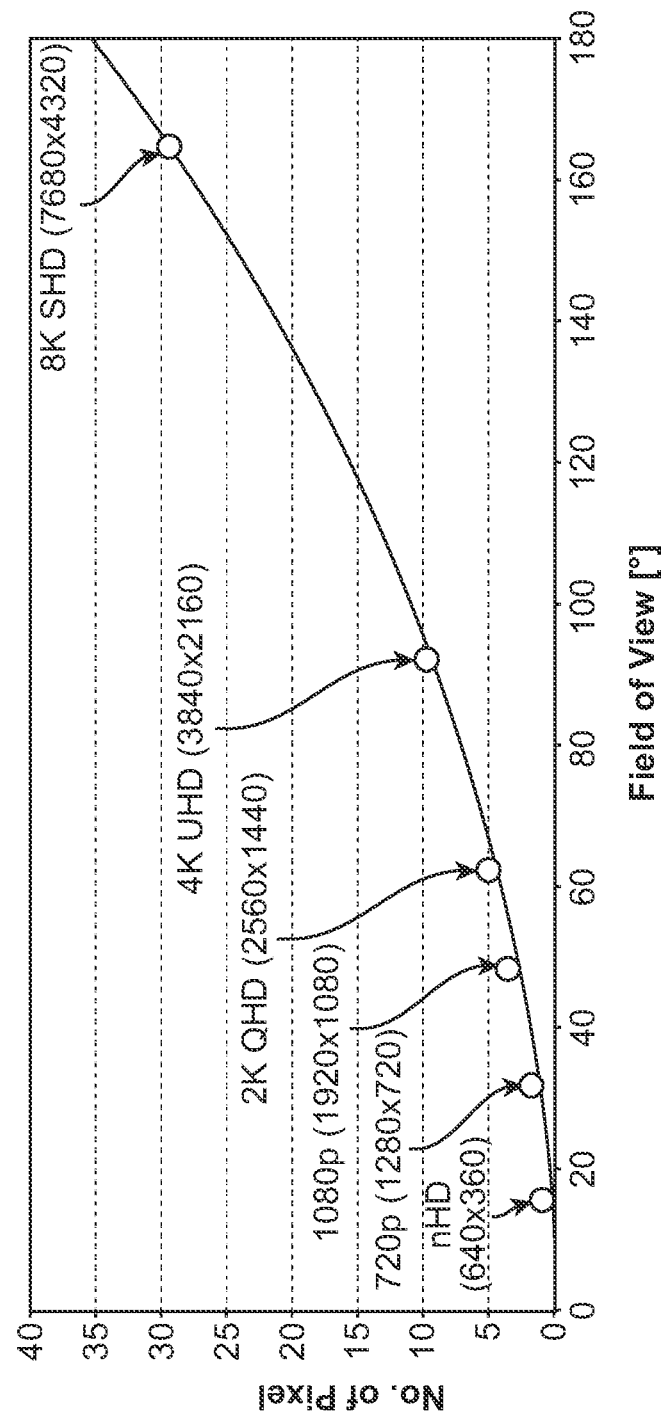
FIG. 3A shows a diagram illustrating the number of pixels required depending on the field of view for a specific resolution.

FIG. 3A shows a diagram of the number of pixels required to achieve an angular resolution of 1.3 arc minutes. For a field of view of approximately 80°, the number of pixels exceeds 5 million. It is easy to estimate that the size of the pixels for a QHD resolution is well below 10 μm, even if the display is 15 mm×10 mm. In summary, advanced reality displays with resolutions in the HD range, i.e. 1080p, require a total of 2.0736 million pixels. This allows a field of view of approximately 50° to be covered. Such a quantity of pixels arranged on a display size of 10×10 mm with a distance between the pixels of 1 μm results in a pixel size of about 4 μm.

In contrast, the table in FIGS. 3B-1 and 3B-2 shows several application areas in which μ-LED arrays can be used. The table shows applications (use case) of μ-LED arrays in vehicles (Auto) or for multimedia (MM), such as Automotive Displays and exemplary values regarding the minimum and maximum display size (min. and max. size X Y [cm]), the pixel density (PPI) and the pixel pitch (PP [μm]) as well as the resolution (Res.-Type) and the distance of the viewer (Viewing Distance [cm]) to the lighting device or display. In this context, the abbreviations "very low res", "low res", "mid res" and "high res" have the following meaning:

| | |
|---|---|
| very low res | pixel pitch approx. 0.8-3 mm |
| low res | Pixel pitch approx. 0.5-0.8 mm |
| mid res | Pixel pitch approx. 0.1-0.5 mm |
| high res | Pixel pitch less than 0.1 mm |

The upper part of the table, entitled "Direct Emitter Displays", shows inventive applications of μ-LED arrays in displays and lighting devices in vehicles and for the multimedia sector. The lower part of the table, titled "Transparent Direct Emitter Displays", names various applications of μ-LED arrays in transparent displays and transparent lighting devices. Some of the applications of μ-displays listed in the table are explained in more detail below in the form of embodiments.

The above considerations make it clear that challenges are considerable in terms of resolution, collimation and field of view suitable for extended reality applications. Accordingly, very high demands are placed on the technical implementation of such displays.

Conventional techniques are configured for the production of displays that have LEDs with edge lengths in the range of 100 μm or even more. However, they cannot be automatically scaled to the sizes of 70 μm and below required here. Pixel sizes of a few μm as well as distances of a few μm or even less come closer to the order of magnitude of the wavelength of the generated light and make novel technologies in processing necessary.

In addition, new challenges in light collimation and light direction are emerging. Optical lenses, for example, which can be easily structured for larger LEDs and can also be calculated using classical optics, cannot be reduced to such a small size without the Maxwell equations. Apart from this, the production of such small lenses is hardly possible without large errors or deviations. In some variants, quantum effects can influence the behaviour of pixels of the above-mentioned size and have to be considered. Tolerances in manufacturing or transfer techniques from pixels to sub mounts or matrix structures are becoming increasingly demanding. Likewise, the pixels must be contacted and individually controllable. Conventional circuits have a space requirement, which in some cases exceeds the pixel area, resulting in an arrangement and space problem.

Accordingly, new concepts for the control and accessibility of pixels of this size can be quite different from conventional technologies. Finally, a focus is on the power consumption of such displays and controllers. Especially for mobile applications, a low power consumption is desirable.

In summary, for many concepts that work for larger pixel sizes, extensive changes must be made before a reduction can be successful. While concepts that can be easily up scaled to LEDs at 2000 μm for the production of LEDs in the 200 μm range, downscaling to 20 μm is much more difficult. Many documents and literature that disclose such concepts have not taken into account the various effects and increased demands on the very small dimensions and are therefore not directly suitable or limited to pixel sizes well above 70 μm.

In the following, various aspects of the structure and design of μ-LED semiconductors, aspects of processing, light extraction and light guidance, display and control are presented. These are suitable and designed to realize displays with pixel sizes in the range of 70 μm and below. Some concepts are specifically designed for the production, light extraction and control of μ-LEDs with an edge length of less than 20 μm and especially less than 10 μm. It goes without saying, and is even desired, that the concepts presented here can and should be combined with each other for the different aspects. This concerns for example a concept for the production of a μ-LED with a concept for light extraction. In concrete terms, a μ-LED implemented by means of methods to avoid defects at edges or methods for current conduction or current constriction can be provided with light extraction structures based on photonic crystal structures. Likewise, a special drive can also be realized for displays whose pixel size is variable. Light guidance with piezoelectric mirrors can be realized for µ-LEDs displays based on the slot antenna aspect or on conventional monolithic pixel matrices.

In some of the following embodiments and described aspects, additional examples of a combination of the different embodiments or individual aspects thereof are suggested. These are intended to illustrate that the various aspects, embodiments or parts thereof can be combined with each other by the skilled person. Some applications require specially adapted concepts; in other applications, the requirements for the technology are somewhat lower. Automotive applications and displays, for example, may have a longer pixel edge length due to the generally somewhat greater distance to a user. Especially there, besides applications of extended reality, classical pixel applications or virtual reality applications exist. This is in the context of this disclosure for the realization of µ-LED displays, whose pixel edge length is in the range of 70 µm and below, also explicitly desired.

Figure 4A:
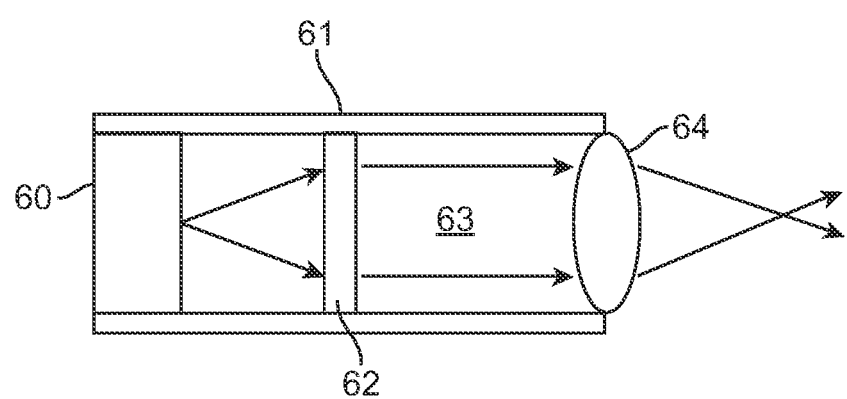
FIG. 4A shows a principle representation of a μ-LED display with essential elements for light generation and light guidance.
Figure 4B:
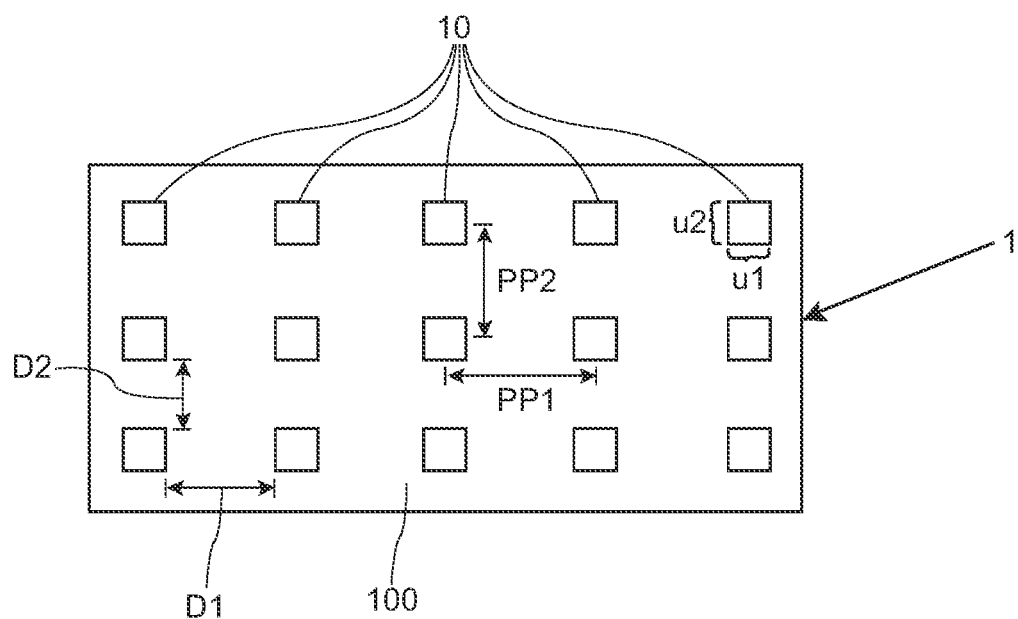
FIG. 4B shows a schematic representation of a μ-LED array with similar μ-LEDs.
Figure 4C:
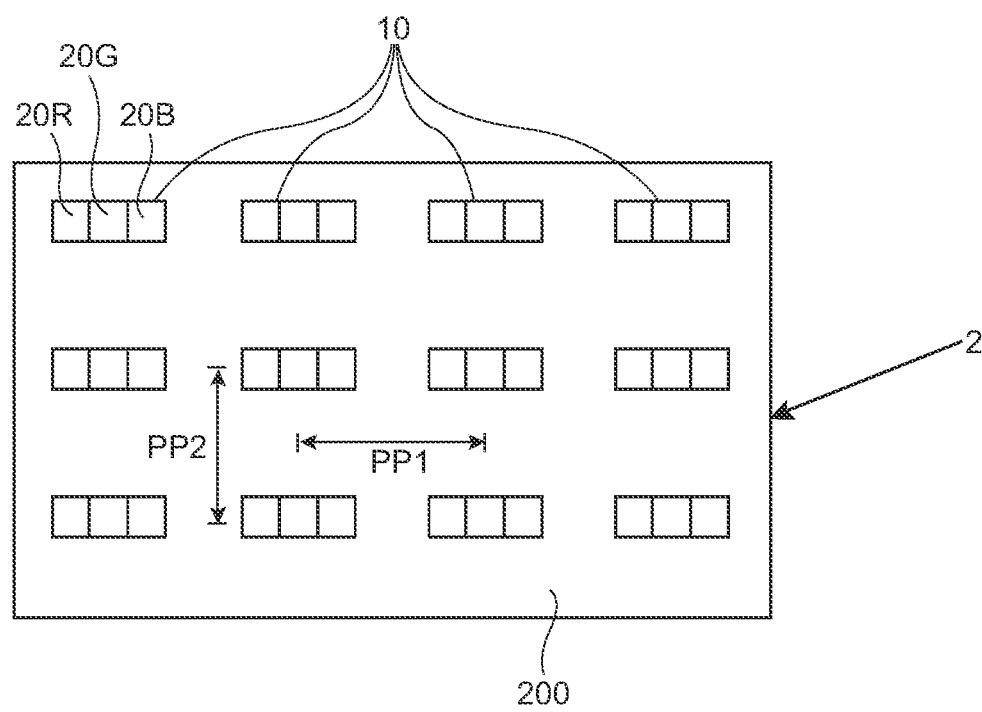
FIG. 4C is a schematic representation of a μ-LED array with μ-LEDs of different light colors.

A general illustration of the main components of a pixel in a µ-display is shown schematically in FIG. 4A. It shows an element 60 as a light generating and light emitting device. Various aspects of this are described in more detail below in the section on light generation and processing. Element 60 also includes basic circuits, interconnects, and such to control the illumination, intensity, and, when applicable, color of the pixel. Aspects of this are described in more detail in the section on light control. Apart from light generation, the emitted light must be collimated. For this purpose, many pixels in microdisplays have such collimation functionality in element 60. The parallel light in element 63 is then fed for light guidance into some optics 64, for further shaping and the like. Light collimation and optics suitable for implementing pixels for microdisplays are described in the section on light extraction and light guidance.

The pixel device of FIG. 4A illustrates the different components and aspects as separate elements. An expert will recognize that many components can be integrated into a single device. In practice, the height of a µ-display is also limited, resulting in a desired flat arrangement.

For displays a control of each pixel is done individually and separated from a second pixel to provide the appropriate flexibility to visualize any kind of information. In simple terms, it requires it requires controlling separately approximately 2 million pixels in a matrix of 1920×1080 pixels as in conventional TVs or monitors. Apart from the challenges of addressing such a number of pixels individually, in augmented reality and automotive applications, the display is quite small and the pixel size, as mentioned above, is only a few µm.

In conventional drivers for larger pixel sizes and displays, the analogue drivers, like the digital circuits, can be easily placed under the corresponding pixels. In such conventional displays with a pixel, size of for example 200 µm² the available space "under" the pixel is of the same order of magnitude. The driver circuit could easily be implemented in the available space and the size of the pixel itself would not be the limiting factor. However, with the reduced size of the pixels, the available space is no longer sufficient for conventional circuitry. A similar problem arises when using digital circuit technology in the material systems used so far. Silicon technology offers possibilities to further reduce the size of circuits, but this material system cannot easily be combined with existing materials for generating blue or green light.

Therefore, new concepts are needed, which can roughly be divided into two areas. The first area refers to new designs of transistors, capacitors or other elements. The designs themselves may exist for completely different applications or fields of technology but not in combination with the material systems used for the µ-LED or in combination with µ-LEDs as such. The second area relates to circuit design and the principles of driving µ-LED pixels. Simply put, digital transmission paths to address the pixels in rows and columns take up space, as does the corresponding row and column decoding. The same applies to the realization of current sources or buffers to supply the individual µ-LEDs with the necessary current. The design in monolithic as well as single µ-LEDs can allow different concepts to achieve a good visual impression with new approaches in addressing the µ-LEDs in a display.

Figure 5A:
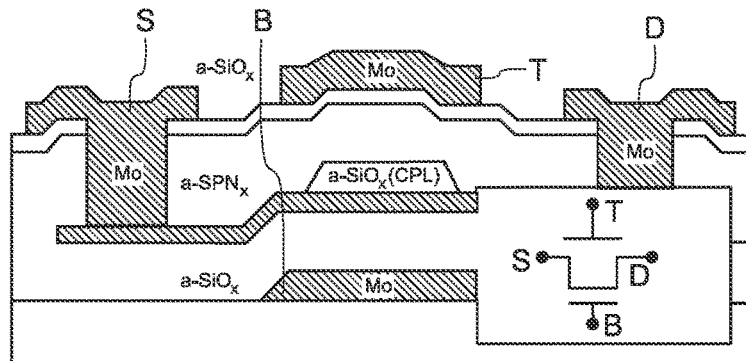
FIG. 5A illustrates an embodiment of a dual-gate transistor in a cross-section.

FIG. 5A shows an embodiment of a current driver for µ-LEDs with backgate and dual-gate transistor, respectively, which is formed in NMOS technology. This design can be realized in a particularly compact form with only little space consumption.

Such a back-gate transistor is often used as a current driver transistor or as a current source. It is constructed in TFT (thin-film technology), among other things, and has a second control connection, also known as a back gate, in addition to its standard control connection or gate. With the help of this additional back gate, the conductive channel of the transistor can be changed as explained below. Instead of an additional transistor for pulse width modulation (PWM), the back gate of an existing dual-gate transistor can now be modulated with a PWM signal.

FIG. 5A shows a cross-section of a backgated NMOS field-effect transistor. On the left side is a source region S, on the right side is a drain region D, with a current conducting channel between the two regions. The resistance of the channel, i.e. its ability to conduct current, is changed by a single gate in a normal field effect transistor. In a dual-gate transistor, the channel is changed by a first bottom gate B and a second top gate T. The gates are located on different sides of the channel. In the embodiment shown, the top gate (upper gate) provides the additional rear side contact or back gate contact.

Figure 5B:
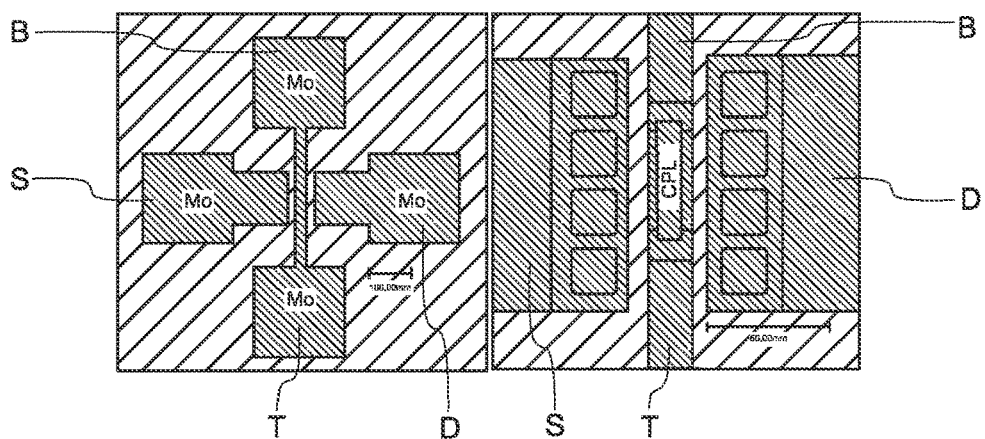
FIG. 5B shows two top views of the dual-gate transistor.

FIG. 5B shows two top views of the dual-gate transistor as shown in FIG. 5A. As shown in the left-hand illustration, a power line can be controlled by a left source area S and a right drain area D via top gate T and/or bottom gate B. The right-hand illustration in FIG. 5B shows a section of the arrangement shown in FIG. 5A.

Figure 5C:
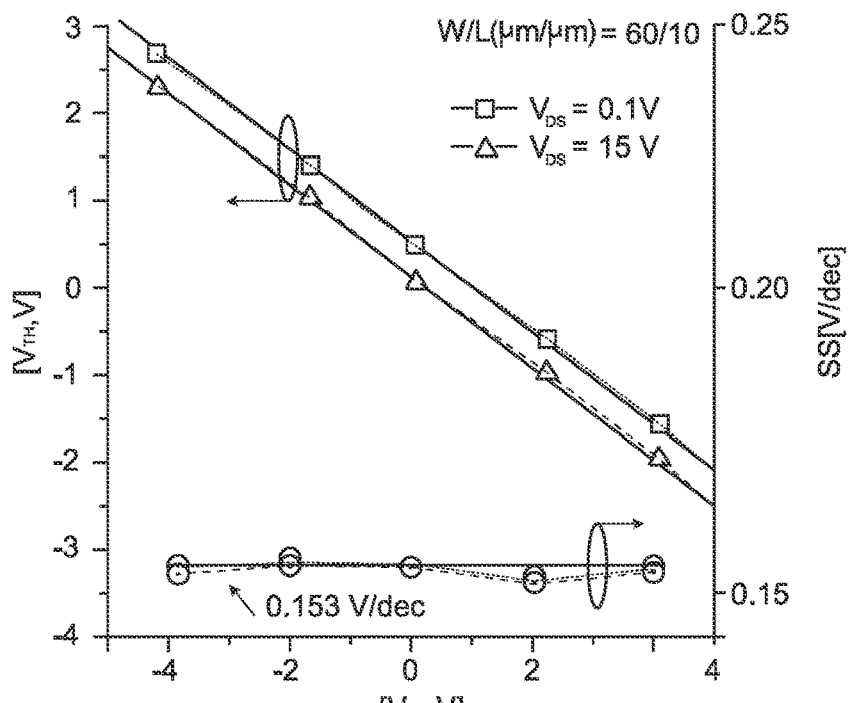
FIG. 5C illustrates a plot of the dependence of a threshold voltage on a top-gate voltage.

FIG. 5C shows an illustration of the dependence of a threshold voltage on a top-gate voltage $V_{TG}$ and thus the interaction of a back contact with the threshold voltage $V_{TH}$. The threshold voltage VTH is in particular the gate-source voltage $V_{GS}$, with which the field effect transistor becomes conductive. FIG. 5C shows the x-axis, the voltage $V_{TG}$ applied to a top gate T. As a function of this, the y-axis shows the threshold voltage VTH for changing the conductivity of the channel of the controlled NMOS field effect transistor. For example, a top gate voltage of 0 V provided a threshold voltage of 0.5 V for current conduction. By means of the additional top gate of the insulated Gate ZO NMOS transistor, the threshold voltage $V_{TH}$ of the transistor can be shifted almost linearly over a wide range.

Figure 6:
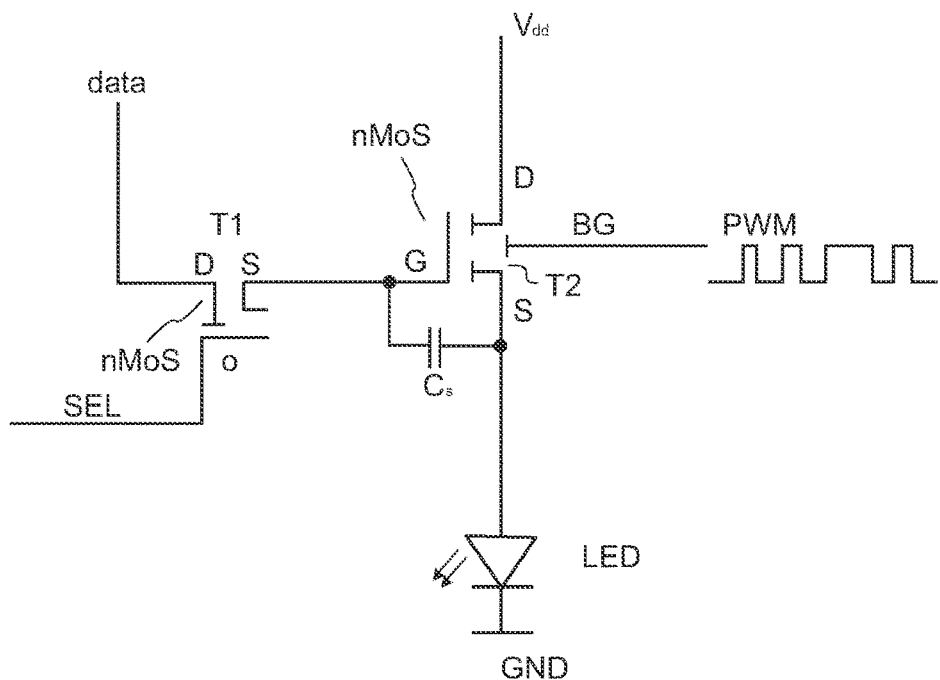
FIG. 6 shows a first embodiment of a control circuit for a μ-LED with some aspects according to the presented concept.

FIG. 6 shows a first embodiment of a device for electronic control of a µ-LED, in particular a pixel or subpixel for a display. The µ-LED can be manufactured using the various technologies shown. These include monolithic production, but also the arrangement in bar form, with current constriction or with the antenna structure disclosed in here. Decoupling structures can be provided to direct the light.

The µ-LED is connected in series with a dual-gate transistor between a first potential GND and a second potential Vdd. The arrangement comprises a threshold line PWM, which is connected to the first control gate or the back-gate BG of the dual-gate transistor T2. This has an additional control electrode. This backgate BG with a rear contact is shown in FIG. 5A and FIG. 5B. As shown in FIG. 5C, the threshold voltage can be shifted significantly via the back contact, i.e. the output current can be modulated by means of the additional gate BG while the voltage $U_{GS}$ between gate G and source S remains constant. In principle, Gate G and Backgate BG can also be used in reverse. This means that the current setting can be carried out by means of the first control terminal BG and the pulse width modulation by means of the second gate G. By means of the wide dynamic range provided by the circuit, the threshold voltage can be shifted into ranges that lead to a safe switch-off of the second transistor T2.

This enables pulse width modulation (PWM) operation.

Another advantage is the speed of the proposed circuit using the dual-gate transistor T2. A fast switching can be carried out. Since, in contrast to modulation via the "Data" line, no memory capacity is used, modulation can be performed much faster with the same driver performance.

Furthermore, the device comprises a data signal line data and a selection signal line sel. Finally, the device also contains a selection hold circuit with a charge storage Cs and a control transistor T1. The charge accumulator is arranged between a second control gate G of the dual-gate transistor T2 and a connection of the µ-LED. The control terminal of the control transistor T1 is connected to selection signal line Sel. During operation, a date "data" is impressed on the data signal line via the selection signal line on gate G of the dual-gate transistor T2. The voltage $U_{GS}$ is stored in capacitor Cs and is still present even after switching off selection transistor T1. The voltage is given by the data signal, whereby addressing is done by means of the selection signal Sel.

Gate G thus creates a fixed channel and thus a constant current through the current path. In this way a constant current source is provided by transistor T2, which is additionally pulse width modulated by a PWM signal at the back gate of transistor T2. The µ-LED thus switches by the PWM signal between a current given by the date in the charge storage and the state "off". Since the µ-LED in some embodiments comprises a slight dependency of the color by the impressed current, the color can be impressed to a small extent by the data signal and the intensity by the PWM signal. If the color dependence is low, the intensity can be adjusted via the date even with a fixed PWM.

FIG. 6 shows a pulse width modulation of an adjustable constant current source with an NMOS TFT (Thin Film) transistor T2 without GND-based programming. However, this version is not temperature stabilized. The temperature instability results from the fact that the voltage across the charge storage Cs varies slightly due to the temperature dependence of the voltage drop across the LED.

Figure 7:
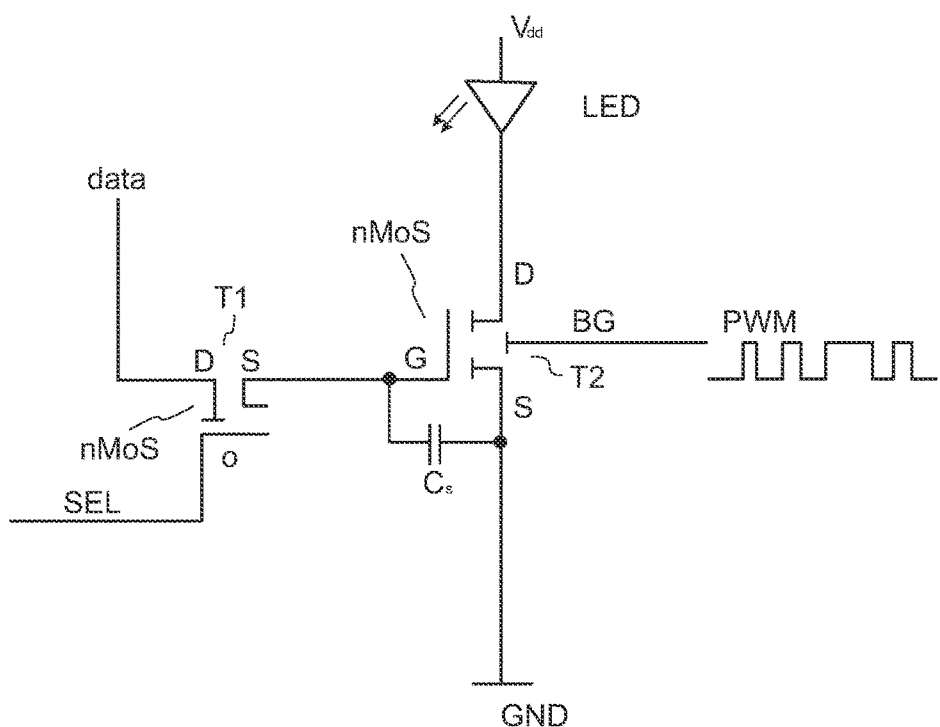
FIG. 7 shows a second embodiment of a control circuit for a μ-LED with further aspects.

FIG. 7 shows a second embodiment of a device for electronic control of a µ-LED pixel cell, provided in NMOS technology. Similar to the previous design, the current path includes a µ-LED and a dual-gate transistor T2 connected in series between the first potential terminal GND and the second terminal Vdd. The charge memory Cs of the selection signal holding circuit comprises one terminal connected to the gate G of transistor T2 and its other terminal connected between source S and first potential GND. As a result, the voltage across the charge accumulator Cs remains constant and is no longer dependent on the forward voltage of the light emitting diodes and thus no longer so dependent on temperature. The selection signal holding circuit is programmed via GND.

On the other side the µ-LED is connected between the drain connection D and the supply potential Vdd. Thus, the µ-LED is located on the side of the second potential connection Vdd, which provides the electrically higher potential. The arrangement is similar to FIG. 6, but the µ-LED is not located on the low side, i.e. not with the cathode connected to GND (ground), but on the high side or upper side of transistor T2. Thus, the cathode of the micro light emitting diode is connected to the drain of transistor T2 and its anode to the second potential connection Vdd. Correspondingly, the µ-LED shows, for example, a common anode topology instead of a previous "common cathode".

Figure 8:
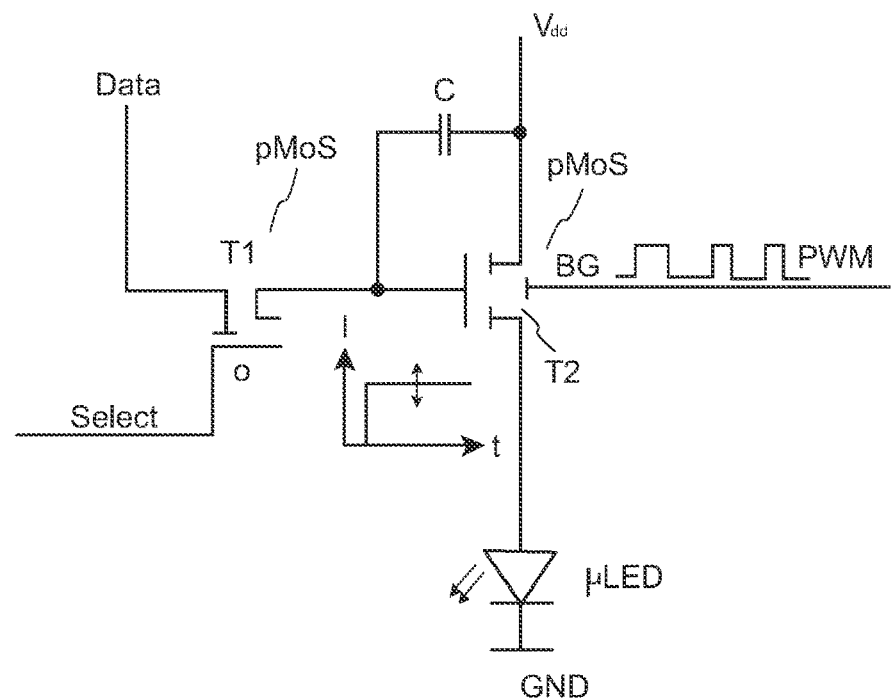
FIG. 8 is a third embodiment of a control circuit for a μ-LED according to some aspects of the proposed concept.

FIG. 8 shows a third embodiment of a device, an embodiment shown in FIG. 6, but now implemented using PMOS thin-film transistors instead of NMOS thin-film transistors (TFT). Only PMOS transistors are used. In this embodiment, the charge memory is connected between the source of the dual-gate transistor T2 and the first potential Vdd.

The embodiments shown in FIGS. 6 to 8 allow classic control in a pixel matrix. The "front gate" (normal) gate G of transistor T2 is described with a voltage value Data, the holding capacitor Cs stores this voltage value and controls the second transistor T2 accordingly. This is used, for example, to set a color mixture in an RGB pixel. A pulse width modulation (PWM) voltage is now applied to the second transistor T2 via the backgate BG. This voltage modulates the micro light emitting diode current in time via pulse width modulation (PWM) and is used, for example, to change the general brightness of a pixel with a previously programmed color. The color is programmed in advance via the first transistor T1 and the capacitor Cs. The same pulse width modulation signal can also be applied to all transistors of a display line, for example, to the respective backgate. Thus, a whole line is "dimmed".

It is also possible that all back gates of a complete display, i.e. all columns and all rows, are driven by a common pulse width modulation signal PWM, so that the complete display is "dimmed" without changing its picture content. This can be used, for example, for a day-night mode for a display in a car or for glasses on Augment Reality applications. In this way, the brightness can be adjusted dynamically and continuously to an external brightness. In the automotive sector, parts of a display may also be individually controllable in this way, allowing dark areas to be brightened and lighter areas to be darkened.

Figure 9:
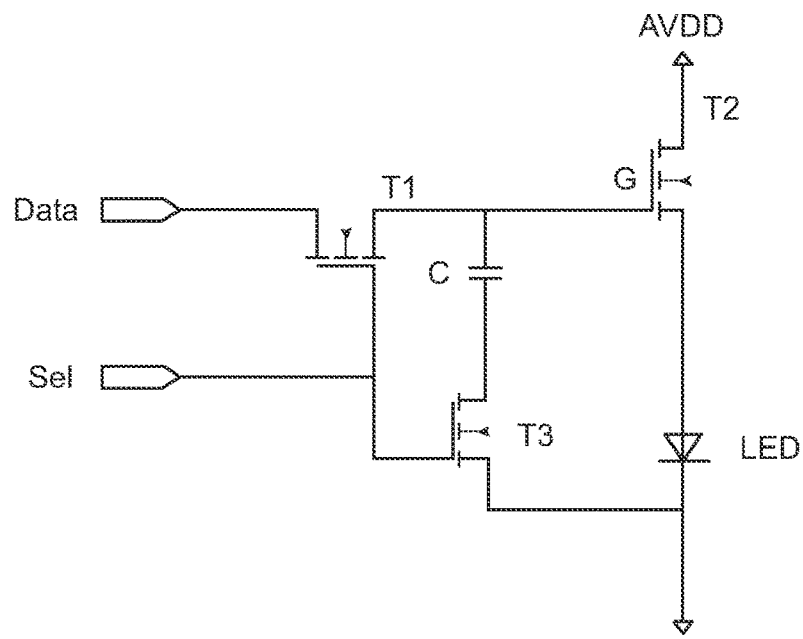
FIG. 9 shows embodiment of a control circuit for a μ-LED with further aspects.

FIG. 9 shows a third embodiment of a device, namely a further design of a control device. In addition to the representation and device shown in FIG. 6, a third transistor T3 is connected in parallel to the µ-LED, the control terminal of the third transistor T3 being connected to the selection signal line Sel. The transistor T2 as constant current source is here designed with only one gate. By means of such an arrangement, programming can be performed independently of the anode potential of the µ-LED. The device shown here results from a combination of NMOS-based IGZO processes and the requirement of a common cathode from process technology with regard to an assembly of µ-LEDs. On this basis an implementation of a 2T1C (two transistors and one capacitance) current source is possible.

If a high potential Vdd is applied to the selection signal line Sel, the first transistor T1 is connected to the data signal line Vdata, in addition the third transistor T3 becomes conductive, bridging the LED and connecting capacitor C to reference potential (GND). In this way, the capacitor is programmed with the voltage Vdata, referenced to the reference potential GND of the lower, first potential connection and not to the anode potential of the µ-LED. If the potential of the selection signal line Sel is at the reference potential (GND), the first transistor T1 and the third transistor T3 are blocked, so that the capacitor C maintains its previously programmed voltage, which corresponds to the gate-source voltage $U_{GS}$ of the second transistor T2. If the anode potential shifts, the separation of Vdata also shifts the gate potential to the second transistor T2, so that the gate-source voltage $U_{GS}$ of transistor T2 remains constant. In this way, the second transistor T2 can operate as a current source.

Figure 10:
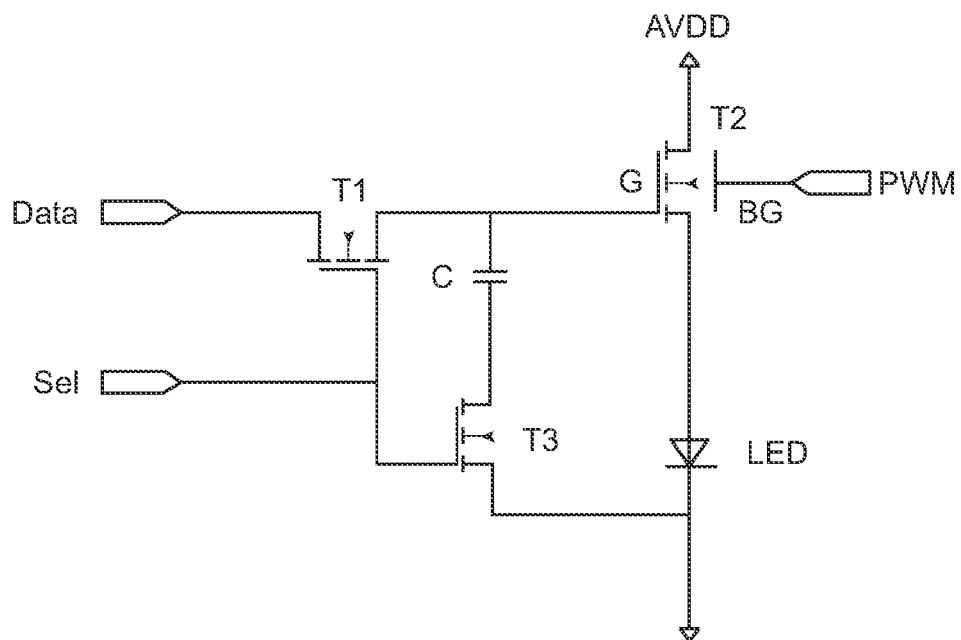
FIG. 10 illustrates a further embodiment of a control circuit for a μ-LED according to some aspects of the proposed concept.

FIG. 10 shows a fourth example of a device, in the form of a subpixel cell. FIG. 10 shows an arrangement as shown in FIG. 9 with the difference that the second transistor T2 here is designed as a dual-gate transistor whose additional gate terminal BG is connected to a threshold line PWM for applying pulse width modulation. The front gate G is connected to the charge storage C, the back gate BG is fed with the pulse width modulated signal.

The transistors T1 to T3 in combination with the holding capacitor C1 form a 3T1C cell in NMOS configuration. The 2T1C cell consisting of transistor T1 and transistor T2 can also be designed as a PMOS configuration. In this case, for example, the third transistor T3 is not required. Transistor T2 is configured as a so-called "dual-gate transistor".

Figure 11:
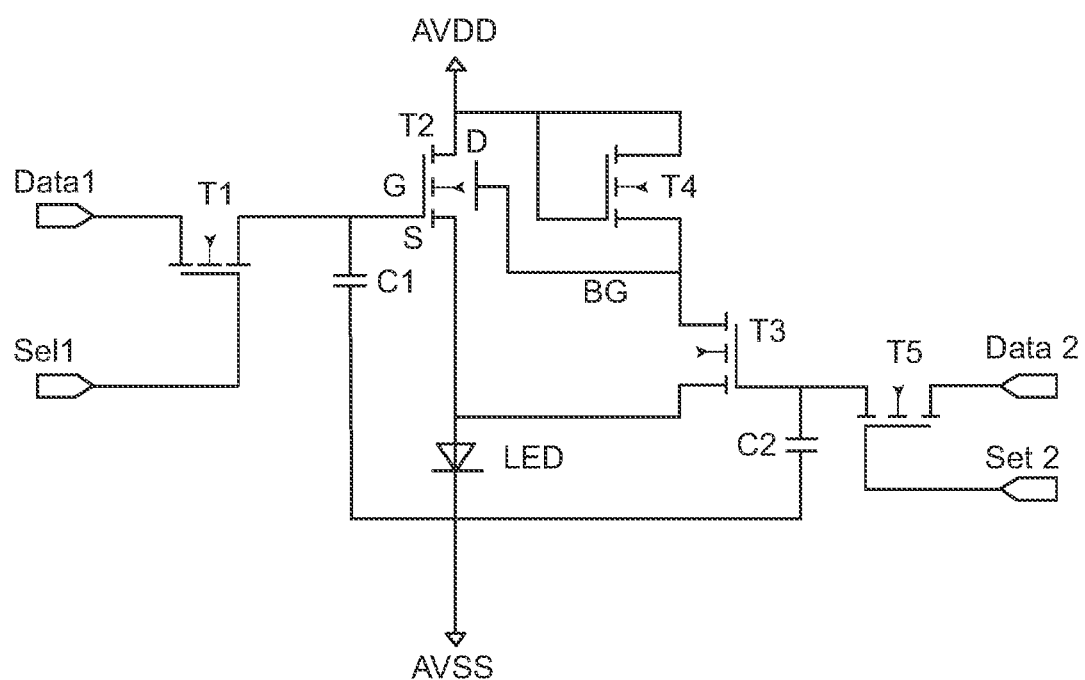
FIG. 11 shows a further embodiment in addition to the previous figure.

FIG. 11 shows an illustration of an example of a device with additional temperature stabilization. The transistors T1 and T2 in combination with the holding capacitor C1 provide a 2T1C cell in NMOS configuration. The LED is placed on the low side of transistor T2, since a "common cathode" is provided for process-related reasons. The T2 is designed as a "dual-gate transistor" and thus comprises two control electrodes. Similar to some previous examples, the gate (corresponding to the bottom gate in FIG. 5A) of the dual-gate transistor T2 is also part of the topology of the 2T1C cell in this embodiment and provides the color and general brightness of the µ-LED via the ground-related programming of the charge storage C1 and the signal on line Data1. Via the backgate BG (front gate of FIG. 5) a PWM signal can be applied to transistor T2, which acts as a current source. The gate-source voltage of transistor T2 is thus dependent on the forward voltage of the LED. Since the voltage drop across the LED depends on both the cross-current and the temperature, the output current is considerably different from the actual expected value of the programming. This can be described by the following equation 2:

$$I_{LED} = K(U\text{data} - U_{LED}(T,I) - U\text{th})^2 \qquad (2)$$

Here $U_{data}$ is the voltage across the charge storage C1. When the µ-LED heats up by itself, its forward voltage decreases, which leads to an increase of the current through transistor T2. Due to the absence of negative feedback, a change in the operating parameters of the µ-LED therefore has a significant effect on the current and thus on the brightness or color of the µ-LED. Therefore a negative feedback is proposed, which exploits the functionality of transistor T2 as a dual-gate transistor and allows compensation of such effects. The negative feedback comprises a holding capacitor C2, which is connected between the reference potential AVSS and a control terminal of a transistor T3. The first terminal of this capacitor forms the control for the backgate BG of the dual-gate transistor T2 and the other terminal is connected to the source S of the dual-gate transistor T2. The negative feedback comprises a further transistor T4, whose control and drain terminals are connected to the supply potential AVDD. Its source terminal is connected to the backgate BG and the drain of transistor T3. Finally, a fifth transistor T5 is provided for optional programming of a compensation, which stores a compensation value on line Data 2 in the holding capacitor C2 on the basis of a selection signal Set2.

The gate-source voltage of transistor T3 corresponds to the voltage of holding capacitor C2 minus the forward voltage of the LED. If this forward voltage Vf LED increases, the gate-source voltage $U_{GS}$ of the third transistor T3 decreases, since the stored charge on the capacitor C2 remains the same. Thus, the current through the third transistor T3 decreases. Since this current also flows through transistor T4, the coupling of its gate to the supply potential results in a smaller voltage drop $U_{DS}$ via the fourth transistor T4. This results in a higher voltage at the node to the back gate of transistor T2. This in turn results in a lower threshold voltage at transistor T2. By means of an appropriate design of the transistors T3 and T4 according to the following equation 3

$$\beta = -\sqrt{\frac{W_4 \cdot L_3}{W_3 \cdot L_4}} \quad \text{whereat} \qquad (3)$$

$$U_{th} \cdot I_{T2} = U_{th} \; U_{th} \cdot I_{Nom} \cdot + \beta \cdot U_{BG-S} \cdot -S$$

an almost complete compensation of the described feedback effect of the forward voltage of the LEDs can be achieved. Typical values for $\beta = -0.52$ this results in $W_3 = 3.69 \cdot W_4$ with $L_3 = L_4 = L_{min}$.

The fifth transistor T5 and the capacitance C2 can be used to fine-tune the pixel cell Data2 including the feedback. As shown in FIG. 11, a significant improvement of the current stability is achieved without complex pre-calculation. The compensation of the current instability is achieved with few components and without complex precalculation of the "Data" signal. This allows temperature fluctuations during operation to be compensated. Furthermore, a reduction of the quiescent current caused by the third transistor T3 can be achieved by the additional control input Data2 via Sel2.

Figure 12:
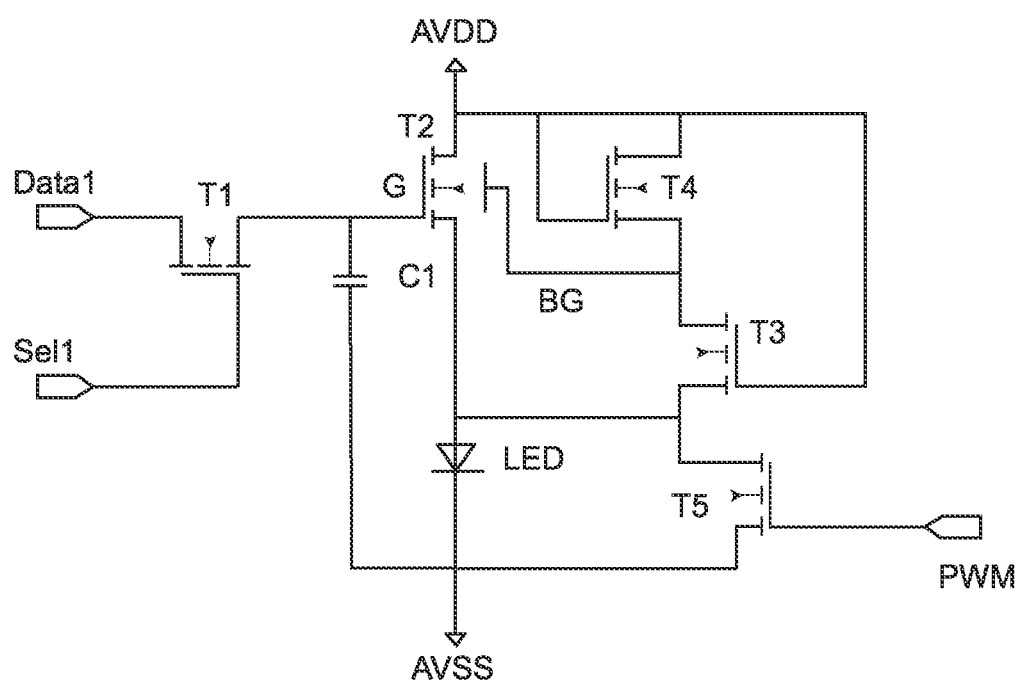
FIG. 12 shows a fifth embodiment of a control circuit for a μ-LED according to some aspects.

FIG. 12 shows a fifth embodiment of a µ-LED control device. As in the previous examples, the µ-LED can be part of a display or a module. In addition to the design as shown in FIG. 6, further changes have been made to the temperature compensation and influence of the forward voltage through the µ-LED.

The embodiment comprises a third electronic switch T3 with a first power line contact connected to the second terminal of the µ-LED, and a second power line contact of the third electronic switch T3 connected to the first control terminal BG of the second electronic switch T2. The device also includes a fourth electronic switch T4. A control terminal of the third electronic switch T3 is connected to a second power line contact of the fourth electronic switch T4, which are connected in common to the supply potential AVDD. A control terminal of the fourth electronic switch T4 is also connected to the supply potential AVDD. Finally, the fourth electronic switch T4 has its first power line contact connected to the second power line contact of the third electronic switch T3.

A fifth electronic switch T5 is provided to control the second electronic switch T2 via the first control connection BG. This is connected in parallel to the µ-LED. It is also connected by its second power line contact to the first power line contact of the third electronic switch T3. The control terminal of the fifth electronic switch T5 is electrically connected to a terminal for supplying a pulse width modulation signal PWM.

The behaviour and function of the device shown in FIG. 12 is similar to the device shown in FIG. 11, but unlike FIG. 11, the gate of the third transistor T3 is electrically connected to a fixed electrical potential Vdd. As an option, an additional fifth transistor T5 can be provided for safe switching off the LED without a cross current from the third transistor T3. A fifth transistor T5 is not necessary if a cross current from the third transistor T3 into the µ-LED is not a problem. According to the device presented here, the pulse width modulation PWM is controlled without a holding capacitor. In this way, a possible pulse width modulation resolution can be increased with the same cycle time. Likewise a recharging of a storage capacitor is not necessary, which increases the switching speed.

A further aspect concerns in the following a control for a brightness adjustment or a dimming of pixels, or of the assigned µ-LEDs. Such dimming is not only frequently used in the automotive sector, for example to switch between day and night vision, but also in AR applications. Basically, such dimming can be useful and advantageous when contrasts have to be adjusted or when external light makes it necessary to control the brightness of a display in order to avoid dazzling a user or to show information reliably.

Conventionally, this problem can be addressed with PWM control and current dimming, but external parameters of the LED often change, which requires complex compensation circuits. Alternatively, so-called 2T1C circuits can be used, to which the control signal for driver control is fed and stored in a capacitor. The brightness is then adjusted by the voltage applied to the capacitor. The invention now makes use of an aspect, which often occurs rather as a parasitic undesired effect, namely the gate-source capacitance of the driver transistor. This forms a capacitive voltage divider with the capacitance of the capacitor, so that the voltage at the gate of the transistor drops. If the gate-source capacitance is selected appropriately, the brightness can be adjusted over a wider range.

In one aspect, a control circuit for adjusting a brightness of at least one µ-LED comprises a current driver element with a control terminal. This is connected in series with the µ-LED and has its first terminal connected to a first potential. A charge accumulator is arranged between the control terminal and the first potential and forms a capacitive voltage divider with a defined capacity between the control terminal and the first terminal.

According to the invention, a control element is now provided which provides a control signal to the control terminal during an initial period of time, on the basis of which a current flowing through the at least one µ-LED can be adjusted during the initial, first period of time. During a second time period following the first time period, the current flowing through the µ-LED is now determined by a reduced control signal resulting from the control signal during the first time period and the capacitive voltage divider.

Thus, when the control signal is selected by the control element, the brightness of the µ-LED can be adjusted so that it depends either substantially on the current during the first time period or the current through the LED during the subsequent second time period.

In other words, the control signal determines the total current through the µ-LED during the first and second time periods and, if the control signal is appropriately selected, depends substantially on the current flowing through the µ-LED during the first time period or on the current flowing through the µ-LED during the second time period.

Thus the control element is set up to provide a first or a second control signal during the first time period in order to operate the µ-LED at at least two different brightness levels during the entire time period. For this purpose, for example, the second control signal is larger than the first control signal, so that the reduced control signal derived from the second control signal is sufficient to drive the current driver and thus provide a current sufficient to operate the µ-LED.

As mentioned, the current driver element may include a field effect transistor whose gate forms the control terminal and has a gate-source capacitance specified by design. Accordingly, during the second time period, the reduced control signal applied to the control terminal of the transistor or current driver results from the control signal during the first time period and the ratio of a charge storage capacity and the sum of the charge storage capacity and the defined capacity.

Such a circuit is operated at a certain frequency, so that first and second time periods follow each other periodically. This frequency can be 60 Hz, often also 100 Hz or 120 Hz, or can be in the range of 60 Hz to 150 Hz. In one aspect, the control element is configured to make a ratio of the second time span to the first time span adjustable, whereby the ratio can be in the range from 300:1 to 100:1, in particular in the range from 100:1. For this purpose, the control element comprises a control transistor at whose control terminal the first and second time span and thus the duty cycle can be set by means of a signal.

A brightness level can now be selected by means of various control signals during the first time period of a period. For this purpose, it is provided in one aspect to operate the µ-LED at a first, darker brightness level if a voltage of the first control signal is within a first voltage interval, and to operate the µ-LED at at least a second, brighter brightness level if a voltage of the second voltage signal is within a second voltage interval which is at least partly above the first voltage interval.

In this context, the brightness is determined by the current flowing through the µ-LED during the whole time period. With a control signal that lies within the first voltage interval, the total current is essentially determined by the current during the first time period, since due to the capacitive voltage divider and the associated drop in a voltage of the reduced control signal during the second time period, the current through the LED during this time period is very small and not sufficient or relevant for operation. The current driver is not or only very slightly driven during this time period, the LED is hardly or not at all lit.

In contrast, the total current over a period is substantially determined by the current during the second period if the control signal during the first period is within the second voltage interval. In this case, despite the capacitive voltage divider and the associated drop in a voltage of the reduced control signal during the second time interval, the current driver is still sufficiently driven so that a sufficiently high current flows through the µ-LED to operate it. Typical possible values for the first voltage interval range from 1.3 V to 4.5 V. The second voltage interval ranges from 4.0 V to 10.0 V.

A further aspect concerns a method for adjusting a brightness of at least one µ-LED connected to a current driver element with a control terminal, the first terminal of which is connected to a first potential and in which a capacitor is connected between the control terminal and the first potential so that it forms a capacitive voltage divider with a defined capacitance between the control terminal and the first terminal. In the method, a control signal is applied to the control terminal during a first time period, whereby a current flowing through the at least one µ-LED is adjusted during the first time period. During the second period following the first period, the control signal is turned off, whereby the current flowing through the µ-LED is set by a reduced control signal resulting from the control signal during the first period and the capacitive voltage divider. "Switching off the control signal" here means disconnecting the control signal from the control terminal so that only a reduced signal acts on the control terminal thereafter, resulting from the control signal during the first time period and the capacitive voltage divider.

This reduced control signal is thus smaller than the control signal by the ratio of the capacitive voltage divider. Specifically, in one aspect, the reduced signal applied to the control terminal during the second time period results from the control signal during the first time period from the ratio of a capacity of the capacitor and the sum of the capacity of the capacitor and the defined capacity.

At this point a further aspect should be mentioned, namely that a ratio of the second time period to the first time period is in the range of 300:1 to 100:1, in particular in the range of 100:1. In another aspect, it is proposed to operate the µ-LED at a first, darker brightness level if a voltage of the first control signal is within a first voltage interval, and to operate the µ-LED at at least a second, brighter brightness level if a voltage of second voltage signal is within a second voltage interval that is at least partially above the first voltage interval.

In this context, the proposed method determines the brightness by the current flowing through the µ-LED during the entire time period. For a control signal that is within the first voltage interval, the total current is essentially determined by the current during the first time period, since due to the capacitive voltage divider and the associated drop in voltage during the second time period, the current through the LED during this time period is very small. The current driver is not or only very slightly driven during this time period.

On the other hand, the total current is essentially determined by the current during the second time period if the control signal during the first time period is within the second voltage interval. In this case, despite the capacitive voltage divider and the associated drop in a voltage of the control signal during the second time interval, the current driver is still sufficiently driven so that a sufficiently high current flows through the µ-LED to operate it. Typical possible values for the first voltage interval range from 1.3 V to 4.5 V. The second voltage interval ranges from 4.0 V to 10.0 V.

The first or second control signal required for control can be obtained from a digital control word by digital/analogueue conversion. The digital control word comprises a number of n bits for this purpose. The least significant m bits (M<n, e.g. m=n−2 bits) correspond to the first control signal, i.e. the most significant bits are 0. In other words, n bits correspond to the second control signal. In another aspect, the most significant bits are used for coarse brightness adjustment, the least significant bits for more precise range adjustment.

Figure 21A:
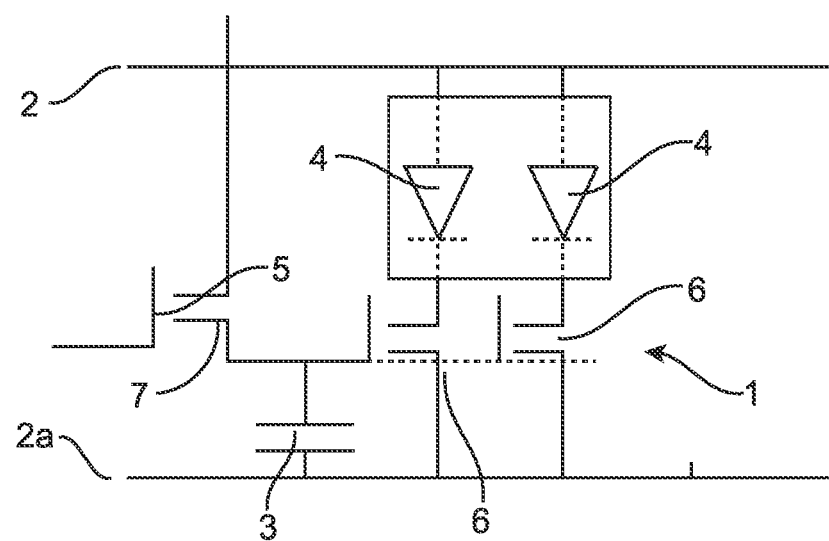
FIG. 21A shows a schematic diagram of a driver circuit for two μ-LEDs to explain some aspects of dimmable control according to some aspects.

FIG. 21A shows a control circuit for a lighting unit 1, which comprises two µ-LEDs 4 as illuminates. From the basic design, the control circuit can be implemented in a 2T1C architecture as shown here. However, other architectures are also conceivable.

Even if two µ-LEDs 4 are provided according to the shown design form in order to ensure redundancy with respect to light generation, it is generally irrelevant for the realization of the invention whether one µ-LED 4 or a plurality of µ-LEDs 4 are used as illuminates. For example, the light unit 1 or the µ-LEDs 4 can be a light unit or LEDs of one color of one pixel.

In the embodiment shown in FIG. 21A, the two µ-LEDs 4 connected in parallel are each supplied with the electrical energy required to excite a light emission via a current driving transistor 6. In addition to one transistor 6 for each µ-LED, a common current source can also be provided for both µ-LEDs 4. Current driving transistor 6 is connected in series with µ-LED 4 between supply potential terminal 2 and reference potential terminal 2a. Supply potential connection 2 provides the electrical energy or voltage required for the operation of lighting unit 1.

A capacitor, which stores the brightness value, is connected between the gate of the current-driving transistors 6 and the reference potential connection 2a. Together with the control transistor 7 it forms a 2T1C cell. A pulse signal is applied to its gate, which applies a control signal 8 from the other terminal of transistor 7 to the control terminal of current driving transistor 6.

For operation according to the proposed concept in a circuit according to FIG. 21A, a pulse signal is now applied to the gate of transistor 7. For example, the duty cycle On/Off can be 200:1, i.e. at a repetition frequency of 60 Hz the ON pulse duration is approx. 50 µs while the Off pulse duration is approx. 16.6 ms.

Within a period, the control transistor is now closed via the pulse signal for a first period (ON pulse duration), and the control transistor is opened again in a second period (OFF pulse duration). During the first period, the control signal 8 is thus applied to the control terminal of the current driver transistor 6 and via the capacitor 3. The control signal controls the current driver transistor 6 and a current caused by the control signal 8 flows through the µ-LED. At the same time, a charge is applied to the capacitor until the voltage of the control signal is established across the capacitor (referred to the potential at terminal 2a).

After the first time period, control transistor 7 is opened again. The voltage of control signal 8 is now stored in the capacitor and should continue to drive the current driver transistor. In practice, however, this is not the case, since in the second time period, a capacitive voltage divider is formed, which consists of the capacitance of the storage capacitor 3 and the capacitance formed by the gate and source of transistor 7. This regularly causes the effective voltage 9 on capacitor 3 to be lowered by a discrete value. The reduced effective voltage 9 results from the voltage of the control signal multiplied by C1/C1+Cp, where C1 is the capacitor capacitance and Cp is the gate-source capacitance. Thus, compared to the first time period, a slightly smaller control signal 9 (or slightly lower voltage) is applied to the driver transistor 6, so that a current of lower intensity flows through the µ-LEDs 4. The brightness of LEDs 4 thus decreases slightly during the second period of a period. However, this is not noticed by an observer, since only the average light output available in relation to the period is decisive for the perception of brightness.

Thus, for an entire period, control signal 8 is applied to the control terminal during the first period and the reduced control signal 9 during the second period. At a frequency of 60 Hz, this would be 0.05 ms to 0.06 ms for the first time period and approximately 16.6 ms for the second time period. In terms of the average light output of the μ-LED, this means that light emitted by the μ-LED during the second time period has a comparatively high proportion of the average light output of the μ-LED during one period.

This is equivalent to the average current through the μ-LED. The current flowing through the μ-LED during the second period has a relatively high share of the average current during the whole period.

It follows from this that if a low voltage is selected for control signal 8, the total current flowing through the LEDs 4 during one period, and thus the average light output, is determined decisively by the strength of the current flowing through the LEDs 4, while control signal 8 is applied during the first period. If a low voltage value is selected for control signal 8, lighting unit 1 can therefore be operated at a low brightness level and dimmed as required within this low brightness range.

If, on the other hand, a high voltage is selected for the first voltage signal 8, for example 8V, the total current flowing through the LED during one period is largely determined by the current during the second period of the period in which the reduced control signal 9 is applied to the current driver transistor 6. If a high control signal 8 is selected, i.e. a higher voltage, the lighting unit 1 is operated at a high brightness level and can be dimmed as required at this brightness level. During the second period of the period in which the reduced control signal 9 is applied to the lighting unit, a current greater than 1 μA still flows through the LED in this operating state, so that particularly effective operation of LEDs 4 is possible.

Figure 21B:
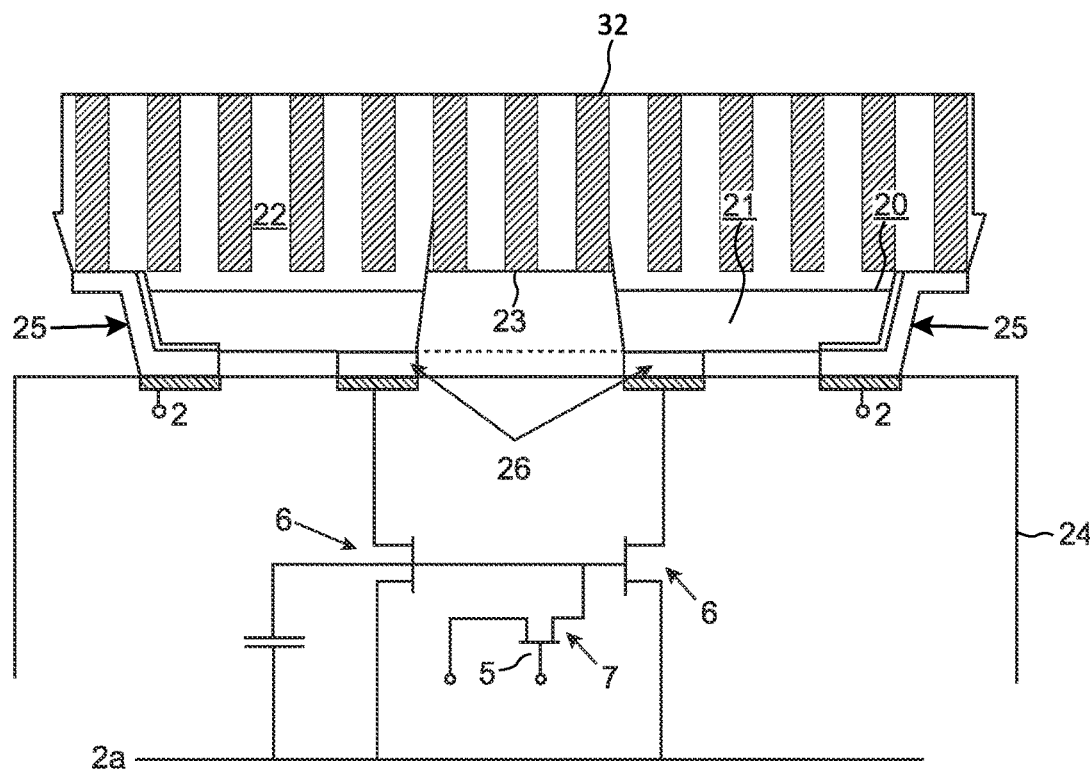
FIG. 21B shows an embodiment of the dimmable control with a μ-LED module.

FIG. 21B is a supplement to this embodiment where the proposed circuit is implemented in a backplane substrate. Contact areas are provided on the backplane substrate to which a μ-LED module is attached. This comprises two μ-LED base modules as disclosed in this application, for example in FIG. 184. The two contacts 26 are each connected to a current driver transistor 6. The two outer contacts 25 of the μ-LED Module are connected to the ground or reference potential connection. The current driver transistor is adequately dimensioned. In some aspects this may be the dual-gate transistor disclosed here, as described in FIGS. 5 to 12.

Furthermore, a photonic crystal 32 is incorporated in the μ-LED module. This extends to just above the active layer 20 and changes the emission properties there, for example in the area above the active layer, where it can have an emission-promoting effect.

Figure 22:
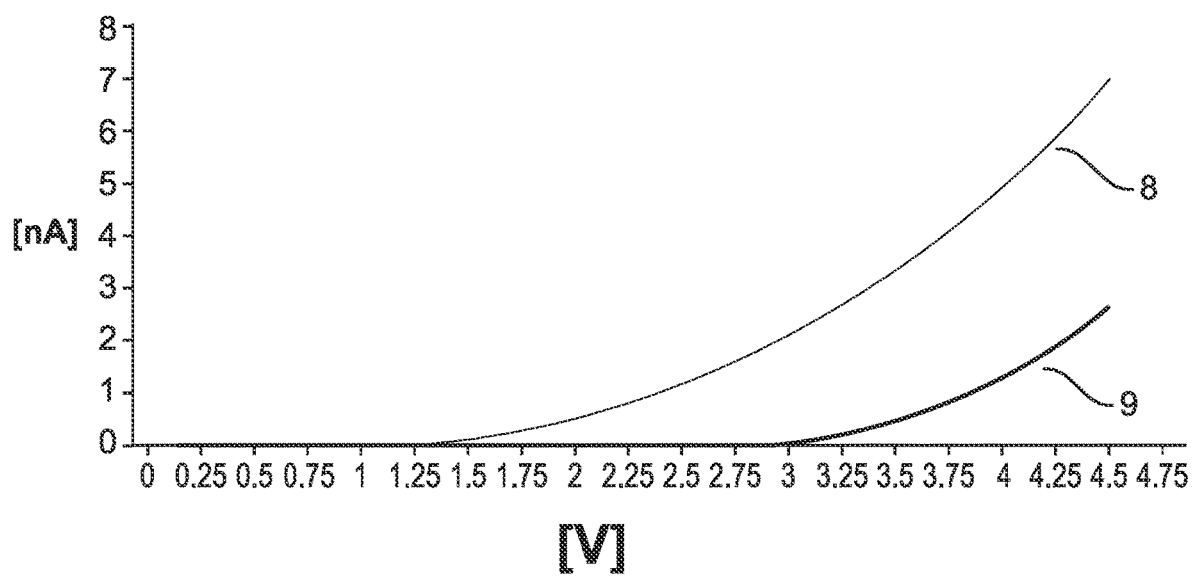
FIG. 22 is a diagram of the LED current flowing through the LED as a function of different capacitor voltages.

FIG. 22 shows a graph showing the strength of the current flowing through the LEDs 4 as a function of the voltage of control signal 8 and the reduced control signal 9. It can be clearly seen that when a control signal 8 with a voltage value of about 1V to 3V is applied during the first time period, the current flowing through the μ-LEDs 4 is largely determined by the first voltage signal 8 applied during the first period. Meanwhile, in the second time period, the control signal 9, which is reduced by the capacitive voltage divider, and thus the current flowing through the μ-LEDs 4 is almost zero.

Only from a voltage of the control signal of about 3.0 V during the first time period does the voltage of the reduced control signal 9 increase and thus also the strength of the current flowing through the μ-LEDs 4 during the second phase.

It must be taken into account in each case that due to the different length of the two phases of a period, namely a short first phase in which the control signal 8 is applied to the lighting unit 1, and a long second phase in which the reduced control signal 9 is applied to the current driver transistor 6, the influence of the second time period on the average light output of the μ-LEDs 4 is significantly greater. As a result, the total current through the μ-LED increases significantly during a period when the voltages of control signal 8 exceed 3.0 V. It follows from this that in the case of a control signal with a comparatively high voltage greater than 3.0 V or 3.5 V, the proportion of the total current flowing through the μ-LEDs 4 during one period is determined to a large extent by the proportion of the current during the second time period.

Figure 23:
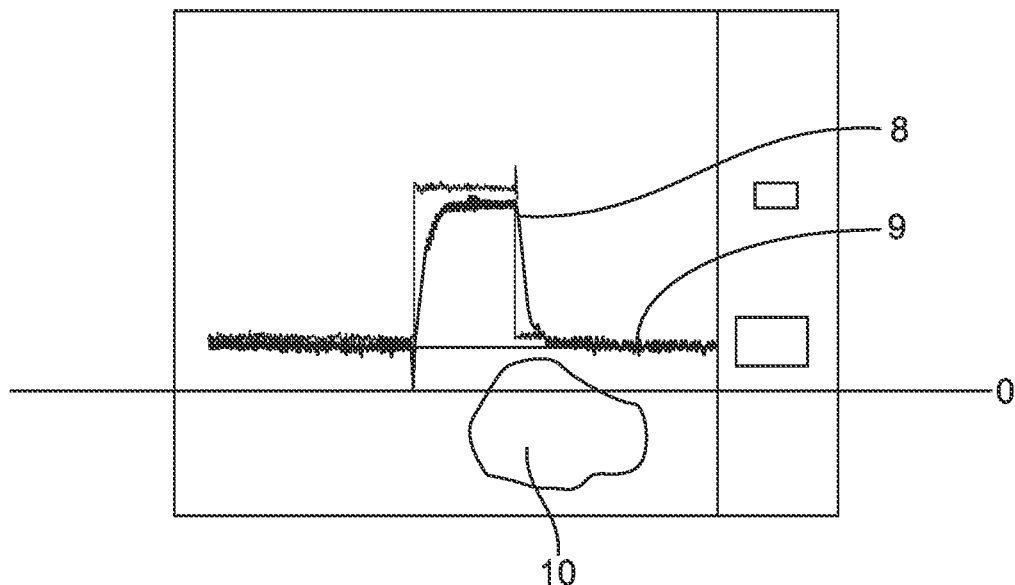
FIG. 23 shows a schematic representation of the brightness of a lighting unit with LED when driven with a comparatively high first voltage signal.

In addition, FIG. 23 shows a schematic representation of the time course of the control signals 8, 9 and the resulting light spot 10 when a control signal 8 is applied with a comparatively high voltage. The control signal 8, which is transmitted to the lighting unit, has a voltage of 10 V in the embodiment shown. Otherwise, the voltage of the reduced control signal 9, which is applied to the lighting unit during the second phase, is reduced but still has a voltage that is significantly higher than 0 V. Due to such a voltage curve of the control signals 8, 9, a bright light spot 10 is formed, the lighting unit is thus operated at a high brightness level.

Figure 24:
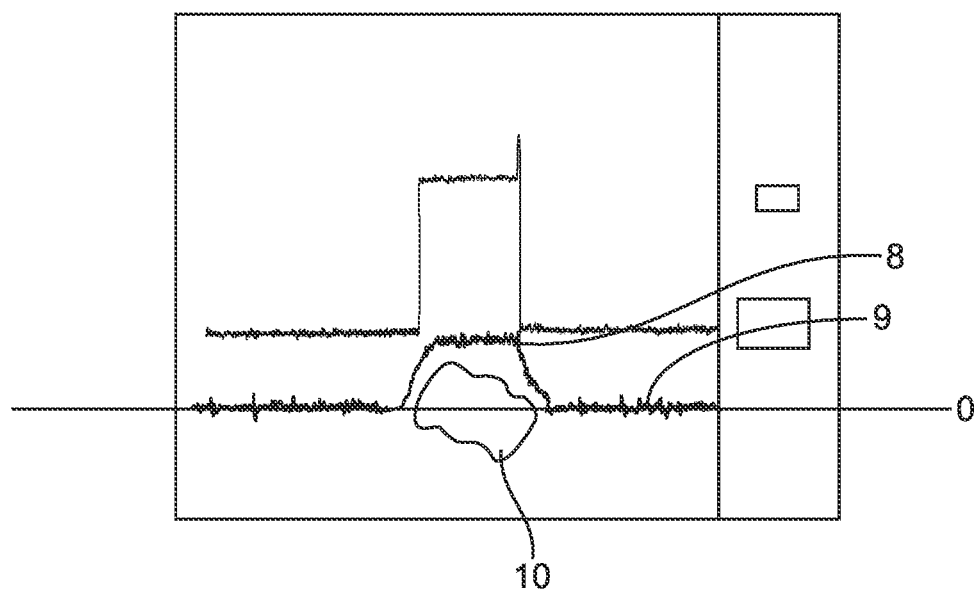
FIG. 24 is another schematic representation of the brightness of a lighting unit with LED when driven with a comparatively low first voltage signal.

FIG. 24 illustrates an operating condition in which a control signal 8 is applied to the lighting unit at a comparatively low voltage, in this case 2.0 V. The reduced control signal 9 in this case has a voltage of at least almost 0 V. The brightness of the light spot 10, which is determined by the average light output of the lighting unit 10 during a period, is significantly lower than in the operating state shown in FIG. 23. The lighting unit and the LEDs used for it are thus operated at a comparatively low brightness level at which they can be dimmed as required.

Figure 25:
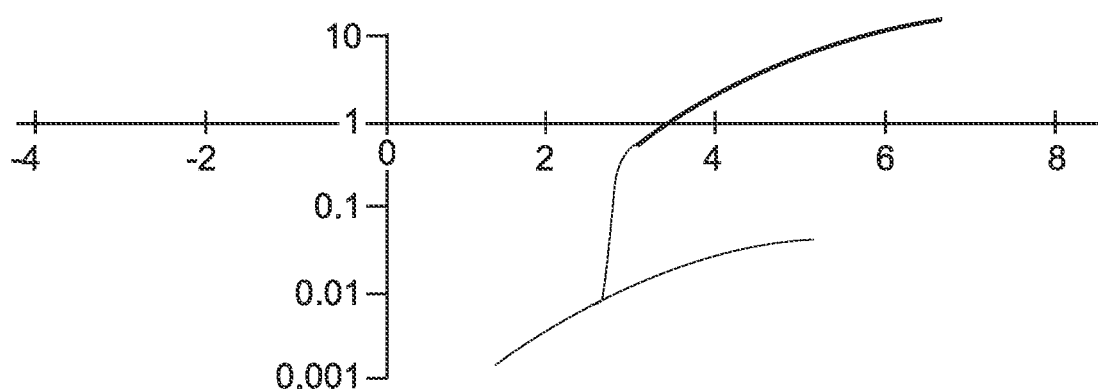
FIG. 25 is a diagram showing the average light output of a lighting unit with LED as a function of the voltage selected for the capacitor voltage according to some aspects of the concept presented here.

Finally, FIG. 25 shows in a graphical representation how the electrical energy conducted through the LEDs during a period, sometimes referred to as the amount of current, behaves in relation to the voltage signals applied to a lighting unit during the first and second periods of a period. The x-axis is the voltage during the first period, the y-axis the current during a period.

It can be seen that when a control signal with a comparatively low voltage is applied, especially a voltage of up to about 3V, the total current flowing through the LEDs is caused by this control signal. Only when control signals with voltages higher than 3V are applied does the voltage of the reduced control signal also increase. Above all, in this operating state, a current flows through the μ-LEDs of the lighting unit which, due to the length of the second time period, has a considerable influence on the amount of the total current flowing through the LEDs during the period and thus on the average light output or brightness of a lighting unit with at least one μ-LED.

Furthermore, FIG. 25 shows that a lighting unit controlled in this way can be operated at two different brightness levels depending on the voltage selected for the control signal. At the two brightness levels it is in turn possible to continuously vary the brightness of the lighting unit within a dimming range limited by a lower and an upper voltage value for the control signal. The course of the two characteristic curves shown in FIG. 25 can be adapted to suit requirements with the aid of a suitable circuit design, in particular by specifically defining the capacitance of the capacitor and the gate-source capacitance of the transistor used as the switching element. It is also conceivable to determine the voltage levels, the control signal and the reduced control signal by suitable selection and dimensioning of the electronic components used.

As the embodiments explained show, the control circuitry designed in accordance with the invention enables the operation of a lighting unit, which has at least one µLED, on at least two brightness levels in a comparatively simple manner. The main consideration here is that, depending on the level of the voltage of the control signal, either the current flowing through the LED during the first time period or the second time period of a period is decisive for the total current flowing through the LED as well as for the average light output and the brightness of the µ-LED perceptible by an observer.

Another aspect deals with the question of how a retroactive effect on the control of a current source can be reduced when PWM control is used. In pulse width modulation, the current source is switched on and off in rapid succession for contrast and brightness adjustment. The frequency is several 100 kHz up to the MHz range. With control loops within the current source, the switching operations lead to spikes or other behaviour, which can bring the control loop out of its control range.

Figure 26:
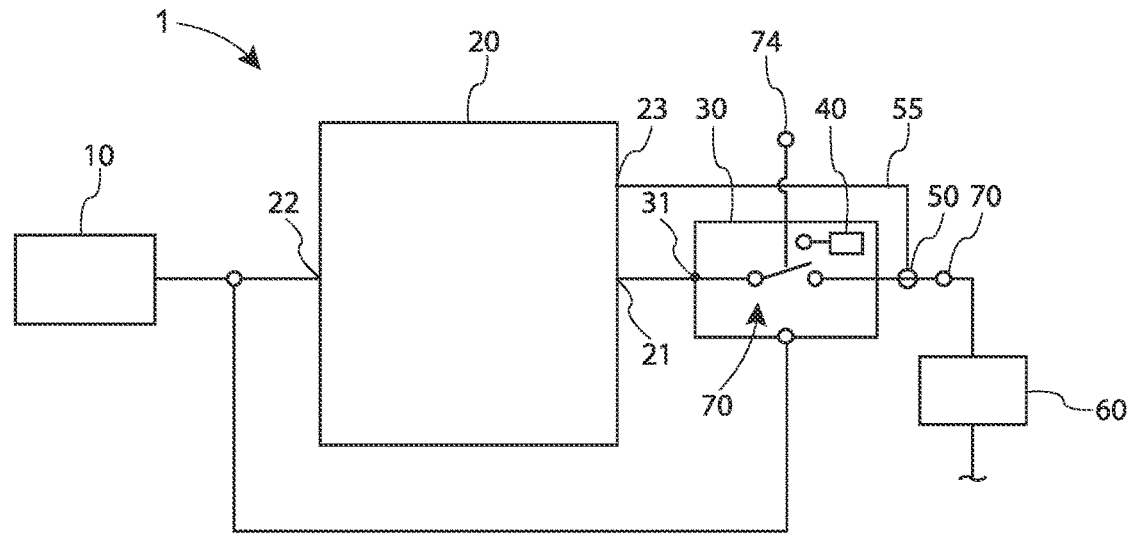
FIG. 26 shows a block diagram of the main components of a PWM supply circuit for μ-LEDs.

FIG. 26 shows a schematic block diagram for a regulated current source for µ-LEDs, which remains stable even during switching operations. This current source can be used in µ-displays or other display devices and is suitable for automotive and augmented reality applications.

The supply circuit includes a reference branch 10, which provides a reference signal and in particular a reference current or, if necessary, a reference voltage. In the following, all further supply currents and, if necessary, also voltages are derived from the reference signal. Further reference signals can also be generated from this signal. The reference signal, i.e. the reference current is characterized by a high temperature stability but also a stability against process fluctuations during production. If necessary, it can include one or more correction circuits, which together provide an accurate and stable reference signal, for example a reference current.

In the present case, reference branch 10 is connected to a reference input 22 of an error correction detector 20 as well as to a controllable supply source 30. In addition to the reference input, the error correction detector 20 also comprises an error signal input 23 and a correction signal output 21. The detector 20 is designed to compare an error signal at input 23 with a reference signal at input 22 or a signal derived therefrom and to generate a correction signal at its output 21.

The controllable supply source 30 has a controllable current source, which is not shown separately in this block diagram. In addition, the supply source includes a second backup source 40, which provides a feedback signal to the error detector in one operating state of the circuit. A switch device 70 is provided for this purpose, which, depending on the operating state, i.e. an operating signal at input 74, either switches the current source to the load or disconnects it from the load and switches on the substitute source 40. In this way, either a signal from the current source to the consumer or the signal from the replacement source is detected at detector 50.

A current-voltage converter or a voltage drop detector can be used for detection. A voltage or a voltage drop or a current can be detected with detector 50. The detected signal is then fed back to the error correction detector 20 and compared with the reference signal or a signal derived from it. The resulting error correction signal is used to adapt the controllable current source. If load 60 is now supplied by current source 30, error correction detector 20 adjusts the current through the load to a value defined by the reference signal. With a µ-LED, the current flowing through the diode can thus be precisely adjusted. If the voltage drop across the load or the current through the load changes due to temperature effects, the error correction detector readjusts the current accordingly. This part of the circuit and its operation corresponds to a control loop.

If the load were now disconnected from the current, for example if the LED is switched off in the case of PWM modulation, the control loop would first attempt to readjust, but then run out of the control range. For this reason, the invention provides for a substitute signal to be supplied to the error correction detector 20. This signal is essentially the same or at least very similar to the nominal signal when the load is switched on. Thus, the error correction detector 20 is operated in its optimum range regardless of the operating state of the load and the control loop is not moved out of its control range. This results in very fast control and prevents detector 20 from falling outside its control range.

The proposed supply circuit thus includes a correction circuit as part of a control loop for high-precision control of a current or voltage source as well as a substitute source. The correction circuit is now fed either a signal derived from the current or voltage source or the signal of the substitute source. The supply of the latter enables the current source to be switched off without the control loop running out of its control range.

Figure 27:
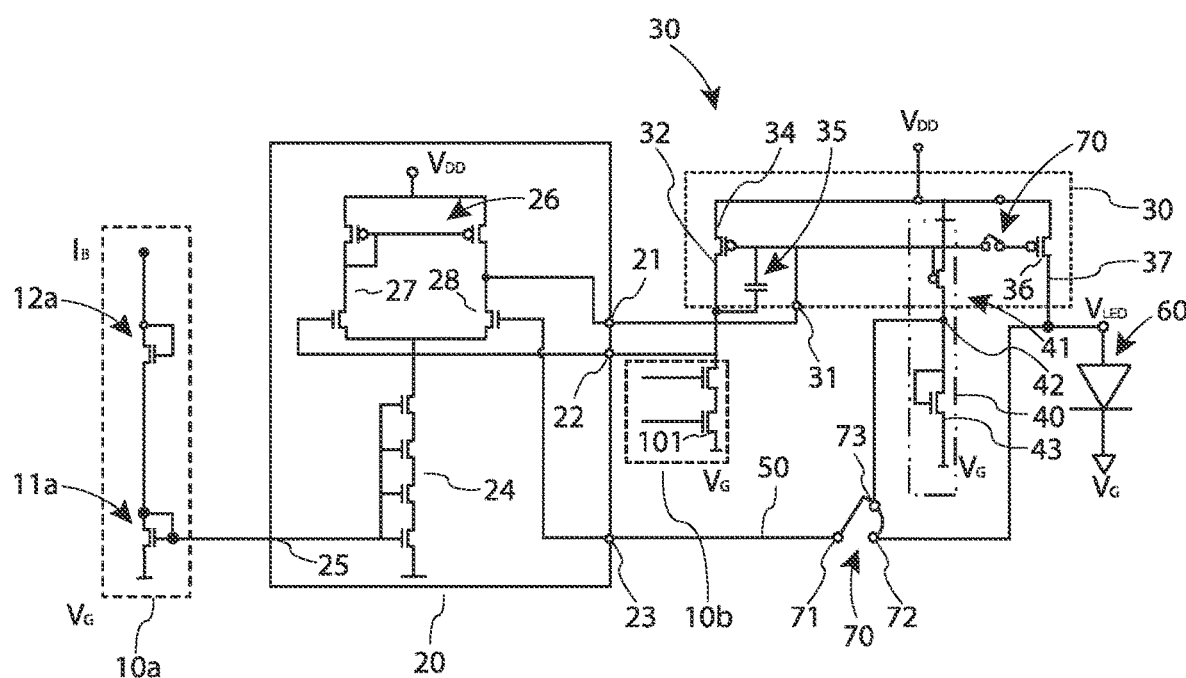
FIG. 27 is an embodiment of a PWM supply circuit for μ-LED according to the proposed principle.

FIG. 27 shows a specific embodiment for driving a power source for a supply of a Light Emitting Diode 60, which is part of a pixel matrix not shown here, for example a display, video wall or other application requiring a high-precision power supply. In the case of light-emitting diodes, a current through the diode also changes with changing temperatures, which can lead to a change in brightness as well as a change in color temperature. This effect is compensated by regulating the current source. Displays, pixel matrices for picture or video applications are often operated with pulse width modulation, in which the light emitting diodes are switched on and off at high frequencies. The ratio between the two states gives the brightness of the respective light emitting diode.

The power supply circuit shown in the following is essentially designed in MOS circuit technology. Some field effect transistors are of the n-type, others of the p-type as shown. In this case the supply circuit is connected between supply potential VDD and consumer. By exchanging the channel types of the field effect transistors and an arrangement between consumer and reference or ground potential VG an alternative embodiment is created. It is also possible to replace individual transistors with bipolar transistors, or to form assemblies such as current mirrors with them. Bandgap references can be used to generate precise voltages, which then provide a current via a converter.

Supply circuit comprises a combined reference branch 10 consisting of two parts 10a and 10b, which provide a reference current. They form part of a current mirror. The reference branch 10a for a first reference current comprises two transistors connected in series, an n-field effect transistor 12a and a p-field effect transistor 11a. The former is connected to a supply terminal, the latter to the reference potential. The gate of the transistor 12a is connected to the drain terminal and thus impresses a constant current. Transistor 11a reflects the current through the reference branch into the four series-connected transistors 24, which form the fixed current source for a differential amplifier. The differential amplifier forms a component of the error correction detector 20 and contains, in addition to the current source from the transistors 24, an inverting and a non-inverting input transistor in each branch, which is connected to the supply potential VDD via a further current mirror 26 consisting of two p transistors. The non-inverting input transistor 27 forms the reference signal input 22, the inverting transistor 28 leads to the error signal input 21. The two transistors comprise the same dimensions as the transistors of mirror 26 in this embodiment. However, different amplification factors may be provided for in versions due to geometric dimensions such as channel width or length. This may be necessary if, as described below, there is also an inherent factor between the error signal and the reference signal. Such an inherent factor results from the design of the current source 30 and the signals (error signal and reference signal) tapped for the detector 20 as described below The controllable current source 30 comprises a current mirror with an output branch and a reference branch, which simultaneously forms the replacement source 40. The reference source 10*b* is connected to a reference branch input 32. This input 32 is also connected to the non-inverting transistor 27 and to the reference signal input of the error correction detector 20. The reference branch of the current mirror is thus impressed with an exact current, whereby a defined voltage drop is fed through the central tap to input 22 of the error detector. The reference branch 10*b* comprises two series-connected transistors for adjusting the current flow through the reference branch of the current mirror of the current source 30 and for defining the reference voltage or reference signal at input 22. The gate of transistor 101 is connected to the gate of transistor 11*a* (but not drawn here) and is thus part of the current mirror of reference source 10. The controllable current source 30 comprises a supply input to which the supply potential VDD is applied and a p-type current mirror transistor 34. A capacitor 35 is connected between gate and terminal 32, so that the voltage in the reference branch is coupled to the gate. This voltage also forms the reference signal for the error detector.

The reason for using a capacitor with positive feedback instead of the usual conduction for current mirrors is, among other things, due to an additional frequency compensation for the additional control signal terminal 31, which connects the gate of transistor 35 with the error correction output 21 of detector 20. The error correction signal is thus also fed to the gate.

The gate of the transistor is also connected to the gate of an output transistor 36 via a switching device 70. This is located between supply potential VDD and output. The current of the reference branch is thus mirrored into the output branch 37 of the current source. By dimensioning the two transistors 34 and 36 accordingly, the ratio of the output current to the current through the branch with transistor 34 can be adjusted accordingly. If, for example, the channel width of output transistor 36 is 10 times that of transistor 34, then the current is also increased by the same factor in simple approximation. In the illustration in FIG. 27, the output transistor 36 is a single transistor. However, it can also be designed as several transistors arranged in parallel.

The switching device 70 in the current source 30 is configured to connect, depending on a signal, the gate of the output transistor 36 either to a fixed potential, here the supply potential, or to the gate of the current mirror transistor 34. In the former case, the output transistor 36 is de-energized, since the potential VDD blocks the gate of the p-type transistor. Since in this case the transistor does not conduct current, it is also referred to as transistor 36 is open. In the second case, the output transistor 36 is closed and the current through the current mirror transistor 34 is mirrored into the output with the above-mentioned factor and led to LED 60.

The output of the current source 30 is connected to the load 60 or the LED as well as to a second switching device 70, which applies either the voltage at the output of the current source to the error signal input of the error detector 20, or a substitute signal. This is provided by the substitute source 40, which is formed by a p-type output transistor 41 and a transistor 43 connected in series. The series connection of the two transistors 41 and 43 is arranged between supply potential VDD and ground potential VG. A central node 42 forms the output for the substitute signal. The gate of transistor 43 is connected to its drain terminal and thus to node 42. The gate of p-type output transistor 41 is connected to the gate of transistor 34. Thus, a current mirror is also formed from the transistors 34 and 41. However, a different factor is selected here by appropriately dimensioning the output transistor 41 so that the current through this branch is significantly lower than that through the output branch.

The two switching devices 70 operate essentially synchronously and are designed so that the output of the current source 30 is connected to the error signal input 23 of the detector 20 when the gate of transistor 36 is connected to the gate of transistor 34. If, on the other hand, the output transistor of the current mirror is de-energized, the substitute signal of the substitute source is present at the error signal input, i.e. tap 42 is connected to input 23.

In the version shown here, the spare source is always activated, i.e. the output transistor always forms a current mirror with transistor 34 and a current flows through the branch of the spare source. In an alternative version, a switch can also be provided here which works in the opposite direction to the switching device 70, i.e. it switches the replacement source currentless, for example, if a voltage is applied to the load or a current is provided by the current source 30.

In an operation of the supply circuit, the switching device 70 is now switched in such a way that node 71 is connected to node 72 and simultaneously the gates of the transistors 34 and 36 are connected to each other. The current source then provides an output current for the load. This leads via LED 60 to a voltage drop of a few volts, for example 2 to 3 volts. The voltage drop is detected as an error signal by the differential amplifier of detector 20 and compared with the reference signal. If the current through the LED now changes, for example due to a temperature change, the error signal also changes and the detector generates a correction signal for the current mirror at the correction signal output 21 and feeds this to the control signal connection 31.

The correction signal is now also applied to the gate of output transistor 36, so that the current is adjusted accordingly. The error detector 20 controls the output current mirror so that the saturation voltage of the inverting and non-inverting transistors 27 and 28 is equal. A load-independent current source is formed by means of the error correction detector 20 and the current mirror connected to the output.

Since light emitting diodes are often operated with pulse width modulation, the current through the diode changes in defined intervals, i.e. the diode is switched on or off at high frequency. The pulse width results in the brightness of the diode 60, which is achieved by the switching device 70 in the current mirror. However, if the current is switched off, the error detector 20 counteracts this for the first time. This can cause it to run regularly out of its optimum dynamic range. The same happens when the current is switched on. Here the differential amplifier needs some time to reach its normal control range. In addition, oscillations or overshooting can occur, which reduces the life of the diode, but can also be visible to a user. The second switching device 70 prevents this by keeping the error detector in its control range by means of the replacement source.

Figure 28:
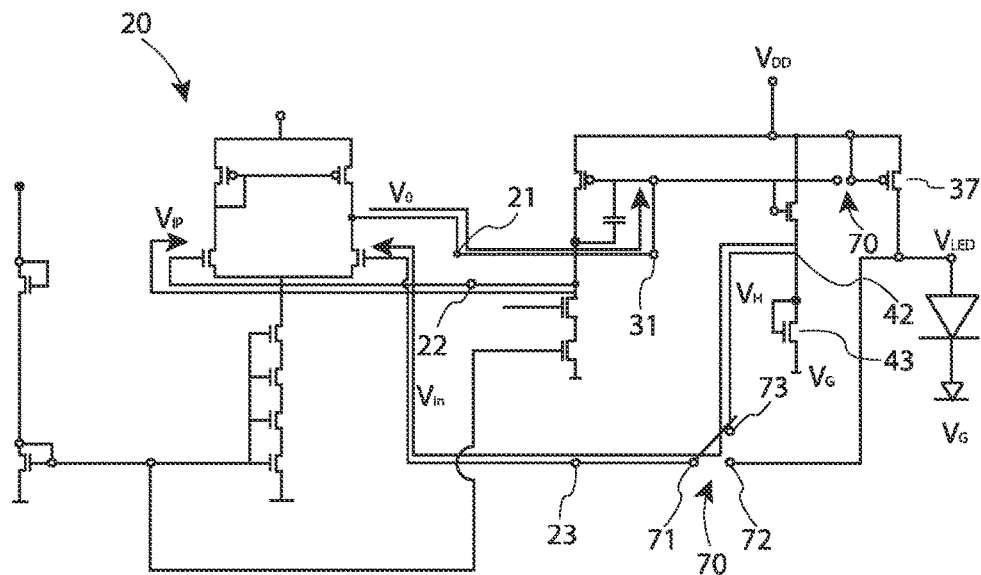
FIG. 28 shows the embodiment of FIG. 27 in an operating state with additional information on the signal flow.

FIG. 28 shows a diagram with the main signal flows. With a switched-off diode, the gate of the p-type field effect transistor 36 of the output branch is directly connected to the supply potential VDD. The lower switching device 70 connects the tap 42 of the substitute source 40 to the error signal input 23 of the detector 20. The substitute source reflects the current with a lower ratio and the second transistor connected in series is used for the necessary voltage generation. This is selected so that it is close to the expected voltage drop of the consumer during normal operation. This keeps the fault detector within its control range and the control loop remains in its steady state.

Figure 29:
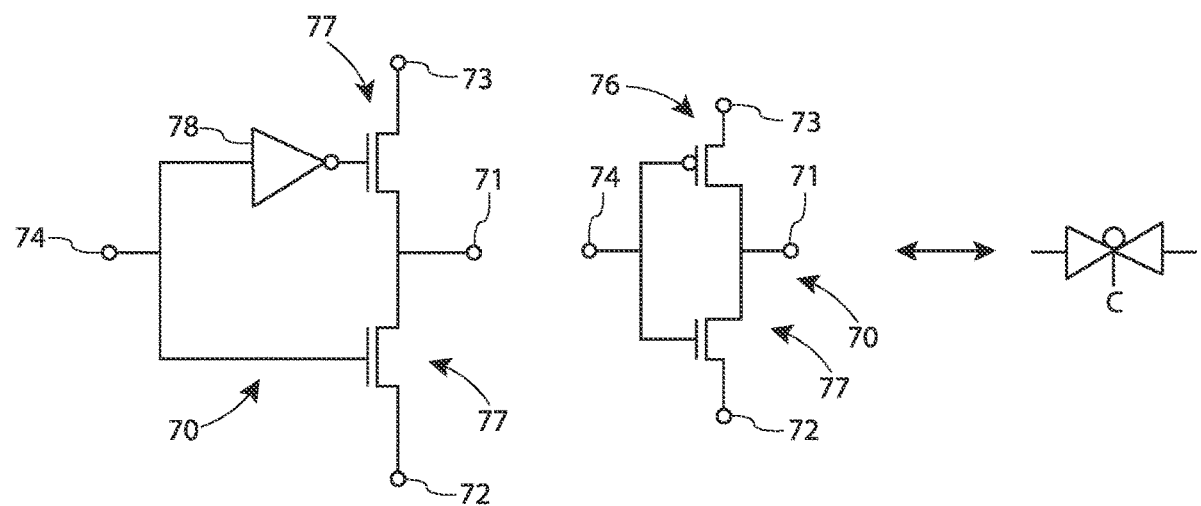
FIG. 29 shows two principle illustrations of two simple switch devices.

FIG. 29 shows two principle illustrations of two simple switch devices. Besides these, other switches can be used. They can also be easily operated with the PWM signal, which can be used to adjust the brightness of the LED. In other applications, other suitable switches are used. The switching device 70 is similar to a known inverter with the difference that the transistors shown here are transmission gates. The output 71 is connected to the error signal input. Input 74 forms the switching input to which the switching signal, for example, the PWM signal, is fed. Two transmission gates of different types connected in series are arranged in series, with output 71 being connected between the two transmission gates. Gate 73 of the p-type with its terminal 73 forms the connection to the backup source. Terminal 72 of the second transmission gate forms the connection for the voltage signal.

Figure 30:
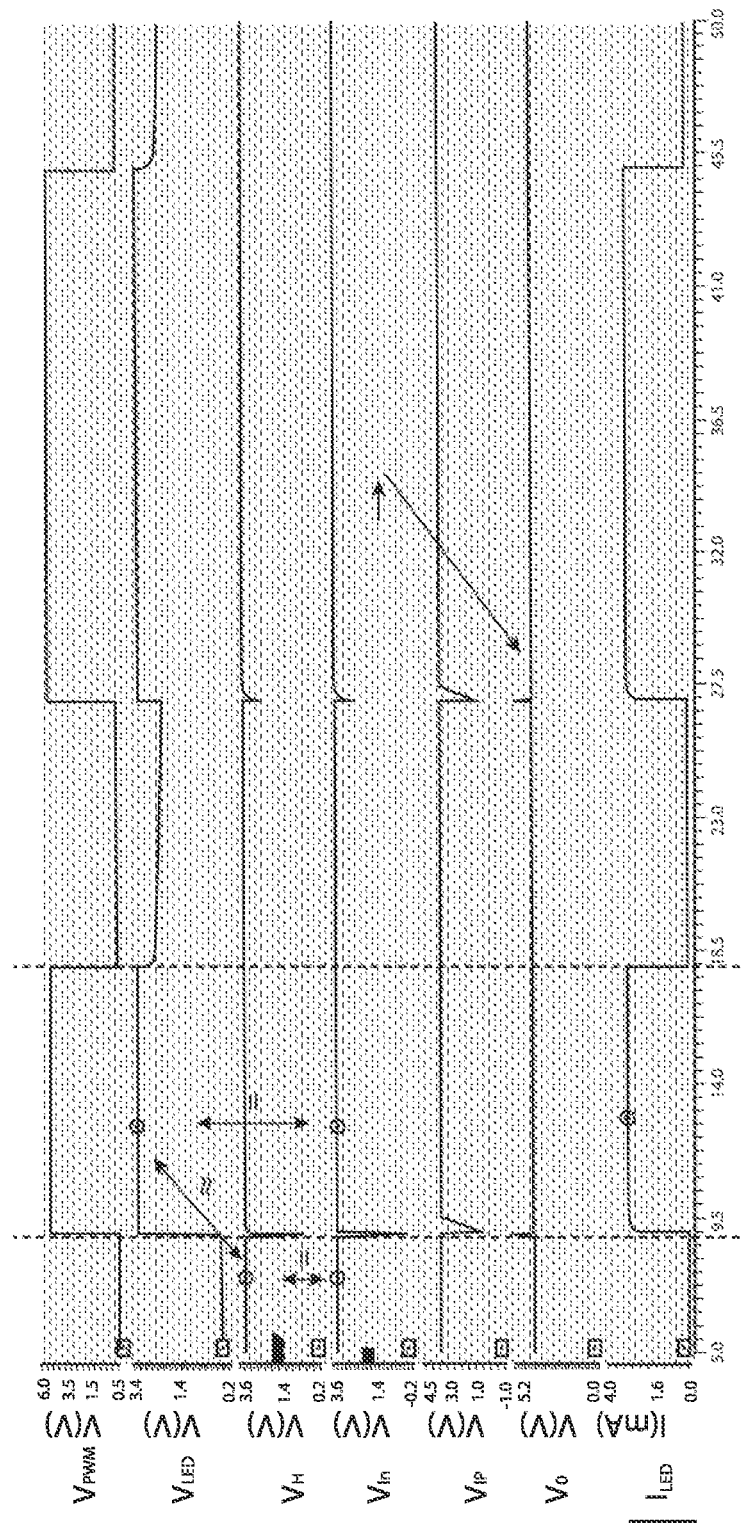
FIG. 30 illustrates a signal-time diagram of the proposed embodiment with the signal points shown in FIG. 27.

FIG. 30 shows a signal-time diagram for different signals in the supply circuit in the different operating states. $V_{FWM}$ describes the pulse width modulation signal for operating LED 60, which is also applied to circuit devices 70. It is a logic signal and changes between two states "High" and "Low". In the High state from about 8 µs to 18 µs and then between 26 µs and 44 µs the LED is switched on, at the other times it is switched off. The current through the LED follows these switching times as can be seen from the lowest curve marked $I_{LED}$.

In contrast, the voltage VLED changes only slightly between the switched on state and the switched off state. The voltage decreases continuously and would reach the starting voltage of approx. 1.4V over time, a current no longer flows, i.e. the LED is switched off. When the LED is switched on, i.e. at the time of 8 µs, the voltage drop across the LED essentially corresponds to the substitute voltage or the substitute signal $V_H$. At the time of switching on, a small voltage drop can be detected in the substitute signal, which can be process-related and depends, for example, on the parameters of the field effect transistors used. Since different types (p- or n-mos) are used, their switching behaviour is not always the same, so that residual currents could still flow during the switchover time.

$V_{in}$ shows the signal at the inverting input, i.e. the error signal input 23. Before the switching time 8 µs, the voltage $V_H$ is equal to the voltage at the error signal input because of the position of the switching device 70, after switching on it corresponds to the voltage $V_{LED}$. This is illustrated by the "=" sign in FIG. 30. $V_H$ is again selected so that it is as similar as possible to the LED voltage $V_{LED}$ expected in normal operation.

The error correction detector 20 now compares the voltages $V_{in}$ at error signal input 23 and Vip at reference input 22 and generates a correction signal Vo. At switching time 8 µs there is a small dip of the voltage Vip at the non-inverting input, which increases a small peak in the correction signal. This may be a simulation artefact, but can also be caused by a sudden change in load in the branch of the power source. In any case, the correction signal is so small and fast that it has no effect.

The second switching point at 18 µs shows no or if only a significantly lower behaviour. Nevertheless, the control at the switch-on time does not significantly affect the output behaviour of the error detector, but rather provides a precise correction signal due to the fast feedback, so that the output current and voltage are quickly adjusted to the desired value and then remain constant. The simulation of FIG. 30 shows a control of less than 0.5 µs in this context.

The proposed supply circuit provides a high-precision current source that is particularly suitable for accurate and color-true control of light emitting diode applications. The already known PWM can be used for the contrast adjustment of the individual light emitting diodes in a pixel matrix, display or similar. The effects of switching operations during pulse width modulation on the current source are reduced by the proposed measures. As a result, even small variations in the operating current, which are only a few percent above the nominal value of the input voltage, can be realized without the switching operations affecting the stability.

In an implementation, it is possible to build the transistors of the current source close to each other, so that they are thermally strongly coupled. For the replacement branch, it makes sense to equip it with Si-pn diodes or other measures, such as amplifiers, etc., in order to approximate the replacement signal to the voltage dropping across the load during operation.

To control µ-LEDs or generally pixels in a display, the switching ratio can be controlled digitally in addition to setting the current through the µ-LED. A digital driver circuit with low own power consumption is still able to—despite the low power consumption, drive a large number of optoelectronic elements and especially µ-LEDs.

Figure 13:
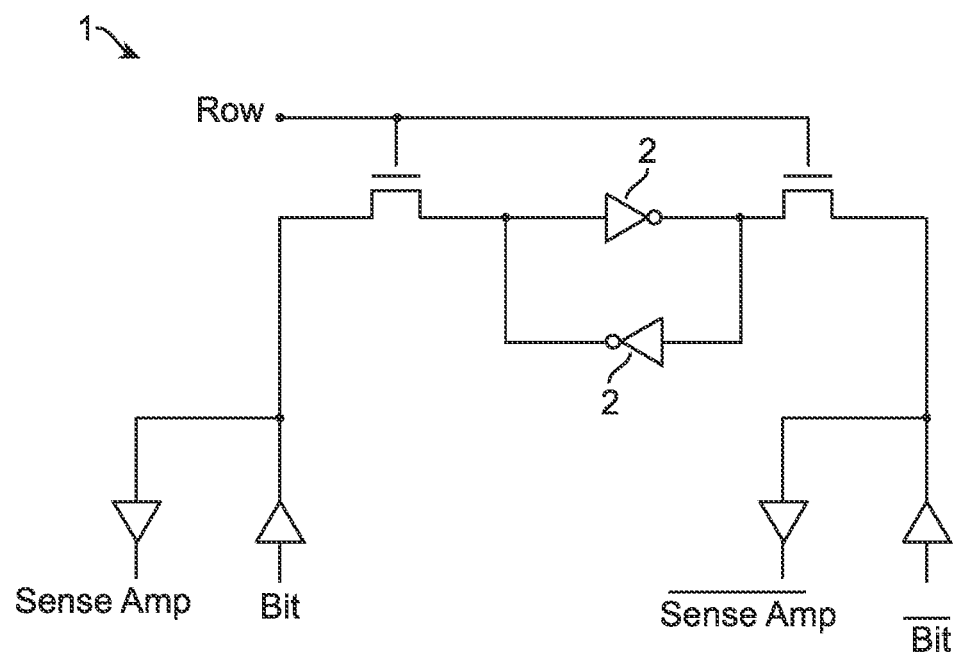
FIG. 13 shows a circuit diagram of an SRAM-6-T cell to illustrate one aspect.

FIG. 13 illustrates a schematic circuit diagram of an implementation of a 6-T static random access memory cell, SRAM-6-T memory cell 1, which includes two cross-coupled inverters 2 as a 1-bit memory. The SRAM 6-T memory cell 1 has a compact memory size in the range of 1.08 µm2 to 1.7 µm2 per bit in 65 nm CMOS technology and a low power in the range of 0.26 µW to 0.37 µW per bit.

Figure 14:
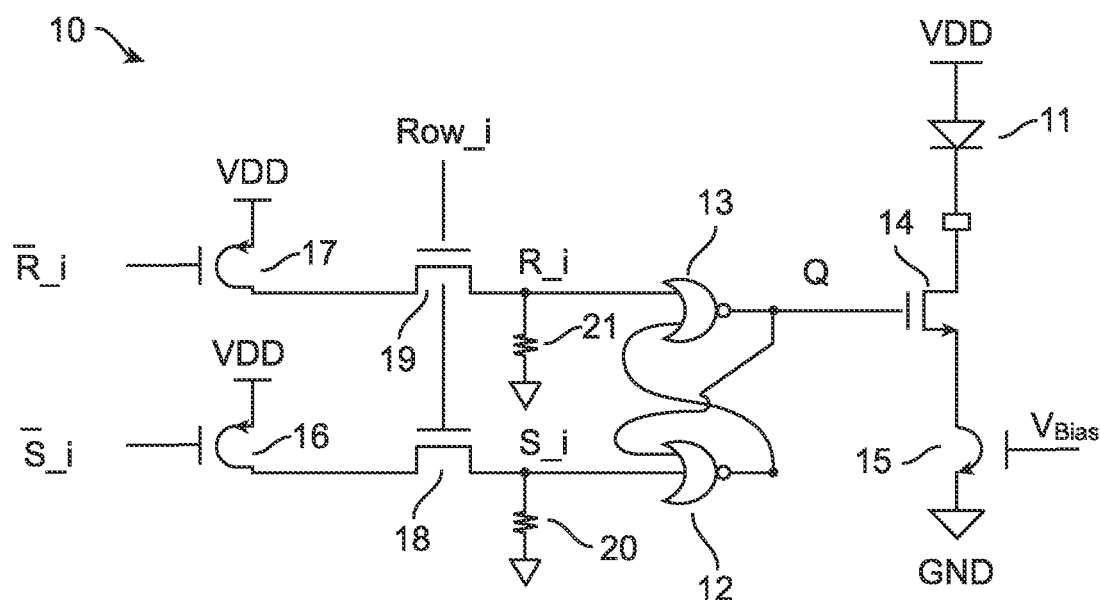
FIG. 14 shows a circuit diagram of a driver circuit to illustrate some aspects.

FIG. 14 illustrates a schematic circuit diagram of a driver circuit 10 configured to drive an optoelectronic element, which is a µ-LED 11. The driver circuit 10 is completely digital and is manufactured using CMOS technology. In this context, FIG. 14 shows only the circuit diagram. The µ-LED 11 is manufactured in a material system suitable for generating light of the desired wavelength, the circuit may be manufactured in a different material system. For the functionality shown, both elements are electrically contacted. Possibilities for this are disclosed in this application.

The driver circuit 10 includes two cross-coupled NOR gates 12, 13 which form a first memory cell or latch used to control the current through µ-LED 11. Driver circuit 10 includes additional first memory cells not shown in FIG. 14. The additional first memory cells have the same structure as the first memory cell shown in FIG. 14 and are used to control the current through additional µ-LEDs.

Each of the NOR gates 12, 13 has two inputs and one output. The output of each NOR gate 12, 13 is coupled to one of the inputs of the other NOR gate 12, 13. The other input of NOR gate 12 receives a set signal S_i and the other input of NOR gate 13 receives a reset signal R_i. The NOR gate 13 generates a signal Q at its output, which controls the gate of a transistor 14. The shown interconnection of the two NOR gates 12 and 13 with their inputs R_i, S_i and the output Q corresponds to an RS flip-flop. Accordingly, the NOR gates connected in this way can be replaced in the circuits shown.

Depending on its gate voltage, transistor 14 switches a current through μ-LED 11 on or off. The current is generated by a transistor 15. The μ-LED 11 and the channels of transistors 14, 15 are connected in series between a supply voltage VDD and ground GND. The driver circuit 10 also includes two pull-up PMOS transistors 16, 17 which are coupled to the transistors 18, 19 respectively. The transistors 16, 17 receive a signal non-S_i or a signal non-R_i at the gate terminals.

The μ-LED 11 is arranged together with other μ-LEDs in a pixel array. Each of the μ-LEDs is connected to a driver circuit as shown in FIG. 14. To enable the selection of a line i, the transistors 18, 19 are each coupled to the NOR gates 12, 13. The transistors 18, 19 are controlled by a line selection signal Line_i at the gate terminals. Pull-down resistors 20, 21 are also provided to hold back states of the cross-coupled NOR gates 12, 13. When the set non-signal S_i (active low set) is received by NOR gate 12, the output of NOR gate 13 is triggered to a high state. The cross-coupled NOR gates 12, 13 hold the high state until they are reset to a low state by the non-R_i (active low set) reset signal received from NOR gate 13.

Figure 15:
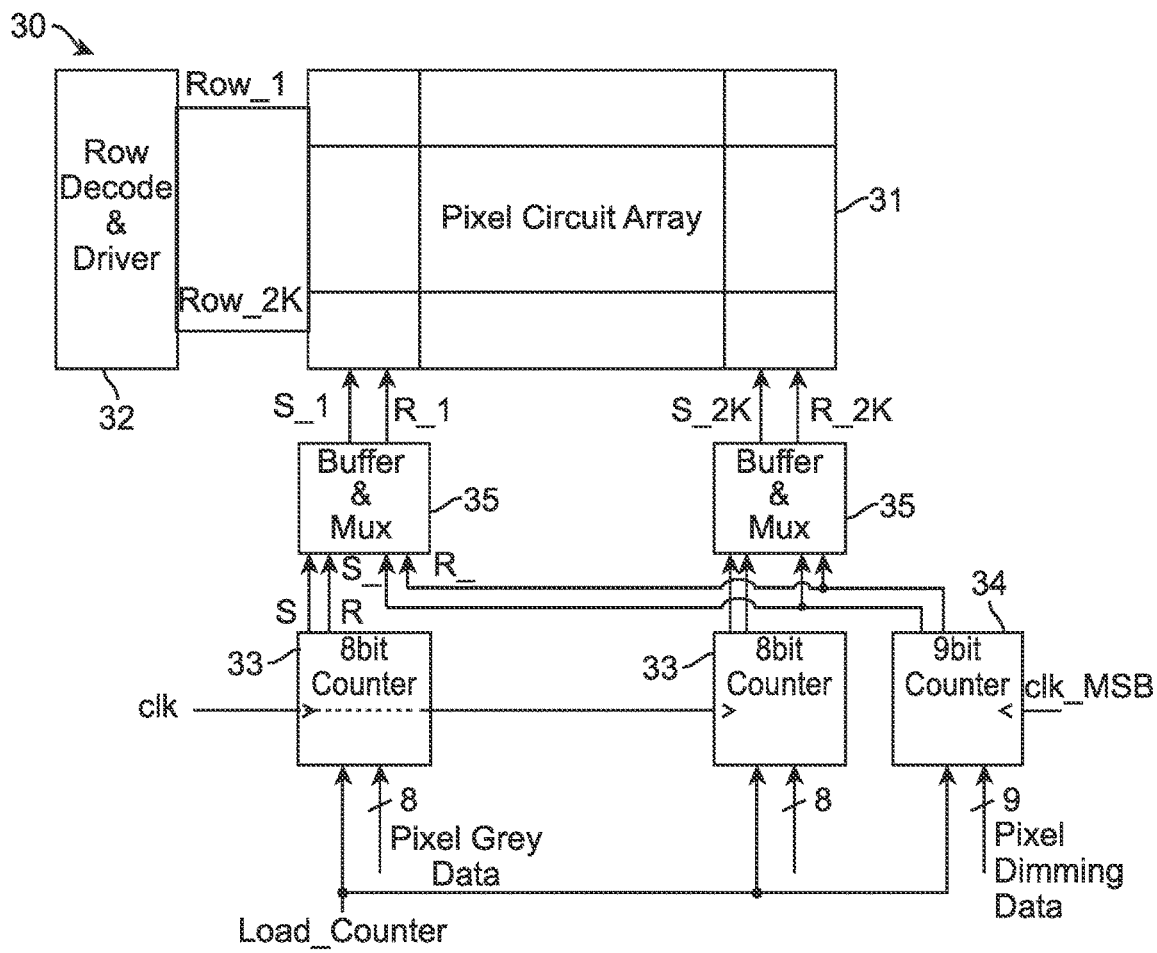
FIG. 15 is a schematic representation of a display with digital elements and the pixel array according to some of the proposed aspects.

FIG. 15 shows a schematic circuit diagram of an optoelectronic device 30, the optoelectronic device 30 including a pixel circuit array 31 comprising an array of μ-LED driver circuits 10 as shown in FIG. 14. As an example, the array includes 2K rows and 2K columns. Each driver circuit 10 is connected to a respective μ-LED. In addition, the μ-LED array is made of a different III/IV material chip and each μ-LED in the array is connected to each pixel driver circuit at the drain of transistor 14 in FIG. 14.

A line decoder and driver 32 selects the lines Line_1 to Line_2K one after the other. The PWM signals controlling the current through the μ-LEDs are generated by N loadable 8-bit counters 33, where N is 2K for this example. The N counters 33 generate the set signals S_i and the reset signals R_i (or alternatively the signals non-S_i and non-R_i) for N columns of pixels simultaneously per selected row. When pixel pulse width values, i.e., 8-bit pixel gray data, are loaded into counter 33, the set signals S_i are activated to turn on the pixel stream, and the counters 33 start with a pixel clock frequency of, for example, between 40 MHz to 100 MHz. When counter 33 reaches the pixel data values, the reset signals R_i are activated to turn off the pixel stream.

There is also a 9-bit (MSB) counter 34, which generates the global or common dimming for the pixel array. The 9-bit pixel dimming data loaded into counter 34 thus determines the brightness of the background of the pixel array. If the dimming pulse width is zero, a line scan is performed so that the pixels in the lines light up. Otherwise, global pixel illumination is performed first, followed by line-by-line scanning. The set signals S_i and reset signals R_i generated by counter 33 and the global or common dimming signals generated by counter 34 are fed to N buffers and multiplexers 35, which pass the signals to the columns of the pixel circuit array 31.

The global dimming data can also be combined with the greyscale data in the video/image signal processor IC or through the μ-LED driver IC, so that no separate global dimming pulse is required and then only the greyscale data is updated line by line. The counters 33, 34 are controlled by a signal Load Counter. Furthermore, the counters 33 receive a clock signal clk. The counter 34 receives a clock signal clk-MSB.

Figure 16:
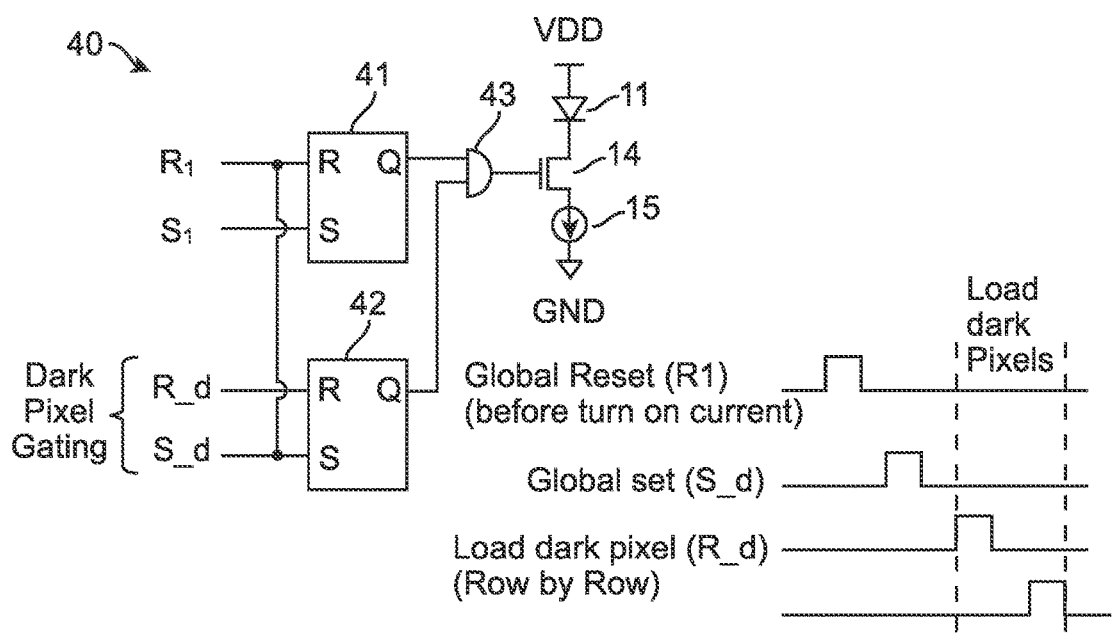
FIG. 16 shows a circuit to illustrate the clock for dark pixels.

To get rid of dark pixels, the driver circuit can include a second memory cell or latch for each μ-LED. FIG. 16 illustrates a schematic diagram of a driver circuit 40 design based on driver circuit 10 as shown in FIG. 14. Driver circuit 40 includes a first memory cell 41 and a second memory cell 42. Both the first memory cell 41 and the second memory cell 42 have a set input S, a reset input R and an output Q. Furthermore, the reset input R of the first memory cell 41 is connected to the set input S of the second memory cell 42. The outputs Q of the first and second memory cells 41, 42 are connected to inputs of an AND gate 43. The output of AND gate 43 is connected to the gate of transistor 14.

As can be seen in the function time diagram shown in FIG. 16, a global reset is performed at the beginning of each frame so that all pixels are dark. Then a global set signal S_d is applied to the set inputs S of the second memory cells 42 to make all pixels "normal pixels". Then the second memory cells 42 of the pixel circuit array are loaded or reset row by row to implement selective dark pixels. An implementation of the optoelectronic device includes a spatial averaging pixel bias current. The optoelectronic device includes a global N-bit digital-to-analogueue converter, DAC, covering a pixel current range of, for example, 22 nA to 1 μA. As illustrated in FIG. 17, identical peripheral bias currents are summed to produce a spatial average bias.

Turning the pixel stream on and off is controlled by the state of the second memory cell or the latch for dark pixels and the PWM signal for normal active pixels. FIG. 18 illustrates a function-time diagram of the optoelectronic device. Line 1 of the function timing diagram shows the duration of a frame. During the frame, the display shows a content such as a video sequence.

At the beginning of the frame a global reset is performed so that all pixels of the display are dark (see line 2). Then dark pixels are loaded line by line so that these pixels are permanently dark during this frame (see lines 3 to 4). Then a global dimming is applied to ensure that the background has the same brightness (see line 5). Then grayscale data is loaded to generate the PWM signals starting at line_1 and ending at line_2K (see lines 6 to 7). Finally line 8 shows when the pixels are switched on. After the frame is finished, the next frame starts. FIG. 19 illustrates a schematic circuit diagram of another version of a driver circuit 50 configured to drive the μ-LED 11. Driver circuit 50 is completely digital and requires even less space than driver circuit 10 shown in FIG. 14.

In the driver circuit 50, the first memory cell includes an NMOS transistor 51 and a PMOS transistor 52 connected in series between the supply voltage VDD and ground GND, which means that the channels of the two transistors 51, 52 are connected in series. Additionally, an input of an inverter 53 is connected between the transistors 51 and 52. The output of inverter 53 is connected to the gates of transistors 51, 52.

Furthermore, an NMOS transistor 54 and a PMOS transistor 55 are connected in series between the supply voltage VDD and ground GND. The transistors 54, 55 receive a set signal S1 or a reset signal non-R1 at their gate terminals. To remove dark pixels, the driver circuit 50 includes a second memory cell or latch that has the same structure as the first memory cell and is also illustrated in FIG. 19. The second memory cell includes an NMOS transistor 56 and a PMOS transistor 57 connected in series, an inverter 58 and an NMOS transistor 59 and a PMOS transistor 60 connected in series.

The transistors 59, 60 receive a set signal S2 or a reset signal non-R2 at their gate terminals. The output of inverter 53 of the first memory cell generates a signal Q1 and the output of inverter 58 of the second memory cell generates a signal Q2. The signals Q1 and Q2 are fed into the inputs of a NAND gate 61. An inverter 62 is located downstream of the NAND gate 61, and the output of inverter 62 is coupled to the gate of transistor 14, which switches the current through μ-LED 11 on and off depending on its gate voltage.

The function timing diagram of FIG. 19 shown above makes it clear that a global reset is performed first by applying the reset signal non-R1 to the first memory cell. Then the reset signal S1 is applied to trigger the first memory cell at output Q1 to the high state. The first memory cell holds the high state until it is reset to the low state by the reset signal non-R1. A lower function timing diagram of FIG. 19 shows the function of the second memory cell during the loading of dark pixels. First a global set signal is applied by signals S2. Then dark pixels are loaded line by line by the non-R2 reset signal.

FIG. 20 illustrates a schematic circuit diagram of another embodiment of a driver circuit 70, which is a variation of the driver circuit 50 shown in FIG. 19. The driver circuit 70 contains the same first and second memory cells as the driver circuit 50, but the driver circuit 70 does not contain a NAND gate for combining the output signals of the first and second memory cells. Instead, driver circuit 70 includes an additional NMOS transistor 71 connected in series with transistor 54. In particular, transistor 71 is located between transistor 54 and ground GND. The gate of transistor 71 is controlled by the output signal Q2 of the second memory cell.

Figure 31:
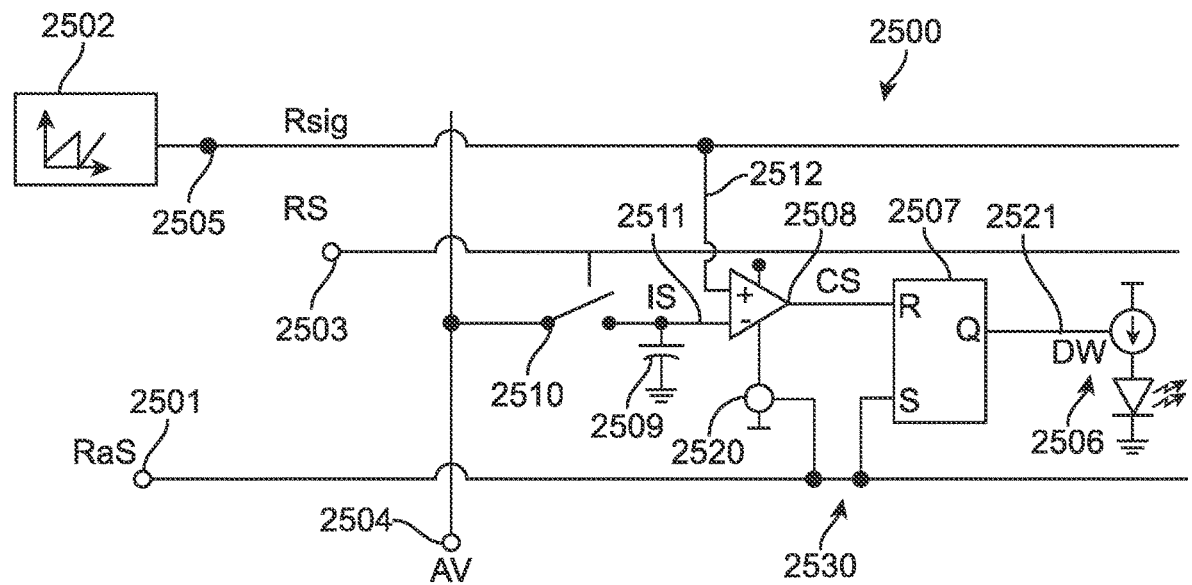
FIG. 31 shows an illustrative version of an analogue ramp-based control circuit suitable for controlling the on/off ratio for light-emitting devices in a μ-LED display.

FIG. 31 illustrates a version of an analogueue ramp for current control in the form of a 2500 control circuit that includes a pixel driver with a small footprint. It is built in a semiconductor material and uses various techniques described here. Such a concept is based on a analogueue ramp for lighting control and is particularly space-saving and shows a hysteresis during operation, which reduces noise and makes double buffering possible. Double buffering allows longer operating cycles, which reduces the total power consumption. This aspect can be advantageous, especially when combined with other power saving functions.

The control circuit features a pixel driver as a combination of a 2530 pulse generator with a column data buffer as input stage. A common ramp generator 2502, which can also be used for several pixels 2506, e.g. a row or column, is part of the control circuit in this version. The control circuit is coupled with its output 2521 to a control input of an adjustable current source of a μ-LED pixel. The current source can be selectively enabled and disabled based on a pulse signal DW applied to the control input of the adjustable current source. In response to the pulse signal DW the μ-LED is switched on or off. In an alternative embodiment, the power source can be replaced by a switch or similar element to ensure that the μ-LED is selectively switched on or off. The pulse length of signal DW corresponds to the brightness of the μ-LED element of the pixel.

The control circuit 2500 comprises a line selection input 2503 for the line selection signal RS and a column data input 2504 for the data signal AV. These inputs are similar to the conventional approach and in fact, they can be used in a similar way. The control circuit also comprises a trigger input 2501 for a trigger or "ramp start" signal RaS and a ramp signal input 2505 for a ramp signal.

Figure 55:
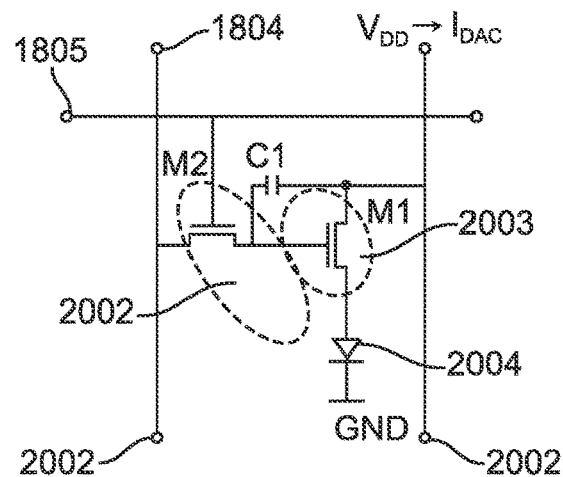
FIG. 55 illustrates a conventional approach for a driver circuit for an LED in one pixel of a display.

Similar to the conventional cell as shown in FIG. 55, the column data input is connected via a switch 2510 to a capacitor 2509 to store data information corresponding to the brightness of the μ-LED inside the capacitor 2509.

Switch 2510 is implemented as described here as a field effect transistor in Si technology or also in Ga or In technology. The gate or control input of switch 2510 is connected to the line selection input to receive the line selection signal RS. However, while the conventional approach uses the charge stored in the capacitor to control the current directly through the light emitting device, capacitor 2509 is used together with switch 2510 as an input buffer. The output 2511 of the input buffer and in particular the capacitor and switch are connected to the pulse generator 2530 to generate a pulse.

Pulse generator 2530 comprises a comparator 2508, which for example contains a differential amplifier and an output buffer stage 2507 implemented as an RS flip-flop, whose behaviour can be expressed with NOR and NAND gates. The differential amplifier is implemented in the same technology as switch 2510. For this purpose, it may include transistors as described in this application. The inverting input 2511 of the comparator is connected to capacitor 2509, the non-inverting input 2512 is connected to the ramp input signal 2505. Comparator 2508 can be selectively switched off to reduce power consumption as explained in detail later.

Comparator 2508 provides a status signal or comparison result CS at its output. The output of the comparator is directly connected to the reset input R of the RS flip-flop 2507. The set input S is connected to the trigger input 2501.

Figure 32:
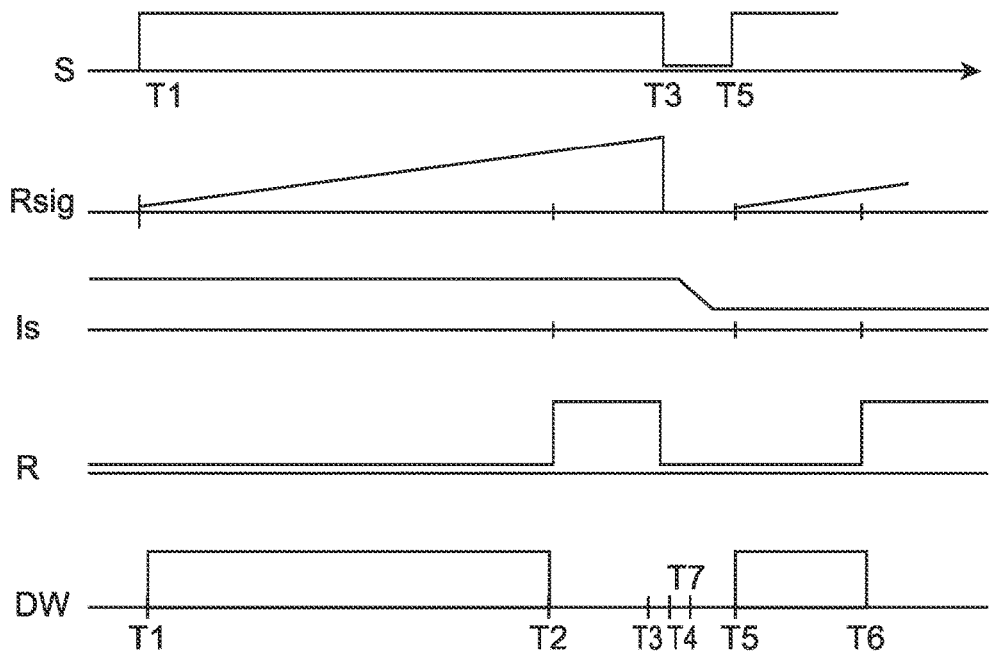
FIG. 32 illustrates a signal-time diagram with different signals of the concept according to FIG. 31.

The operation of the control circuit is explained in more detail with reference to the various signals illustrated over time in FIG. 32. It is assumed that the line selection signal RS is applied and a constant charge is applied to capacitor 2509. A constant signal IS is applied to the non-inverting input of the comparator (corresponding to reference 2512). Signal IS corresponds to the brightness of the μ-LED associated with the control circuit.

At time T1, the trigger signal RaS changes from a low level LOW to a high level HIGH and subsequently the set input S of the RS flip-flop 2507 also goes to HIGH. At time T3, the trigger signal RaS will change back to the LOW level. The ramp signal Rsig is applied at the same time T1. Ramp signal Rsig increases linearly over the time the trigger is HIGH. This means that ramp signal Rsig starts from a first value corresponding to LOW and rises to a second level, i.e. the HIGH level. Ramp signal Rsig is also applied to the non-inverting input of the comparator. During the time period from T1 to T2, the comparator compares the signal IS buffered in capacitor 2509 with ramp signal Rsig. As long as the signal at the non-inverting input is lower than the inverting input, the output signal applied to the reset input R of the RS flip-flop remains LOW. At time T2, the reset input R receives the rising edge of the result signal CS when the output of the comparator changes from LOW to HIGH. At this time, the ramp signal becomes higher than the buffered signal IS.

As a result of this transition, output Q of the RS flip-flop resets the control signal DW for the current source to LOW value from time T2. It can thus be seen that the time T2 at which the output signal DW switches off the current source again depends on the charge stored in capacitor 2509, provided that a uniformly rising ramp Rsig is assumed. The ramp signal RSig and the signal IS thus define a pulse whose length essentially corresponds to the time period from T0 to T2.

At time T3, the trigger signal changes from HIGH to "LOW". At the same time, the ramp signal is switched off, causing the comparator to output a "LOW" signal. Therefore, both signals at the R and S input will change to LOW. Due to a small hysteresis in the comparator, the transition for the trigger signal at input S will be a little faster, causing the flip-flop to keep the output signal DW LOW, regardless of the transition of signal CS at input R. At time T5, trigger signal RaS is repeated at input S. Likewise, the ramp signal Rsig starts again at its start value.

The period between time T3 to T5 is the blanking time used to reprogram the corresponding columns in each row. For this purpose, the row selection signal is triggered at time T7, which connects the column data line to the capacitor via switch 2510. Capacitor 2509 is then charged or discharged to a new value. In this example, capacitor 2509 is discharged to a much smaller value that corresponds to a different (lower) brightness. The recharging is initiated at time T7 and ends at time T4, when the line selection signal RS goes LOW again, opening the switch. Another row can be addressed and reprogrammed during the cycle for the present row at time T5.

Because of the lower level for signal IS, the comparator 2508 now changes its output much earlier at time T6 in the new cycle. Consequently, output Q falls to "LOW" at time T6, which is much shorter than for the previous period of the trigger signal RaS. Output Q with its control signal DW controls the current through the μ-LED coupled to it. The longer the output signal DW remains at HIGH, the longer a current flow through the μ-LED, resulting in a high brightness for the corresponding color. Comparator 2508 and maybe the RS-Flip-Flop can be switched off during reprogramming and blanking time to reduce power consumption. For this purpose, at least the comparator comprises a 2520 power control unit connected to the trigger input. As long as the trigger signal is Rsig HIGH, the comparator 2508 is powered to perform its operation. During the sampling period, it is switched off in response to the trigger signal.

Since in some examples the sampling time can be significantly longer than the current time for the trigger signal, the whole pulse generator can be switched off.

In an alternative embodiment, reference is again made to time T2 in FIG. 32. The comparator switches its output signal CS from LOW to HIGH as soon as the ramp signal reaches the threshold of the buffered signal IS. Trigger signal S is still HIGH, which causes the RS flip-flop to switch the output signal LOW. As you can see, output Q remains LOW regardless of the level at the reset input R. Therefore, the comparator could be switched off after a reset because of the transition of the signal at input R. In some variants, the power control unit 2520 can be coupled to output Q to control the power supply to the comparator based on the state of output Q.

Segmentation and additional ramps can be used if different lines are addressed. This would allow implementing spatial-temporal multiplexing, which reduces the generation of current peaks and leads to less varying power consumption. While in the present example signals have been applied to specific inputs on the comparator, the skilled person can see that the design of this principle can be changed. For example, inverting and non-inverting inputs can be exchanged, resulting in inverse behaviour. The RS flip-flop requires two transistors and resistors, which implements a small asymmetry during the design in the RS flip-flop (e.g. by adjusting the value of one resistor), adjusts the switching behaviour and will prevent undefined states.

With some μ-displays, individual pixel errors may occur, which damage the μ-LEDs. Such errors cannot be avoided. However, a repair with the size of a μ-display is only possible with a very large effort. Therefore, it is suggested to design not only subpixels redundantly, i.e. to provide more than one subpixel of the same color, but to provide redundant μ-LED branches with selection fuse. These redundant pixels can also be connected to the same power source. In a test, the functionality of each μ-LED is now checked. If the test results in two functional μ-LEDs, one of them can be specifically deactivated to compensate for color changes or loss of brightness of the other μ-LED due to the different current flow. If, on the other hand, a fault is detected, the redundant μ-LED continues to be used.

Figure 33:
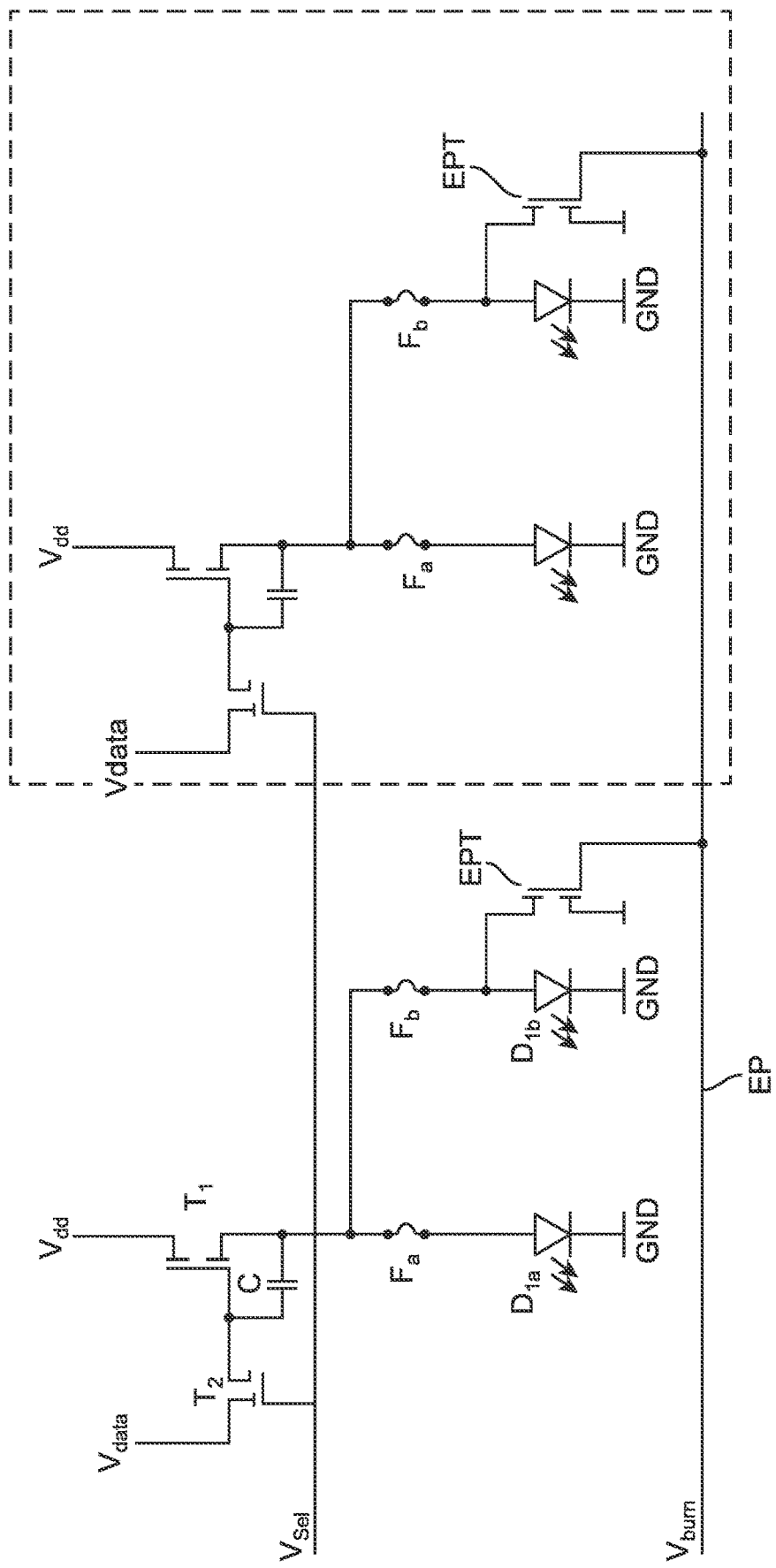
FIG. 33 shows a circuit diagram of a pixel cell with redundant μ-LEDs and fuses to separate a μ-LED.

FIG. 33 shows an embodiment of a proposed device that provides such redundancy with simultaneous selection protection. The illustration shows two pixel cells each with a first and second branch, each having a μ-LED D1a and D1b, respectively. The μ-LED D1a and D1b are connected to a common reference potential connection GND. Their other terminals are each connected to an electronic fuse Fa and Fb. These are, for example, a fuse, which melts when the current through the fuse becomes large enough. The second branch, i.e. the branch with the fuse Fb and the μ-LED D1b also shows an imprinting component EPT. This is designed as a MSOFET transistor and its drain terminal is connected between the fuse and the μ-LED. Its source contact is connected to the common reference potential, the gate can be supplied with the selection signal Vburn via the imprinting signal line EPT. In principle, lines or alternatively columns can be addressed, controlled or selected via the imprinting signal line EP, depending on the wiring.

The pixel cell also includes a 2T1C circuit with a current driving transistor T1. This transistor is connected to the supply potential on the one hand and to the first and second branch and its fuses Fa and Fb on the other hand. A charge storage C is electrically connected to the gate of the first transistor T1 and to the source terminal of the first transistor T1. Furthermore, the "t1C cell also comprises a transistor T2 which is connected between the data terminal Vdata and the gate of the transistor T1. The selection signal can be fed to its gate.

For each color of a pixel two μ-LEDs D1a and D1b, each electrically connected in series to an electrical fuse Fa and Fb, can be provided. In this way, redundancy is created for each pixel in all sub-pixels.

In the case where μ-LEDs are electrically connected along a row and along a column to a common imprinting signal line EP, each pixel cell of a column, for example, can be electrically connected and addressable to the supply potential terminal VDD by means of a common supply line to a switching transistor arranged on a common carrier outside the active display. Fuses of a column can thus be triggered or made to melt.

In the following, the mode of operation of this circuit is explained in more detail.

In the first case, one of the two μ-LEDs is defective in such a way that it is "OPEN", i.e. there is no current flow through the defective μ-LED. Then the test gives a corresponding result and the respective other μ-LED is automatically used. On the other hand, a "SHORT", i.e. a short circuit, can also be present. If this short-circuit occurs, the resistance through the short-circuited diode is very low, so that the current through the respective fuse is significantly higher. This also cuts the fuse in a SHORT.

A third case concerns the situation that both µ-LEDs function as expected. In this case, the current of the power source is split between both branches, which can lead to a color error. The dominant wavelength depends on the selected current. Therefore, in such a case, the signal Vburn (high potential, e.g. VDD) is applied so that the imprinting component EPT becomes conductive. If transistor T1 is simultaneously fully switched through by a corresponding signal on the data and selection line, a high potential is thus applied to the fuse. The resulting high current flow destroys fuse Fb, so that diode D1b is safely disconnected.

When designed in PMOS technology, the potentials and signals exchange their polarity accordingly.

The fuse can be designed as a metal strip with different widths. For example, one length can be 33 [µm], a width at one longitudinal end 20 [µm], at the other longitudinal end 9 [µm] and in a 12 [µm] long central area 2 [µm]. The longitudinal ends can be square or rectangular and have passages. The square longitudinal end can be in the direction of the transistor T1 and the rectangular longitudinal end can be in the direction of a light emitting diode. A material can be IGZO, for example.

Instead of the above-mentioned metal strips, a thin-film transistor can also be used, especially in diode interconnection, in which the gate and source are electrically connected permanently. Each µ-LED can be equipped with its own thin-film transistor. This can act as both a controllable current source and an electrical fuse. By means of a signal, the thin-film transistor can be pulled to zero potential, for example, so that it burns through as a result of the increased current flow and the µ-LED is switched off. In principle, all known types of electrical fuse can be used. Activation or release does not have to destroy the fuse, but in any case, it must safely disconnect the assigned µ-LED from the power supply.

In this way, an end-of-line test can be carried out without additional process steps such as laser cutting or similar. A combination with embossing diodes as embossing components is also possible.

FIG. 33 shows on the right side a neighboring cell of a first pixel cell. For each line a selection signal line Vsel, an imprint signal line EP and a data signal line Vdata can be connected. With Vsel and Vdata the selection signal line generates a signal for selecting the relevant line to activate the associated fuses. The imprinting signal line EP provides a fusing voltage V_burn for generating a fusing current I_burn.

Figure 34:
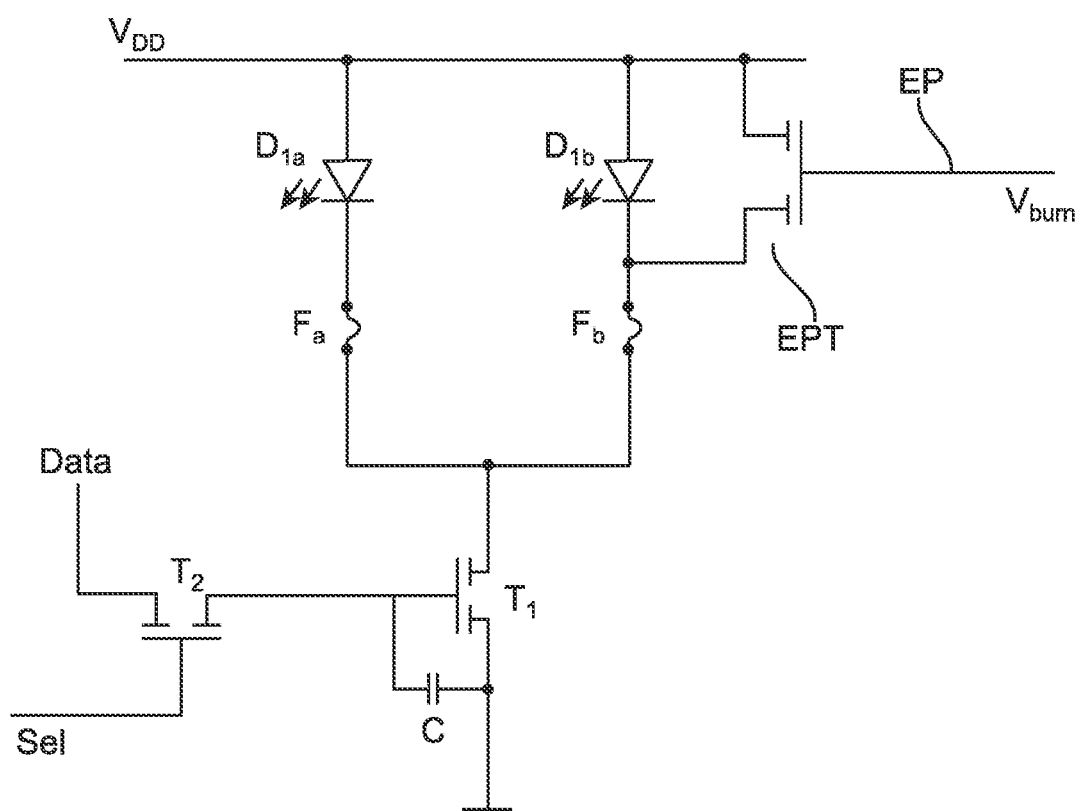
FIG. 34 shows a further embodiment of a circuit with redundant µ-LEDs, in which a defect of a µ-LED can be compensated.

FIG. 34 shows a second embodiment of a proposed device in which the arrangement between the current source and µ-LEDs is reversed. While FIG. 33 shows a configuration with a common cathode, FIG. 34 shows a common anode configuration with the µ-LEDs.

The anode connections of the µ-LEDs D1a and D1b are connected to the supply potential connection VDD. A first current line contact of a first transistor T1 is connected to the reference potential terminal GND. The drain terminal of the first transistor T1 is connected to the common terminal of the electrical fuses Fa and Fb. The selector holding circuit comprises a charge storage C connected to the control contact of the first transistor T1 and to a source terminal of the first transistor T1.

The function of this arrangement is similar, but the transistor EPT is connected between the fuse Fb and µ-LED D1b and the supply potential. A voltage V_burn can be applied to the gate of the imprinting transistor EPT via an imprinting signal line EP, thus causing the electrical fuse Fb, which is a fuse, to melt.

Figure 35:
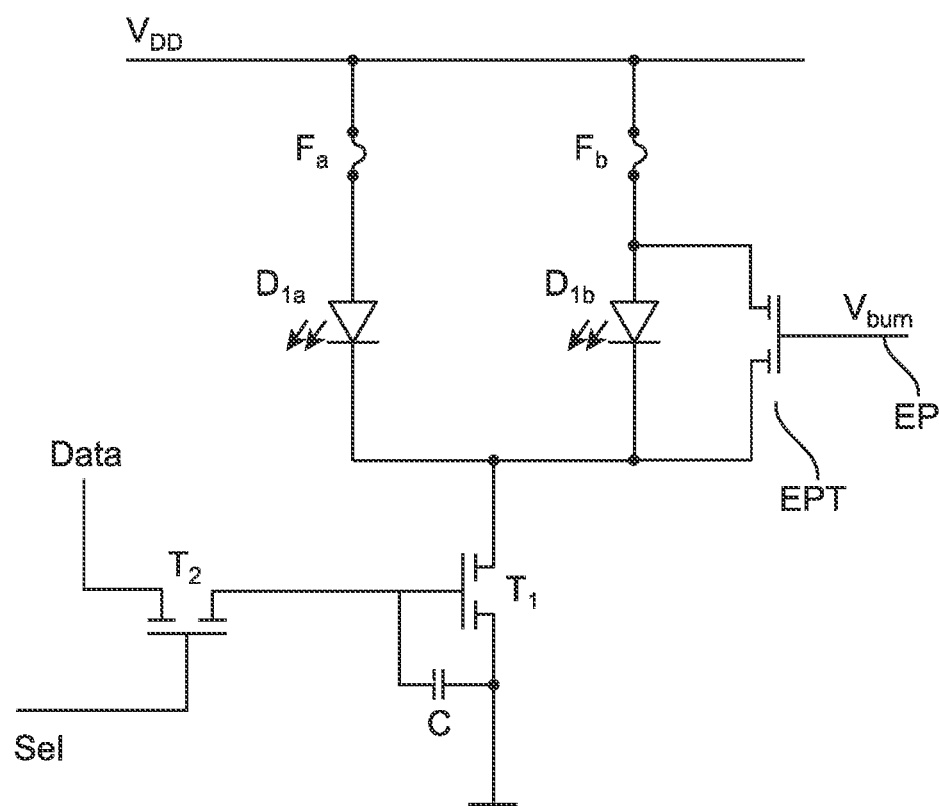
FIG. 35 illustrates a third embodiment of a circuit with redundant µ-LEDs according to some aspects of the presented concept.

FIG. 35 shows a third embodiment of a device with redundant branches of µ-LEDs, which can be selected by means of selection fuses. In contrast to the embodiment in FIG. 35, the series connection of fuse and µ-LED is swapped in each branch. Thus, the fuse is directly connected to the supply potential terminal, the µ-LED of each branch is connected on the cathode side to a common base point and to the current driving transistor T1. Furthermore, the imprinting transistor EPT is connected with its drain terminal between fuse Fb and µ-LED Dib. Its source terminal also leads the current driving transistor T1 to the common base point for the µ-LEDs. The 2T1C cell is constructed in the same way as in the previous figure. To melt the fuse, the diode D1b is bridged with the imprinting transistor EPT and the signal Vburn, so that a high current melting the fuse flows through the fuse Fb.

As the LEDs are not connected together to the potential connections for VDD or GND, no common electrode of the µ-LEDs can be realized, i.e. one electrode for several pixels. This arrangement is suitable, for example, if no common electrode is required for process technology.

Figure 36:
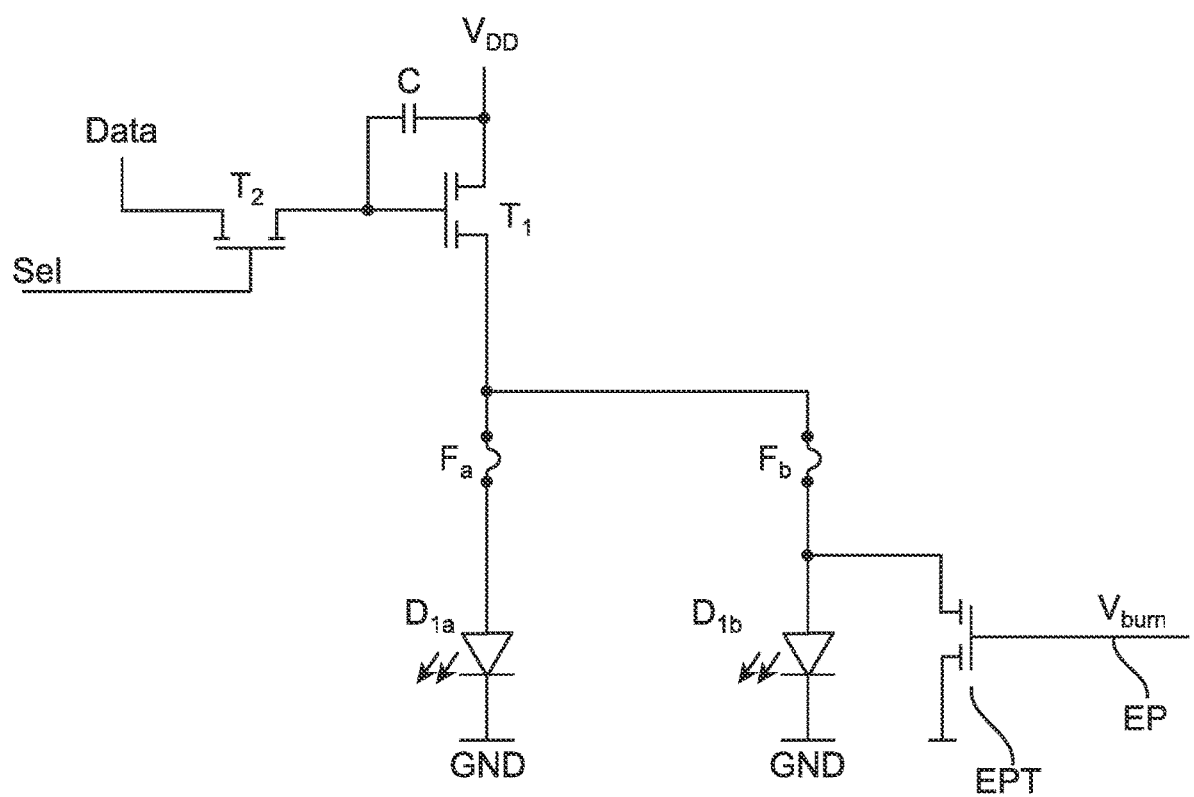
FIG. 36 shows a fourth embodiment of a circuit with redundant µ-LEDs in which a defective µ-LED can be replaced.

FIG. 36 shows a slight modification of the embodiment according to FIG. 33, where the transistors are PMOS (especially transistor T1) and the charge storage is connected between the gate and the fixed supply potential. The advantage of this embodiment is that the voltage across the charge storage is independent, unlike the R design in FIG. 33, in which the voltage across charge storage C can vary slightly due to the forward voltage or changes in it due to temperature fluctuations. The same advantage of independence from temperature variations is also shown in the design of FIG. 34.

Figure 37:
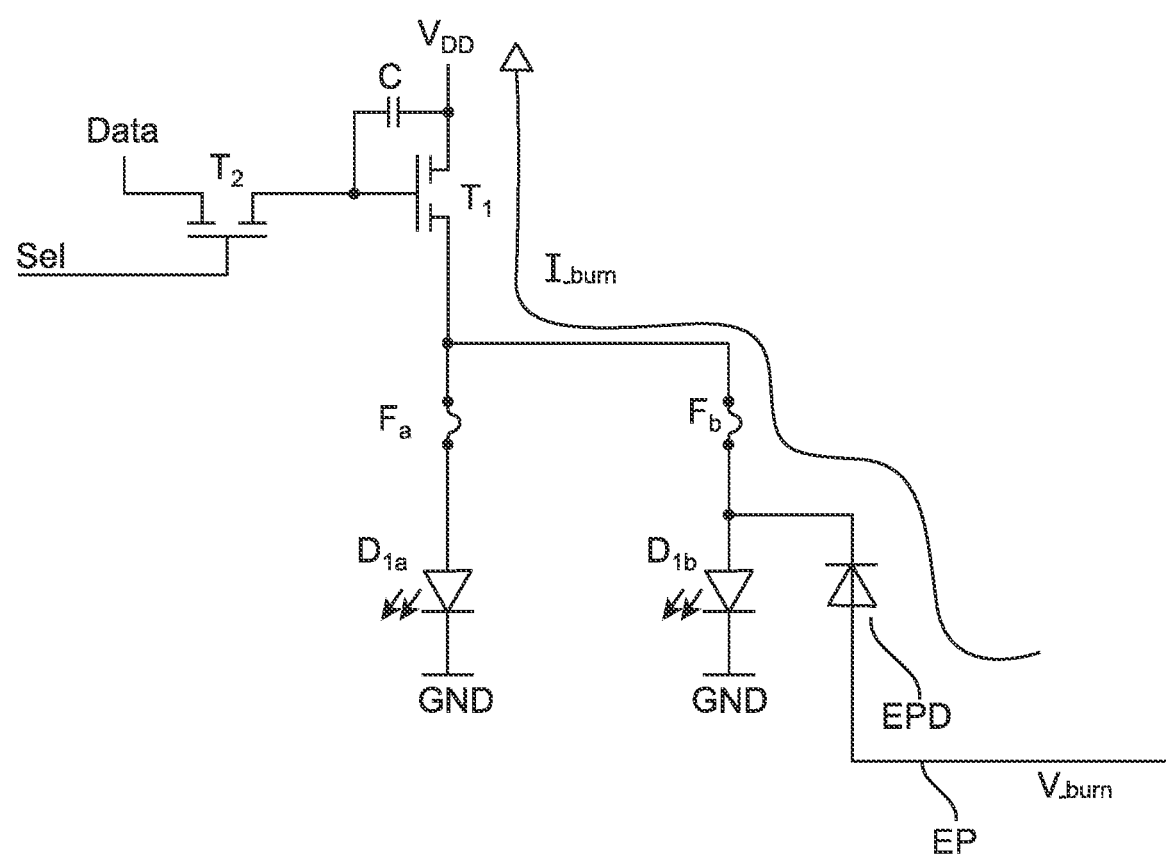
FIG. 37 shows a fifth embodiment of a circuit with redundant µ-LEDs.

FIG. 37 shows another alternative version of the embodiment shown in FIG. 36. The imprinting component here is an imprinting diode EPD with one terminal connected to a second terminal of the µ-LED Dib, to which the imprinting diode EPD is assigned, and the other terminal connected to an imprinting signal line EP, by means of which addressing can be performed. As shown in FIG. 37, a first terminal of the imprinting diode EPD is connected between fuse Fb and µ-LED D1b and a second terminal of the imprinting diode EPD is connected to the imprinting signal line EP. The melting voltage V_burn is also applied to the latter, with which the electrical fuse melts.

During operation, a selection of an electrical fuse Fb to be triggered is made by switching through the first transistor T1. This is done by programming a voltage on the charge storage C via the data line Data and the selection line Sel. The VDD connection is connected to 0 volts or a negative voltage, in contrast to normal operation. A voltage V_burn is then applied to the imprint signal line EP, which is more positive than the voltage at VDD. In this way, a high current IF or I_burn flows via the imprinting diode EPD via the electrical fuse Fb and the first transistor T1, which is switched on, whereby the fuse Fb is triggered in the selected pixel cell. The fuse Fb melts and the corresponding LED D1b is switched off. In addition, the potential at the first potential connection GND should ideally also be greater than 0 Volt, for example equal to the melting voltage V_burn, so that no large current flows via LED D1b or D1a and can damage them.

According to this embodiment, the current (IF, I_burn) required to trip the electrical fuse Fb flows in the opposite direction to that which would flow in "normal operation". After this procedure in an EOL test, no additional process steps, such as laser cutting or similar, are required.

Figure 38:
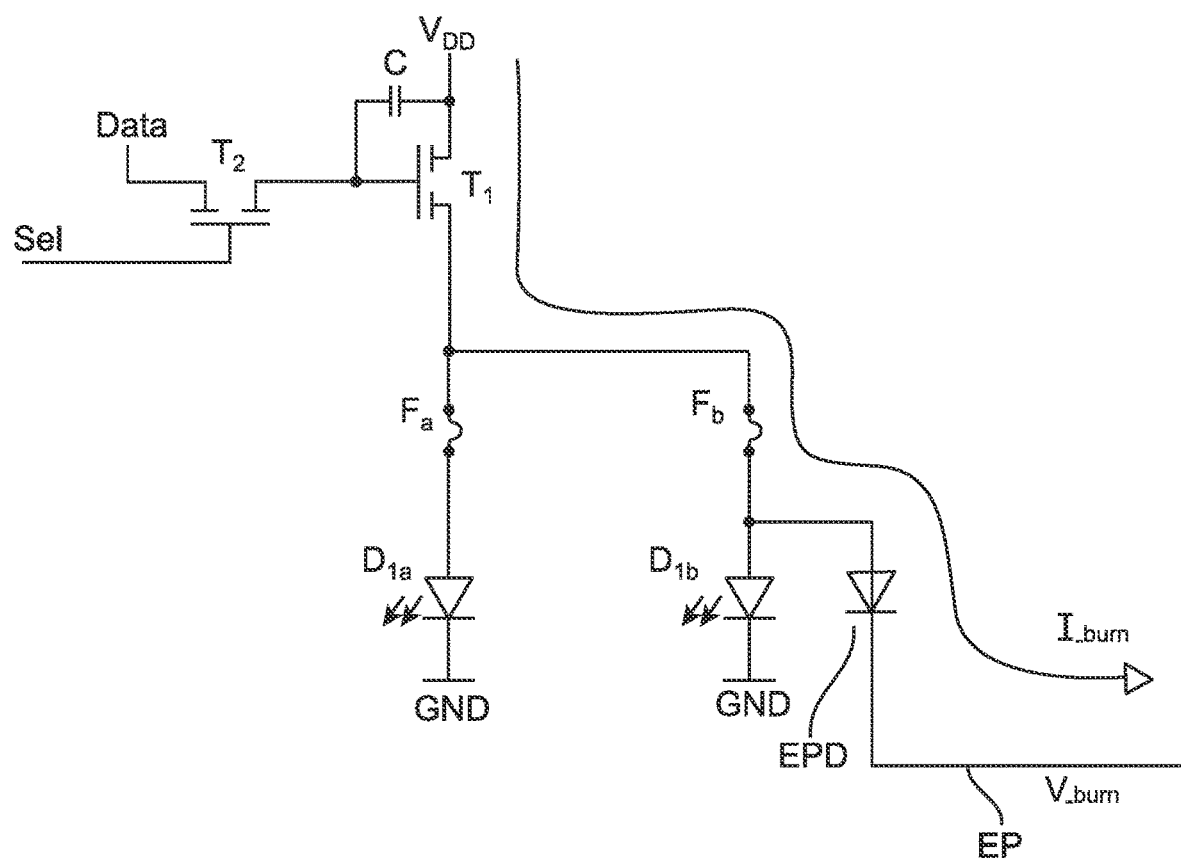
FIG. 38 is a sixth embodiment of a circuit with redundant µ-LEDs, in which a defect of a µ-LED is compensated.

FIG. 38 shows a modification of the embodiment according to FIG. 37, in which the imprinting diode was only turned upside down. It is now connected on the anode side between fuse Fb and µ-LED D1b of the second branch. The arrangement according to FIG. 38 is created using PMOS thin-film transistors as current driver transistor T1 and a common cathode arrangement for the µ-LEDs. All imprint signal lines EP of a line of a display are connected together here. The electrical fuse Fb to be triggered is selected by switching through the first transistor T1. For this purpose, the charge storage C is set to o V or another voltage so that T1 becomes conductive. A voltage of 10 V or another positive voltage is applied to the VDD connection. The voltage V_burn, which is applied to the imprint signal line EP, is here more negative than the voltage at the supply potential connection VDD and is 0 Volt, for example. In this way, a high current I_burn flows through the imprinting diode EPD, through the electrical fuse Fb and the conducting first transistor T1, whereby the fuse Fb in the selected pixel cell is triggered and thus melted.

Meanwhile, the potential at the first potential connection GND should ideally be just as high as the potential at the second potential connection VDD, so that the LEDs D1a and D1b are switched in reverse direction and so that no high current flows over the LED D1b or D1a and can damage them despite the first transistor T1 being conductive. According to this embodiment, the current (IF) I_burn required to trigger fuse Fd flows in the same direction as it would in "normal operation" of the arrangement.

Figure 39:
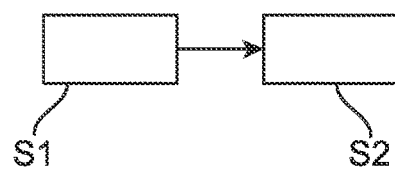
FIG. 39 shows an outline of a procedure for testing and configuring a pixel cell that is driven by one of the circuits presented above.

FIG. 39 shows an embodiment of a method for the electronic configuration of a plurality of µ-LEDs. In a first step S1 the µ-LEDs of the first branch and the second branch are tested for their functionality. This results in several possibilities, of which the following is probably the most common. In this case, both µ-LEDs function as expected. If this is the case, in a second step S2 an imprint signal is applied to the electronic imprinting component. A current is then provided by the current driver or current source, which flows through the now conductive current imprinting element. The current is selected so that the µ-LEDs are not damaged, but the fuse of the respective branch is destroyed. This deactivates the respective branch. In case of a fault, however, only one of the two branches is still functional. The other is either "OPEN", i.e. no current flows over the faulty branch, or "SHORT", i.e. a short circuit is present. In the latter case, the increased current and the low resistance in this branch can destroy the fuse in the faulty branch, so that the fuse in the faulty branch changes from SHORT and OPEN and does not affect the function of the whole arrangement any more.

With the method described above, the imprinting signal line can be designed as a global line, i.e. one connected to all pixels. Addressing is done via the supply line via transistor circuits on a panel outside an active display, as well as via the selection lines and appropriate programming of the charge accumulators of the 2T1C cells.

This results in a reduced wiring effort. Likewise, a reduction of the necessary layers can be achieved, which can lead to a reduction in costs. However, the switching transistors must be designed in such a way that they can carry the current of a column. Furthermore, there is an increased power dissipation in the panel or in the common carrier during this process.

The described circuit design with two fuses can be used for a variety of µ-LED embodiments.

Figure 40:
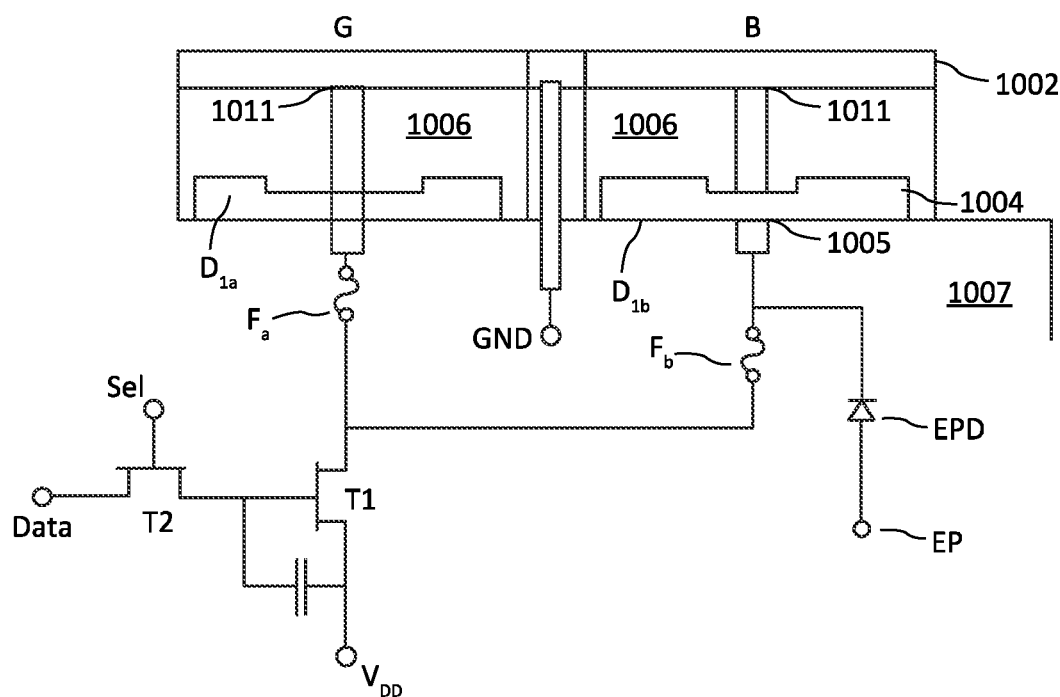
FIG. 40 illustrates a circuit for driving and testing µ-LEDs according to aspects of the proposed concept of a slot antenna based on the principle disclosed in this application.

FIG. 40 shows an embodiment of the circuit based on the proposed concept combined with a slot antenna arrangement disclosed in this application. The slot antenna has a stack of semiconductor layers with a lower contact area 1005 and an upper contact area 1011. The upper contact area 1011 of each slot antenna is connected to a common ground potential terminal GND within the substrate 1007 via a transparent cover electrode 1002. The substrate 1007 also houses the other circuit elements for driving and testing the slot antenna. The contact areas 1005 of both slot antennas are now connected to a fuse $F_a$ or $F_b$. Between the fuse Fb and the contact area 1005 of the right slot antenna there is also a tap, which leads to the imprint diode EPD and the imprint signal line EP.

The respective other terminals of the fuses $F_a$ and F are connected to the output of the current driver transistor T1. Together with the selection transistor T2 and the capacitor located between the supply potential $V_{DD}$ and the control terminal of the current driver transistor T1, the current driver transistor T1 forms a 2T1C cell to supply the two slot antennas. In one aspect, the current driver transistor T1 is the dual-gate transistor disclosed in this application.

As explained in the previous examples, a test step evaluates whether the two slot antennas are functional. If this is the case, the fuse Fb is destroyed by the isolating element EPD and thus the right slot antenna is cut off from the power supply. If one of the two slot antennas is defective, the power supply for the remaining slot antenna is provided by the 2T1C cell.

FIG. 41 shows a similar embodiment, in which µ-LEDs are provided in the form of horizontally aligned microrods. These are connected with their respective contact 2 to a contact area 3 on the substrate not shown here. The contact area 3 is in turn connected to the common reference potential GND. The rear contact connection of each microrod is connected to the respective fuse $F_a$ or $F_b$. µ-LED D1b is the redundant diode and its rear contact terminal is connected to the imprinting transistor EPT. To melt the fuse Fb, the imprinting signal Vburn is applied to the control connection, whereby a high current flows through the fuse from the current driver transistor T1 to the imprinting signal line EP. In this way, the horizontally oriented microrod D1b is disconnected from the power supply. In the event of a production-related failure of the microrod D1a due to either a short-circuit or a disconnection, the 2T1C cell with its current driver transistor T1 supplies the microrod D1b.

FIG. 42 shows a further embodiment, in which a series of basic modules 5 are provided. Two first adjacent contacts each are connected to the supply potential connection $V_{DD}$ via respective fuses $F_a$ and $F_b$. Between the fuse $F_b$ and the respective contact, an imprint transistor is connected, which is connected to the output of the current driver transistor T1 of a respective current source. In this version, a pair of base modules is connected to a common current source comprising a 2T1C cell consisting of the current driver transistor T1, the selection transistor T2 and a capacitor. In the event of a positive test of the two base modules, a switching signal is applied via the control terminal of the imprinting transistor EPT and thus a fusing current is switched via transistor T1 to the respective fuse $_{Fb}$.

Small-scale display arrangements with a high resolution are particularly desirable for AR systems, such as head-up displays or glasses with a light field display that projects a raster image directly onto the retina. For µ-displays with pixel-sized light sources, so-called µ-displays in matrix form based on GaN or InGaN are proposed, among others.

Figure 43:
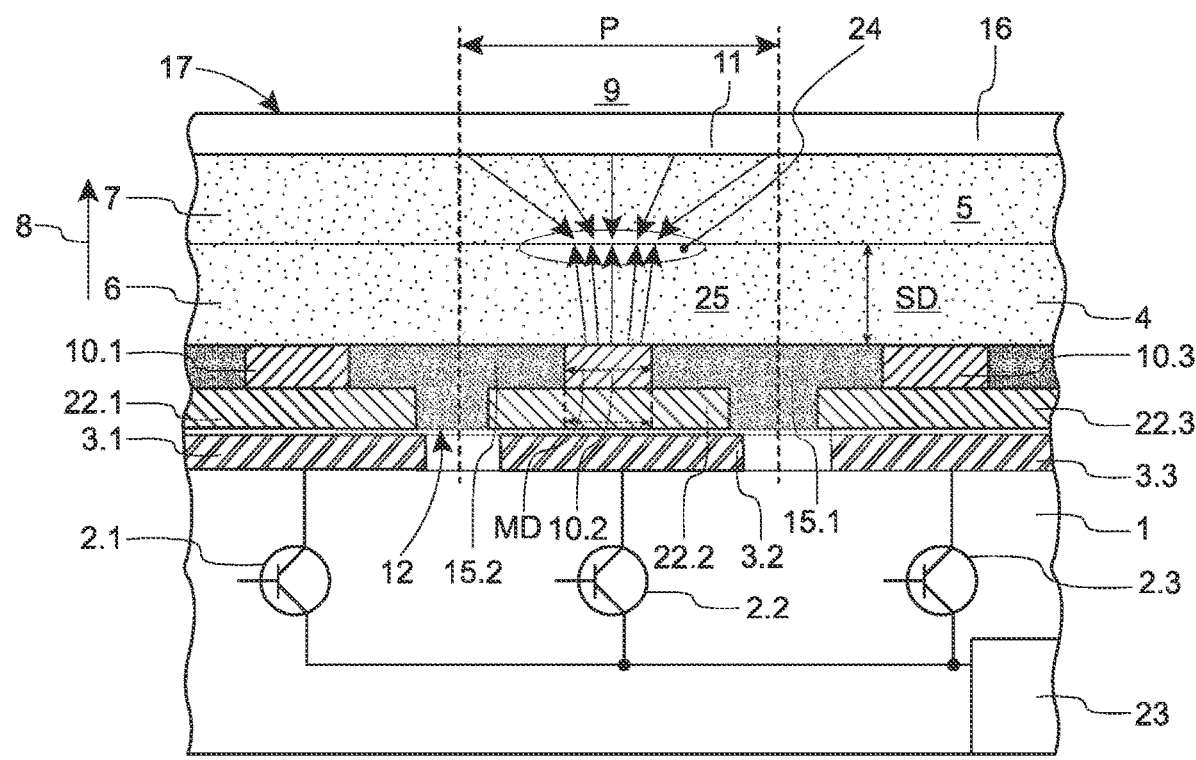
FIG. 43 shows an embodiment of a display device consisting of a monolithic pixel array with a monolithic IC in cross-sectional view according to some aspects of the proposed concept.

FIG. 43 shows a display device comprising an IC substrate component and a monolithic pixelated optochip mounted thereon as a first embodiment of a cross-sectional view. An IC substrate component 1 is shown with monolithic integrated circuits 2.1, 2.2, 2.3 and with IC substrate contacts 3.1, 3.2, 3.3 controlled by them. The IC substrate component 1 can comprise further components for control, power supply and for signal exchange with peripheral devices, whereby an interface 23 is sketched as an example. In this context, reference is made to further different versions in this application, which describe the digital and analogueue circuit components in more detail. FIGS. 49A to 49C, 50A and 50B with their corresponding descriptions are given as examples.

The IC substrate contacts 3.1, 3.2, 3.3. are metallic and are each separated by an insulating layer. A monolithic pixelated optochip 4 is arranged on the IC substrate component 1 and electrically and mechanically connected to the IC substrate contacts 3.1, 3.2, 3.3. To be more precise, contacts 22.1m 22.2 and 22.3 are inserted on the surface of the pixelated optochip 4 in such a way that they are opposite the IC substrate contacts 3.1, 3.2, 3.3 when they are positioned exactly on the IC. As shown, the contacts have the same size in each case, so that even a slight offset as shown has no negative effects and a short circuit is avoided. Various techniques for such a connection are disclosed in this application.

The monolithic pixelated optochip 4 comprises a semiconductor layer sequence 5 with a first semiconductor layer 6 with p-doping and a second semiconductor layer 7 with n-doping, wherein the first semiconductor layer 6 and second semiconductor layer 7 are applied over a large area and extend in the lateral direction perpendicular to the stacking direction 8 substantially over the entire monolithic pixelated optochip 4. Embodiments of the semiconductor layers 6, 7 with several individual layers of different doping levels or made of different semiconductor materials are not shown in detail. Between the first semiconductor layer 6 and the second semiconductor layer 7 there is an active layer, not shown in detail, with quantum wells in the area of which an active zone 24 emitting electromagnetic radiation forms when a current flows through the semiconductor layer sequence 5 in stack direction 8.

On the front side 17 above the semiconductor layer sequence 5, a transparent contact layer 16, for example of indium tin oxide (ITO), is applied flat. In order to achieve a μ-LED 9 with a small pixel size P, in the present embodiment of 2 μm to 5 μm diagonal size, the first light source contact 10.1, 10.2, 10.3 on the underside of the first semiconductor layer 6 facing the IC substrate component 1 is considerably smaller than the pixel size P. For the embodiment, a maximum diagonal MD of the first light source contact 10.1, 10.2, 10.3 of 300 nm is selected so that the feature is fulfilled according to which the projection area 13 of the first light source contact 10.1, 10.2, 10.3 on the μ-LED back side 12 corresponds at most to half the area of the μ-LED back side 12. For the present embodiment, the projection surface 13 comprises a diagonal of 4 μm and covers approximately 5% of the area of the μ-LED rear surface 12. This results in a laterally limited current path 25 within the μ-LED 9 between the first light source contact 10.2 and the second light source contact 11 formed by a section of the transparent contact layer 16, which leads to a laterally limited active zone 24. Additionally, non-radiative recombination at the edges of the active zone 24 are suppressed. To improve the lateral confinement of the current path 25, the doping of the first semiconductor layer 6 and the second semiconductor layer 7 is preferably selected such that they have a p or n conductivity of less than $10^4$ $Sm^{-1}$, preferably less than $3*10^3$ $Sm^{-1}$, more preferably less than $10^3$ $Sm^{-1}$. In addition, it is advantageous to select a small layer thickness SD of the first semiconductor layer 6. It is preferred that the layer thickness SD of the first semiconductor layer 6 in stack direction 8 is at most ten times and preferably at most five times the maximum diagonal MD of the first light source contact 10.1, 10.2, 10.3 in lateral direction.

Figure 44:
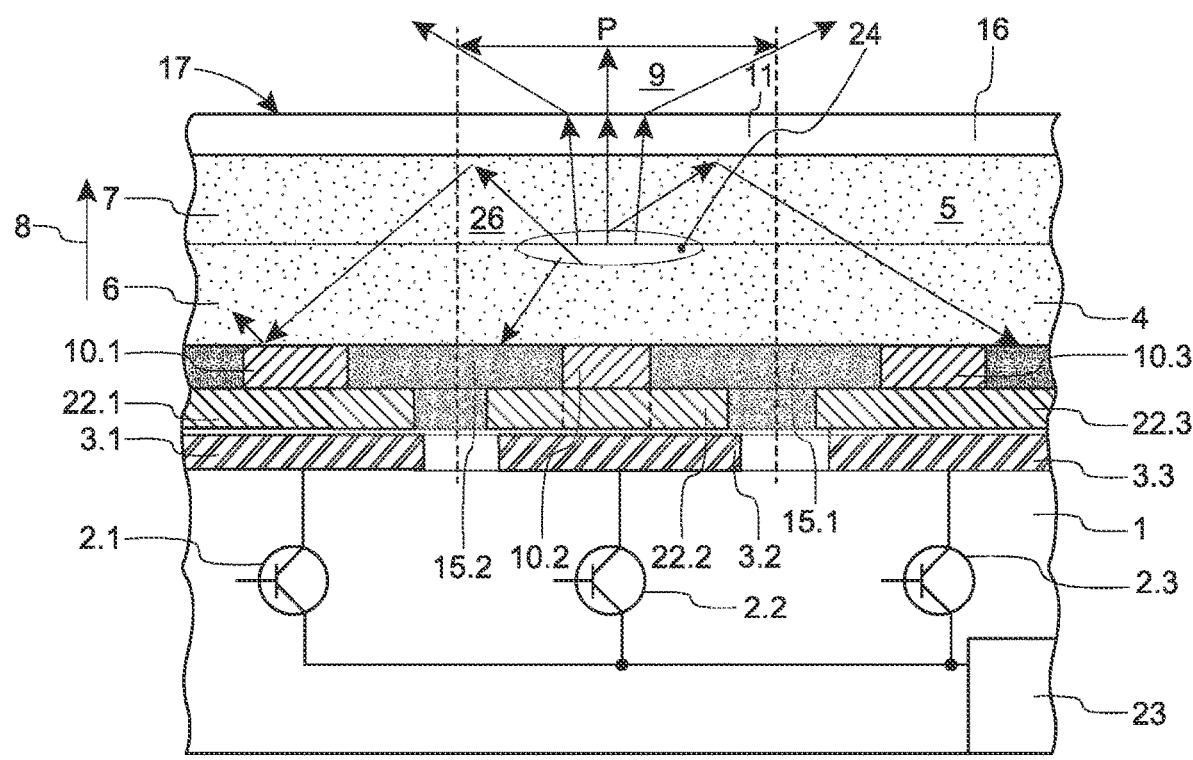
FIG. 44 shows the previous embodiment of the proposed display device in cross-sectional view with a sketched possible light path.

According to the invention, the first light source contact 10.2 is surrounded in a lateral direction perpendicular to the stacking direction 8 by a rear absorber 15.1, 15.2 with an optical blocking effect, the rear absorber 15.1, 15.2 preferably consisting of silicon, germanium or gallium arsenide and/or having a graphene or soot particle intercalation. From the light path 26 shown in FIG. 44 for the first embodiment, it can be seen that this measure reduces crosstalk from a driven μ-LED 9 into adjacent pixels.

Figure 45:
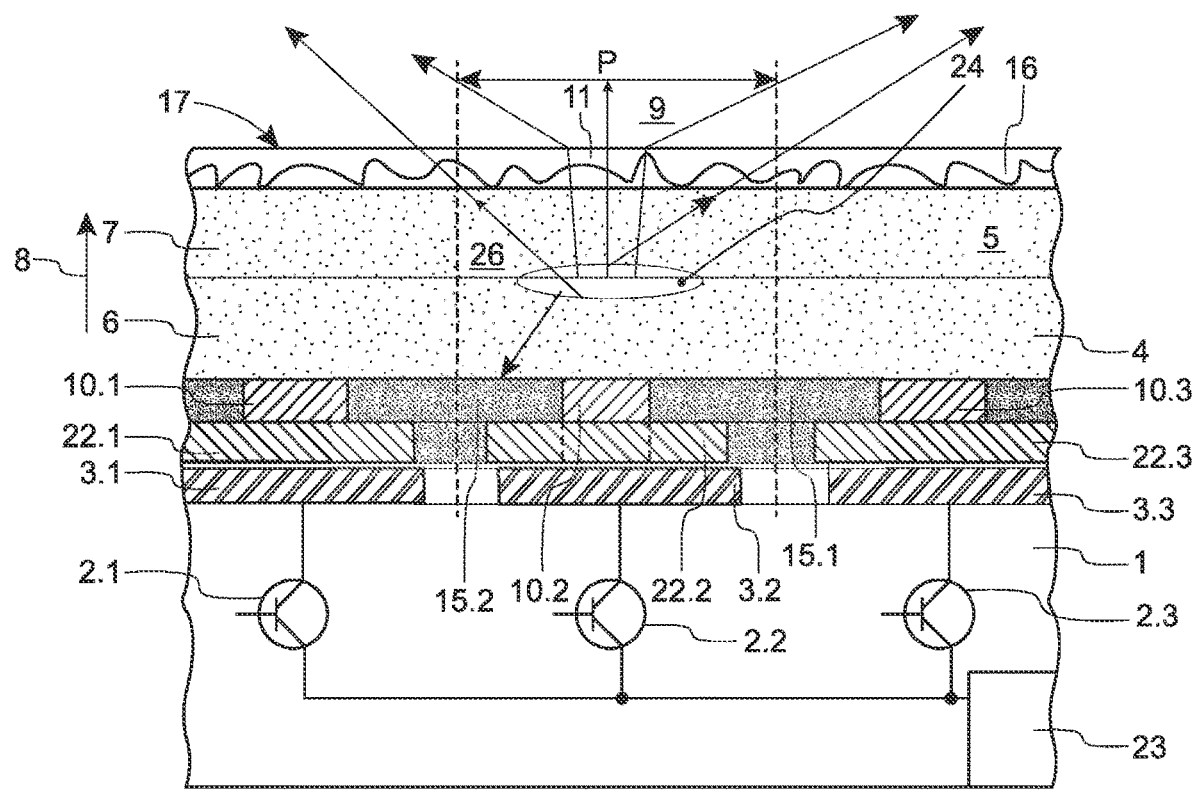
FIG. 45 illustrates a second embodiment of the proposed display device with monolithic pixel array and IC in cross-sectional view.

For the second embodiment shown in FIG. 45, the same reference characters are used for the components that are identical to the first embodiment. Shown are three-dimensional structures on the top of the second semiconductor layer 7, which improve the light extraction to the front side 17. It can be seen that the degree of total reflections is reduced and the output coupling cone is enlarged. For a design alternative not shown in detail, 17 Fresnel lens structures are provided on the front side. In another alternative, photonic crystal structures are arranged on the surface. In some alternatives, structures are arranged above the μ-LEDs and partly extend into the active layer. Such a combination is also possible to create a constriction and localization of the recombination zone.

Figure 46:
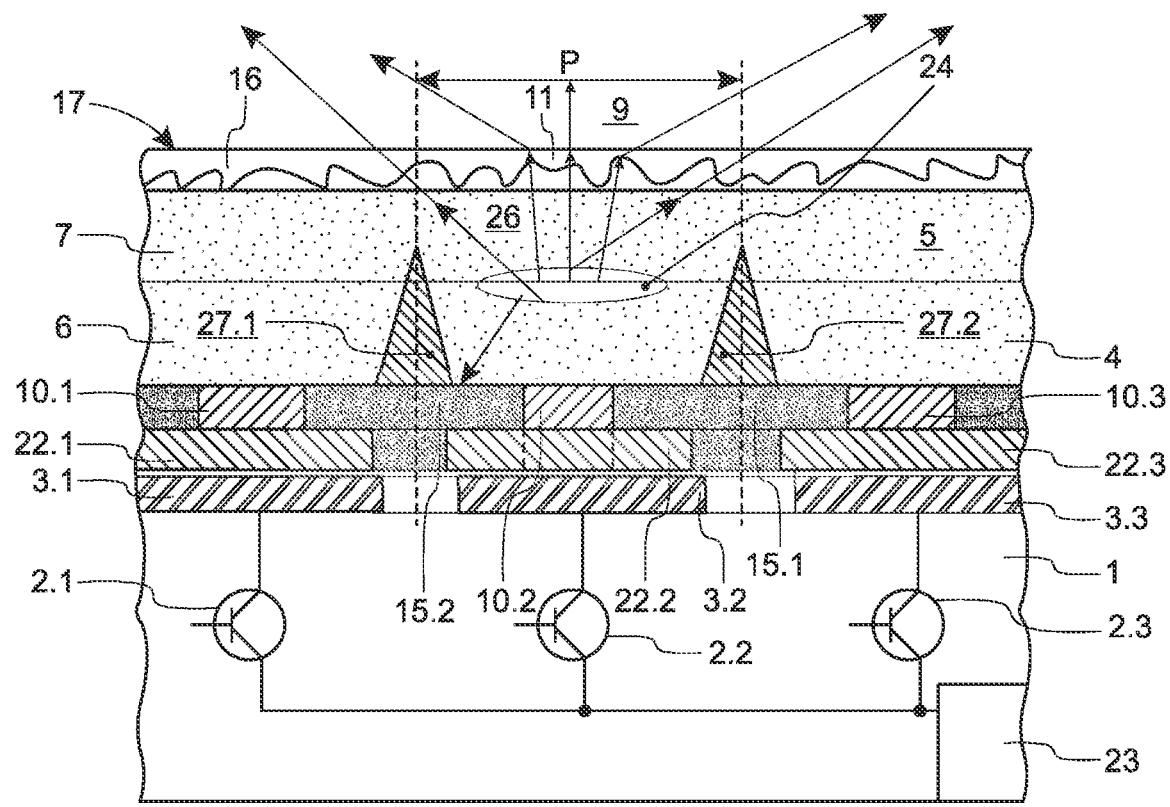
FIG. 46 is a third embodiment of the proposed display device in cross-sectional view according to further aspects of the proposed principle.

FIG. 46 shows a third embodiment with a rear absorber 15.2, 15.2, which comprises sections 27.1, 27.2 projecting into the semiconductor layer sequence 5, which additionally shield the boundary area between adjacent μ-LEDs 9. Structured elements of reflective materials such as aluminium, gold or silver or of dielectric materials whose refractive index is lower than that of the first semiconductor layers 6, 7 can be used for the subsections 27.1, 27.2. For further embodiment, subsections 27.1, 27.2 additionally improve the lateral limitation of the current path.

Figure 47:
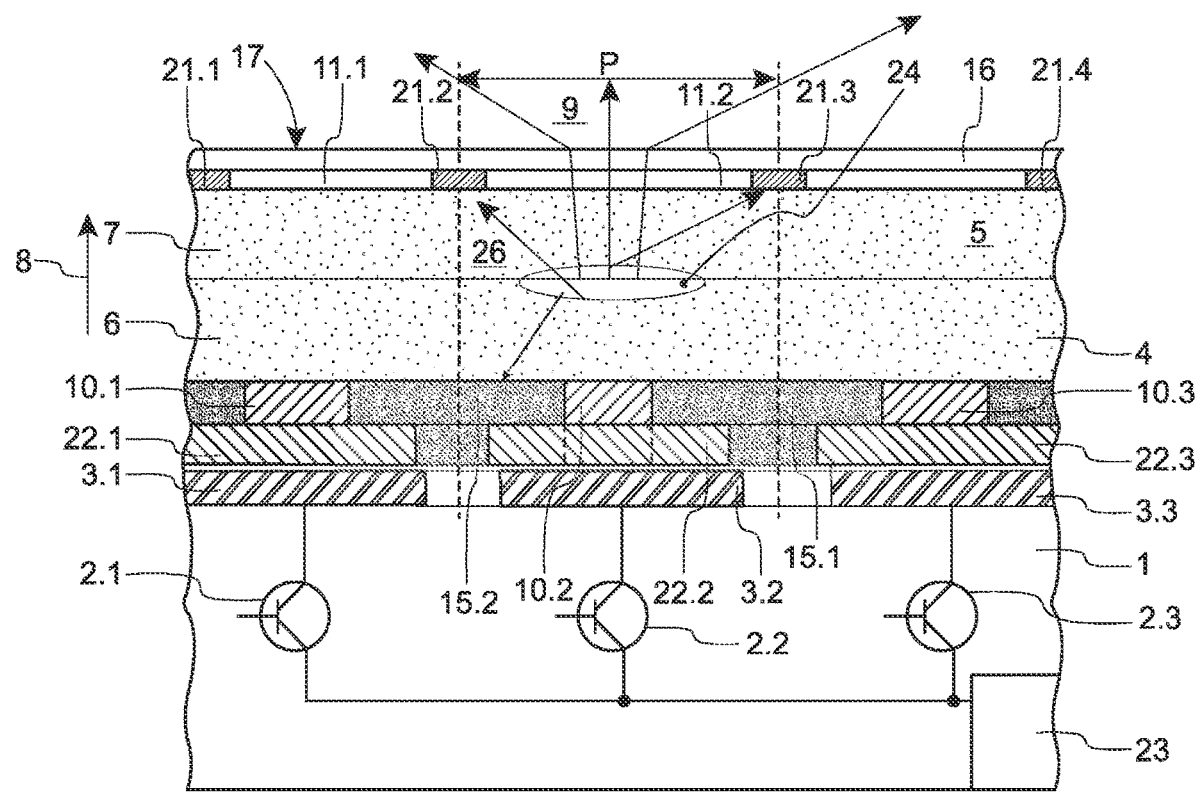
FIG. 47 shows a fourth embodiment of the proposed display device in cross-sectional view with additional measures for light guidance.

The fourth embodiment shown in FIG. 47 further reduces the optical crosstalk between adjacent μ-LEDs 9 by a frontal absorber 21.1, 21.2, 21.3, 21.4, which laterally surrounds the second light source contacts 11.1, 11.2, 11.3. If the frontal absorber 21.1, 21.2, 21.3, 21.4 is electrically insulating, the lateral restriction of the current path for the localization of the active zone 24 can additionally be improved.

For the embodiments shown in the figures, an optochip contact element 22.1, 22.2, 22.3 is arranged between the first light source contact 10.1, 10.2, 10.3 and the respectively assigned IC substrate contact 3.1, 3.2, 3.3. The cross-sectional area of the optochip contact element 22.1, 22.2, 22.3 is larger than that of the first light source contact 10.1, 10.2, 10.3, so that the monolithic pixelated optochip 4 can be contacted in a simplified manner on the IC substrate component 1.

Figure 48A:
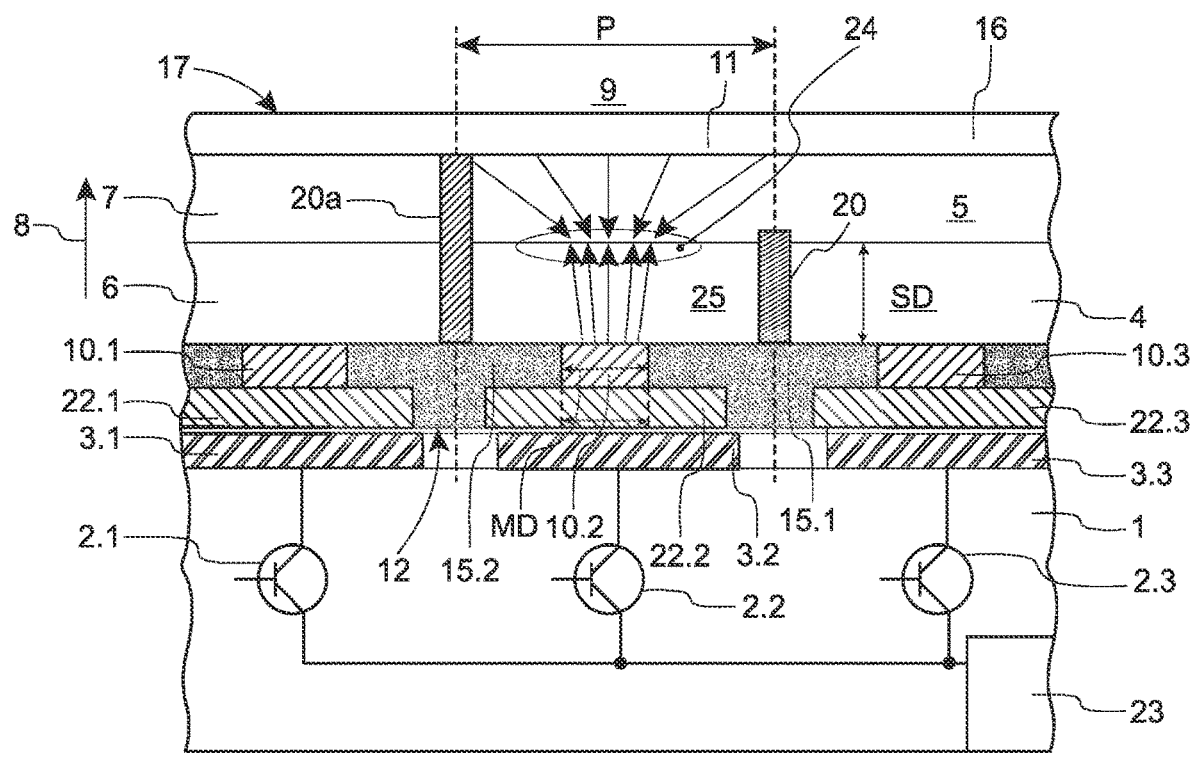
FIGS. 48A and 48B show two alternative embodiment to improve the localization of charge carriers in one of the proposed display devices with further aspects from this disclosure.

FIG. 48A shows an alternative embodiment, which is basically based on the previous example in FIG. 43. However, additional measures have been taken to reduce the current and prevent optical and electrical crosstalk. The embodiment is similar to that of FIG. 133 in this respect. In particular, a trench 20 was created between the middle and right μ-LED after the application of layers 6 and the active layer, which comprises an optically reflective but also insulating material (at least on the trench wall). The latter to avoid a short circuit between the pixels, the former to avoid optical crosstalk. Between the left and the middle pixel a larger trench is created, which essentially extends through layers 6 and 7. It forms not only an optical barrier, but also an electrical barrier between the pixels or μ-LEDs. Further aspects of this embodiment can be found in relation to FIGS. 131 to 137 and other places in this application.

Figure 48B:
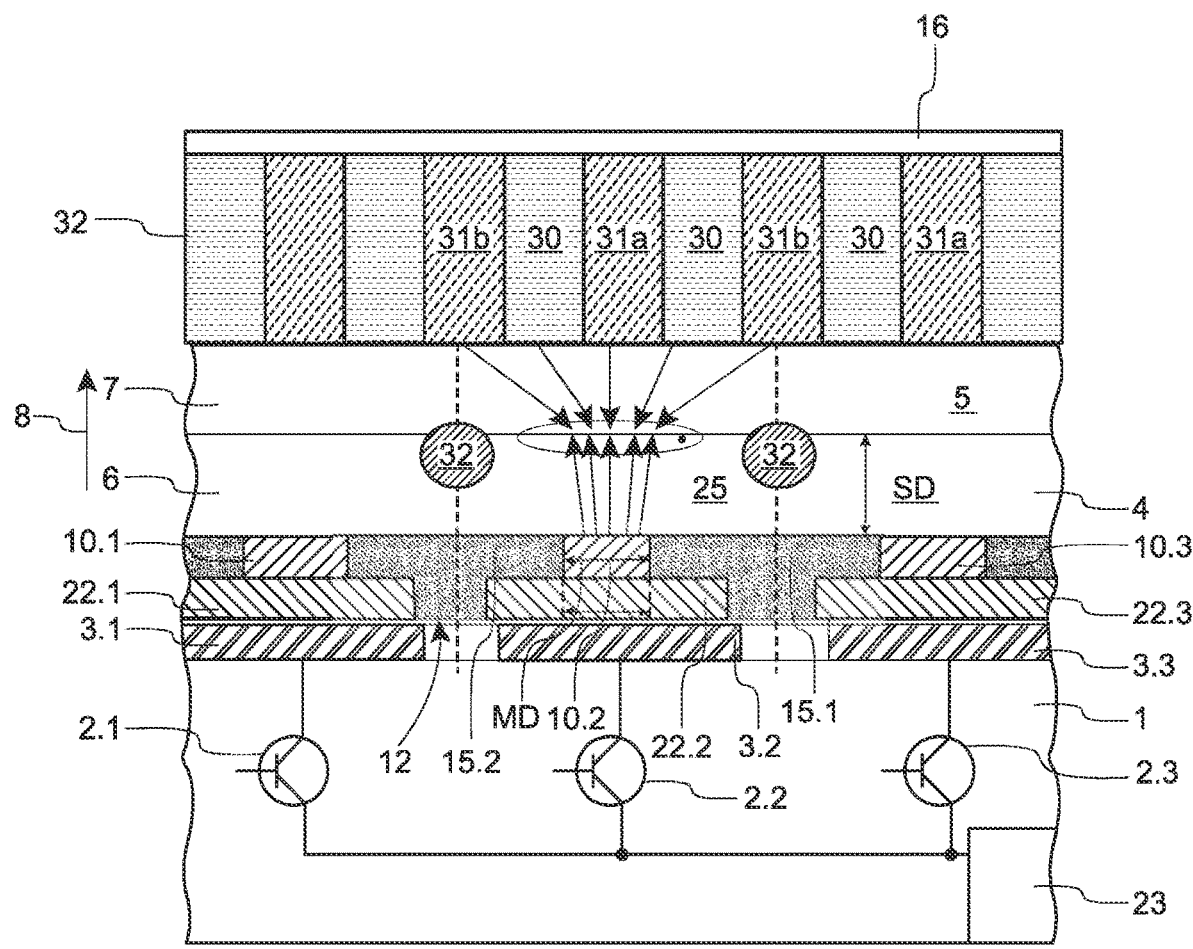

FIG. 48B shows a further embodiment based on the previous examples. Identical elements carry the same reference points. In this embodiment a doping 32 is introduced in layer 6 between the individual μ-LEDs. The doping changes the band structure in this area and leads to an increase of the band gap. Injected charge carriers thereby experience a field and are kept away from this area. Together with the light source contact 10.2, effective localization is thus also achieved in the area of the recombination zone shown in FIG. 48B.

Another aspect is the photonic structure 32 on the surface of layer 16, where a transparent material 31a with a high refractive index (e.g. $Nb_2O_5$) is directly applied as a column or pillar over a recombination zone. Light generated in zone 24 is bundled by the column as waveguide and thus directed. Another column of the same material 31b is located in this configuration between two adjacent pixels. Between them, a transparent material with a lower refractive index is filled in. This result in a refractive index variation in lateral alignment similar to the structures described above. The periodic variation of the refractive index leads to an optical band gap. The size and shape of this band gap depends, among other things, on the periodicity, so this diagram is only an example, other periodicities are also conceivable. Such a combination of the different techniques results in a strong localization on the one hand and a good directional radiation on the other hand. Crosstalk is prevented. The IC structure and the comparatively large contacts also improve the alignment and fastening of the two layer structures.

Figure 49A:
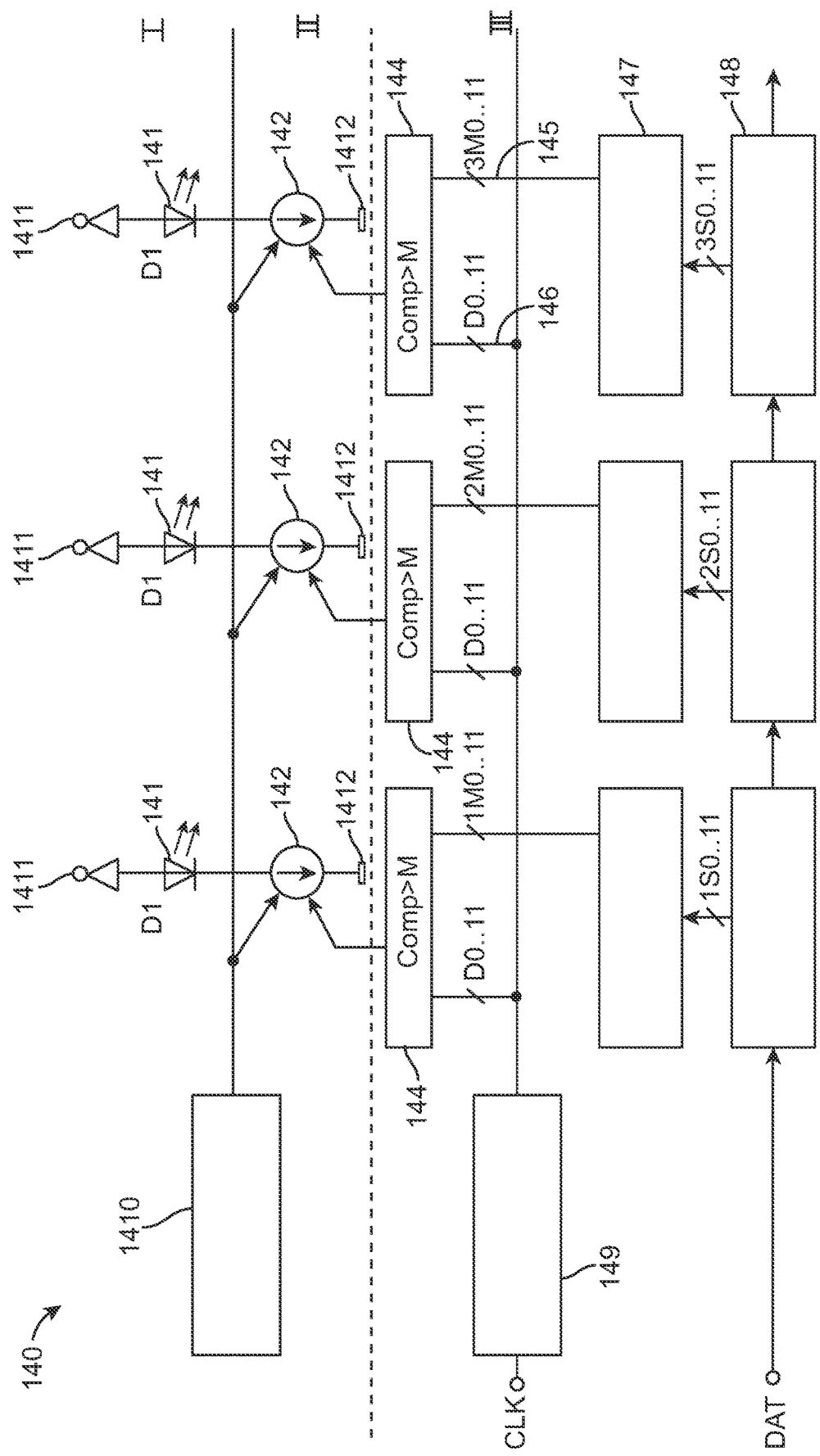
FIG. 49A illustrates a circuit diagram for a control circuit of one or more LEDs, taking into account the requirements for geometry and size.

FIG. 49A illustrates a general overview of digital and analogueue concepts of the three essential parts of a μ-LED display array with its main functionality. Sections I and II concern analogueue sections of the μ-display with a plurality of pixels arranged in rows and columns. Each pixel 141 can either consist of subpixels with different colors. Alternatively, displays with pixels of similar size can be used to obtain the different colors. The μ-LED display is implemented in this embodiment as a monolithic display comprising a first substrate carrier on or in which the μ-LED pixels are integrated. However, other designs, in particular, the designs disclosed here, are also conceivable, including the antenna slot structure and the realization of the μ-LED in bar form or in modules.

In some cases, the first substrate carrier also includes the circuit for the analogueue section II. In an alternative, the substrate of the μ-LED is thinner and comprises a large number of contacts on its underside. The contacts on the underside are then bonded or otherwise attached to a carrier that includes the analogueue section II. Alternatively, the analogueue section II can be grown on a thinned substrate that also carries the μ-LED pixels on the other side. Such an approach can reduce misalignment between the analogueue section and the μ-LED pixels. On the other hand, a material system is required that is suitable for integrating an analogueue circuit.

The analogueue section II of the arrangement contains the control for the current through the respective pixels. For this purpose, each pixel 141 with its anode contact is brought into contact with a common source potential 1411. The respective cathode of the μ-LED pixels is connected to an adjustable driver, which in this case is implemented as current source 142, which is integrated in section II and in turn connected to terminal 1412. In this design, a common anode contact is thus realized. Cover electrodes as disclosed in this application may provide such a function. However, the other case of a common cathode also exists. In this case, the μ-LED is located between cathode potential terminal 1412 and the current source. The advantage of such an arrangement is that the supply voltage can be somewhat lower and the μ-LED does not have to process a large input voltage.

Section II also includes a reference current source 1410, for example a temperature-stabilized current mirror or the like, to supply the same reference current to the respective current sources 142. While only one current source is shown in this example, multiple reference current sources may be used to provide a respective reference current for different pixels. For example, each pixel line can be assigned to a reference current source. If such reference current sources are switchable, the current sources for each row can be switched on or off periodically, thus reducing power consumption. In terms of embodiments, Section II is manufactured in polysilicon, which thus comprises a different material system than that used for the realization of the μ-LEDs in Section I.

In addition to the reference current supplied to each of the current sources 142, the current sources also include a switch input to work selectively with each current source and then separately with each pixel. Switching the current sources using PWM techniques to adjust the brightness of each pixel, as explained, further reduces overall power consumption. The PWM signal is generated in digital section III of the array.

The digital section III comprises a clock input CLK and a data input DAT. The data input DAT is coupled to 12-bit shift registers 148, which are connected in series. The shift register receives the incoming data stream and delivers a corresponding word to a 12-bit memory 147 for storage. The 12-bit memory may comprise flip-flops or a similar circuit to store the 12-bit words in memory. The memories are coupled to the other input of each comparator 144. In this way, a data stream can be used to store temporarily a whole series of brightness values in the flip-flops of memory 147.

The clock signal at input CLK defines the clock for a counter 149 that supplies a 12-bit counter word D0 . . . 11. Counter word D0 . . . 11 is applied to the respective comparators 144, which are connected to the current sources 142 of each μ-LED pixel. In an alternative embodiment, other components can also be used if necessary, for example, a combination of different gates, which check whether counter word D0 . . . 11 is smaller than the word of the memory connected to it.

When operating such an arrangement, comparator 144 compares counter word D0 . . . 11 with the memory word, i.e. the contents of the 12 bit memory. Depending on the result, for example whether the comparison with the comparator indicates whether the counter word D0 . . . 11 is larger or smaller than the memory word, the current source is switched on or off. In other words, the comparison with the comparator results in a pulse width based on the clock signal in counter 149 to operate each pixel. For example, the first pixel in the displayed chain should have a dark value, i.e. be switched off, the second pixel should have a light value or be completely switched on. The data stream then has the following relevant string of zeros and ones in two words, strung together in the form of "000000000111111111111". After the words are stored in one of the two memories 147 each, they are sent in inverted form to the comparator 144. The comparison is made in the comparator. As long as the counter word D is smaller than the memory word M, the driver remains switched on (in the example with the inverting comparator, "111111111111" and "000000000000" are thus compared with the counter word).

The μ-LED display array contains different parts that have different requirements and limitations, making it difficult to implement in a single semiconductor material. Nevertheless, the main challenge is the size predefined by the pixel size of the μ-LED. Transistors or other active elements in the analogueue or digital part face this limitation, which excludes certain implementations.

Figure 49B:
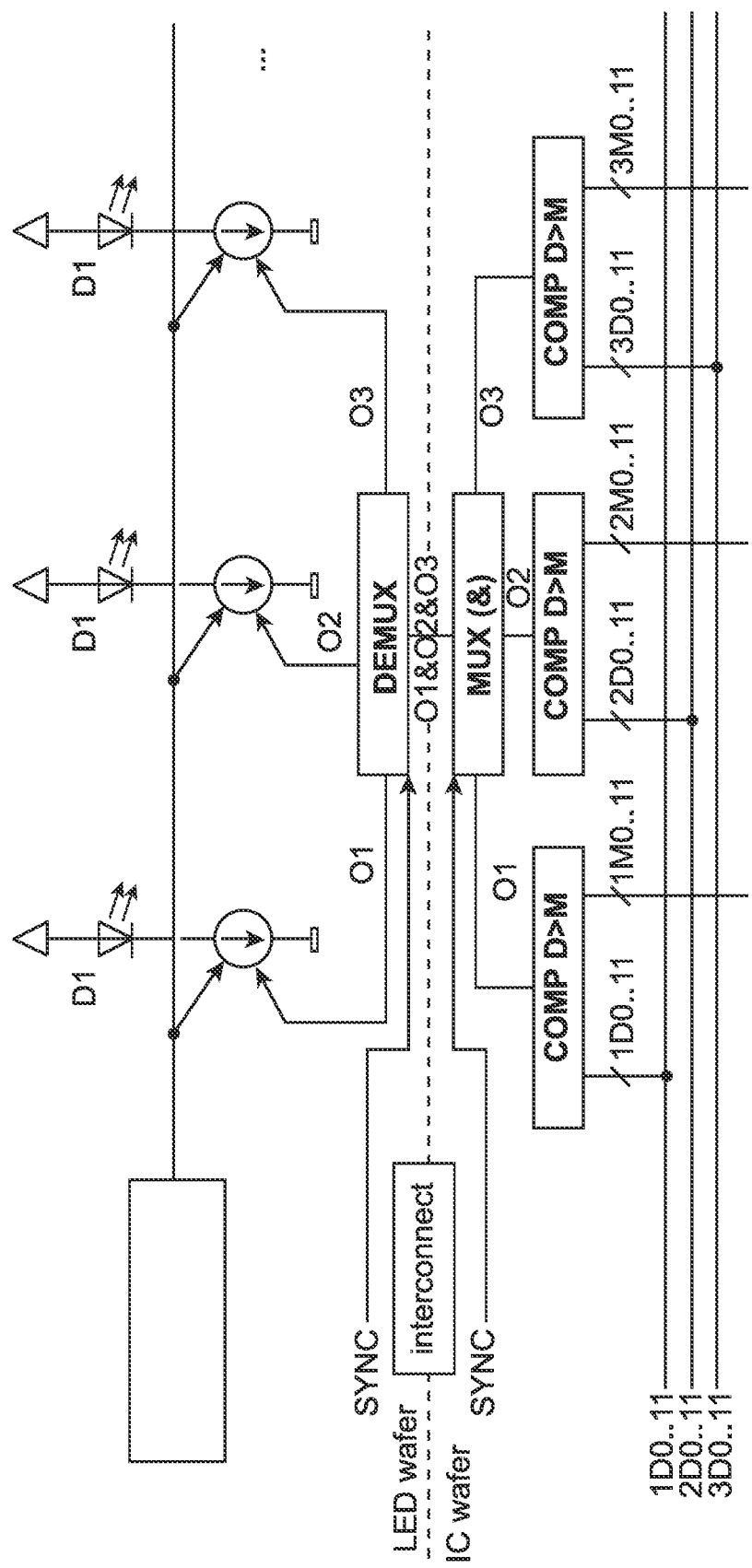
FIG. 49B shows an alternative embodiment of a schematic diagram of a driver circuit for several µ-LEDs, taking into account the requirements for geometry and size.

FIG. 49B shows another version of the three sections of a μ-LED display arrangement with its main functionality. While the first section is essentially the same as the corresponding section I of FIG. 49A, section II is slightly different. Section II now includes a DEMUX Demultiplexer, which switches between the different pixels using a higher clocked sync signal Sync. The frequency of this signal Sync has a higher frequency than the refresh rate and depends on the number of signals O1 to O3 generated by the DEMUX demultiplexer. In one configuration, the demultiplexer controls all pixels of a row or a column. In an alternative configuration, a demultiplexer can be used for each subpixel of a pixel. Combinations of these are also possible. This allows the number of necessary contact areas between section II and section III to be reduced.

Section III again comprises a multiplexer between the outputs of the respective comparators Comp. D>M and the demultiplexer of the second section II. The synchronization signal Sync is the same as for the demultiplexer in section II and is generated together. Another change compared to the execution of FIG. 49A is that the counter word (D0 . . . 11) determining the PWM modulation for the individual comparators is fed directly to the comparators individually and not jointly. In contrast to the embodiment of FIG. 49A, the implementation of a multiplexer and demultiplexer has the advantage that the number of interconnects, i.e. the number of connections between the purely digital section III and section II can be reduced. In contrast, an additional higher-frequency synchronization signal must be routed between Sections III and II via one of these interfaces.

Figure 49C:
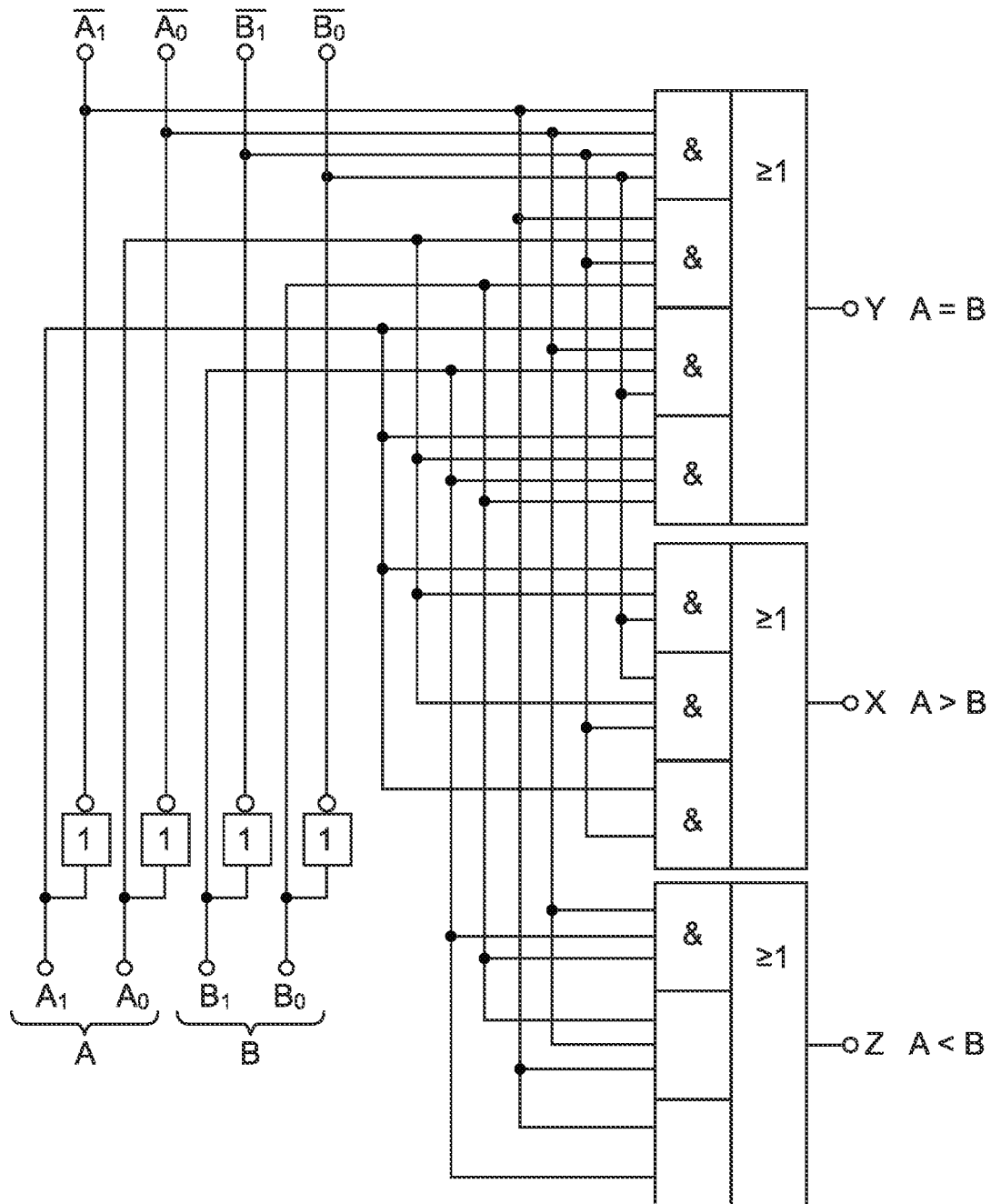
FIG. 49C shows a version of a comparator circuit, as it can be used in a comparator instead of an OR gate as used in FIG. 49A.

FIG. 49C shows a functional circuit diagram of a version of a known comparator, as it can be used in parts in principle in the embodiment of FIGS. 49A and 49B. The circuit represents a 2 BIT comparator, but can be extended to several bits. In practical implementation, the inverting inputs can also be omitted. Since there is also a comparison with the counter word, it is sufficient to implement the circuit part A>B or A<B.

Figure 49D:
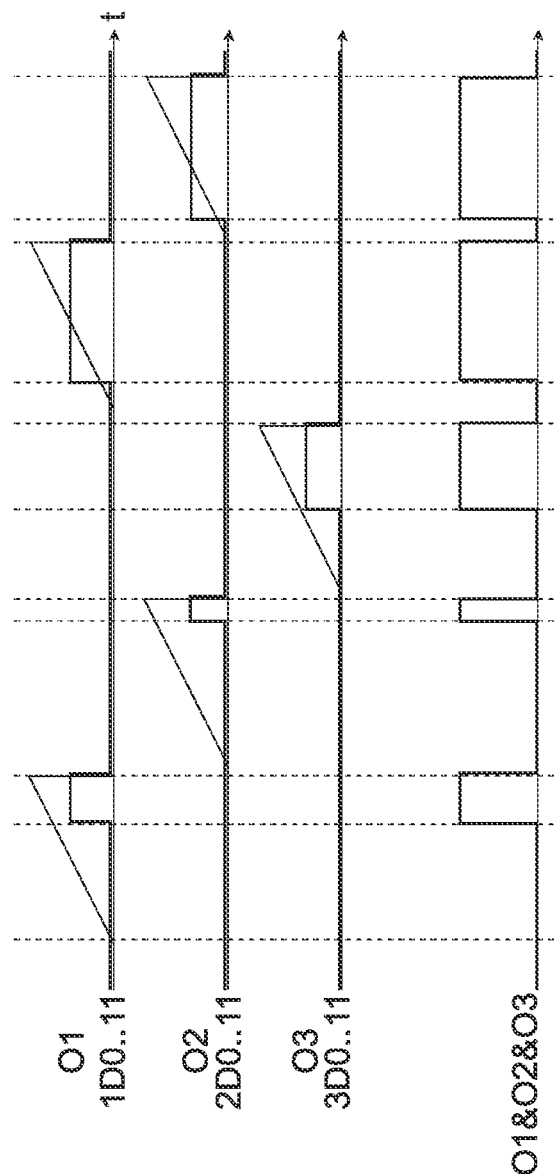
FIG. 49D shows a time diagram for the various counter words 1D to 3D and the memory registers as they are used to generate the output signal.

FIG. 49D shows a time diagram for the various counter words 1D to 3D and the memory registers as they are used to generate the output signal. The counter words D0 . . . 11 are time-shifted so that each time word starts when the previous one has passed through. With the comparator or an OR function the output signal O1 to O3 is generated, which is then fed to the multiplexer.

The μ-display arrangement comprises various parts with different requirements and limitations, making it difficult to implement in a single semiconductor material. A challenge also lies in the available space, which is essentially determined by the pixel size of the μ-LED. Transistors or other active elements in the analogueue and digital part are subject to this limitation, which excludes certain implementations.

Figure 50A:
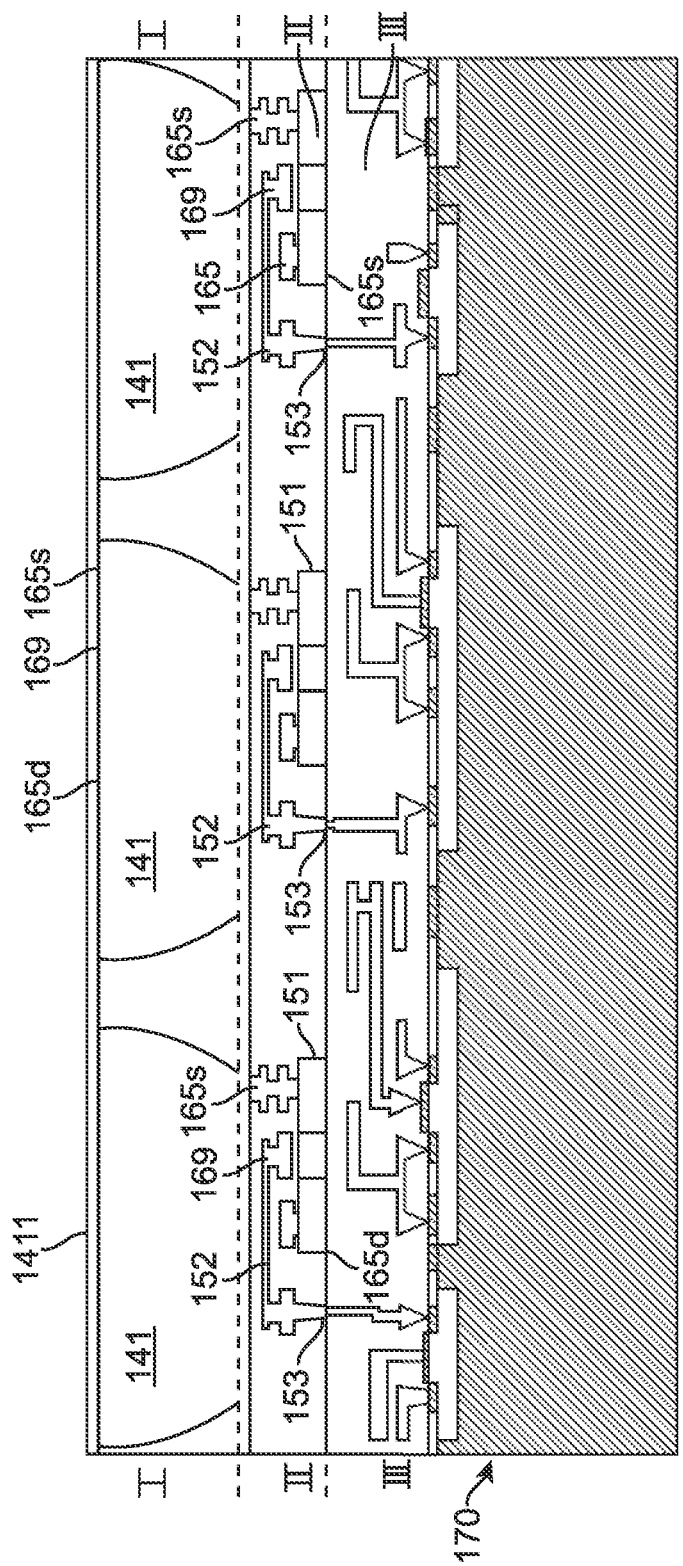
FIG. 50A shows a sectional view of a µ-LED display arrangement.

FIG. 50A shows an exemplary sectional view of a μ-display to illustrate different aspects of contacting and wiring of the individual sections. Similar to FIG. 49A or 49B, the μ-display comprises a μ-LED section I, an analogueue section II and a digital section III. The μ-LED portion is based on GaN, InGaP or another semiconductor material capable of emitting light of blue, red or green color. The μ-LED section I comprises the common cathode or anode (+) contact layer 1411 extending on the upper surface and connecting each of the active regions of the μ-LED pixel 141. Not shown is an additional out-coupling or light-shaping structure on the surface of layer 1411, which may include photonic structures, converters or the like.

The pixels are arranged in a substrate and are optically and electrically separated from each other so that their emission does not disturb neighbouring μ-LED pixels and the pixels can be controlled separately. For example, μ-LED pixel 141 can be implemented using the current limiting doping described above.

In this case, the current flow is limited to a smaller area by doping. The doping changes the band gap so that the charge carriers are effectively limited. Examples of such limitations or other structural measures to improve quantum efficiency and/or radiation characteristics are disclosed in the other sections. The pixels may also contain LED nanorods arranged in a slotted antenna structure, as also described above. Also bars or the other μ-LED structures disclosed in this application are conceivable.

The underside comprises in some areas an insulating material to prevent leakage current. The surface is shaped in such a way that area II is aligned so that the elements are mainly below the respective pixel element. Each μ-LED pixel includes a contact area facing area II, which forms the connection to area II of the μ-LED display.

The analogueue section II of the μ-display of FIG. 50A can be implemented from or based on the same semiconductor material system. For example, active and passive components used for the power sources can be implemented in GaN InGaP or InAlP systems, provided that space requirements can be met. In such cases, the forming of the components can be achieved using several conventional deposition techniques. This has the advantage that contacts of the μ-LED pixels in the interface of section I can easily be aligned with the traces within section II. Stress and strain due to different temperature coefficients can also be minimized. Alternatively, section II is formed with a different semiconductor material. For example, polycrystalline silicon or amorphous silicon structures are suitable and are understood to form small components. Both sections can be formed, aligned and joined separately.

Due to the size requirements, the alignment must be very precise, as the size of the contacts of the μ-LED can only be in the range of a few nm$^2$. As a further alternative, polysilicon material can be deposited on the lower surface layer by various growth processes to form subsequently the required circuit components. To reduce the voltage, one or more sacrificial layers can also be implemented. Furthermore, the polysilicon layer can be formed first, and then the μ-LED pixels can be formed using the desired material system. In the present example, different material systems are used for area II and I, but the expansion and other parameters are adapted so that a joint production is possible.

For this purpose, section II is manufactured with polycrystalline silicon. Polycrystalline silicon or amorphous silicon structures are well understood to form particularly small dimensioned components. For this purpose, polysilicon material is applied to a suitable carrier and the necessary components are formed in it. To reduce the thermal expansion, several intermediate or sacrificial layers are provided, which do not take over any further function, but adapt the thermal parameters by the different crystal structure. Such layers are also located between area II and area I. There a change of the material system to the material system intended for μ-LED pixel production takes place. Then the μ-LED pixels are formed.

Alternatively, all sections can be formed separately, aligned and then bonded together. Due to the size requirements, the alignment must be very precise, because the size of contacts of the μ-LED may only be in the range of a few pmt.

Depending on complexity, area II as illustrated in FIG. 50A by elements 151 and interconnection layers 152 contains one or more transistors that are part of a power source or switch. Interconnection layers 152, arranged in several layers of Section II, connect the contacts on the surface of Section II to the various components in Section II. For example, contact 165s of transistor 152 is connected to the top contact via an interconnection layer and to the corresponding μ-LED. Similarly, gate contact 169, which controls transistor switching or resistor behaviour, is coupled to contact interface 153 on the bottom surface of the portion adjacent to Digital Section III.

Digital section III is based on silicon and comprises some digital circuits 170. It is normally formed separately and then electrically connected to the analogueue section II by a bonding process. Forming the digital and analogueue sections separately allows for optimized manufacturing techniques and testing of the analogueue and μ-LED sections prior to bonding to the digital section. Similar to the analogueue section, the digital section III contains some interconnections for digital and analogueue signals. Power may also be provided via the digital section III.

The small space available may require different setups and implementations. One aspect is the integration of transistors within the analogueue section to form the power source and control circuitry. FIG. 51 and FIG. 52 illustrate various examples of the implementation of field effect transistors with small space requirements in the semiconductor material.

FIG. 51 illustrates an inverted stacked transistor formed with amorphous silicon. The transistor has an insulating gate layer 155 formed of SiN over gate contact 156. The gate contact 156 is shaped by a small bump so that the gate layer 155 follows the bump, which has a central region 157 and two sloping sidewalls 158. A layer of amorphous silicon 154 is formed over the gate layer, thus also forming a central area and two sloped sides. The surface of the amorphous layer 154 can be highly n-doped to form a highly n-doped layer of amorphous silicon 151 with high conductivity. Alternatively, the highly n-doped layer 151 is deposited on layer 154.

Finally, a metal layer is applied to the n-doped layer 151, which also extends to the side edges of the silicon layer 154 and SiN layer 155. A gap in the metal layer and the layer 151 divides the structure and thus forms a source and a drain contact. In particular, metal layer 152 forms a drain contact, while metal layer 153 forms the source contact of the field effect transistor. The conductive channel is then formed in the polisilicon layer in the central region between source and drain. The highly n-doped polysilicon layer 151 provides a good electrical connection to the channel in layer 154. This structure allows the gate to be contacted from a side other than source and drain, taking up very little space.

FIG. 52 shows two examples of space-saving polysilicon transistors. The transistors are formed on a glass carrier with a grown $SiO_2$ layer as base substrate. Each transistor comprises two highly n-doped polysilicon regions 165s and 165d, separated by an undoped polysilicon layer 170, which is located between the regions 165s and 165d. Adjacent to the drain region is a lightly doped drain region 166, which is located between the polysilicon region 170 and the drain region 165d.

Alternatively, a gold-doped region 167 is formed between polysilicon 170 and drain region 165d. The source 165s, drain 165d and undoped areas 170 are then completely covered by a $SiO_2$ layer, which extends on the sidewalls of the areas 165s and 165d respectively. Holes are etched over areas 165s and 165d to gain access to the source and drain areas. The holes are filled with a metal, for example Al, to create electrical contacts. The contact also runs over the sidewall of the $SiO_2$ layer, creating a larger area for contacting. In the center above the polysilicon layer 170 a gate is formed by applying an aluminum layer 169 on top of the insulating $SiO_2$ layer. Gate 169 is electrically insulated from the metal contacts for source and drain.

The limited space available may also require new concepts for the implementation of control circuits. In conventional circuits for controlling LED displays, the pixels are arranged in addressable rows and columns. Each pixel consists of one LED of a certain color or alternatively of a triplet of three different LEDs. In the latter case, a pixel can also be referred to as a pixel containing three sub-pixels, each of which comprises an LED of a particular color.

Figure 50B:
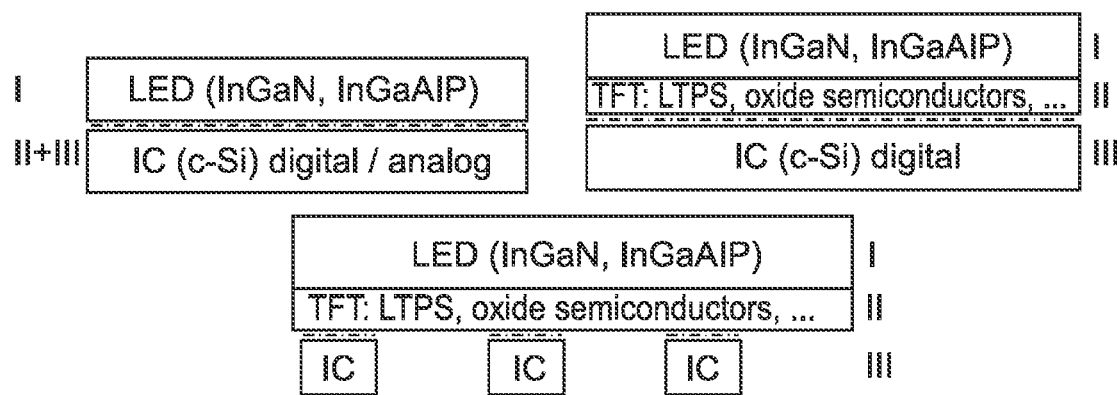
FIG. 50B shows various examples of how the different sections are connected after the execution of FIGS. 49A and 50A.

Referring again to the example of FIG. 49A or 49B, FIG. 50B shows various designs for connecting μ-LED structures to digital circuit sections. The two sections can be based on different material systems or technologies. The upper first section comprises the μ-LED elements or pixels or subpixels arranged in rows and columns. Depending on the desired color, different material systems and technologies are used, for example the materials InGaN and InGaAlP. In a first example, the wafer or μ-LED structure is connected to a wafer based on crystalline silicon using a W2 W (wafer to wafer) process, which includes the digital circuit section and any necessary analogueue sections. In the example of FIG. 49B, section I is realized by the upper wafer, the lower wafer comprises sections II and III. In the second example of FIG. 50B, thin film layers of polycrystalline silicon are deposited on the bottom of the first wafer with the first section at low temperatures. This section either provides pure interconnects to connect to the digital section III or additionally houses driver circuits or other components to drive the μ-LEDs. In these two examples, the wafers are interconnected together to produce the desired display or matrix. The third example shows an alternative embodiment, in which individual chips are provided with digital circuits and are operatively connected to section II. The chips include, for example, rows and column drivers for driving parts of the display.

Figure 54:
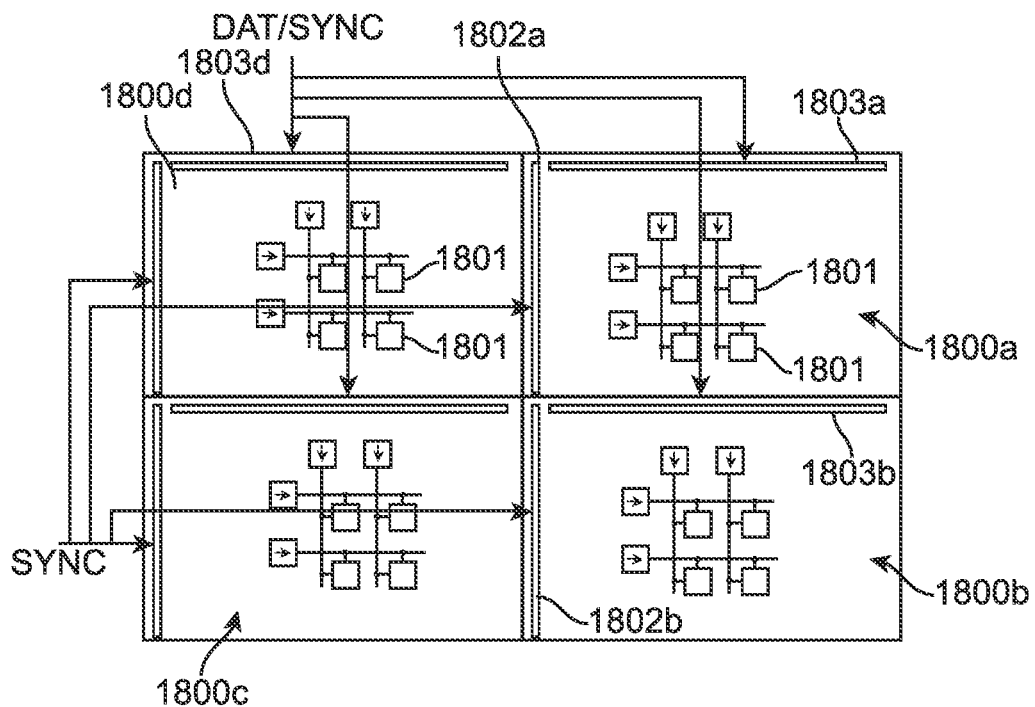
FIG. 54 shows a circuit diagram of a µ-LED display segmented into different sub-matrices.

FIG. 54 shows an embodiment described in more detail below. In this way, individual parts of the display can be controlled separately. In addition, this type of separation during production allows individual faulty circuits to be sorted out without having to replace the entire wafer in case of a fault in one element of the digital circuit in section III.

The limited space under the analogueue sections makes new concepts for the required implementation of digital control concepts. In conventional circuits for controlling LED displays, the pixels are arranged in addressable rows and columns. The same principle can also be applied in the present case. Each pixel has one LED of a certain color or alternatively a triplet of three different LEDs. In the latter case, it can also be called a pixel if it contains three subpixels, each of which comprises a μ-LED of a certain color.

Figure 53:
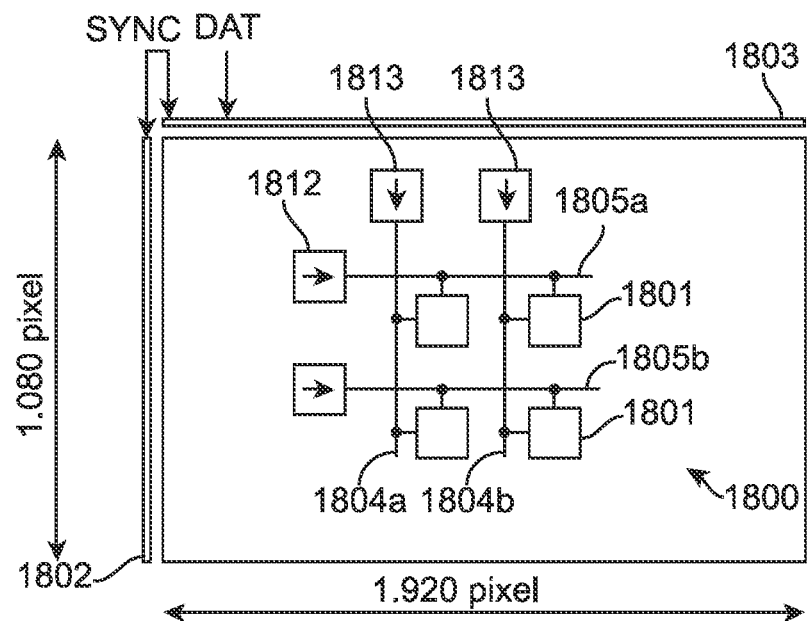
FIG. 53 shows a circuit diagram of a µ-LED or LED display.

FIG. 53 shows a diagram with the elements required to address a conventional LED display. For simplicity, only one color type is shown, although each pixel contains three LEDs with different colors. The pixels are arranged in addressable columns and rows. The display comprises an 1800 pixel matrix with 1920 pixels per row and 1020 lines. The pixel matrix was constructed in a monolithic way. The display has several line drivers 1802 and several column drivers 1803 to address each pixel in the pixel matrix individually. Both driver types can be integrated into the matrix or provided as external components coupled to the matrix via an interface. A combination is also possible.

Each of the line drivers 1812 has an individual driver device that is coupled to a corresponding line 1805$a$, 1805$b$ and drives the current through it. Likewise, each column driver has a driver element 1813, each driver element being connected to a data line 1804$a$, 1804$b$. Pixel drivers 1801 are located at the intersections of the rows and columns. The pixel driver 1801 is connected to the rows and columns and drives the corresponding pixel.

The display includes some control and address signals from external components, two of which are specially marked here, namely DATA and SYNC. The latter signal SYNC is used to synchronize the row and column drivers with each other to avoid artefacts and ensure clean programming. By addressing a corresponding row, the pixels connected to the corresponding row are selected. The DATA signal is then applied to the appropriate columns to program each of the pixel drivers 1801 in the selected rows.

In the case of a display with a large number of pixels, the clocking for conventional display programming can lead to high frequencies for the programming signal. For example, in the display of FIG. 53, the frequency for the programming frequency per bit and row may be several MHz depending on the color depth of each subpixel in the range. For example, with a brightness depth of 10 bits, corresponding to 1024 different illumination values, the programming frequency for 1080 display lines and a frame rate of 60 Hz is about 66 MHz.

The table below shows the frequency of the programming signal and the programming time per bit and row in μs. With increasing color or illumination depth, the PWM time units for programming and therefore the programming frequency increases.

| Color bits | PWM units | Programming time in μs | Programming frequency (MHz) |
| --- | --- | --- | --- |
| 8 | 255 | 0.06 | 17 |
| 10 | 1023 | 0.02 | 66 |
| 12 | 4096 | 0.00 | 265 |
| 14 | 16383 | 0.00 | 1062 |

The very short programming time, especially with high color or illumination bits (i.e. 12 bits or 14 bits), leads to a high load on the corresponding line and column drivers. In the extreme case of a change from white to black or vice versa of a single pixel, the column driver must reprogram (reload) the pixel in a few ns. For comparison, ultramodern DDR4 rams run at an internal frequency of about 800 MHz to 1.5 GHz, i.e. in the range of the programming frequency of 14 bit illumination depth.

In order to reduce the programming frequency, the rising and falling clock edge can be used for programming, as similarly in memories. It is also possible to segment the display and divide the display matrix into different segments. Depending on the production technology, segmentation allows individual segments to be tested separately, so that they can be replaced in the event of errors.

FIG. 54 shows an example where a display of 1920×1080 pixels is segmented into a 2×2 matrix with sub-displays. Each subdisplay 1800$a$ to 1800$d$ contains a pixel matrix of 960×540 pixels. Similar to the display in FIG. 53, each subdisplay comprises its own column and row drivers 1802$a$, up to 1802$d$, and 1803$a$ to 1803$d$. DATA and SYNC signals are also supplied to the respective segments. The smaller number of lines reduces the programming frequency accordingly. Further segmentation of the columns as shown in FIG. 54 will also reduce the demand on the column drivers and the load with each programming cycle is reduced. The following table shows an example of programming time and programming frequency for 108 display rows per segment (there are 10 such segments in total, again with a refresh rate of 60 Hz.

| Color bits | PWM units | Programming time in μs | Programming frequency (MHz) |
| --- | --- | --- | --- |
| 8 | 255 | 0.61 | 1.7 |
| 10 | 1023 | 0.15 | 6.6 |
| 12 | 4096 | 0.04 | 26.5 |
| 14 | 16383 | 0.01 | 106 |

As shown, the reduced number of lines due to segmentation reduces the requirements for programming time and programming frequency by roughly the factor of segmentation. Each of the segments is implemented in a similar way. Each pixel matrix 1800, 1800$a$ to 1800$d$ contains lines and rows on which the pixel drivers and light emitting devices are arranged.

FIG. 55 shows an example of a conventional pixel driver such as a 2T1C structure in which the current through the LED is controlled by a charge programmed during the blanking time of the display. The driver is located at the interface of a line 1805 and a data line 1804. Furthermore, a supply line 2002, which provides a supply voltage $V_{DD}$ and a current $I_{DAC}$, is coupled to the light emitting device 2004 via a driver transistor 2003. The driver transistor 2003 thus operates as a controllable current source. The current through the driver transistor 2003 is controlled by the 1T1C structure 2002. In particular, a field effect transistor M2 has its gate connected to the line selection line for programming and acts as a switch.

When activated by a "HIGH" signal on the line selection line, transistor M1 closes and data line 1804 charges capacitor C1 to the desired level. During this programming, the power supply line may be switched off that the light emitting device is basically off. This will prevent various artefacts during programming. After reprogramming, transistor M2 is open again and the charge stored in the capacitor drives current transistor M1 so that a current flows through the light emitting device. The current corresponds to the stored charge and thus to the desired lighting level.

Figure 56:
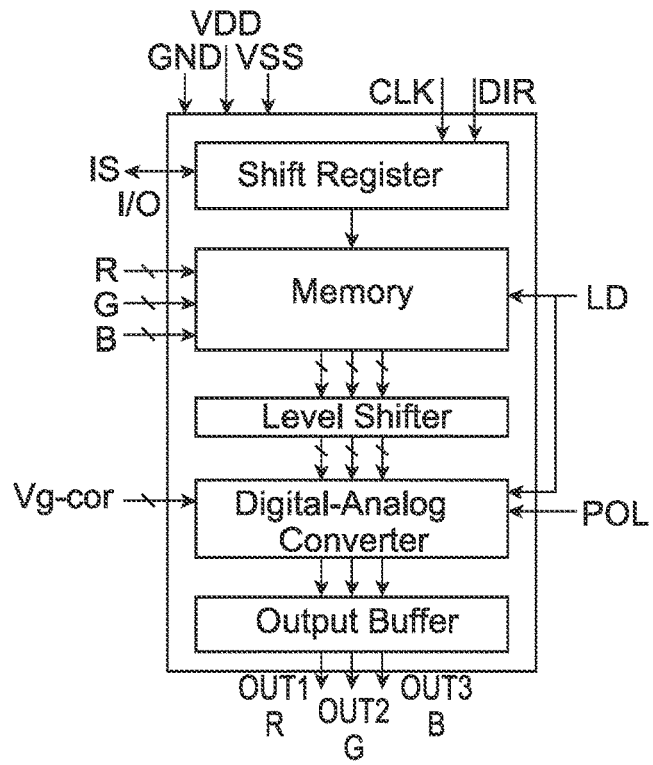
FIG. 56 illustrates a version of a conventional gap driver suitable for use in a display.

FIG. 56 shows the schematic for a conventional column or data driver. The driver comprises a digital section and an analogueue section to drive the corresponding data lines. Alternatively, the output can control dedicated drivers for the data lines. Apart from power supply connections in GND, VDD and VSS, further control signals CLK and DIR are provided. Digital values R, G and B for the different colors are stored in a buffer. They are forwarded and processed by a level shifter and then fed to a digital-analogueue converter. The DAC can also correct some values by using a separately generated correction signal Vg-cor. After conversion to analogueue signals, they are stored in an output buffer and then applied to an output buffer. The analogueue rgb signals are then applied to the data lines. Although only 3 data output lines are shown here, the column data driver provides signals for all data lines in the display matrix.

Figure 57:
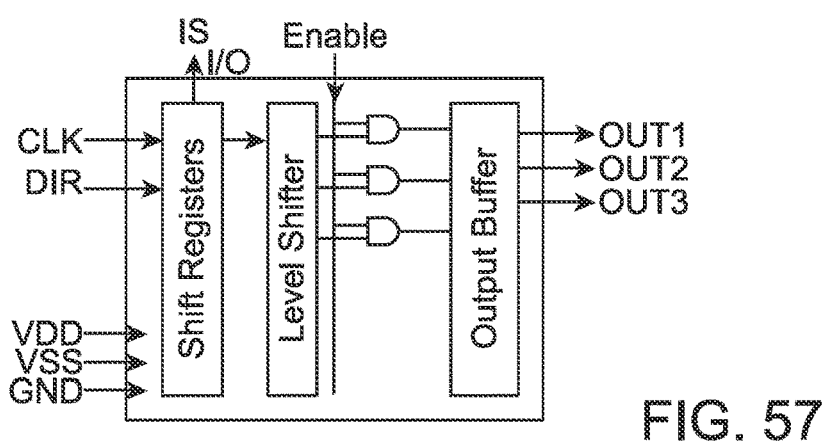
FIG. 57 shows a version of a conventional line driver suitable for use in a display.

FIG. 57 shows an example of a conventional line driver. The driver comprises a shift register that receives the CLK and DIR signals and is coupled to a large number of logical AND gates via a level shifter. The gates also receive an ENABLE signal, to which the corresponding outputs in the output buffer go HIGH. During operation, the shift register shifts the bits with each CLK signal to apply selectively a HIGH signal to one of the corresponding gates. The ENABLE signal is required to activate globally line selection during reprogramming.

Figure 58:
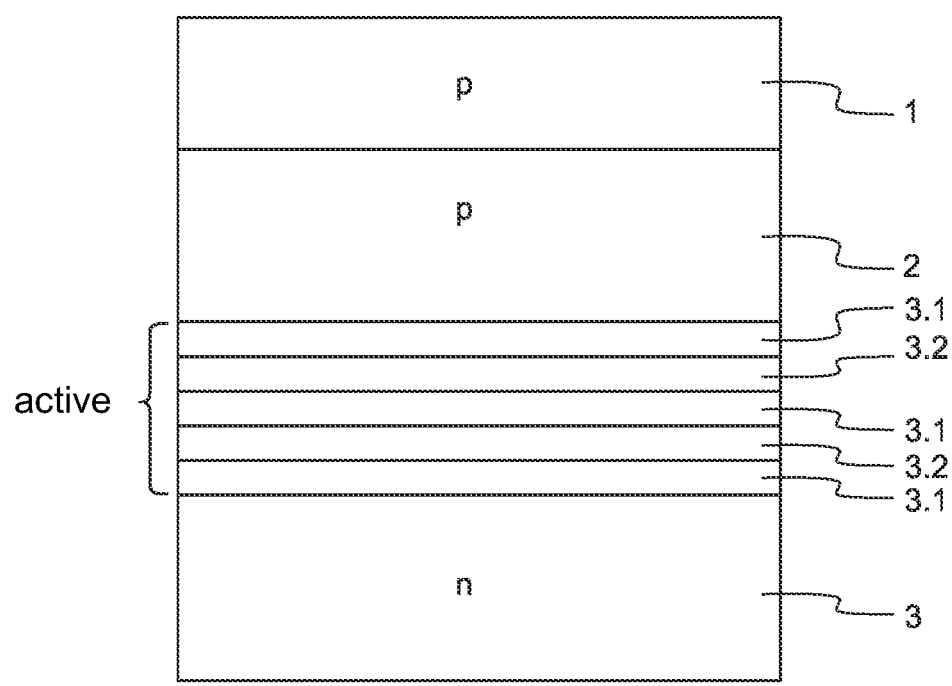
FIG. 58 is an embodiment of a semiconductor layer stack with quantum well structure

FIG. 58 generally shows a possible embodiment of a semiconductor layer stack. This comprises an n-doped layer 3, which is epitaxially deposited on a substrate not shown. The n-doped layer 3 is followed by the active region. This contains a multiquantum well structure with the quantum well layers 3.1 and 3.2. The multiquantum well structure can have a plurality of such successive layers, which are also formed with different material systems. Adjacent to this is the p-doped layer 2, followed by a current widening layer 1.

In the following, various devices and arrangements as well as methods for manufacturing, processing and operating as items are again listed as an example. The following items present different aspects and implementations of the proposed principles and concepts, which can be combined in various ways. Such combinations are not limited to those listed below:

836. Device for electronic control of a µ-LED pixel cell, in particular created with NMOS technology, comprising
   a data signal line, a threshold line and a selection signal line;
   a µ-LED electrically connected in series to a dual-gate transistor and together with it between a first and second potential terminal;
   wherein the dual-gate transistor is arranged with its current conduction contacts between a terminal of the µ-LED and a potential terminal, and a first control gate of the dual-gate transistor is connected to the threshold line;
   a selection hold circuit comprising a capacitor coupled to a second control gate of the dual-gate transistor and to a current conduction contact of the dual-gate transistor, and a control transistor having its control terminal connected to the selection signal line.

837. Device according to item 836,
   the dual-gate transistor comprising a backgate transistor in which the backgate forms the first control gate.

838. Device according to item 836 or 837, where the first control gate of the dual-gate transistor is configured to set a threshold voltage.

839. Device according to any of the preceding items, in which the dual-gate transistor comprises a thin-film transistor with two opposite control gates.

840. Device according to any of the preceding items, which is configured in such a way that a switching signal (PWM signal) is applied to the threshold line during operation.

841. Device according to any of the preceding items, in which a first terminal of the µ-LED is connected to the first potential terminal; and in which the dual-gate transistor is arranged with its current conducting contacts between a second terminal of the µ-LED and the second potential terminal; and the capacitor is connected to the second control gate of the dual-gate transistor and to the second terminal of the optoelectronic component.

842. Device according to any of the preceding items, in which the first terminal of the µ-LED is connected to a second current line contact of the dual-gate transistor and its second terminal is connected to the second potential terminal;
   the dual-gate transistor with its current line contacts is located between a first terminal of the µ-LED and the first potential terminal;
   the capacitor is connected to the second control gate of the dual-gate transistor as well as to the first potential terminal.

843. Device according to any of the preceding items, in which
   the first terminal of the µ-LED is connected to the first potential terminal;
   the dual-gate transistor with its current line contacts is arranged between a second terminal of the µ-LED and the second potential terminal;
   the capacitor is connected to the second control gate of the dual-gate transistor and to the second potential terminal.

844. Device according to any of the preceding items, in which the selection hold circuit comprises another control transistor.

845. Device according to item 844, in which the further control transistor is connected in parallel with the µ-LED and its control terminal is connected to the selection signal line.

846. Device according to item 845, in the case of the dual-gate transistor is configured as a transistor with one gate providing the second control gate.

847. Device according to any of the preceding items, in which the charge storage is connected to the second control gate of the dual-gate transistor and to the first potential terminal, and further comprising:
   a temperature compensation circuit with a negative feedback based on the detection of a forward voltage by the µ-LED, the temperature compensation circuit being configured on the output side to output a signal on the threshold line.

848. Device according to item 847, in which the temperature compensation circuit comprises a control path arranged in parallel with the dual-gate transistor and having two paths connected in series.

849. Device according to item 847, in which the threshold line is connected from a node between the two controlled paths provided by a third control transistor and a fourth control transistor, to the first control gate of the dual-gate transistor.

850. Device according to item 849, in which the control terminal of the fourth control transistor is connected to the second potential terminal.

851. Device according to any of items 847 to 850, in which the temperature compensation circuit comprises a second charge storage device connected to a control terminal of a control transistor providing one of the two paths and to the first potential terminal.

852. Device according to item 851, in which
a second data signal line for programming a negative feedback factor is provided, which is coupled to the second charge storage and the third control transistor.
853. Device according to item 852, in which the coupling is established via a fifth control transistor controlled by a second selection signal line.
854. Device according to any of the items 847 to 850, in which the temperature compensation circuit is connected to the second potential terminal via its third control transistor
855. Device according to any of the items, in which a fifth control transistor is connected in parallel to the μ-LED, on which a switching signal (PWM signal) is applied to its control terminal during operation.
856. Device according to any of the preceding items, in which the transistors are field-effect transistors using NMOS technology.
857. Method of operating a device according to any of the preceding items, wherein an analogueue data drive signal for color control of the μ-LED is applied to the μ-LED via the selection hold circuit by means of the selection signal, and brightness control of the μ-LED is effected by means of a coupled pulse width modulation signal.
858. Use of a device according to any of the items 836 to 856 for driving a μ-LED or m-LED array or optoelectronic device according to any of the preceding items.
859. Driver circuit for driving a plurality of optoelectronic elements, comprising:
a plurality of first memory cells, each comprising a set input,
a reset input and an output,
wherein each first memory cell at said output is triggered to a first state by a set signal at said set input and maintains said first state until reset to a second state at said reset input, and
wherein the output of each first memory cell is configured to control a respective one of said optoelectronic elements.
860. Driver circuit according to item 859, wherein each first memory cell provides a pulse width modulation signal, PWM signal at the output, and the PWM signal controls a switch configured to switch a current through the respective optoelectronic element on and off.
861. Driver circuit according to any of the preceding items, wherein each first memory cell comprises two cross-coupled NOR gates or two cross-coupled NAND gates.
862. Driver circuit according to any of the preceding items, each first memory cell comprising an NMOS transistor and a PMOS transistor connected in series, and an inverter having an input connected between the NMOS transistor and the PMOS transistor and an output connected to the gates of the NMOS and PMOS transistors.
863. Driver circuit according to any of the preceding items, further comprising a plurality of counters each configured to activate a set signal when a data value is loaded into the respective counter and to activate a reset signal when the respective counter reaches the loaded data value.
864. Driver circuit according to any of the preceding items, further comprising a common counter configured to generate a common dimming signal for the plurality of optoelectronic elements.
865. Driver circuit according to any of the preceding items, further comprising a plurality of second memory cells, each second memory cell being coupled to a respective one of the first memory cells and configured to override an output signal of the respective first memory cell as necessary to leave the respective optoelectronic element turned off.
866. Optoelectronic device, comprising:
a plurality of optoelectronic elements, in particular μ-LEDs or μ-LED arrangements according to any of the preceding items, and a driving circuit for driving the plurality of optoelectronic elements according to one of the preceding items.
867. Optoelectronic device according to item 866, where the optoelectronic elements are μ-LEDs.
868. Method of operating an optoelectronic device according to item 866, comprising the following steps performed in the specified order during a frame:
switching off all optoelectronic elements;
controlling the optoelectronic elements that darken during framing by means of the second memory cells; and
controlling the current through the optoelectronic elements by means of the first memory cells.
869. Method according to item 868, in which a common dimming of the optoelectronic elements is carried out before the current through the optoelectronic elements is controlled by means of the first memory cells.
870. Control circuit for adjusting a brightness of at least one μ-LED, comprising a current driving element having
a control terminal, the first terminal of which is connected to a first potential;
a capacitor connected between the control terminal and the first potential and forming a capacitive voltage divider with a defined capacitance between the control terminal and the first terminal;
a control element adapted to apply a control signal to the control terminal during a first time period, on the basis of which a current flowing through the at least one μ-LED is adjustable during the first time period;
wherein during a second time period subsequent to the first time period, a current flowing through the μ-LED is determined by a reduced control signal formed by the control signal during the first time period and the capacitive voltage divider; and
the control element is arranged to provide a first or a second control signal during the first time period in order to operate the μ-LED at at least two different brightness levels.
871. Control circuit according to item 870, in which the current driving element comprises a field effect transistor whose gate forms the control terminal and the defined capacitance is a gate-source capacitance predetermined by design.
872. Control circuit according to any of the preceding items, in which the reduced control signal applied to the control terminal during the second time period is obtained from the control signal during the first time period and the ratio of a capacitance of the capacitor and the sum of the capacitance of the capacitor and the defined capacitance.
873. Control circuit according to any of the preceding items, characterised in that the control is set to operate the first and second time periods at a repetition frequency of 60 Hz or more.

874. Control circuit according to any of the preceding items, in which the control element comprises a control transistor at whose control terminal the first and second time periods are adjustable by means of a signal.

875. Control circuit according to any of the preceding items, in which a ratio of the second time period to the first time period is in the range of 300:1 to 100:1, in particular in the range of 100:1

876. Control circuit according to any of the preceding items, adapted to operate the μ-LED at a first, darker brightness level when a voltage of the first control signal is within a first voltage interval, and to operate the μ-LED at at least a second, brighter brightness level when a voltage of the second control signal is within a second voltage interval which is at least partially above the first voltage interval.

877. Control circuit according to item 876, characterized in that the first voltage interval is in the range of 1.3 V to 4.5 V.

878. Control circuit according to item 876 or 877, characterized in that the second voltage interval is in the range of 4.0 V to 10.0 V.

879. Method for adjusting a brightness of at least one μ-LED which is connected to a current driver element having a control terminal, the first terminal of which is connected to a first potential and in which a capacitor is connected between the control terminal and the first potential so that it forms a capacitive voltage divider with a defined capacitance between the control terminal and the first terminal, comprising the steps
applying a control signal to the control terminal during a first period of time, thereby adjusting a current flowing through the at least one μ-LED during the first period of time; and
switching off the control signal during a second time period following the first time period, whereby the current flowing through the μ-LED is adjusted by a reduced control signal formed by the control signal during the first time period and the capacitive voltage divider.

880. Method according to item 879, in which the reduced control signal applied to the control terminal during the second time period is obtained from the control signal during the first time period by the ratio of a capacity of the capacitor and the sum of the capacity of the capacitor and the defined capacity.

881. Method based on one of the preceding articles, in which a ratio of the second period to the first period is in the range 300:1 to 100:1, in particular in the range 100:1.

882. Method according to any of the preceding items, in which the μ-LED is operated at a first, darker brightness level if a voltage of the first control signal is within a first voltage interval, and the μ-LED is operated at at least a second, brighter brightness level if a voltage of the second control signal is within a second voltage interval which is at least partially above the first voltage interval.

883. Method according to any of the preceding items, in which the control signal is derived from a digital control word having a number n of bits, the n bits corresponding to the second control signal and the least significant m bits corresponding to the first control signal.

884. Use of a control circuit according to any of the preceding items for driving a μ-LED, μ-LED array or μ-LED module according to any of the preceding items.
O 885. Supply circuit, comprising:
an error correction detector having a reference signal input, an error signal input and a correction signal output;
a controllable current source with current output and a control signal terminal, the control signal terminal being connected to the correction signal output to form a control loop for the controllable current source, the current source configured to provide a current at the current output in dependence on a signal at the control signal terminal;
a substitute source with one output configured to provide a substitute signal;
a switching device which is configured to supply, depending on a switching signal, either a signal derived from the current at the current output or the substitute signal to the error signal input with additional disconnection of the current output of the current source 886. Supply circuit according to item 885, in which the substitute signal is substantially the same as the signal derived from the current signal.

887. Supply circuit according to any of the preceding items, in which the variable current source comprises a current mirror having a switchable output branch connected to the current output.

888. Supply circuit according to item 887, in which the output branch comprises an output transistor whose control terminal is connected via the switching device to a fixed potential for opening the transistor in dependence on a switching signal.

889. Supply circuit according to any of the preceding items, in which the adjustable current source comprises an input branch to which a reference current can be supplied and which has a node which is connected to the reference signal input of the error correction detector.

890. Supply circuit according to any of the preceding items, in which the controllable current source comprises a current mirror, the control signal terminal being connected to the control terminal of an output transistor of the current mirror.

891. Supply circuit according to any of the preceding items, in which the error correction detector comprises a differential amplifier, the two branches of which are connected together to a supply potential via a current mirror.

892. Supply circuit according to item 891, in which the two branches of the differential amplifier each comprise an input transistor, which have different geometric parameters.

893. Supply circuit according to any of the preceding items, in which the replacement source comprises an element coupled to the output for generating a voltage so that the replacement signal is substantially equal to the signal derived from the current signal.

894. Supply circuit according to any of the preceding items, in which the replacement source comprises a series connection of a current-generating element and a voltage-generating element, the output being disposed between the two elements.

895. Supply circuit according to any of the preceding items, in which the replacement source comprises a transistor whose control terminal is connected to the control terminal of the current mirror transistor of the current source.
896. Supply circuit according to any of the preceding items, in which the switching device comprises one or more transmission gates.
897. Supply circuit according to any of the preceding items, comprising a reference current mirror configured to supply a current defined on the input side to the error correction detector and to the current source on the output side.
898. Method for powering a µ-LED comprising:
   detecting of a supply current by the µ-LED;
   comparing the supply current with a reference signal and deriving a correction signal from the comparison;
   changing the supply current in response to the correction signal to control the supply current to a setpoint;
   switching off a supply current through the µ-LED and simultaneous supply of a substitute signal for the comparison step.
899. Method according to item 898, in which the substitute signal is substantially equivalent to a supply current through the µ-LED or a signal derived therefrom.
900. Use of a supply circuit according to any of the preceding items for supplying a µ-LED or µ-LED device, in particular according to any of the preceding items, which is operated by a signal which pulse-width modulates the power supply.
901. Arrangement with
   the supply circuit implemented in a substrate according to any of the preceding items; and
   a µ-display according to any of the preceding items or comprising a matrix of pixels arranged in rows and columns and having at least one µ-Led or µ-LED array according to any of the preceding items.
902. Display matrix control circuit comprising a plurality of light emitting devices arranged in rows and columns, comprising:
   a row selection input for a row selection signal and a column data input for a data signal;
   a ramp signal input for a ramp signal having a level between a first value and a second value and a trigger input for a trigger signal;
   a column data buffer configured to buffer the data signal in response to the row select signal;
   a pulse generator coupled to the column data buffer and said ramp signal input and configured to provide a buffered output signal to control the on/off ratio of at least one of said plurality of light emitting devices in response to the trigger signal, the data signal and the ramp signal.
903. Control circuit according to item 902, wherein the pulse generator comprises
   comparator means for comparing the buffered data signal with the ramp signal; and
   an output buffer coupled to an output of the comparator device and the trigger input.
904. Control circuit according to object 903, wherein the output buffer comprises a flip-flop, in particular an RS flip-flop with its input coupled to the output of the comparator device and the trigger input respectively.
950. Control circuit according to any of items 902 to 904, wherein the column data buffer comprises a capacitor for storing the data signal and a switch disposed between the capacitor and the column data input.
906. Control circuit according to any one of items 902 to 905, the comparator device comprising a power control input coupled to the trigger input to adjust its power consumption based on the trigger signal.
907. Control circuit according to any one of items 902 to 906, wherein the comparator device is coupled to the output buffer to control its power consumption based on an output state of the output buffer.
908. Control circuit according to one of the items 902 to 907, wherein the comparator is coupled with its inverting input to the data column buffer and with its non-inverting input to the ramp signal input.
909. Control circuit according to any of the items 902 to 907, further comprising:
   a ramp generator for supplying the ramp signal to the ramp signal input, the ramp generator being configured to generate a signal varying between an initial value and a final value in response to the trigger signal.
910. Method of controlling the illuminance of a light emitting device in a matrix display having a plurality of light emitting devices arranged in addressable rows and columns, the method comprising
   providing a data signal for a selected row and at least one light emitting device;
   supplying a trigger signal;
   converting a level of the data signal to a pulse with respect to a trigger signal; and
   controlling the on/off ratio of the light emitting device with the pulse.
911. Method according to item 910, wherein the step of converting a level of the data signal comprises:
   generating a ramp signal between a first value and a second value;
   comparing the data signal with the ramp signal to generate a comparison signal;
   generating of a pulse based on the trigger signal and a change in the comparison signal.
912 Method according to item 910, wherein the generation of a pulse comprises setting a level of an output signal to a first value in response to a trigger signal and resetting the level of the output signal to a second value in response to the change in the comparison signal.
913. Method according to items 911 or 912, where the ramp signal is generated in response to the trigger signal.
914. Method according to any of the items 910 to 913, wherein delivery of a data signal comprises pre-buffering the data signal, in particular pre-buffering the data signal in a memory device.
915. Use of the control circuit according to any of the preceding items in a µ-display or for driving a µ-LED, µ-LED array or an array of µ-LEDS, in particular according to any of the items 94 to 111 or 7 to 50 and 484 to 536.
916. Device for electronically driving a plurality of µ-LEDs, comprising
   a first and at least one second branch each having a µ-LED connected therein and an electronic fuse arranged in series with the µ-LED, the first and the at least one second branch being connected to a potential terminal on one side;
   a driver circuit having a data signal input, a selection signal input and a driver output connected to the other side of the first and at least one second branch;

an imprinting component associated with the at least one second branch, which is designed to generate a current flow triggering the electronic fuse arranged in series.

917. Device according to item 916, in which
the μ-LED is configured according to any of the subsequent or preceding items; and/or
the μ-LED comprises a light-shaping or light-guiding element on its surface according to any of the subsequent or preceding items; and/or
the μ-LED of each branch comprises a common electrically conductive, in particular transparent, contact layer 918. Device according to any of the preceding items, characterised in that
the imprinting component comprises an imprinting transistor, which is electrically connected with its current line contacts in parallel with the μ-LED to which the imprinting transistor is assigned and whose control contact is connected to an imprinting signal line.

919. Device according to any of the preceding items, characterised in that
the imprinting component comprises an imprinting diode having one terminal connected to a second terminal of the μ-LED with which the imprinting diode is associated and the other terminal of which is connected to an imprinting signal line.

920. Device according to any of the preceding items, characterised in that
first terminals of the μ-LED are connected to a reference potential terminal;
a first transistor with its current conduction contacts is arranged between a common terminal of the fuses of the μ-LED and a supply potential terminal;
a charge storage device is electrically connected to a control contact of the first transistor and to a first current conduction contact of the first transistor.

921. Device according to any of the preceding items, characterised in that
second terminals of the μ-LED are connected to a supply potential terminal;
a first current conducting contact of a first transistor is connected to a reference potential terminal and a second current conducting contact of the first transistor is connected to a common terminal of the electrical fuses;
a capacitor is connected to a control contact of the first transistor and to the first current conduction contact of the first transistor.

922. Device according to any of the preceding items, characterised in that
second terminals of the μ-LED are connected to the fuse assigned to the μ-LED;
a first current conducting contact of a first transistor is connected to a reference potential terminal and a second current conducting contact of the first transistor is connected to first terminals of the μ-LED;
a capacitor is connected to a control contact of the first transistor and to the first current conduction contact of the first transistor.

923. Device according to any of the preceding items, characterised in that first terminals of the μ-LED are connected to a reference potential terminal;
a first transistor with its current line contacts is arranged between a common terminal of the fuses of the μ-LED and a supply potential terminal;
the charge storage device is electrically connected to a control contact of the first transistor and to a second current conduction contact of the first transistor.

924. Device according to any of the preceding items, characterised in that
first terminals of the μ-LED are connected to a first reference potential terminal;
a first transistor with its current conduction contacts is arranged between a common terminal of the fuses of the μ-LEDs and
a supply potential terminal;
a capacitor is electrically connected to a control contact of the first transistor and to a second current conduction contact of the first transistor, a first terminal of the imprinting diode being connected to a second terminal of the μ-LED and a second terminal of the imprinting diode being connected to the imprinting signal line.

925. Device according to any of the preceding items, characterised in that
first terminals of the μ-LEDs are connected to a reference potential terminal;
a first transistor with its current line contacts is arranged between a common terminal of the fuses of the μ-LEDs and a supply potential terminal;
a capacitor is electrically connected to a control contact of the first transistor and to a second current conduction contact of the first transistor, a second terminal of the imprinting diode being connected to the second terminal of the μ-LED and a first terminal of the imprinting diode being connected to the imprinting signal line.

926. Device current line contact, characterised in that
the driver circuit comprises the first transistor, a second transistor and the charge storage, the selection signal line being applied to a control contact of the second transistor and the data signal input being applied to a current conduction contact of the second transistor, and a first or a second current conduction contact of the first transistor providing the driver output which is connected to the μ-LEDs of the first branch and a second branch to provide a power supply.

927. μ-display or μ-display module comprising a plurality of the devices according to any of the preceding items, in which pixel cells of the μ-display are each electrically connected along a row and/or along a column on a common imprinting signal line, and
each pixel cell of a column is electrically connected to the supply potential terminal by means of a common supply line to a switching transistor arranged on a common carrier outside the μ-display.

928. μ-display or μ-display module according to item 927, in which the μ-LEDs connected in the first and at least one second branch at least comprise
features according to any of the preceding items, in particular items 94 to 111 or 7 to 50;
features according to any of the items 484 to 536;
a photonic structure according to any of items 607 to 679.

929. Method for electronically configuring a plurality of μ-LEDs according to any of the preceding items articles, comprising the steps of:
testing a function of the μ-LED of the first and second branch;
if there is no error in the μ-LED in the first and second branch:
applying of an imprinting signal to the electronic imprinting component;

imprinting into the second branch a current flow which triggers the fuse connected in series to the μ-LED of the second branch.

930. Use of a device according to any of the preceding items in a display arrangement according to any of the preceding or subsequent items.

931. Display arrangement comprising an IC substrate component with monolithic integrated circuits and with IC substrate contacts arranged as a matrix; and a monolithic pixelated optochip comprising a semiconductor layer sequence with a first semiconductor layer having a first doping and a second semiconductor layer having a second doping, wherein the polarity of the charge carriers in the first semiconductor layer differs from that of the second semiconductor layer and the semiconductor layer sequence defines a stacking direction; and wherein μ-LEDs arranged as a matrix are present in the monolithic pixelated optochip; and wherein each μ-LED has a μ-LED rear side facing the IC substrate component and a first light source contact which adjoins the first semiconductor layer in a contacting manner and is electrically conductively connected to a respective one of the IC substrate contacts;

characterised in that the projection area of the first light source contact on the μ-LED rear surface is at most half the area of the μ-LED rear surface; and the first light source contact in a lateral direction perpendicular to the stacking direction is surrounded by an absorber on the rear side.

932. Display arrangement according to item 931, characterized in that the first semiconductor layer and the second semiconductor layer comprise a p- or n-conductivity lower than $104\ Sm^{-1}$, preferably lower than $3*103\ Sm^{-1}$, more preferably lower than $103\ Sm^{-1}$.

933. display arrangement according to any of the preceding items, characterized in that the layer thickness of the first semiconductor layer in the stacking direction is at most ten times and preferably at most five times the maximum diagonal of the first light source contact in the lateral direction.

934. Display arrangement according to any of the preceding items, characterized in that the pixel size of the μ-LED is <10 μm and preferably <5 μm and particularly preferably <2 μm.

935. Display arrangement according to one of the preceding items, characterized in that the projection area of the first light source contact on the μ-LED back is at most 25% and preferably at most 10% of the area of the μ-LED back.

936. Display arrangement according to any of the preceding items, characterized in that the rear absorber extends in the stacking direction in the semiconductor layer sequence.

937. Display arrangement according to any of the preceding items, characterized in that a second light source contact made of a transparent material is arranged in the stacking direction above the second semiconductor layer for each μ-LED, which is electrically conductively connected to a transparent contact layer on the front side of the monolithic pixelated optochip.

938. Display arrangement according to item 937, characterized in that the second light source contact is formed by the transparent contact layer itself.

939. display arrangement according to any of the preceding items, characterized in that the second light source contact is adjacent to the transparent contact layer and the second light source contact of adjacent μ-LEDs are separated from each other by an absorber on the front side in a lateral direction perpendicular to the stacking direction.

940. Display arrangement according to any of the preceding items, characterized in that the front absorber extends against the stacking direction up to and preferably into the second semiconductor layer.

941. Display arrangement according to any of the preceding items, characterized in that, with respect to the stacking direction, an optochip contact element whose cross-sectional area is larger than that of the first light source contact is adjacent below the first light source contact.

942. Display arrangement according to any of the preceding items, further comprising:

a light-shaping structure, in particular a microlens or a photonic crystal, which is arranged on the monolithic pixelated optochip and directs light emitted by the monolithic pixelated Optochip.

943. Display arrangement according to any of the preceding items, further comprising a light-converting element on the surface of the monolithic pixelated Optochip.

944. Display arrangement according to any of the preceding items, wherein, in the case of two adjacent μ-LEDs, one μ-LED is configured as a redundant element to the other μ-LED, to which a fuse element in the IC substrate component is assigned, which fuse element is designed to replace the other μ-LED by the redundant element if the other μ-LED fails or to disconnect the redundant element from a power supply if the other μ-LED is functional.

945. Method of manufacturing a display device, wherein an IC substrate component with monolithic integrated circuits and with IC substrate contacts arranged as a matrix and a monolithic pixelated optochip are electrically conductively connected; and a semiconductor layer sequence with a first semiconductor layer having a first doping and a second semiconductor layer having a second doping is grown in the monolithic pixelated optochip, the polarity of the charge carriers in the first semiconductor layer differing from that of the second semiconductor layer and the half-conductor layer sequence defining a stacking direction; and wherein μ-LEDs arranged in the monolithic pixelated optochip as a matrix are applied, each μ-LED comprising a μ-LED rear side facing the IC substrate component and a first light source contact which adjoins the first semiconductor layer in a contacting manner and is electrically conductively connected to a respective one of the IC substrate contacts;

characterised in that the first light source contact is applied with a size such that its projection area perpendicular to the stacking direction occupies at most half the area of the μ-LED backside; and the first light source contact in a lateral direction perpendicular to the stacking direction is surrounded by an absorber on the rear side.

946. Display arrangement with a μ-display comprising a plurality of pixels arranged in rows and columns, comprising:

a first substrate structure with µ-LEDs arranged therein or applied thereto, the edge length of which is less than 50 µm, in particular less than 20 µm, and which form the pixel structure arranged in rows and columns, wherein the µ-LEDs are individually controllable; and a plurality of contacts are arranged on the surface of the first substrate structure opposite to a light emission direction;

a second substrate structure comprising on a surface a plurality of contacts corresponding to the contacts of the first substrate structure and having a plurality of digital circuits for addressing the µ-LEDs;

wherein the first and second substrate structures are connected together and the plurality of contacts are electrically connected to the corresponding contacts, and wherein the first substrate structure is formed with a first material system and the second substrate structure is formed with a second material system different therefrom.

947. Display arrangement according to item 946, in which at least some contacts of the plurality of contacts have an edge length of less than 10 µm or an area of less than 20 µm².

948. Display arrangement according to any of the preceding items, in which the µ-LEDs are formed with an edge length of less than 10 µm and/or have a distance to adjacent µ-LED of less than 7 µm.

949. Display arrangement according to any of the preceding items, comprising an adhesive or other form-fitting element partially disposed between and holding together the first and second substrate structures 950. Display arrangement according to any of the preceding items, wherein the µ-display comprises a plurality of pixels arranged in rows and columns, at least some of the µ-LEDs or µ-LED arrays or optoelectronic devices according to any of the preceding items, or elements according to any of the preceding items.

951. Display arrangement according to any of the preceding items, in which the second substrate structure comprises at least some of the circuitry according to any of the preceding items.

952. Display arrangement according to any of the preceding items, further comprising at least one light guiding arrangement having features according to any of the preceding items.

953. Display arrangement according to any of the preceding items, in which the first substrate structure is separated from the second substrate structure by an intermediate structure through which at least contact lines extend which connect the contacts of the first substrate structure with contacts of the second substrate structure.

954. Display arrangement according to any of the preceding items, in which the first system of materials comprises at least one of the following compounds GaN, GaP, GaInP, InAlP, GaAlP or GaAlInP, GaAs, AlGaAs, and the second material system comprises at least one of the following material systems: monocrystalline, polycrystalline, amorphous silicon, indium-gallium-zinc oxide, GaN or GaAs.

955. Display arrangement according to any of the preceding items, in which in the first carrier structure comprises a plurality of switchable current sources, each of which is connected to a pixel for the supply thereof, and whose switch inputs are coupled to the contacts for supplying switching signals from the digital circuits.

956. Display arrangement according to item 955, in which the switchable current sources are arranged in a material system, which is different from the material system used for the µ-LEDs or from the first material system.

957. Display arrangement according to any of the preceding items, in which the plurality of digital circuits of the second substrate structure are adapted to generate a PWM-like signal from a clock signal and a data word for each pixel.

958. Display arrangement according to item 957, in which the plurality of digital circuits comprises a number of serially connected shift registers, the respective length of which corresponds to the data word for one pixel, each shift register being connected to a buffer for intermediate storage.

959. Display arrangement according to any of the preceding items, wherein the plurality of digital circuits comprise a multiplexer electrically coupled to a demultiplexer in the first substrate structure for driving multiple optoelectronic devices.

The description with the help of the exemplary embodiments does not limit the various embodiments shown in the examples to these. Rather, the disclosure depicts several aspects, which can be combined with each other and also with each other. Aspects that relate to processes, for example, can thus also be combined with aspects where light extraction is the main focus. This is also made clear by the various objects shown above.

The invention thus comprises any features and also any combination of features, including in particular any combination of features in the subject-matter and claims, even if that feature or combination is not explicitly specified in the exemplary embodiments.

The invention claimed is:

1. A display arrangement comprising:
an IC substrate component with monolithic integrated circuits and with IC substrate contacts arranged as a matrix; a monolithic pixelated optochip comprising a semiconductor layer sequence with a first semiconductor layer having a first doping and a second semiconductor layer having a second doping, wherein the polarity of the charge carriers in the first semiconductor layer differs from that of the second semiconductor layer and the semiconductor layer sequence defines a stacking direction;

wherein µ-LEDs arranged as a matrix are present in the monolithic pixelated optochip;

wherein each µ-LED has a µ-LED rear side facing the IC substrate component and a first light source contact which adjoins the first semiconductor layer in a contacting manner and is electrically conductively connected to a respective one of the IC substrate contacts;

wherein the projection area of the first light source contact on the µ-LED rear surface is at most half the area of the µ-LED rear surface;

wherein the first light source contact in a lateral direction perpendicular to the stacking direction is surrounded by an absorber on the rear side;

wherein at least one of the first semiconductor layer or the second semiconductor layer is continuous across the µ-LEDs; and wherein a second light source contact is adjacent to a transparent contact layer and the second light source contact of adjacent µ-LEDs are separated from each other by a front absorber on the front side in a lateral direction perpendicular to the stacking direction.

2. The display arrangement according to claim 1, wherein the first semiconductor layer and the second semiconductor layer comprise a p- or n-conductivity lower than 104 Sm$^{-1}$.

3. The display arrangement according to claim 1, wherein the layer thickness of the first semiconductor layer in the stacking direction is at most ten times the maximum diagonal of the first light source contact in the lateral direction.

4. The display arrangement according to claim 1, wherein the projection area of the first light source contact on the μ-LED back is at most 25% of the area of the μ-LED back.

5. The display arrangement according to claim 1, wherein the second light source contact made of a transparent material is arranged in the stacking direction above the second semiconductor layer for each μ-LED, which is electrically conductively connected to the transparent contact layer on the front side of the monolithic pixelated optochip.

6. The display arrangement according to claim 1, wherein the front absorber extends against the stacking direction up to the second semiconductor layer.

7. The display arrangement according to claim 1, wherein, with respect to the stacking direction, an optochip contact element whose cross-sectional area is larger than that of the first light source contact is adjacent below the first light source contact.

8. The display arrangement according to claim 1, wherein, in the case of two adjacent μ-LEDs, one μ-LED is configured as a redundant element to the other μ-LED, to which a fuse element in the IC substrate component is assigned, which fuse element is designed to replace the other μ-LED by the redundant element if the other μ-LED fails or to disconnect the redundant element from a power supply if the other μ-LED is functional.

9. The display arrangement of claim 1, wherein the first light source contact is encapsulated in a lateral direction perpendicular to the stacking direction by an absorber on the rear side, said absorber being in contact with the surface of the first light source contact in the stacking direction.

* * * * *